United States Patent [19]

Loshbough et al.

[11] 4,236,222
[45] Nov. 25, 1980

[54] DIGITAL SCALE

[75] Inventors: Richard C. Loshbough; Edward G. Pryor, both of Westerville, Ohio

[73] Assignee: Reliance Electric Company, Cleveland, Ohio

[21] Appl. No.: 3,234

[22] Filed: Jan. 15, 1979

Related U.S. Application Data

[62] Division of Ser. No. 824,858, Aug. 15, 1977, Pat. No. 4,204,197.

[51] Int. Cl.³ .................... G01G 23/14; G01G 13/14
[52] U.S. Cl. ................................. 364/567; 364/466; 177/1; 177/25
[58] Field of Search ................ 364/567, 466; 177/1, 177/25

[56] References Cited

U.S. PATENT DOCUMENTS

| 3,853,267 | 12/1974 | Cadwell et al. ................ 364/567 |
| 4,036,316 | 7/1977 | Rock ................................ 364/567 X |
| 4,055,748 | 10/1977 | Boshinski et al. ............... 364/466 |
| 4,071,102 | 1/1978 | Ostenbridge et al. .......... 364/567 X |
| 4,114,706 | 9/1978 | Realini et al. ................... 364/567 X |

*Primary Examiner*—Edward J. Wise
*Attorney, Agent, or Firm*—Roy F. Hollander; William F. Simpson

[57] ABSTRACT

The invention relates to a scale system which employs a microcomputer forming an integral part of the analog to digital conversion means in which the microcomputer controls the sequence of operations for performing the conversion, accumulates and stores digital data derived during the conversion of the analog signal and combines and processes that data to provide the digital output data resulting from the conversion, all in addition to performing other scale functions. The invention relates to an improved multicapacity weighing and computing digital scale having a triple slope analog-to-digital conversion means. The analog weight signal is integrated for a time interval which is fixed for a given scale capacity range which would generate substantially the same integrator output level in response to a full capacity weight signal for the selected scale capacity as would be generated by a full capacity weight for all other scale capacities. In accordance with the invention, the time interval during which the first reference DC source is integrated is extended beyond the detection of the crossover of the integrator output with its reference level. The invention also provides an improved weight filtering arrangement which enables the full advantage of the improved converter to be obtained. The invention further provides for the tracking of the net zero indication by modification of the stored tare weight data by a predetermined amount to decrease the absolute value of the net weight in response to the net weight being within a preselected weight range.

8 Claims, 37 Drawing Figures

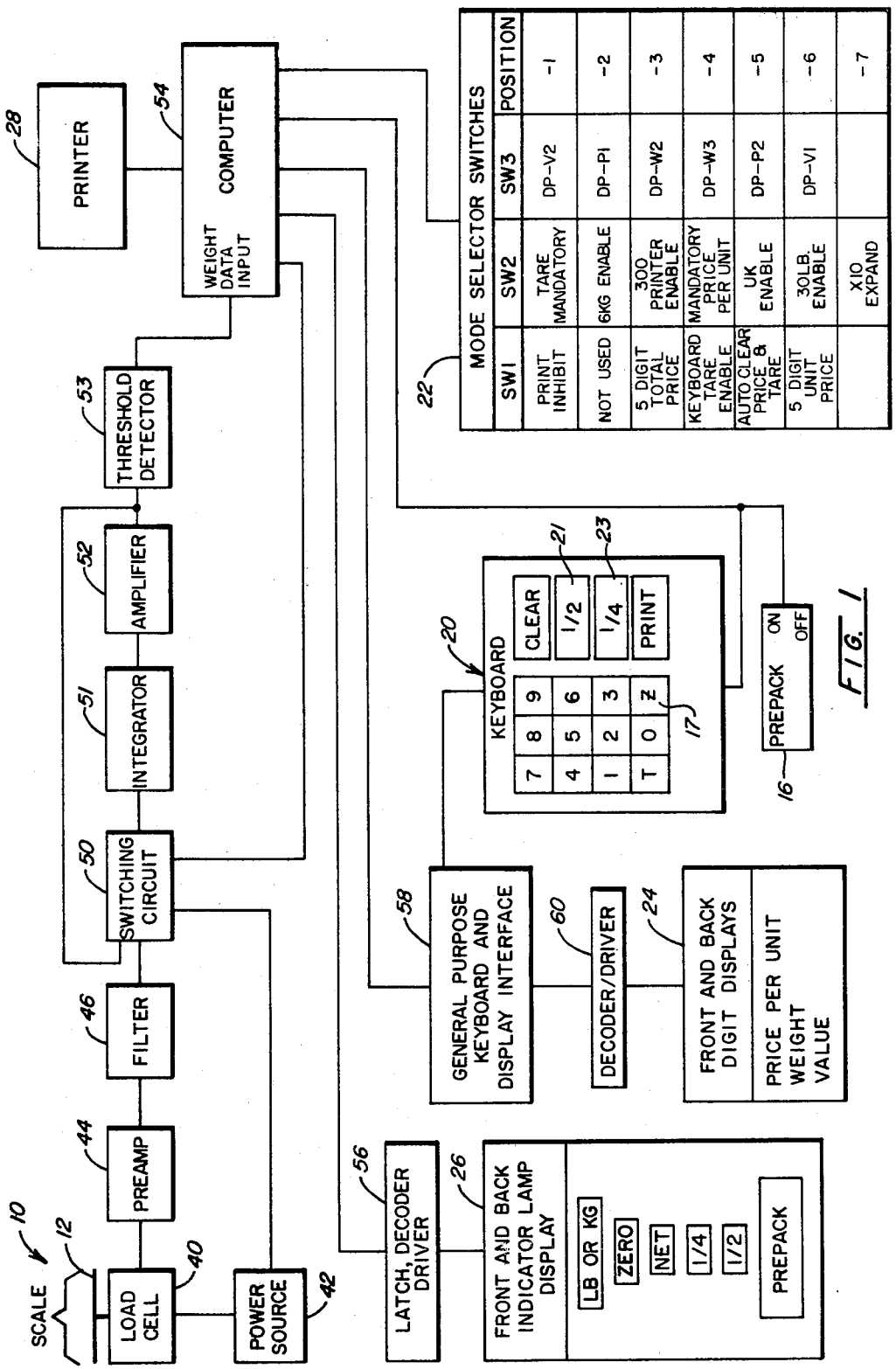

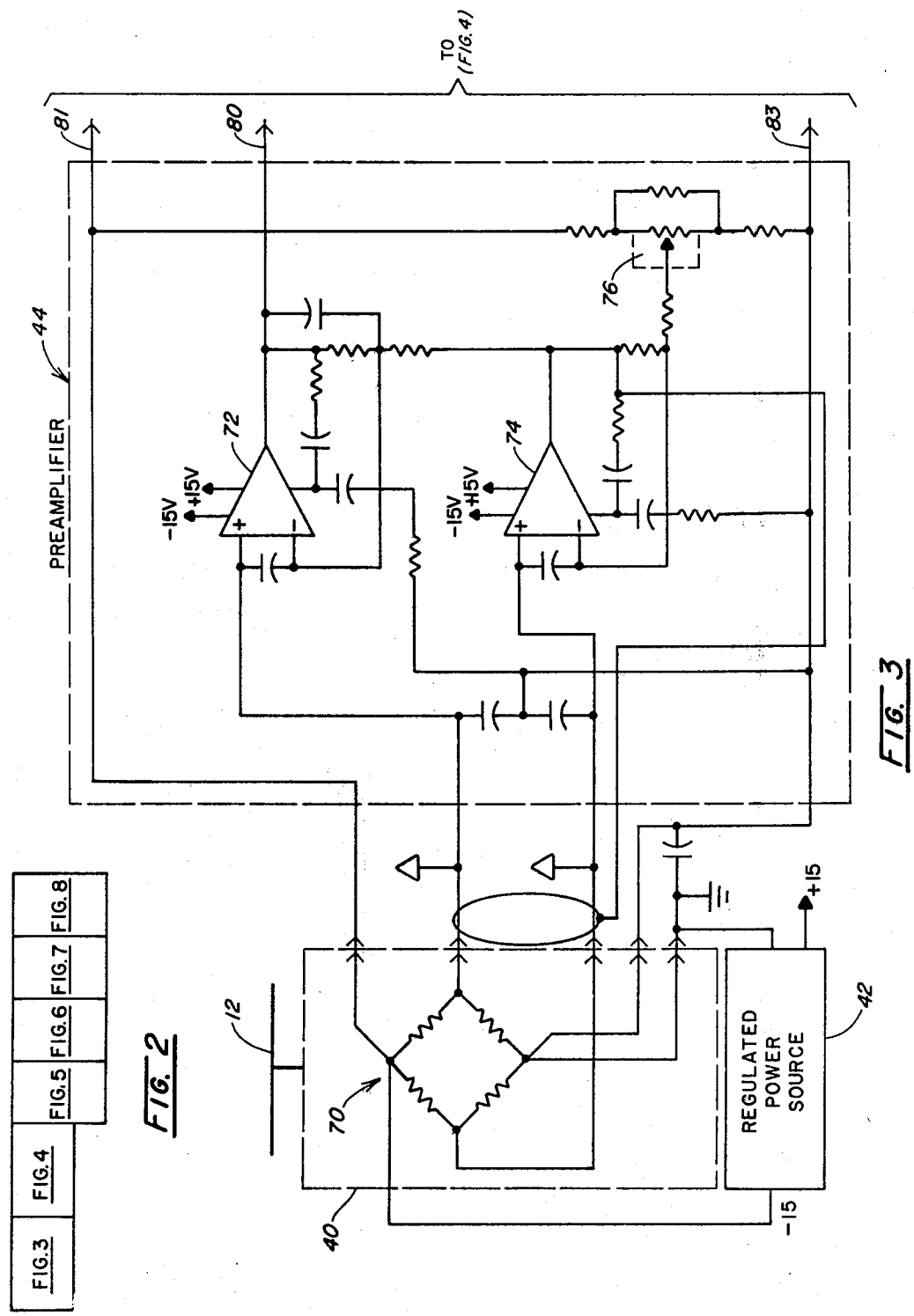

RAM ASSIGNMENTS

| | 00 | | 01 | | 02 | | 03 | |
|---|---|---|---|---|---|---|---|---|
| 0 | MOTION FLAG | -000 | FILTER COUNTER | -010 | LB/KG LAMP | -020 | Z KEY TIMER | -030 |
| 1 | ZERO INCREMENT FLAG | -001 | ZERO LAMP FLAG | -011 | ZERO LAMP | -021 | ZERO DONE FLAG | -031 |
| 2 | TARE DONE FLAG | -002 | NET FLAG | -012 | NET LAMP | -022 | | |
| 3 | MANUAL TARE FLAG | -003 | FACTOR FLAG | -013 | 1/2 LAMP | -023 | AUTO CLEAR FLAG | -033 |
| 4 | DIGIT TIMER | -004 | | | 1/4 LAMP | -024 | 2 PREVIOUS LSD | -034 |
| 5 | | -005 | | | PRE-PACK HALF PENCE | -025 | 1 PREVIOUS LSD | -035 |
| 6 | | | | | PRE-PACK HALF PENCE | -026 | | |
| 7 | | | | | PRINT COMMAND | -027 | | |
| 8 | | | VERIFY TEST FLAG | -018 | | | | |
| 9 | | -009 | SIGN | -019 | SIGN | -029 | SIGN | -039 |
| A | RESULT | -00A | | -01A | | -02A | | -03A |
| B | | | ARI ARITHMETIC SCRATCH PAD RESGISTER | | | | | |
| C | | | | | WEIGHT | | FILTERED WEIGHT | |
| D | | | | | | | | |
| E | | | | | | | | |
| F | | -00F | | -01F | | -02F | | -03F |

| | 04 | | 05 | | 06 | | 07 | |
|---|---|---|---|---|---|---|---|---|
| 0 | 300 PRINTER ENABLE | -040 | 5 DIGIT TOTAL PRICE ENABLE | -050 | | -060 | | -070 |
| 1 | MANDATCRY PRICE/UNIT EN. | -041 | 5 DIGIT PRICE ENABLE | -051 | | | | |
| 2 | TARE MANDATCRY EN. | -042 | | | TOTAL PRICE | | | |
| 3 | 30 LB EN. | -043 | AUTO CLEAR EN. | -053 | | | WORK AREA AND DISPLAY OUTPUT REGISTERS | |
| 4 | 6 KG EN. | -044 | 20 INCREMENT PRINT DISABLE | -054 | | -064 | | |
| 5 | UK EN. | -045 | KEYBOARD TARE EN. | -055 | | -065 | | |
| 6 | KEYBOARD RETURN | -046 | | | | | | |
| 7 | KEYBOARD STROBE | -047 | RECOMPUTE FLAG | -057 | PRICE | | | |
| 8 | X ZERO BY PER. 10 KEY | -048 | VERIFY MODE FLAG | -058 | | | | |
| 9 | SIGN | -049 | SIGN | -059 | | -069 | | -079 |
| A | | -04A | | -05A | | -06A | | |
| B | | | | | | | TEMPORARY SCRATCH PAD REGISTERS | |
| C | AUTO ZERO | | TARE | | OUTPUT WEIGHT | | | |
| D | | | | | | -06D | | |
| E | | | | | SIGN | -06E | | |
| F | | -04F | | -05F | | -06F | | -07F |

*FIG. 13*

DIGITAL SCALE

This is a division of application Ser. No. 824,858, filed Aug. 15, 1977, now U.S. Pat. No. 4,204,197.

BACKGROUND OF THE INVENTION

1. Field of the Invention

This invention concerns weight measuring apparatus. More particularly, the invention is concerned with a weighing scale system having an improved analog-to-digital conversion means including a microcomputer which forms an integral part thereof and to the automatic tracking of the net zero indication of such an apparatus.

2. Description of the Prior Art

Weighing and computing scales must meet several stringent requirements for performance and cost. The scales must be accurate enough to satisfy public weights and measures authorities, yet be available at a reasonably affordable price and perform their operations within a period of time which is convenient for sales transactions.

One of the important factors in digital scales upon which cost, accuracy and operation time depends, is the conversion of the unknown analog weight signal corresponding to an article weight to digital data representative of the article weight.

In the past, digital weighing and computing scales have typically performed the analog-to-digital conversion with a separate distinct and independently controlled analog-to-digital converter circuit which may provide its digital output to a data processing means. Typical examples are Williams, Jr. et al, U.S. Pat. No. 3,709,309 and Loshbough et al., U.S. Pat. No. 3,962,569. This prior art circuitry conventionally uses the dual slope method of analog-to-digital conversion, which method is illustrated in Gilbert, U.S. Pat. No. 3,051,939 and Ammann, U.S. Pat. No. 3,316,547. Triple slope analog-to-digital converters are shown in U.S. Pat. Nos. 3,577,140 Aasnacs; 3,582,947 Harrison; 3,678,506 Wheable; and Re. 28706 Dorey. Reference is also made to U.S. Pat. No. 3,937,287 granted to E. G. Pryor and R. C. Loshbough on Feb. 10, 1976 relating to data filtering. The exemplarily embodiment of the invention described herein describes features shown in U.S. Pat. Nos. 3,962,569 Loshbough et al; 3,962,570 Loshbough et al; 3,986,012, Loshbough et al; and 4,004,139, Hall, et al; and U.S. application Ser. No. 729,911, Hall et al.

Prior art weight measuring apparatus has generally required circuitry separate from the data processing means for performing the integrating, counting, and control functions normally associated with an integrating type analog-to-digital conversion. Attendant with the requirement for separate circuitry is its cost and the relative inflexibility due to the limited number of functions performed by hardwired circuitry.

SUMMARY OF THE INVENTION

There is, therefore, a need for a weighing scale having a relatively simple design which is capable of more effectively utilizing the data processing means to reduce the number of components required to implement the analog-to-digital conversion and thereby reduce the cost of the weighing scale and allow the analog-to-digital conversion to avail itself of the flexibility afforded by the data processing means.

The present invention achieves the foregoing needs by providing a weighing scale system which employs a microcomputer data processing means which is integral to an analog-to-digital conversion and which is used for controlling the sequence of operations and computing the required data for the scale system. The requirement for separate control and counting circuitry associated solely with the analog-to-digital conversion is thereby eliminated, with the additional advantage of allowing the analog-to-digital conversion to be modified via a modification of the instructions of the microcomputer.

In a conventional triple slope analog-to-digital conversion, an analog signal is applied through a switching circuit to an integrator circuit for a first fixed time interval in order to drive its output from an initial level to a level which is proportional to the amplitude of the analog signal. Then a second integrating interval is begun in which a clock-driven digital timing counter begins counting time intervals and simultaneously a first reference DC source is applied through the seitching circuit to the integrator to drive its output past a reference level. This level is detected by a threshold detector circuit. In accordance with the present invention, the second time interval is extended an additional time interval beyond the crossover of the reference level. Then during the third integrating interval, the elapse of time is counted. The slower rate permits the crossover to be more precisely detected. Upon detection of such crossover by the threshold detector, the counting of the elapsed time is halted.

In the prior art a separate single digital counter is used to count the clock pulses to accumulate a count of elapsed time for both the second and third integrating intervals. Its most significant digits are used to accumulate the elapsed time count during the second interval and its least significant digits are used to accumulate the elapsed time count during the third interval.

A unique feature of the present invention is that the control of the switching circuit is performed by a microcomputer and the output of the threshold detector is applied directly to the microcomputer so that all counting and arithmetic operations are performed by the microcomputer.

The analog to digital conversion system also affects other characteristics of a weighing and computing scale. For example, an improved digital input weight filtering arrangement is provided which permits the improved accuracy to be obtained by reducing the filter delay and at the same time reducing the effects of vibration or jitter.

In order for a weighing scale to be able to provide a choice of full scale capacities, it is necessary that the weight signal or data be modified in either its analog form or its digital form in a manner which is dependent upon the particular scale capacity and units of weight which are selected.

The weight can be detected according to a single one of several possible scale capacities and weight units and then multiplied by an appropriate conversion factor when another scale capacity is selected. This, however, requires that a computer of such a weighing scale have a more complex sequence of operations because for each selected scale capacity it must deal with substantially different numbers in performing all of its various checks and control functions.

Alternatively, the analog weight signal may be amplified by an amplification factor which is unique for each scale capacity. This selective modification of the analog gain has the disadvantage that it requires the use of either adjustable or multiple circuit elements, such as resistors, in the analog circuitry, one of which must be manually switched into the circuit for each selected amplification factor corresponding to each selected scale capacity. The use of such alternatively selectable circuit elements requires a substantial additional expense and creates problems in calibration.

These problems can be reduced by causing the full capacity analog weight signal for each scale capacity to produce the same digital number at the output of the analog-to-digital converter. This also permits a single span control to set the full capacity output for all selectable scale capacities. For example, in the exemplary embodiment of the present invention, a full scale weight for each scale capacity will produce a digital output of 30,000 net effective weight increments which are termed raw weight increments. The number of raw weight increments is then multiplied by a factor, depending upon the scale capacity to obtain the proper weight units.

It is a unique feature of the present invention that it provides substantially the same digital data with a full capacity weight for all selected scale capacities without requiring multiple circuit elements and without requiring modification of the analog circuit gain. This unique aspect of the present invention is provided by the microcomputer implementation of the analog-to-digital conversion.

Another unique feature of the present invention relates to the computing and displaying of a net weight. The prior art includes weighing and computing scales upon which a food container or other tare weight may be placed, weighed and have the tare weight entered into memory. This stored tare weight is available for later subtraction from the gross weight of the filled container to compute and display the net weight of the contents.

Whenever such a tare weight container is placed on the platter of a scale operating in such a net mode, the digital display should indicate a zero weight. However, drift and hysteresis effects may cause the digital data representing the subsequent measurement of the weight of the container to be different from the previously measured weight data which was stored as the tare weight. Consequently, a subtraction of the earlier stored tare weight from the currently measured weight may cause an erroneous non-zero number to be displayed.

It is a unique feature of the present invention that such drift or wandering in the digital tare weight data is automatically tracked and the stored tare weight is automatically updated so that an accurate net zero indication is maintained.

The objects and features of the invention will be apparent from the specification and claims when considered in connection with the accompanying drawings illustrating the exemplary embodiment of the invention.

The means, apparatus, and structure, by which the above novel improvements, in accordance with the present invention, are achieved in the exemplary embodiment described herein, comprises various registers, counters, timers, flags, storage spaces, together with specific routines and routine loops for the control of the respective apparatus or means by the central control unit. In addition, numerous switches, lamps and display devices cooperate with the central control unit and the various storage spaces, counters, timers, etc., which apparatus comprises input and output means for the system.

DESCRIPTION OF THE DRAWINGS

FIG. 1 is a block diagram illustrating the apparatus of the exemplary embodiment of the invention.

FIG. 2 is a diagram illustrating the layout and relative interrelationship of the circuit diagrams of FIGS. 3 through 8 and is shown on the same sheet as FIG. 10.

FIGS. 3 through 8 show the detailed circuitry of an exemplary embodiment of the invention.

FIG. 13 is a random access memory assignment table illustrating the assignments for the memory of the exemplary embodiment of the invention.

Figure 4:
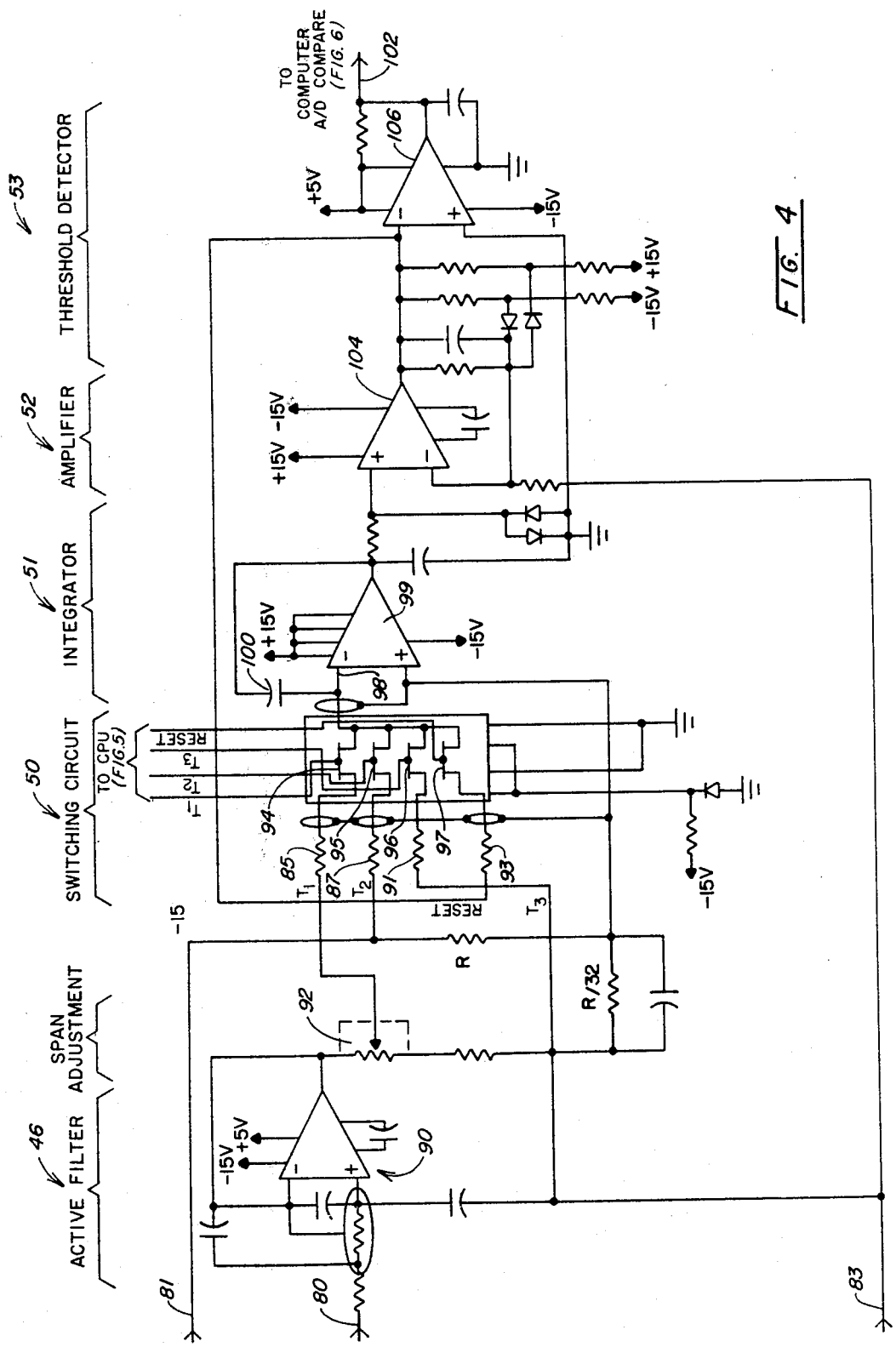

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose. For example, the term connection is not necessarily limited to direct connection but also includes connection through other circuit elements.

GENERAL DESCRIPTION

The exemplary embodiment of the invention is illustrated in the block diagram of FIG. 1. A load cell 40 mechanically supports a platter 12 and is supplied with electrical energy by a power source 42. The load cell applies an analog weight signal through a preamplifier 44 and filter 46 to a switching circuit 50. The analog weight signal has an amplitude which is dependent upon the weight supported by the load cell 40.

The switching circuit 50 is also connected to the power supply so that not only the analog signal but also two reference DC sources can be sequentially applied to the integrator 51 during the performance of a triple slope A/D conversion. The output of the integrator is amplified by an amplifier 52 and applied to a threshold detector so that the crossover of the integrator output with its reference output level is detected by the threshold detector 53. The output of the amplifier is also connected to the switching means 50 for use in resetting the integrator 51. The output of the threshold detector 53 is applied to a microcomputer 54 which is also connected to the switching circuit 50 for controlling its switching functions.

The microcomputer 54 is connected to a printer 28 and through latch decoder and driver circuitry 56 to indicator lamp displays 26. Operational mode selector switches 22 are also connected to data input terminals of the microcomputer 54.

The microcomputer is further connected to a general purpose keyboard and display interface 58 for receiving data from a keyboard 20 and transmitting data through a decoder/driver 60 to digit displays 24. The "PRE- PACK ON/OFF" switch 16 and the "Z" key 17 are individually connected to discrete inputs to the microcomputer 54.

In this exemplary embodiment, the analog-to-digital conversion is performed by the combination of the switching circuit 50, the reference DC sources derived from the power source 42, the integrator 51, the threshold detector 53 and the microcomputer 54. The amplifier 52 is provided to amplify the integrator output so that the threshold detector will more accurately determine when the integrator output crosses the threshold voltage.

The microcomputer 54 includes storage registers in which the elapsed time counts, which are derived from a microcomputer program or instruction loop, are accumulated. It also includes stored data for each scale capacity. The microcomputer 54 includes a central processor, associated memory and stored data for controlling the switching circuit 50 to appropriately apply the inputs to the integrator 51 in the proper sequence and at the proper time, for interrogating the output of the threshold detector 53, and for arithmetically processing the accumulated elapsed time intervals or counts.

Figure 12:
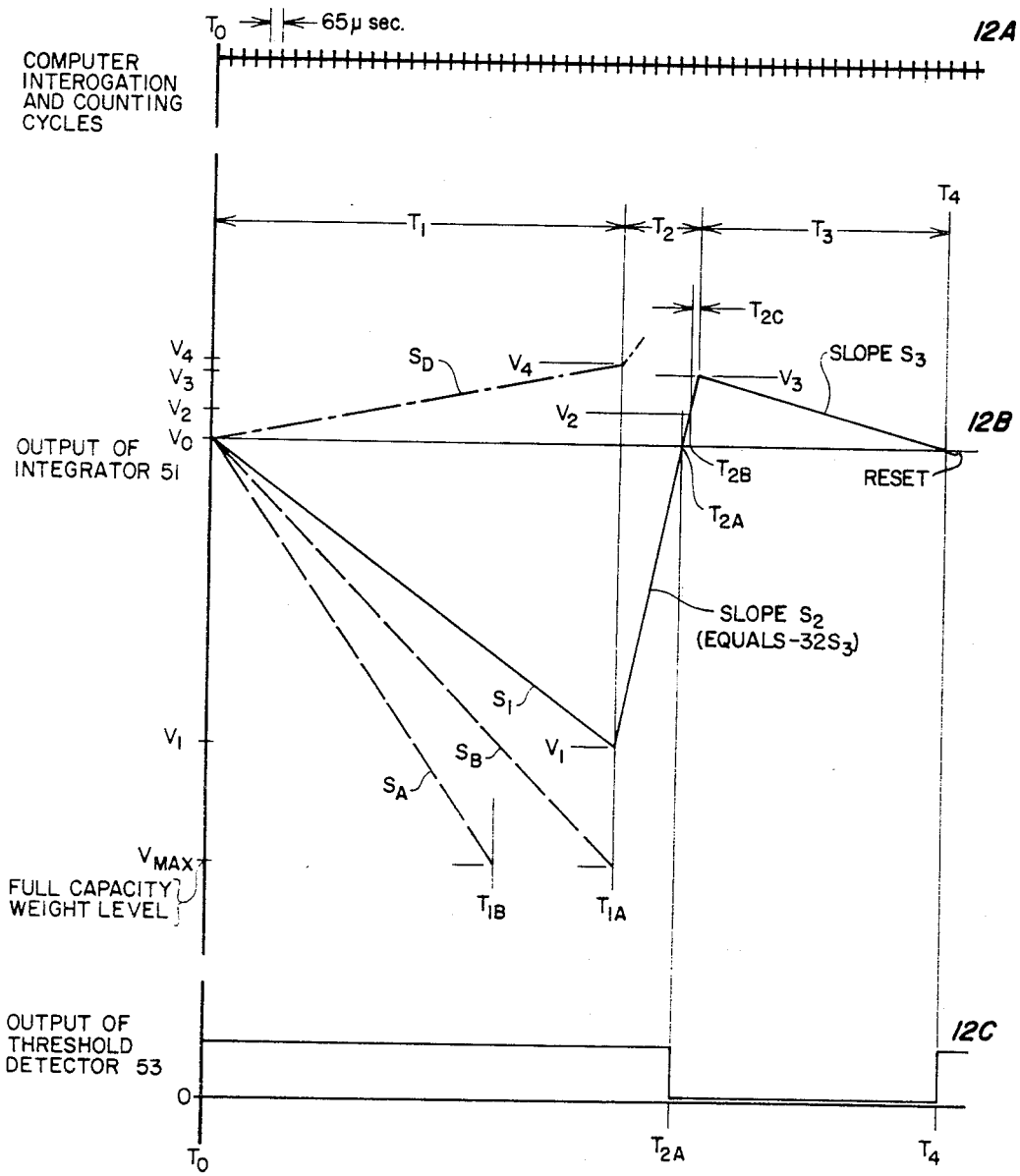
FIG. 12 is a diagram illustrating the operation of the exemplary embodiment of the invention.

FIG. 12 illustrates, in simplified form, the signal relationships which are most significant in describing the invention. The vertical axes represent amplitudes which are not drawn to scale in order that the principles of operation may be more clearly illustrated. The horizontal axis represents time.

The top most graph 12A depicts the computer interrogation and counting cycles and in the exemplary embodiment have a 65 microsecond period. These are not drawn to scale because several thousand such cycles would be needed. Each cycle represents the length of time required for the microcomputer to loop through its interrogation and indexing sequence of operations.

Below that is a graph 12B illustrating in a solid line the output of the integrator 51 and also illustrating, with broken lines, portions of alternative outputs from the integrator 51.

Finally, the lowest graph 12C illustrates the output state of the threshold detector 53. Its threshold level is set to correspond to the initial level $V_o$ at the output of the integrator 51 and its output is high when the output of the integrator is negative and is low when the output of the integrator is positive.

Referring to FIGS. 1 and 12, at time $T_o$ to microcomputer 54 switches the switching circuit 50 to apply the analog signal, which was derived from the load cell, to the input of the integrator 51. This analog continues to be applied and is integrated for the entire time interval $T_1$. This input causes the output of the integrator to be driven from its initial level $V_o$ along slope $S_1$ to level $V_1$. The magnitude of $V_1-V_o$ is a directly proportional function of the amplitude of the analog signal and is also a function of its integration time $T_1$.

The time interval $T_1$ is a different but fixed and constant time for each different scale capacity and is controlled by the microcomputer 54 and is obtained by reading permanently stored timing data from the computer memory, loading it into suitable registers and sequentially setting the registers in accordance with selected timing loop instructions.

One unique feature of the present invention is that this first integrating interval $T_1$, during which the analog signal is integrated, is different for each scale capacity and therefore different data is stored in memory and loaded into the time delay registers for each scale capacity.

A particular $T_1$ time is chosen for each scale capacity so that whatever scale capacity is selected, a full scale weight on the platter for that scale capacity will always drive the integrator output to substantially the same level. Assume for example that the above described integration along integrator output slope $S_1$ represents a 20 pound weight on the platter 12 with a 30 pound scale capacity selected, then a 30 pound weight on the platter 12 would integrate along slope $S_B$ to arrive at $V_{MAX}$ at the time $T_{1A}$ after time interval $T_1$. If, for example, a 15 kg scale capacity were then selected, a shorter analog signal integrating time would be provided by the microcomputer 54 so that a 15 kg weight on the scale platter would drive the integrator output along the slope $S_C$ to reach $V_{MAX}$ at a time $T_{1B}$. In the exemplary embodiment, the following analog signal time intervals are used:

6 kg×2 g—239.660 milliseconds 15 kg×5 g—95.790 milliseconds 30 lb×0.01 lb—105.625 milliseconds At time $T_{1A}$ which is the end of the first integrating time interval $T_1$, the microcomputer 54 switches the switching circuit 50 to begin the second integrating time interval $T_2$ by applying a first reference DC source $I_1$ to the input of the integrator 51. This first reference DC source $I_1$ is then integrated to drive the integrator output level, which represents the sum of the integral obtained during $T_1$ and the integral being performed during $T_2$, along slope $S_2$ back towards and past the initial integrator output level $V_o$.

After initiating this second integrating interval $T_2$, the microcomputer begins periodically interrogating the output of the threshold detector 53 looking for the transition which indicates the crossover of the integrator output level with its initial level $V_o$.

Each time the microcomputer interrogates the output of the threshold detector 53 and finds that crossover has not occurred, it increments a memory register referred to as the $T_2$ register or $T_2$ counter which is assigned to accumulate such interrogation counts. Each such interrogation and counting cycle or instruction loop requires the identical time to perform which in the exemplary embodiment, is 65 m sec.

Eventually, at a time labelled $T_{2A}$ in FIG. 12B, the output of the integrator 51 crosses over its initial level $V_o$ causing the output of the threshold detector to switch from a low state to a high state. This transition may occur anywhere within an interrogation and indexing cycle or the end or beginning of such a cycle. However, because of the digital ambiguity the microcomputer 54 will not detect this transition until it interrogates the output of the threshold detector 53 at time $T_2B$.

When the switching of the output of the threshold detector 53 is detected at $T_2B$ by the microcomputer 54, no more interrogation and indexing cycle counts are accumulated in the memory register. Therefore, the digital count accumulated in the first memory register at time $T_2B$ represents the sum of the amplitude $(V_1-V_o)$ plus any overshoot $V_2-V_o$ of slope $S_2$, beyond level $V_o$.

On occasion, the coincidence of the integrator output with the threshold level $V_o$ will occur relatively near the end of a counting cycle. The possibility then exists that circuit switching, which occurs at the end of the computer interrogating cycles, may cause transients which might cause erroneous operation. For example, if the crossover occurs just before an interrogation of the output of the threshold detector 53 by the microcomputer 54 so that very little overshoot occurs, then the output level of the integrator will be close to the level $V_o$. If the next integrating interval $T_3$ were then begun, a computer clock pulse may cause the threshold detector 53 to switch states prematurely.

A unique feature of the present invention is that these crosstalk problems can be eliminated by providing an extra delay at the end of the $T_2$ interval after the microcomputer 54 has detected the $V_o$ crossover. Conveniently, this delay interval, labelled $T_2C$, can be made equal to one interrogation cycle and will cause the integrator output to be driven further along $S_2$ from $V_2$ and $V_3$. However, the count accumulating memory is not incremented so that no count is added to the memory register for that extra cycle.

After delay time $T_2C$, the computer 54 switches the switching circuit 50 to apply a second reference DC source $I_2$ to the integrator 51. This second reference DC source $I_2$ is substantially less than the first reference DC source $I_1$ which was integrated during interval $T_2$ because it is desired to integrate at a reduced slope $S_2$ in order to obtain more precisely the time of the coincidence of the integrator output with its initial level $V_o$. In the exemplary embodiment of the invention, the reference source which is integrated during the $T_2$ interval is 32 times greater than the reference source which is integrated during the $T_3$ interval. Therefore, the magnitude of the slope $S_2$ of the integrator output during interval $T_2$ is 32 times greater than the magnitude of the slope $S_3$ during interval $T_3$.

Upon the beginning of interval $T_3$, the microcomputer 54 again goes through interrogating and counting cycles just as it did during interval $T_2$. However, during interval $T_3$, the interrogating and counting cycles are counted by incrementing a memory register referred to as the $T_3$ counter or $T_3$ register. Then, as during interval $T_2$, counts continue to be accumulated in the second memory register until the first interrogation of the threshold detector 53 by the computer 54 which occurs after coincidence of the integrator output with the threshold level $V_o$. When the computer detects the resultant output level change of the threshold detector 53 at time $T_4$, and $T_3$ integrating interval and the count accumulation is stopped by the microcomputer 54.

At time $T_4$, the count accumulated in the second register during interval $T_3$, is directly proportional to and represents the difference between the integrator output level $V_3$ at $T_3A$ which is at the beginning of interval $T_3$ and the integrator output level at $T_4$ at the end of interval $T_3$. For computational purposes, the integrator output level at the end of $T_3$ is assumed to be $V_o$. Since this is a digital ambiguity within one of the counting cycles for the integration along the lesser slope $S_3$, it will be apparent from the following discussion that the error is less than one part in 30,000 at full scale capacity in the exemplary embodiment.

Nonetheless the time $T_4$, when the microcomputer detects the crossover, there will again be some overshoot past the initial level $V_o$ if the crossover occurs between periodic interrogations of the output of the threshold detector 53.

In order to remove the affect of this overshoot and accurately reset the integrator precisely to the identical $V_o$ prior to each integration, the microcomputer 54 switches the switching circuit 50 to effectively connect the integrator output to its input. This negative feedback drives the integrator output to $V_o$ following $T_4$ by effectively discharging the capacitor of the integrator 51. This is desirable because the current may drift prior to the next integrating cycle and because the overshoot and the end of the interval $T_3$ may produce an error in the time of crossover during the $T_2$ interval in which the integration is done along the steeper slope $S_2$.

The integration functions of the triple slope A/D conversion are completed with the accumulation in each of two memory registers of the digital count data taken along slopes $S_2$ and $S_3$. The microcomputer must now take this data and derive a digital number which is proportional to $V_1-V_0$ and which therefore is proportional to the amplitude of the analog input signal which was integrated during time interval $T_1$.

The counts in the $T_2$ register are proportional to $V_1-V_2$. The counts accumulated in the $T_3$ register are proportional to $V_3-V_o$. However, these counts were derived from the integration of two different reference DC sources of substantially different amplitudes. Therefore each $T_2$ count represents a different and greater quantity of integrator output amplitude and thus a greater weight increment than is represented by each $T_3$ count. In the exemplary embodiment, the first reference DC source $I_1$ is 32 times greater than the second reference DC source $I_2$ and therefore each $T_2$ count represents 32 times as much amplitude (32 raw weight increments) as does each $T_3$ count.

In order to equalize the value of each count in the $T_2$ and $T_3$ counters, the microcomputer 54 first multiplies the $T_2$ count by the ratio of $I_1/I_2$ which in the exemplary embodiment is 32. There upon the result represents the raw weight increments.

By way of example, 600 interrogating and counting cycle counts may have been accumulated in the $T_2$ register in driving the integrator output from $V_1$ to $V_2$ and 45 interrogating and counting cycle counts may have been accumulated in the $T_3$ counter in driving the integrator output from $V_3$ to $V_o$ during interval $T_3$. Consequently, in accordance with the invention, the microcomputer will multiply 600 by 32 to obtain a product of 19,200 raw weight increments represented by $V_1-V_2$.

The microcomputer then processes the $T_3$ count to convert it from a number representing $V_3-V_o$ to a number representing $V_2-V_o$. This is done by subtracting from the $T_3$ count a number of counts representing $V_3-V_2$. Since the integration along slope $S_2$ from $V_2$ to $V_3$ required one interrogating and counting cycle during time $T_2$, that interval $T_{2C}$ represents the same amplitude as is represented by a number of $T_3$ counts which is equal to the ratio of the first reference DC source $I_1$ to the second constant DC source $I_2$. Consequently, the microcomputer subtracts that ratio $I_1/I_2$ from the accumulated $T_3$ count.

In the above example for the exemplary embodiment, the number 32 is the ratio which is subtracted from the $T_3$ count of 45 yield a difference of 13 counts. These 13 counts represent 13 raw weight increments represented by $V_2-V_o$.

Therefore, the microcomputer can now arithmetically derive the number of raw weight increments represented by $V_1-V_o$ by subtracting this difference of $T_3$ counts which represents $V_2-V_o$ from 32 times the number of $T_2$ counts. In the example, the microcomputer subtracts 13 from 19,200 to yield 19,187 raw weight increments.

This digital number is proportional to the amplitude of the analog weight signal which was integrated during $T_1$. In the exemplary embodiment this digital represents weight increments which are referred to as raw weight increments herein.

Each weight indication is then filtered by an improved digital filter. Each weight, when obtained, is subtracted from the filtered weight and the difference divided by two. A one is then added or subtracted from the result to make the result approach the last weight and the last weight corrected by the final result.

This digital number of raw weight units is multiplied by the computer at a later time by the computer by a factor, depending upon the scale capacity to obtain the weight in the proper units for display.

The present invention maintains an accurate zero indication when the scale is not operating in the net mode and also maintains an accurate net zero indication in addition by updating the data stored in a tare weight register.

Tare weight data may be entered into a tare memory register by either of two methods. The digits of a tare weight may be keyed in through the keyboard 20 and this is referred to as a keyboard tare. The tare weight data may also be entered into memory by placing an empty container or other tare weight on the platter and depressing the "T" key. This is referred to as manual tare and causes the scale to read the tare weight and store it in the tare memory.

After a tare weight is properly entered by either of these operations, the computing and weighing scale displays the net weight, which is the difference between the weight of an object on the platter and the weight data stored in the tare register. Consequently, an object weighing the same as the tare weight, for example, the same empty container, should cause a zero net weight to be displayed. A lessor weight on the platter will generate the display of a negative weight.

Unfortunately, creep, hysteresis effects and drift may cause an object on the platter to generate slightly different tare weight data at different times. Similar difficulties have been observed in the maintenance of a gross zero indication as described in Loshbough et al, U.S. Pat. No. 3,986,012. In that situation, a separate auto zero register is used to store a correction factor for automatically correcting the gross zero indication. However, it has been discovered that the same auto zero register cannot be used for net zero tracking because whenever the scale reverts from a net mode of operation back to its gross mode, the auto zero register would still contain net zero tracking data and be erroneous for gross auto zero correction purposes.

The invention involves the periodic updating of the tare weight data to track such wander in order to maintain the display of a zero net weight under the conditions for which a zero net weight should be displayed and in order to use the most recently detected and most accurate tare weight data as a reference which is subtracted from total gross weight to compute net weight.

Each time the microcomputer 54 computes a net weight, it examines that weight data to determine whether the tare weight data should be modified. If the net weight is found to be exactly zero, then no drift has occurred and no tracking is necessary. Since a zero indication already exists, the microcomputer skips the remaining net zero tracking sequence of operations.

However, if the computed net weight is not exactly zero, it is then examined to determine whether it is close enough to a net weight of zero that its departure from zero can be attributed to creep, drift or hysteresis effects rather than to a change in the weight placed on the platter.

This decision, whether the net zero tracking should actually be performed, is made by determining whether the net weight is within a preselected, narrow, weight range or band centered about a net weight indication of zero. Therefore if the computed but non-zero net weight is outside this range, the remainder of the net zero tracking sequence of operations is skipped. However, if it is within the range, net zero tracking is performed by modifying the previously stored tare weight data to compensate for the shift or wander of the net zero.

Data representing the preselected range within which net zero tracking is performed is permanently stored in the memory of the microcomputer 54. In the exemplary embodiment of the invention this range is a predetermined number of increments which represent different weights for each scale capacity so the net zero tracking sequence of operations is done with data which has already been multiplied by a scale conversion factor to represent output increments of weight rather than units of raw weight increments.

For example, in the exemplary embodiment, for the following scale capacities, the net weight must be within the following ranges in order for the tare weight data to be modified to track the net zero:

| Scale Capacity | Range |
| --- | --- |
| 6kg × 0.002kg | ± 0.0008kg |
| 15kg × 0.005kg | ± 00.0002kg |
| 30lb × 0.01lb | ± 00.004lb |

If the net weight is within the preselected range for the selected scale capacity, then the microcomputer modifies the tare weight register in a direction which will reduce the next computed net weight by one increment of its least significant digit.

This is done by algebraically adding to the tare weight data a one having the same sign as the previously computed net weight.

For example, for the 30 lb×0.01 lb capacity, a computed net weight of +00.002 pounds will cause a +1 to be added to the least significant digit of the tare weight data, any carry being appropriately propagated. If the stored tare weight was 00.192 pounds it will become 00.193 pounds. Therefore, the next time a net weight is computed for the identical gross weight data, the net weight will be +00.001 pounds.

If the gross weight data does not change, continued repetition of the above sequence of operations will continue to increment the stored tare weight data ultimately to cause a net weight indication of 00.000 pounds. Thus, in the exemplary embodiment 00.00 will be displayed when only the 4 most significant digits are displayed. The repetition of these net weight tracking operations occur approximately five times per second in the exemplary embodiment.

The exemplary embodiment of the invention incorporates and cooperates with many features shown in U.S. Pat. Nos. 3,962,569; 3,962,570; and 3,986,012; and in U.S. applications Ser. Nos. 573,162 and 729,911 which are incorporated herein.

However, these features are briefly described to the extent which is helpful to enable those skilled in the art to construct an embodiment of the invention and to practice the invention.

The exemplary embodiment comprises a digital weighing and computing scale to determine the weight of merchandise, to compute the total price or value of the merchandise and to display, and optionally to print, the price per unit weight, the weight of the merchandise and the total value or total price of the merchandise.

FIG. 1 is a block diagram of the exemplary embodiment of the invention and was broadly described above. The exemplary embodiment has input and output structures which may be explained in more detail.

The first input device is the load cell 40 linked to a platter 12 upon which merchandise is supported. The load cell 40 provides the analog output signal which is related to the weight of the merchandise.

The second group of inputs comprises operator accessible switches 20 including a "PREPACK on/off" switch 16 for selecting a prepack mode of operation and a keyboard 20 having keys labelled and physically arranged as illustrated in FIG. 1. The "PREPACK on/off" switch is not provided for UK modes of operation when Half Pence pricing is used. While the "PREPACK on/off" switch 16 is not electrically a part of the keyboard, it is conveniently positioned adjacent the keyboard for ease of access by the operator.

The third group of inputs comprises a plurality of programmable mode selector switches 22 which are selectively switched at the factory or by a service technician in the field and are inaccessible to the operator. These mode selector switches 22 are labelled as indicated in FIG. 1 and are switched to those operational modes which are appropriate for the weight and currency units, legal standards and requirements and to the merchandising and pricing methods of the particular store in which the weighing and computing scale will be used.

The weighing and computing scale embodying the present invention also has three groups of output devices. The first group consists of two identical sets of three numerical display devices 24. One set is mounted so that it is visible to the scale operator and a duplicate set is mounted to be visible to the customer or purchaser of the merchandise.

Each display device contains five, cold cathode, gas discharge display digits with three lower commas, each digit having seven segments to display any number from zero through nine. The three displays of each duplicate set ordinarily display price per unit, net or gross weight and total value.

The second output group comprises a pair of duplicate front and back indicator lamp displays, one facing the operator and one facing the purchasing customer. Each indicator lamp display has six translucent windows upon which labels are printed and which are at times backlighted by suitable lamps for making the labels visible. As illustrated in FIG. 1, the labels include "ZERO", "NET", "PREPACK", "¼", "½" and a sixth legend which is alternatively labelled at the factory either "LB" or "KG".

The third output is a printer 28 which is optional.

The "Z" key 17 is operated to zero or null the scale. After power is first applied to the weighing and computing scale embodying the present invention or after a power interruption, no unit price data or tare weight data will be accepted and no total price or value will be displayed until the exemplary embodiment has been so zeroed. The scale may also be zeroed at other times using the "Z" key.

The scale is zeroed in response to depression of the "Z" key 17 when no substantial weight is on the scale by loading the presently detected weight into a memory register for subsequent use as a correction factor. In subsequent weight measurements this correction factor is subtracted from the detected weight to provide a corrected weight. Consequently a zero weight indication will be displayed when there is no weight on the scale.

In order for the exemplary embodiment to perform the zero operation in response to depression of the "Z" pushbutton 17, all of the following four conditions must exist. These interlocks prevent the customer from being defrauded by intentional or accidental creation of an erroneous zero. First, the "Z" pushbutton 17 must be depressed continuously for at least 1.5 seconds. Second, the platform of the scale must have been motionless for a predetermined interval of time. Third, there must be no tare weight data stored in the memory registers of the exemplary embodiment. Fourth, there must be no significant weight on the platter.

Shortly after the exemplary embodiment has been zeroed in this manner the lamp behind the "ZERO" legend of the indicator lamp display 26 will be illuminated.

The keyboard 20 is a 4×5 matrix in which 15 of its key positions are used. The 10 keys labelled "0" through "9" are used to key in price per unit information and, under conditions subsequently described, may be used to key in a tare weight.

Tare weight data may be entered into memory registers in one of two ways. First, a known tare weight may be keyed in by using the keys labelled "0" through "9" of the keyboard 20 and then subsequently depressing the "T" key within two seconds after entry of the last tare weight digit. Such a keyboard entry of tare weight data is accepted only if the corresponding mode of operation is selected by the appropriate mode selector switches 22. Second, an empty container or other object of unknown tare weight may be positioned on the platter 12 and the "T" key then depressed to cause the exemplary embodiment of the invention to automatically store in memory the weight of that object as the tare weight. This is termed a manual tare operation. A tare weight will be accepted and entered into memory only when certain conditions exist which are described in connection with FIGS. 14A–14Z in the detailed description of the operation of the exemplary embodiment.

If an operator discovers that erroneous tare weight data has been entered, the tare data may be cleared by pressing the key with the numeral "0" and then pressing the "T" key within 2 seconds of the operation of the "0" key. However, such a clearing of the tare data will only be accepted and the tare data will be cleared only if the net weight on the scale is less than 10 scale increments. This prevents the defrauding of a customer by the erroneous clearing or changing of the tare data while an object is on the platter.

After the entry and acceptance of tare weight data, the "NET" legends of the indicator lamp displays will be backlighted to signify that the exemplary embodiment is in a net mode of operation and therefore that its displayed data is a net weight.

If tare weight data has been entered by a manual tare, then the removal of the container will cause the exemplary embodiment to display the tare weight preceded by a negative sign.

The ten digit keys 0 through 9 are used to enter the price per unit weight either after tare data has been entered into memory or, under no tare conditions, by keying in the price per unit and failing to depress the "T" key.

The fraction keys 21 and 23 bear, respectively, the legends "½" and "¼". The fraction keys are depressed to input the information that the pricing is per ½ unit or ¼ unit of weight. Depression of a fraction key 21 or 23 at the appropriate time will cause the corresponding fractional legend on the indicator lamp displays 26 to be illuminated.

The "CLEAR" key of the keyboard 20 may perform two different functions. First, any price data which has been entered may be cleared by depressing the "CLEAR" key. Second, when the "CLEAR" key is pressed and held in a depressed position, all output displays will be blanked or held off. If the pushbutton is released and subsequently again held in a depressed state, all display segments and all display indicating lamps will be turned on.

These two modes permit the displays to be checked to make certain that there are no short circuits which are erroneously turning on display segments and no open circuits which are preventing display sigements from being turned on.

When the weighing and computing scale embodying the present invention is used with a printer 28, the operator may depress the "PRINT" key to initiate the printing of an appropriate label bearing the price per unit, the total weight and the total value.

The manually programmable mode selector switches 22 comprise a plurality of individually operable, single pole, single throw switches. Their functions are enabled, that is their labelled conditions exist, when the switches are on or made.

The exemplary embodiment of the present invention has three selectable scale capacities, these are: 15.000 kg × 0.005 kg., 30.00 lbs. × 0.01 lbs. and 6.000 kg × 0.002 kg. For selecting the particular scale capacity which is desired, two capacity-enabled mode selector switches are provided, a first switch 1 for selecting the 6 kg scale and a second switch 2 for selecting the 30 lb capacity. If both of these mode selector switches are off, then 15 kg scale capacity is chosen.

Under most conditions, the price per unit and the total price will be four digit numbers from 0 to 99.99. However, mode selector switches are provided to permit either or both of the price per unit and the total price to be displayed as a five digit number. Selection of these modes is accomplished by switching to the on position the mode selector switch 3 labelled "5 digit unit price" and/or the mode selector switch 4 labeled "5 digit total price."

A mode selector switch 5 labelled "×10 EXPAND" provides a mode which increases displayed resolution by causing the display of the raw weight increment data. This mode may be used when calibrating, servicing or testing the exemplary embodiment.

A mode selector switch 6 labelled "PRINT INHIBIT", when switched to its on position, will cause printing to be inhibited for weights less than 20 scale increments. A mode selector switch 7 labelled "KEYBOARD TARE ENABLE" is switched on to permit tare weights to be entered on the keyboard as described above.

The mode selector switch 8 labelled "AUTO-CLEAR PRICE AND TARE" may be switched to its on position so that whenever the scale weight goes above ten scale increments and remains above ten increments for one second or longer and then returns below ten scale increments, the price unit data and the tare weight data will be automatically cleared. This avoids the necessity of requiring the operator to manually clear the price unit data and tare weight data each time merchandise is weighed.

A "TARE MANDATORY" mode selector switch 9 may be switched to its on position to require the input of a tare weight before the exemplary embodiment will compute and display the total price.

The mode selector switch 10, labelled "300 PRINTER ENABLE" is provided for use with the model Toledo/300 Automatic label printer manufactured by the Toledo Scale Division of Reliance Electric Company. When switched to its on position, it limits the printing of price per unit, weight and total value to four digits each.

Mode selector switch 12 labelled "UK" enables half penny pricing for the United Kingdom.

The mode selector switch 13, labelled "PRICE PER UNIT", is switched to its on position whenever it is desired to permit factor pricing (e.g., price per ¼ and ½ pound), to be entered on the keyboard and yet have the price per pound displayed.

In some areas a "price by count" mode of operation is desired. To allow this mode to be elected, the "PREPACK on/off" switch 16 may be provided in an alternate embodiment with a third position labelled "price by count".

When the "PREPACK" switch 16 is switched to its on position, the previously entered price per unit data and tare weight data will not be automatically cleared regardless of the position of the mode selector switch 8. The "PREPACK" switch 16 causes the "PREPACK" legend to be backlighted and overrides the mode selector switch 8 so that re-entry of the identical price per unit and tare weight after each weighing operation will not be necessary.

In addition to the operational modes and functions already described above, the exemplary embodiment of the present invention automatically performs several other operations regardless of the selected mode.

Automatic gross zero compensation or auto zero tracking compensates the scale for minor off-sets from a zero weight after correction. Whenever the presently detected and corrected weight is within 4 raw weight increments of zero, the correction factor is modified to automatically bring the corrected weight to within one raw weight increment of zero. This automatic gross zero compensation will occur for variations in zero which occur at a rate of 5 raw weight increments per second or slower so long as the total compensation, that is the total correction factor, is within ±400 raw weight increments. The exemplary embodiment of the invention also provides net zero tracking as previously described.

It might be noted by way of further explanation, that the "Z" key 17 causes the capture range of the automatic gross zero tracking system to be extended from ±4 raw weight increments as described above to ±400 raw weight increments.

The exemplary embodiment of the invention is also provided with a motion detection system which detects weight changes greater than ±0.5 displayed increment per 1/5 second. The detection of such platter motion causes the display lamps behind the legend "LB" or "KG" to be turned off and signals to the remainder of the circuitry of the exemplary embodiment that a motion condition exists.

A gross weight exceeding the scale capacity by more than 5 scale increments causes the weight display and the total value or total price display to be blanked.

A total price calculation in excess of the digit nine in all four character positions of the total price register (or alternatively all five if the five digit total price mode is selected) will cause the total price display to be blanked.

The circuitry of the weighing and computing scale illustrated in FIG. 1 is shown in detail in the schematic diagrams of FIGS. 3 through 11. FIG. 2 shows how FIGS. 3 through 8 are associated to illustrate the complete circuit. The random access memory assignments are illustrated in in FIG. 13 and are discussed in connection with the subsequent description of the detailed operation of the exemplary embodiment.

FIG. 3 illustrates a load cell 40 which is mechanically linked to the platter 12 and includes four resistive strain gage elements which are connected in a Wheatstone bridge arrangement 70. Typical scale mechanisms suitable for cooperating in the embodiment of the invention described herein are shown in U.S. Pat. No. 3,847,238 granted to D. L. Hall, et al., on Nov. 12, 1974 and in U.S. Pat. No. 3,074,496 granted to L. S. Williams on Jan. 22, 1963.

Electrical power from the regulated power supply 42 is applied across one pair of opposite terminals of the bridge 70. The other pair of opposite terminals of the strain gage bridge 70 forms the output of the strain gage bridge and is connected to the input of the preamplifier 44. With no strain, the bridge 70 would be balanced and the output would be zero volts. In this state each output terminal of the strain gage bridge is at the same potential intermediate the potentials of the terminals of the regulated power source 42. However, in practical application the strain gage bridge 70 will be under the stress of the platter and other mechanical linkages.

Any weight positioned on the platter 12 will further deform the resistive element of the bridge 70 causing a variation in their resistance and unbalancing of the bridge. In this manner an output analog voltage is obtained from the strain gage bridge 70 which is related to the weight of the object on the platter 12 and is applied and amplified by the preamplifier 44.

The preamplifier 44 has two differential operational amplifiers 72 and 74 which are connected to form a differential amplifier presenting a very high input impedance to the output of the strain gage bridge 70 so that there is substantially no current drain from the bridge 70 while still providing a preamplifier which is a true differential amplifier rejecting all common mode voltages such as drift or changes in the bridge excitation voltage.

The non-inverting input of the OP-AMP 72 is connected to one of the output terminals of the strain gage bridge 70. The other output terminal of the bridge 70 is connected to the non-inverting input of OP-AMP 74. The OP-AMP 74 provides a substantially unity gain amplifier with its output fed across to the inverting input of the OP-AMP 72. In addition, the inverting input of the OP-AMP 74 is connected to the wiper of a potentiometer 76 which is used to shift the output level of OP-AMP 72. The potentiometer 76 is manually adjusted to compensate for small differences in the mechanical and electrical parameters of production parts and circuits to provide a total effective analog signal component resulting primarily from loading of the strain gages 70 when the platter has no object placed thereon. This known analog signal component or analog offset is subsequently removed by a subtraction in the digital data processing circuitry.

Referring now to FIG. 4, the output 80 of the preamplifier 44 provides a voltage having an amplitude proportional to the sum of the analog offset and the signal change resulting from an object being placed on the platter 12 and is applied to an active filter circuit 46. This active filter circuit 46 is a low pass filter designed to filter out scale platform or platter vibration. The output circuit of the active filter 46 includes a span adjustment potentiometer 92 which is connected as a simple voltage divider for adjustably selecting the desired proportion of the filtered analog weight voltage to be applied through the seitching circuit 50 to the integrator 52 at rhe appropriate time. This potentiometer adjusts the analog circuit gain to a value suitable for the various scale capacities.

The switching circuit 50 under the control of the microcomputer 54 (see FIG. 1) may be used to selectively gate one of four possible inputs through four field effect transistors to the input 98 of the integrator 51. The four alternatively selectable inputs are: (1) the analog weight signal from the wiper of the potentiometer 92 which is applied through a resistor 85 and FET 94; (2) a reference DC source applied through resistor 87 and FET 95; (3) a second reference DC source which is applied through resistor 91 and FET 96; and (4) a reset signal applied through resistor 93 and FET 97. In the exemplary embodiment, resistors 85, 87, and 91 are all 500K ohms.

Figure 5:
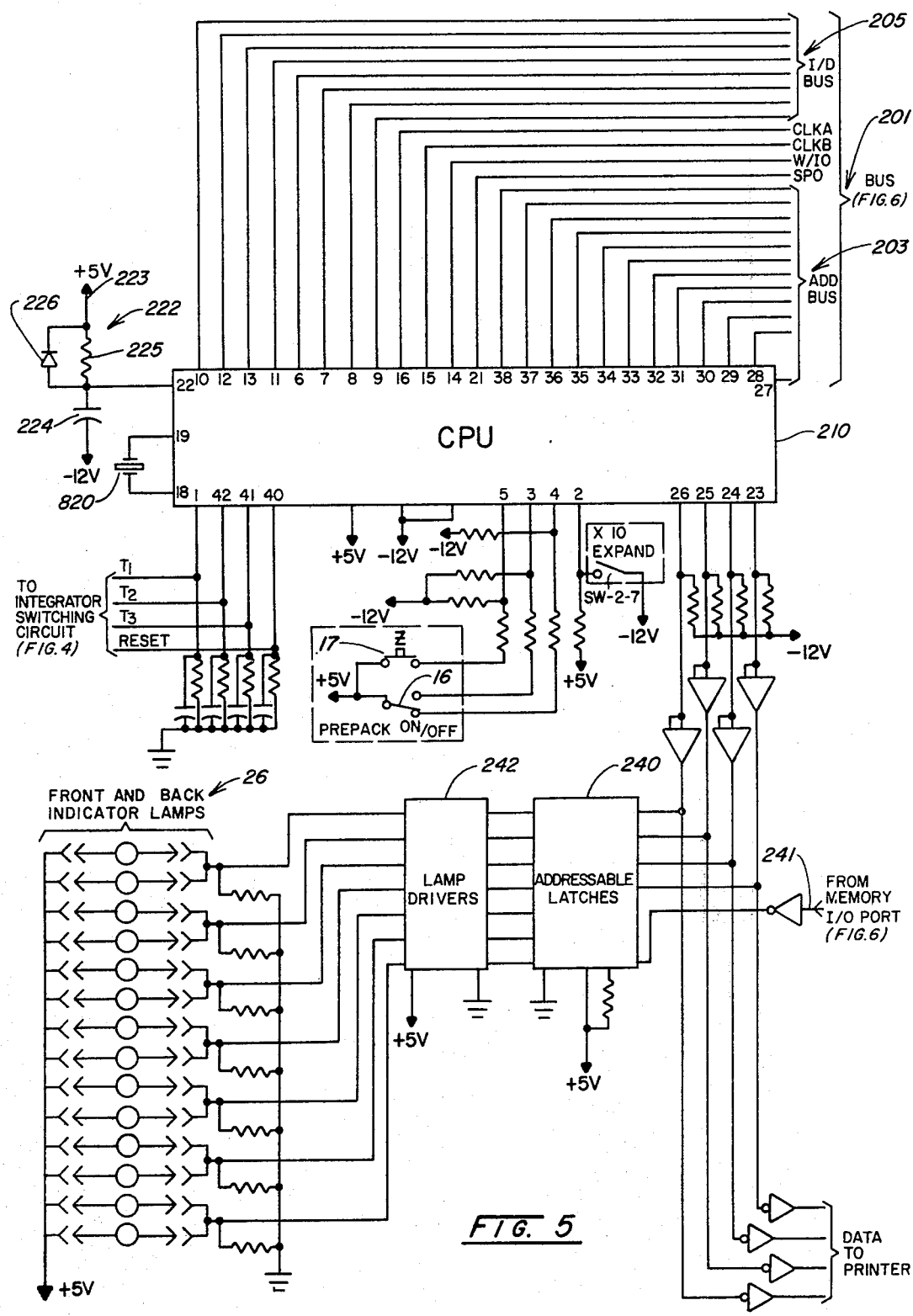
Figure 9:
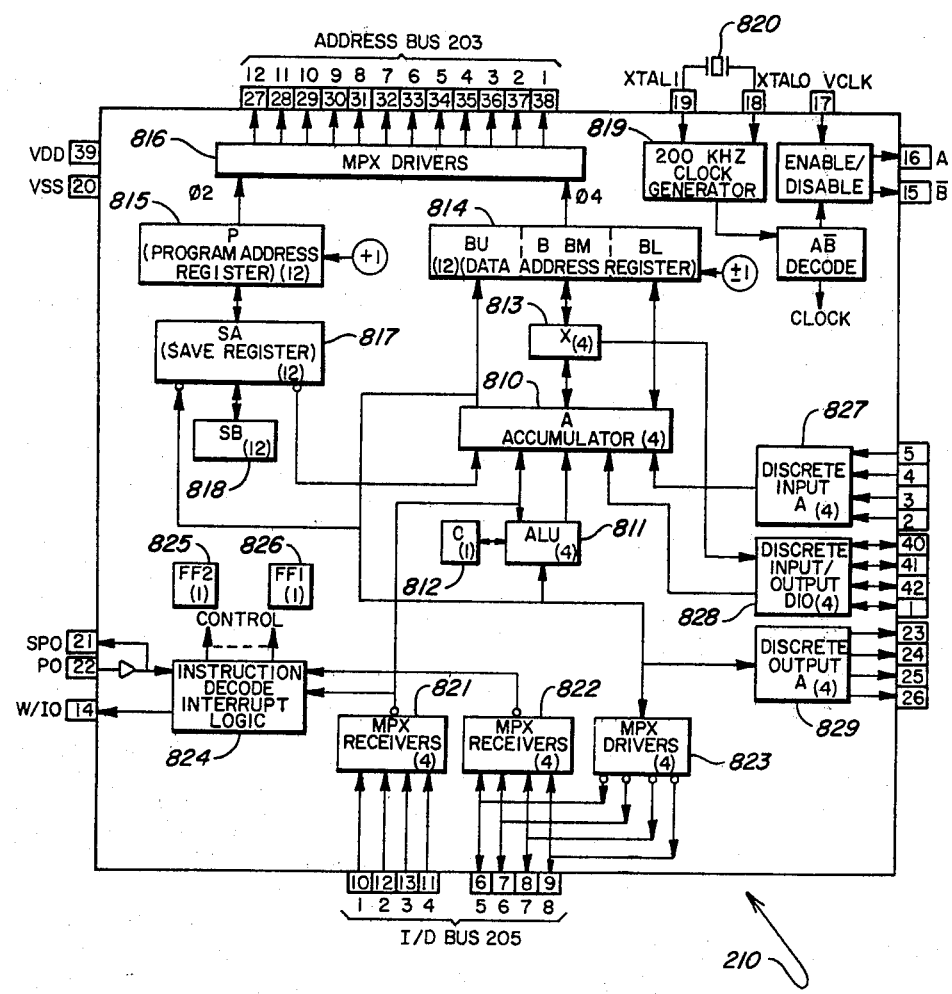
FIGS. 9 through 11 are block diagrams of the integrated circuits forming the central processor, memory and general purpose keyboard and display interface devices used in combination with the circuitry of the exemplary embodiment of the invention.

The gates of four FETS 94, 95, 96, and 97 are connected to four discrete input/output terminals, 1, 42, 41, and 40 of the CPU as illustrated in FIGS. 5 and 9 so that the CPU can control these gates.

As previously described in the exemplary embodiment, the amplitude of the first reference DC source, which is integrated during the second integration interval $T_2$ of the triple slope A/D conversion, is 32 times greater than the second reference DC source which is integrated during the third integration time interval $T_3$.

This is accomplished in the exemplary embodiment by referencing the input to the integrator 51 to a particular non-zero potential rather than to ground. In particular, series resistors R and R/32 shown in FIG. 4 form a voltage divider between the power supply potential of −15 volts and ground. Resistor R is 32K ohms and resistor R/32 is 1K ohm. Therefore, the reference potential which is always applied to the noninverting input of OP-AMP 99 of the integrator 51 has an amplitude equal to 1/33 of the power supply potential and has the same polarity. In the exemplary embodiment this reference potential fixed is at 15/−33 volts relative to ground potential by resistors R and R/32.

During the first integrating interval $T_1$ of the triple slope conversion, a positive analog weight signal is normally applied to the integrator 51. Then, during the second interval $T_2$, the −15 volt power supply provides the first reference DC source having a polarity opposite to the polarity of the analog weight signal and having an amplitude of $32/-33 \times 15$ volts relative to the reference potential at the noninverting input of the OP-AMP 99.

During the third integrating interval $T_3$, FET 96 is switched on to apply a second reference DC source to the integrator which is derived through resistor 91 from ground potential. Since ground potential is positive with respect to the reference voltage at the noninverting input of OP-AMP 99 and has an amplitude of 15/33 volts, the connection of the integrator input 98 to ground through resistor 91 effectively provides a second reference DC source during interval $T_3$ which is both opposite in polarity to and 1/32 the amplitude of the reference DC source applied during interval $T_2$.

Except for this manner of referencing the integrator 51, it is a conventional integrator circuit including an integrating capacitor 100.

The output of the integrator 51 is applied to the amplifier 52 and through it to the threshold detector 53. The amplifier 52 comprises an OP-AMP 104 and is provided to amplify the output of the integrator 51 to make the slope of the output of integrator 51 steeper so that the time of its crossover with its initial level can be more accurately determined.

The threshold detector circuit 53 includes an OP-AMP 106. It is simply a high gain amplifier which is driven from one saturation to the other when its input voltage crosses zero.

FIGS. 5–8 show the details of the input and output devices and circuitry and the digital data processing and control circuitry.

In accordance with the present invention the microcomputer 54 of FIG. 1 may be any of several suitable types of commercially available microcomputers or other similar control circuitry including wired components of types well known in the computer and electronics arts.

In the exemplary embodiment of the invention, the microcomputer 54 is essentially a PPS-4 parallel processing, microcomputer system developed by and using devices manufactured by Rockwell International Corporation. The microcomputer 54 is comprised essentially of a central processing unit or CPU which in the exemplary embodiment described herein is a Rockwell PPS-4/2 unit and a memory unit having both read only memory or ROM for storage of program and fixed constants and also random access memory or RAM for storage of data for use in processing. The preferred memory used with the exemplary embodiment of the invention is a Rockwell P/N A17XX device.

In addition to its connection to the output of the Threshold detector 53, the microcomputer 54 is also directly connected to the mode selector switches 22, the printer 28, the "Z" key 17, and the "PREPACK ON/OFF" switch 16. The microcomputer 54 is also connected to the front and back indicator lamp displays 26 through suitable interfacing latching, decoding and driving circuitry 56.

Finally, the microcomputer 54 is also connected to a general purpose keyboard and display interfacing device 58 for interfacing the keyboard 20 and the front and back digit displays 24 with the microcomputer 54. A general purpose keyboard and display interface or GPKD interface 58 is employed which is the exemplary embodiment described herein comprises a device manufactured by Rockwell International Corporation and designated P/N 10788. This unit, under the control of the microcomputer 54, receives and temporarily holds data keyed in on the keyboard 20 for subsequent transmission to the microcomputer 54. The GPKD interface unit 58 also receives data from the microcomputer 54 which it applied through decoder/drive logic 60 the front and back digit displays 24 under control of the microcomputer 54. The Rockwell PPS 4 microcomputer system uses four bit data words, eight bit instruction words and in the exemplary embodiment of the present invention twelve bit address words all of which are parallel transferred within the system.

Figure 6:
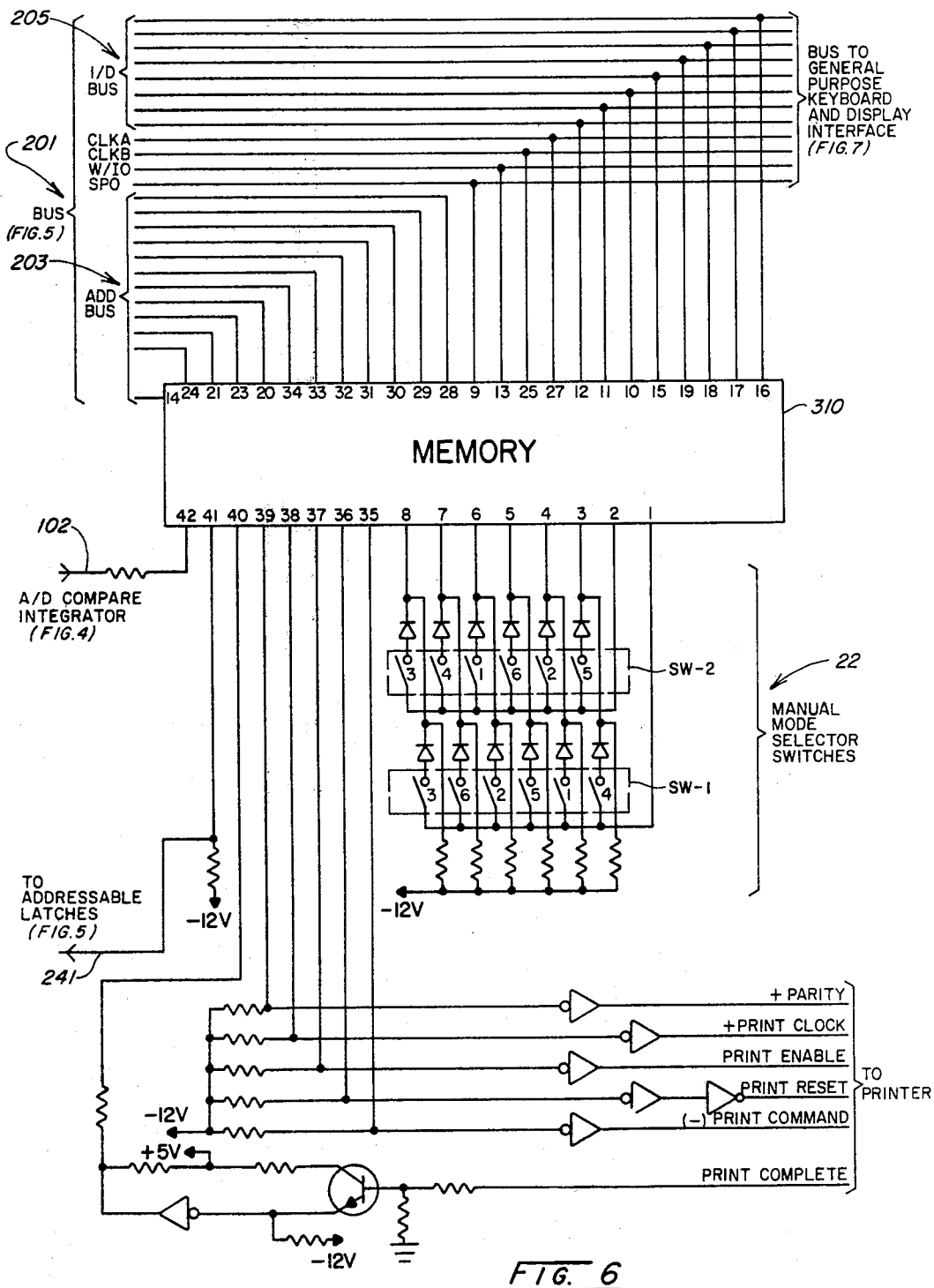
Figure 7:
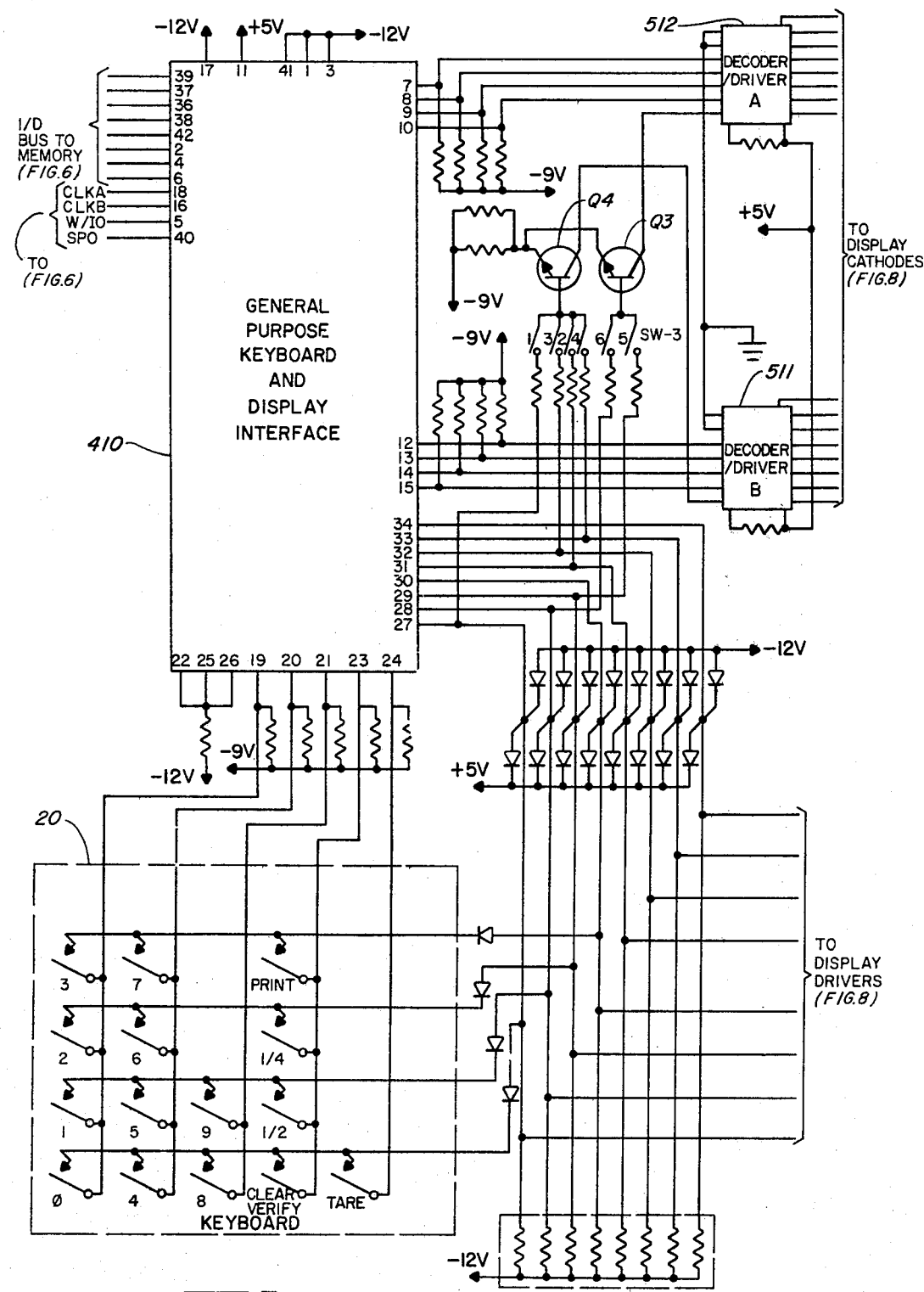

Referring now to FIGS. 5–8, at the top of FIG. 5 is shown the bus system 201 interconnecting the CPU 210 of FIG. 5, the memory 310 of FIG. 6 and the GPKD 410 of FIG. 7. The bus system 201 includes a twelve line address bus 203 which is connected only to the memory 310 for addressing the RAM and ROM memory. The bus 201 further includes an eight line instruction/data bus 205 which transfers, at different times, either eight bit instruction words or two four bit data words bidirectionally. The bus 201 further includes two clock lines, CLKA and CLKB, a write command line and an input/output enable line W/IO for use during one clock phase time for instructing the RAM memory to write and for use during another clock phase time for disabling the RAM memory and enabling the input/output devices for the performance of an input/output instruction. The bus system also includes a "synchronized power on" CPU output line labelled SPO for use in initializing other devices in the circuit.

The CPU 210, which is shown as a single block in FIG. 5, is illustrated in greater detail in FIG. 9. FIG. 9 is a block diagram available with technical information from Rockwell International, Inc.

The CPU 210 as shown in FIG. 9 has an accumulator 810 which is the basic work register of the CPU. It also has an arithmetic logic unit 811 with a carry register 812 and an X register 813 all connected to the accumulator 810. The CPU 210 further has a data address register 814 and a program address register 815 which may be selectively interconnected with the address bus 203 output pins 27 through 38 through the multiplex driver circuits 816. The CPU 210 has two program address save registers 817 and 818 to provide two levels of subroutine stacking. The Rockwell CPU PPS 4/2 is provided with internal clock 819 when a suitable crystal 820 is connected to its pins 18 and 19. The instruction/data bus 205 is connected to pins 6 through 13 which in turn are connected to multiplex receivers 821 and 822 and the multiplex driver 823. Incoming instructions are decoded by the CPU in its instruction decode logic 824 and two separate flip-flops 825 and 826 are provided for program use.

In addition to the bus input/output capabilities, the CPU 210 is provided with 12 discrete input/output pins, four from each of the three registers 827, 828, and 829. These are connected as illustrated to pins 1–5, 23–26, and 40–42.

Referring back to FIG. 5, the discrete input/output register 828 of the CPU as shown in FIG. 9 is connected as shown in FIG. 5 to the four control lines labelled $T_1$, $T_2$, $T_3$, and "Reset" which extend to the switching circuit 50 in order to control the integrations of the triple slope A/D conversion. The crystal 820, shown in FIG. 5, controls the frequency of its internal clock generator which is preferably 0.20 MHZ.

A time delay circuit 222 FIG. 5 is provided for delaying the CPU 210 and in particular its program counter (which must be returned to 0000) after power is first applied or after a brief power interruption or momentary power failure.

The "PREPACK ON/OFF" switch 16, the "Z" pushbutton 17 and the "x10 EXPAND" mode selector switch 5 are connected to the discrete input 827 (see FIG. 9) at pins 2, 3, 4, and 5 of the CPU 210 as shown in FIG. 5.

The front and back indicator lamps 26 are connected through lamp drivers 242 to addressable latches 240. The addressable latches 240 respond to the incoming data and apply the data to the appropriate indicator lamps 26. More specifically, the latches are addressed from output pins 23, 24, and 25 of the CPU 210. With three such address lines, any of the seven indicator lamps 26 may be selected or addressed. The addressable latches are enabled by the output of terminal 26 of the CPU 210 and enabled latch is then controlled by data transmitted over line 241 from the memory input/output port terminals 41 shown in FIGS. 6 and 10.

As illustrated in FIG. 5, output terminals 23-26 of the CPU 210 also provide four bit data to the printer.

Figure 10:
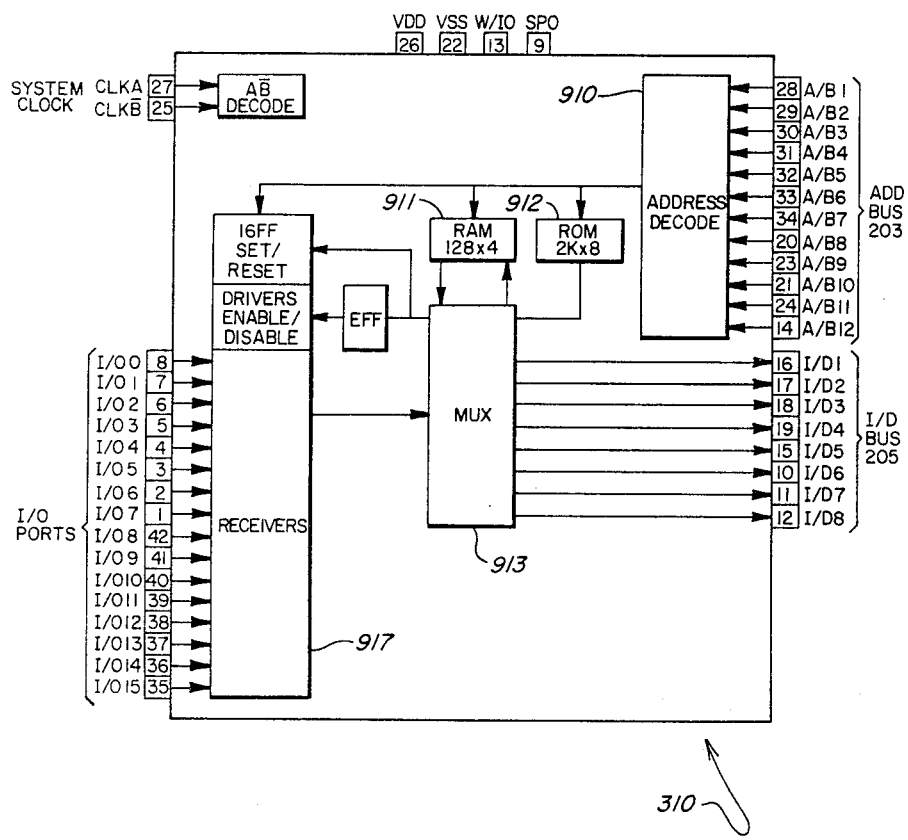

FIG. 6 illustrates, in block form, the memory 310 which is illustrated in greater detail in FIG. 10. Referring to FIG. 10, the memory includes both RAM memory 911 and ROM memory 912. These are connected to the instruction/data or I/D bus 205 through a multiplexer 913 which is connected to pins 10-12 and 15-19. An address decoder 910 is connected to the address bus 203 through pins 14, 20, 21, 23, 24, and 28-34. The memory 310 further has sixteen discrete input/output ports connected at pins 1-8 and 35-42 through receiver buffers 917 to the multiplexer 913.

The read-only memory 912 has a storage capacity of 2 k eight bit words, any of which may be addressed over the address bus 203 and its stored eight bit word returned to the CPU over the instruction/data bus 205.

The random access memory 911 has 128 four bit storage registers for storing four bit words. Dependent upon the clock phase and the state of the w/10 line connected from terminal 14 of the CPU to terminal 13 of the memory, the addressed memory register will read its four bit contents out onto the instruction/data bus 205 and will write, if so instructed, a new four bit work from the CPu into the addressed register through the multiplexer 913.

Returning to FIG. 6, the output 102 from the threshold detector 53 illustrated in FIG. 4 is applied to one of the discrete input/output ports at pin 42 of the memory 310.

Eight other discrete input/output ports connected to pins 1-8 of the memory 310 are connected to the twelve manual mode selection switches 22 illustrated in FIG. 6. Half of the twelve switches, labelled SW-1, are connected between pin 2 and through diodes to pins 3-8 of the memory 310. The other half of the twelve switches, labelled SW-2, are connected between pin 1 and pins 3-8. Each of the individual switches of both switches SW-1 and SW-2 are individually and independently actuable and each is labelled with a number which corresponds to the function listed in block 22 on FIG. 1. Consequently, the microcomputer 54 can interrogate the condition of switches SW-1 by strobing pin 2 and examining the data of lines 3-8 and can interrogate switches SW-2 by strobing pin 1 and examining the data of pins 3-8. It is to be understood that any particular one of these switches may be assigned any particular operational mode function.

Printer control signals are applied to the printer from the five discrete input/output memory ports 35-39 of the memory 310 illustrated in FIG. 6. The "print complete" signal when received from the printer is applied to the discrete input/output port 40 of the memory 310.

Figure 8:
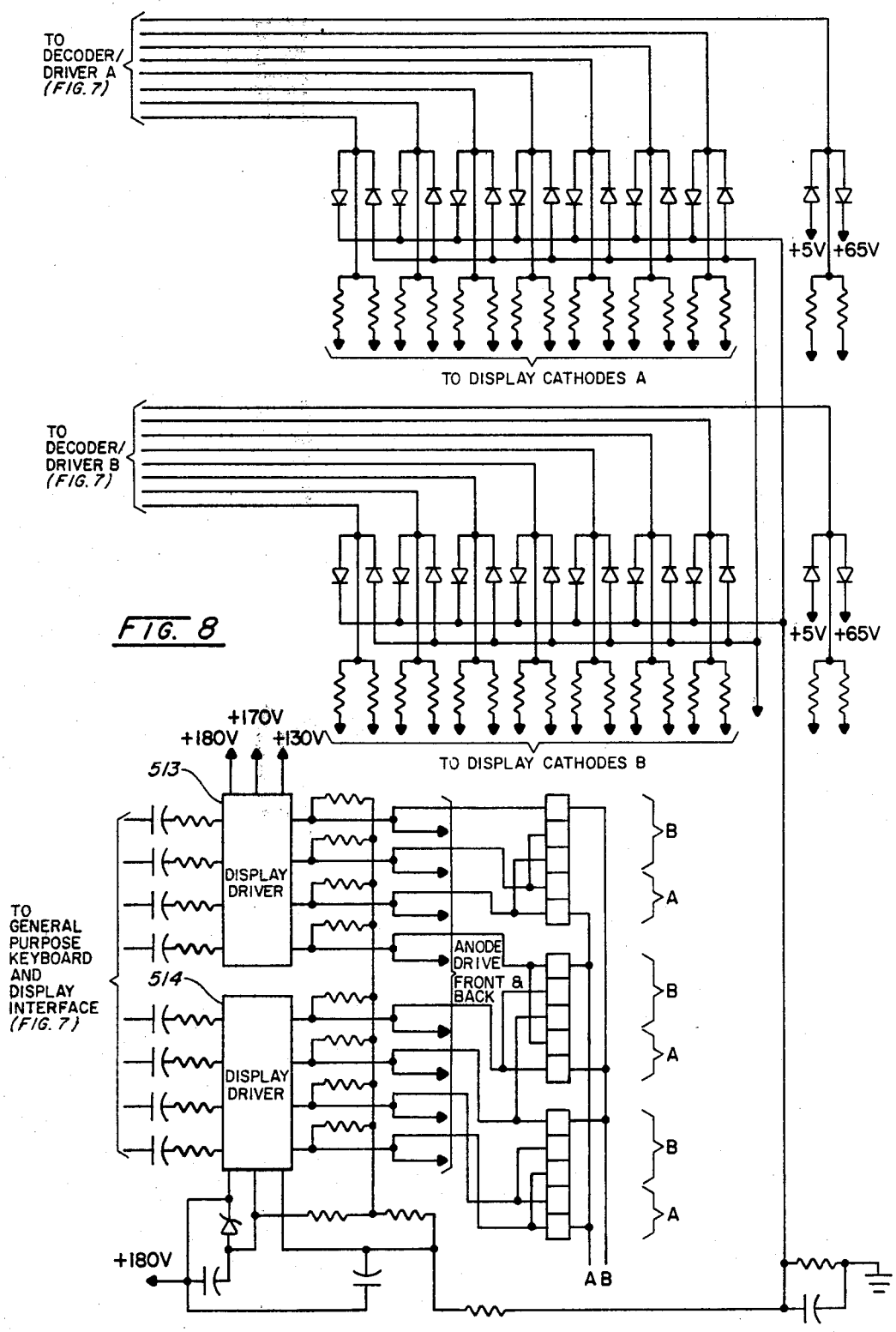

FIG. 7 includes, in block diagram form, the general purpose keyboard and display interface 410. FIGS. 7 and 8 illustrate the keyboard 20 and display drivers connected thereto.

The GPKD interface 410 used in the exemplary embodiment is a device manufactured by Rockwell International Corporation and given their type number P/N 10788. It is interconnected with the memory 310 and the CPU 210 through the data bus 205 as well as the clock A, clock B, synchronized power on and write/input-output lines of the bus 201.

Figure 11:
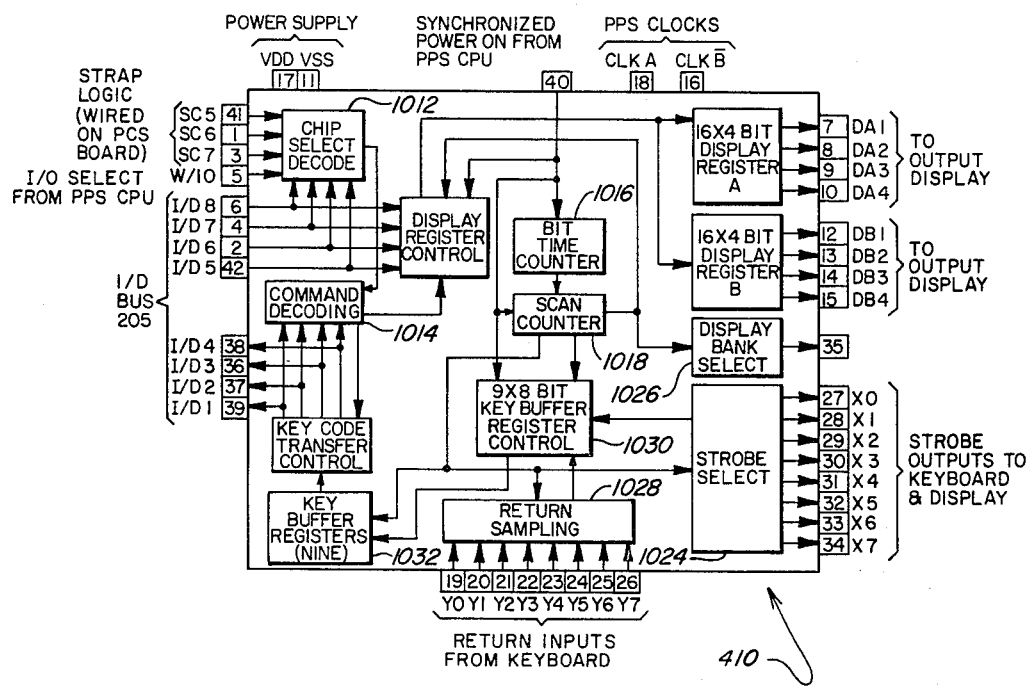

A block diagram of the circuit of the GPKD interface 410 is illustrated in FIG. 11. Referring to FIG. 11, chip select decode circuit 1012 compares the chip address data applied by the CPU 210 to pins 2, 4, and 42 of the GPKD over the instruction/data bus to the data on the chip select straps at pins 1, 3, and 41. If the strapped address is identical to the address on the instruction/data bus, if the instruction/data line connected to pin 6 is true and if the write/input-output mode has been selected by the CPU so that the CPU has trued the W/IO input pin 5, then the GPKD is selected to execute the command.

The command is applied to the GPKD from the CPU 210 over that half of the instruction/data bus which is connected to pins 36 through 39. The command is decoded by the command decoding logic circuitry 1014. A bit time counter 1016 is provided to divide the clock frequency from the PPS clock and apply its output to a scan counter 1018. The scan counter 1018 provides timing signals for the display register control display bank select 1026, return sampling 1028, key buffer register 1032, and control 1030 and strobe select circuit 1024.

The GPKD of FIG. 11 includes two display registers A and B, which store display data. These display registers store data from the instruction/data bus and, upon command, output the data to their associated displays.

The strobe select circuit 1024, with its eight output pins, 27 through 34, sequentially outputs eight strobe signals to its eight output pins. These outputs may be used to strobe an 8×8 keyboard matrix or for multiplexing display characters.

The return sampling circuit 1029 receives data from the strobed keyboard indicating the states of the key matrix return lines from the keyboard. When a key closure is detected at the return sampling circuit 1028, the key buffer register control circuit 1030 and loads the key code for that key into the buffer register 1032. Subsequent key closures which are detected may also be stored in the key buffer registers 1032 until they are called for by and transferred to the CPU on a first in, first out basis.

Returning to FIG. 7, the eight strobe select output pins 27 through 34 are applied four to the display driver 513 of FIG. 8 and four to the display driver 514 of FIG. 8. The outputs of the display drivers 513 and 514 are applied to the anode drive terminals of the front and back displays.

Referring to FIG. 7, since various decimal point locations are required by the various countries, a switch labelled SW-3 consisting of six individually operated single pole, single throw switches is associated with transistors Q3 and Q4 selectively enabling those digit positions in which decimals may be displayed.

Four of the strobe select lines at pipe 27 through 30 of the GPKD 410 are additionally applied to the four input strobe lines of the keyboard matrix of the keyboard 20. The keyboard return lines are connected to pins 19 through 21, 23 and 24 of the return sampling inputs of the GPKD 410. These permit interrogation of the keyboard for key depressions.

OPERATION OF THE SYSTEM

Figure 14A:
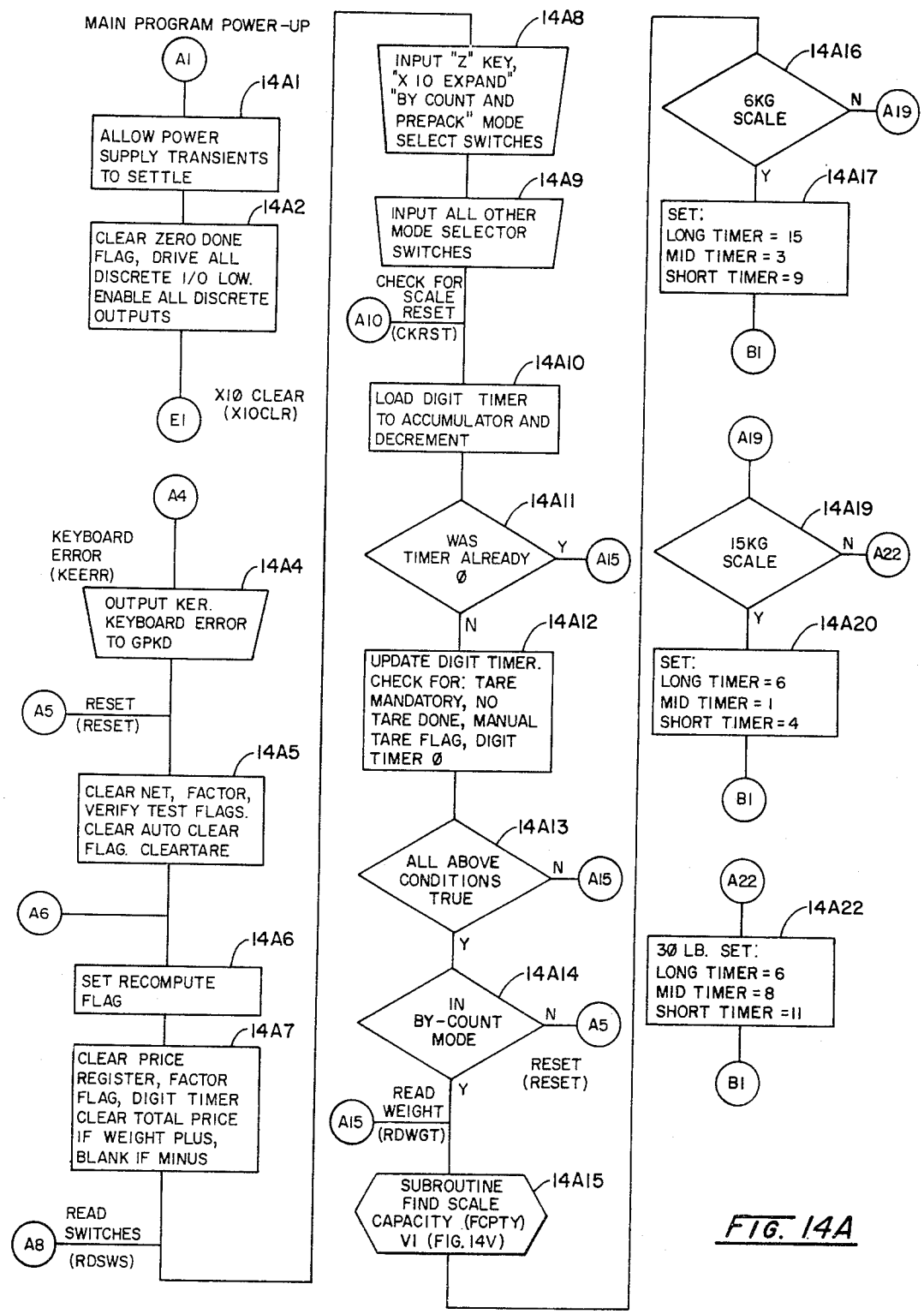
FIGS. 14A through 14Z are flow diagrams illustrating the operation of the preferred embodiment of the invention (FIG. numbers 14Q and 14U are not used for clarity).
Figure 14B:
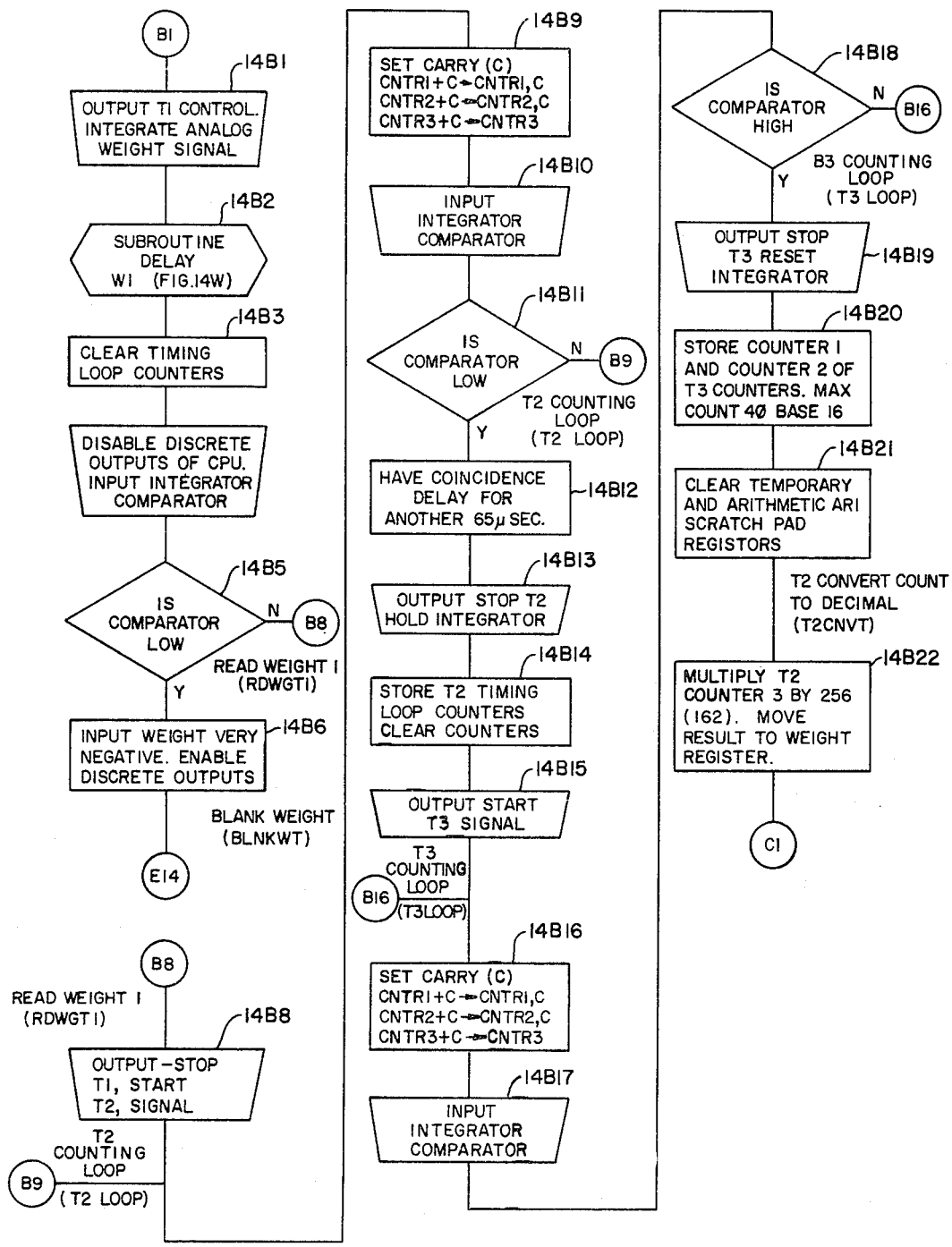
Figure 14C:
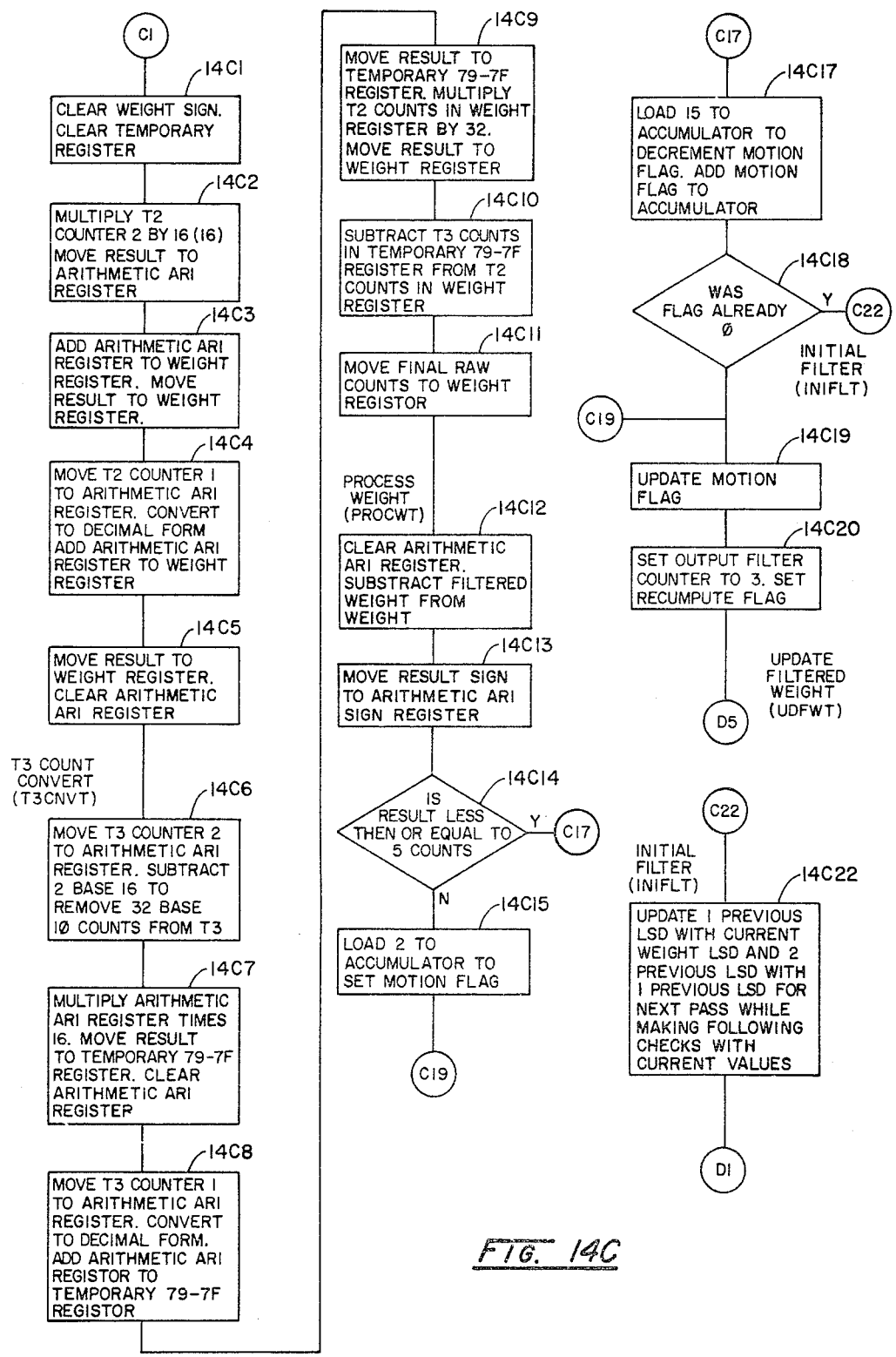
Figure 14D:
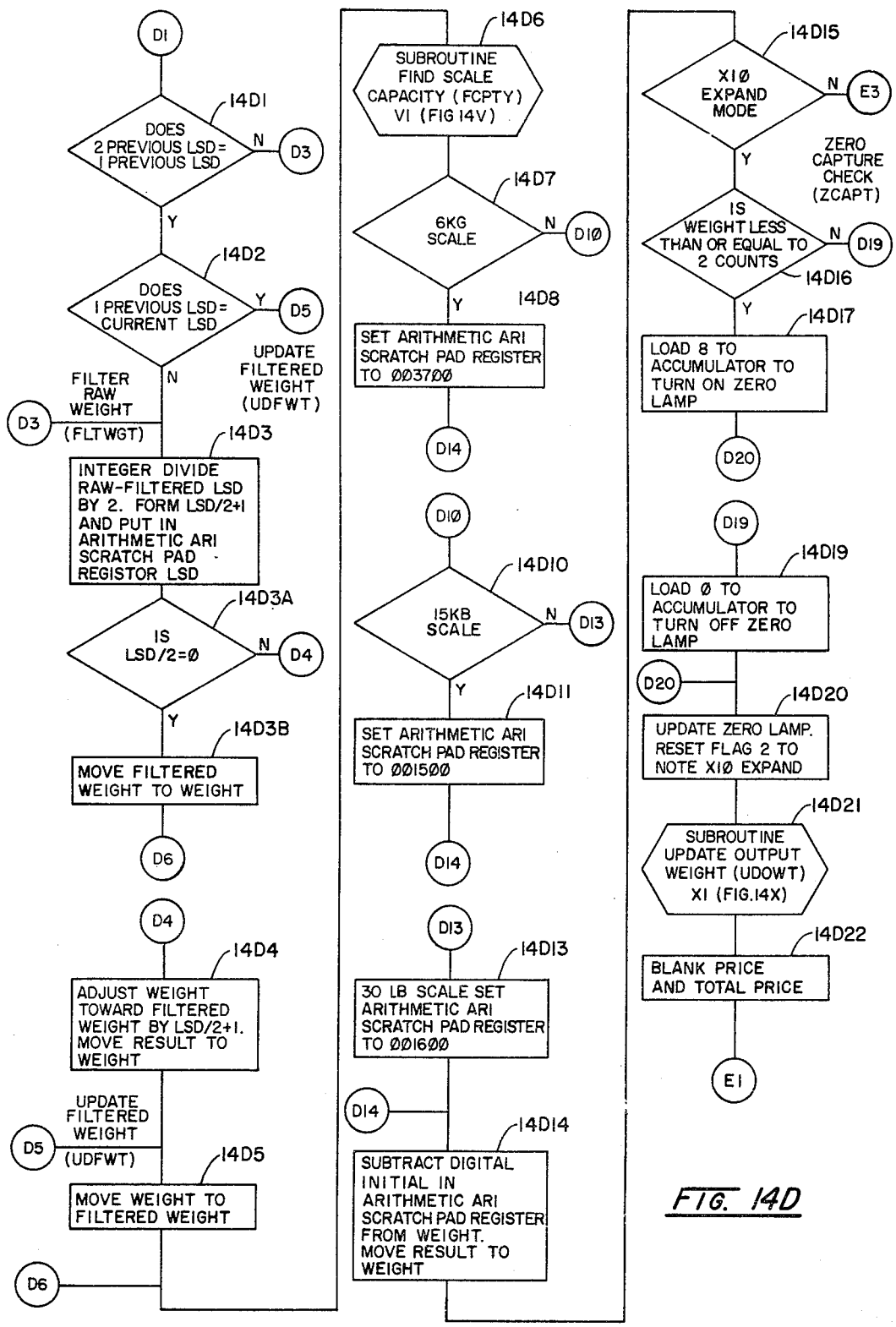
Figure 14E:
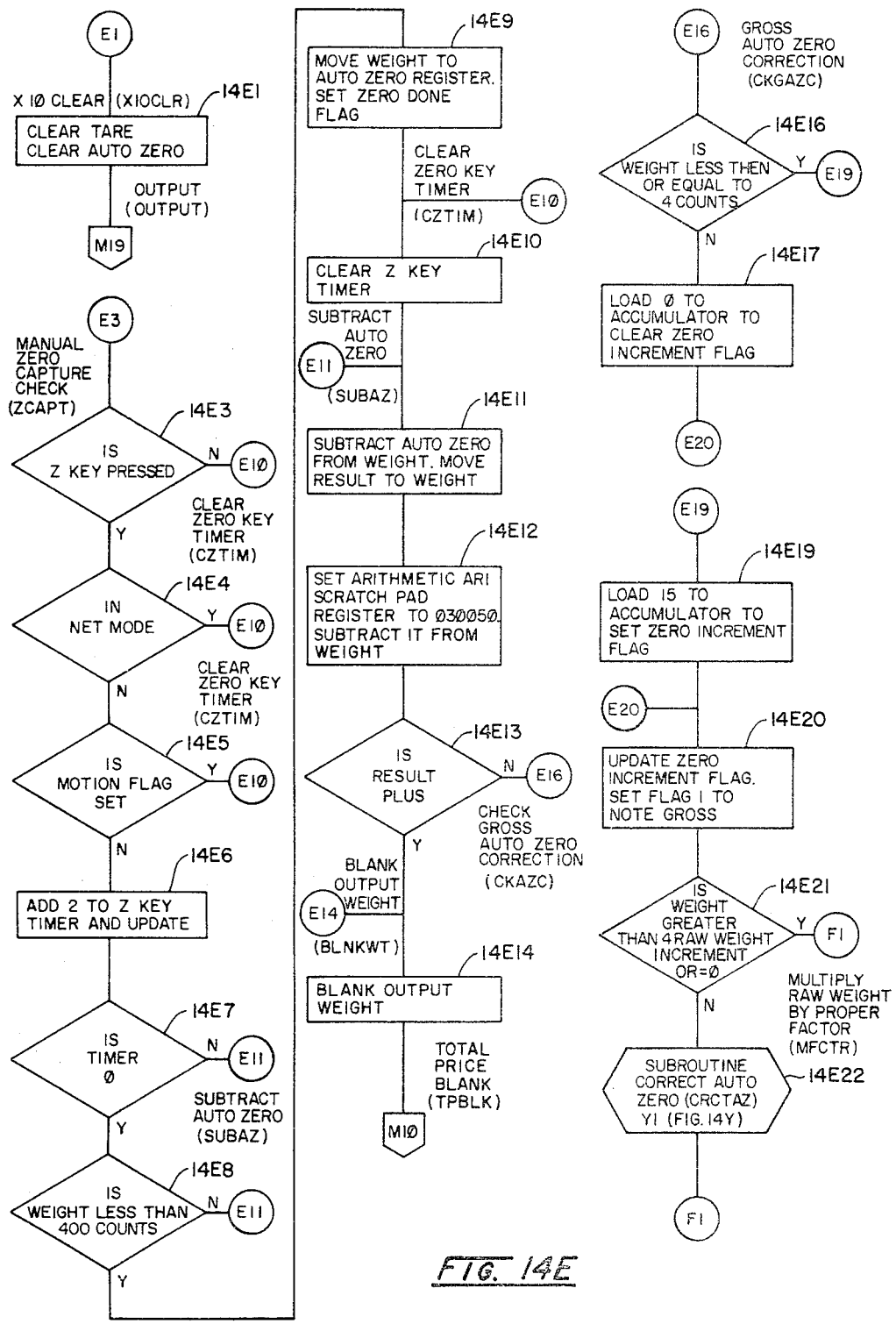
Figure 14F:
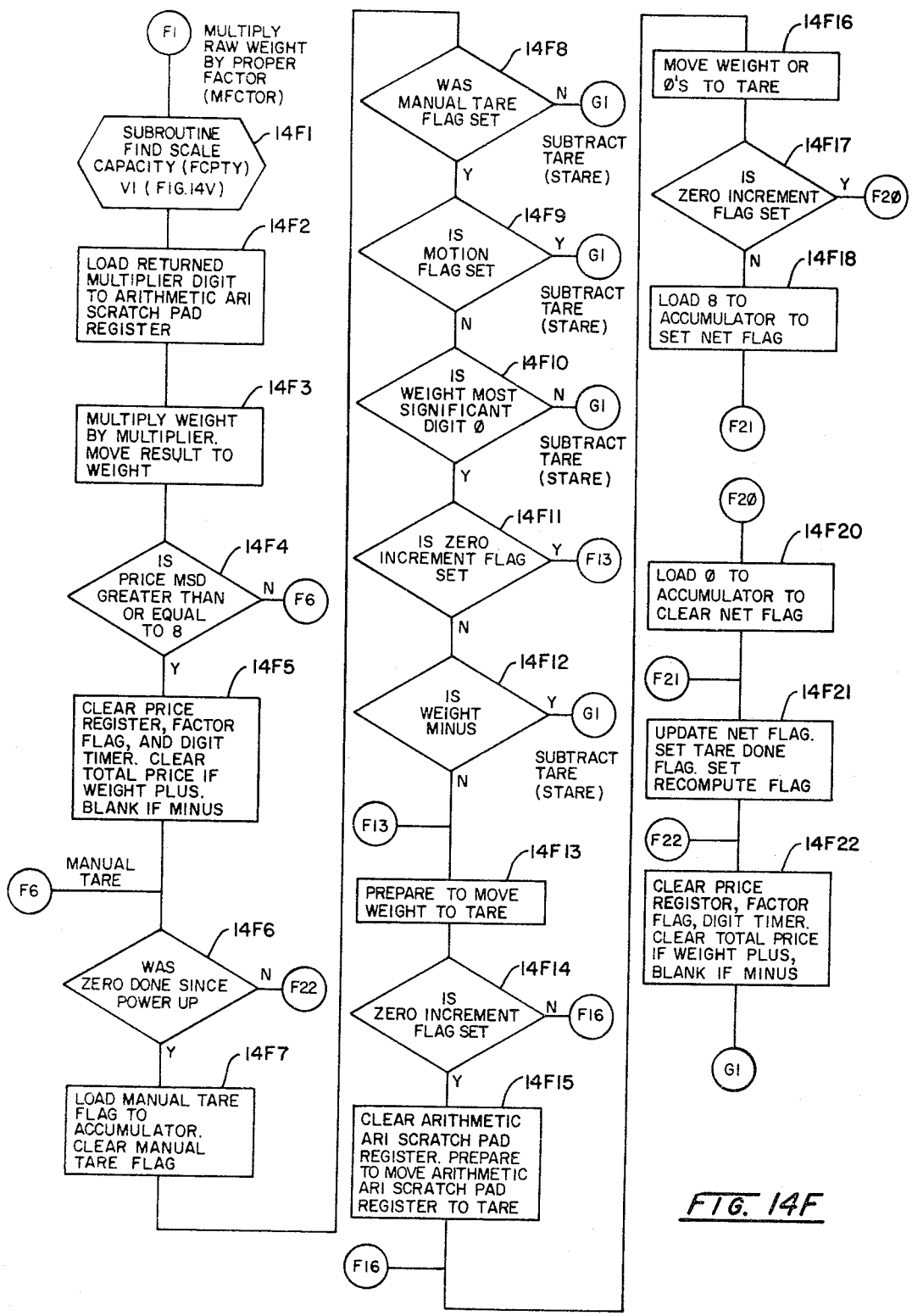
Figure 14G:
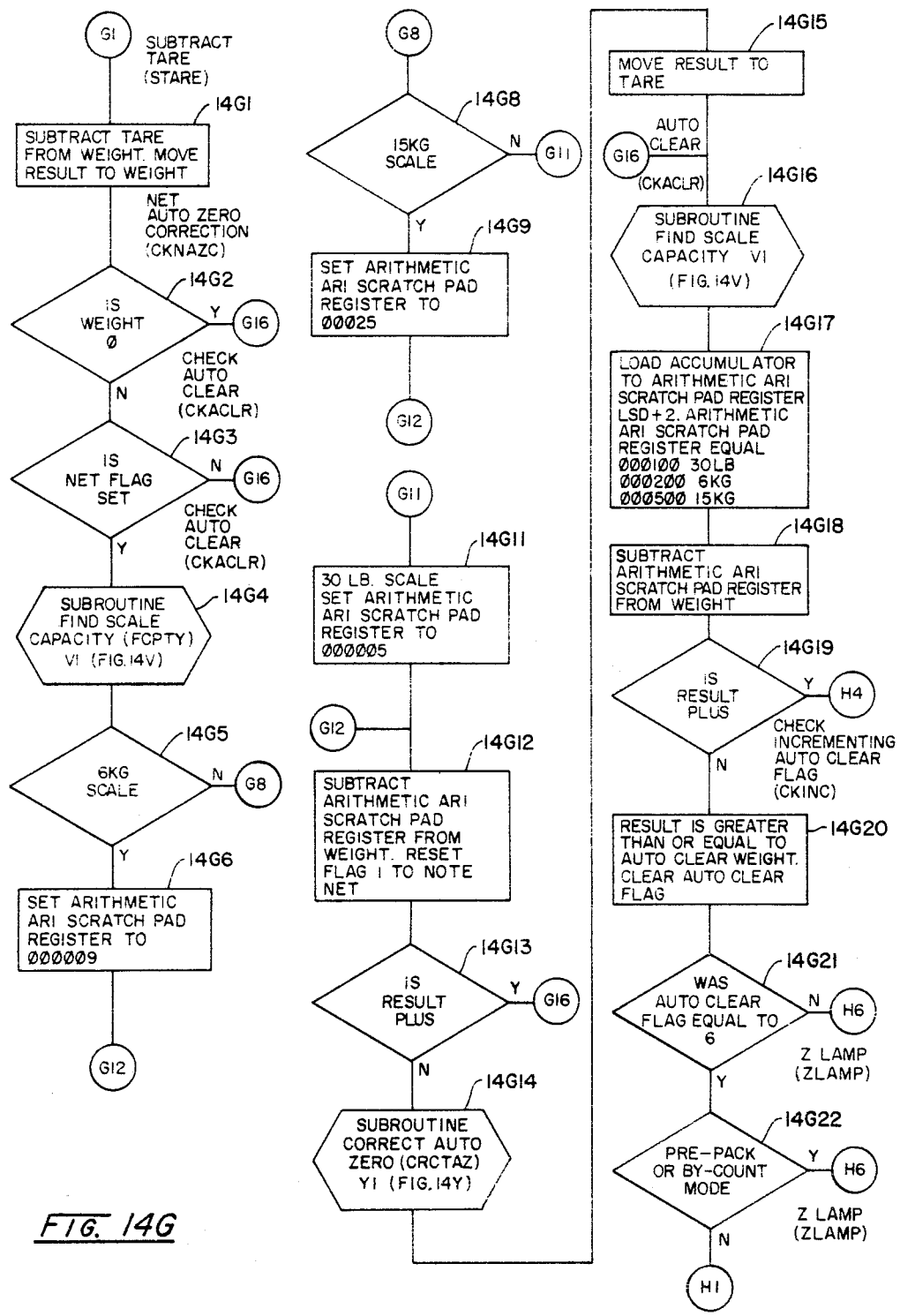
Figure 14H:
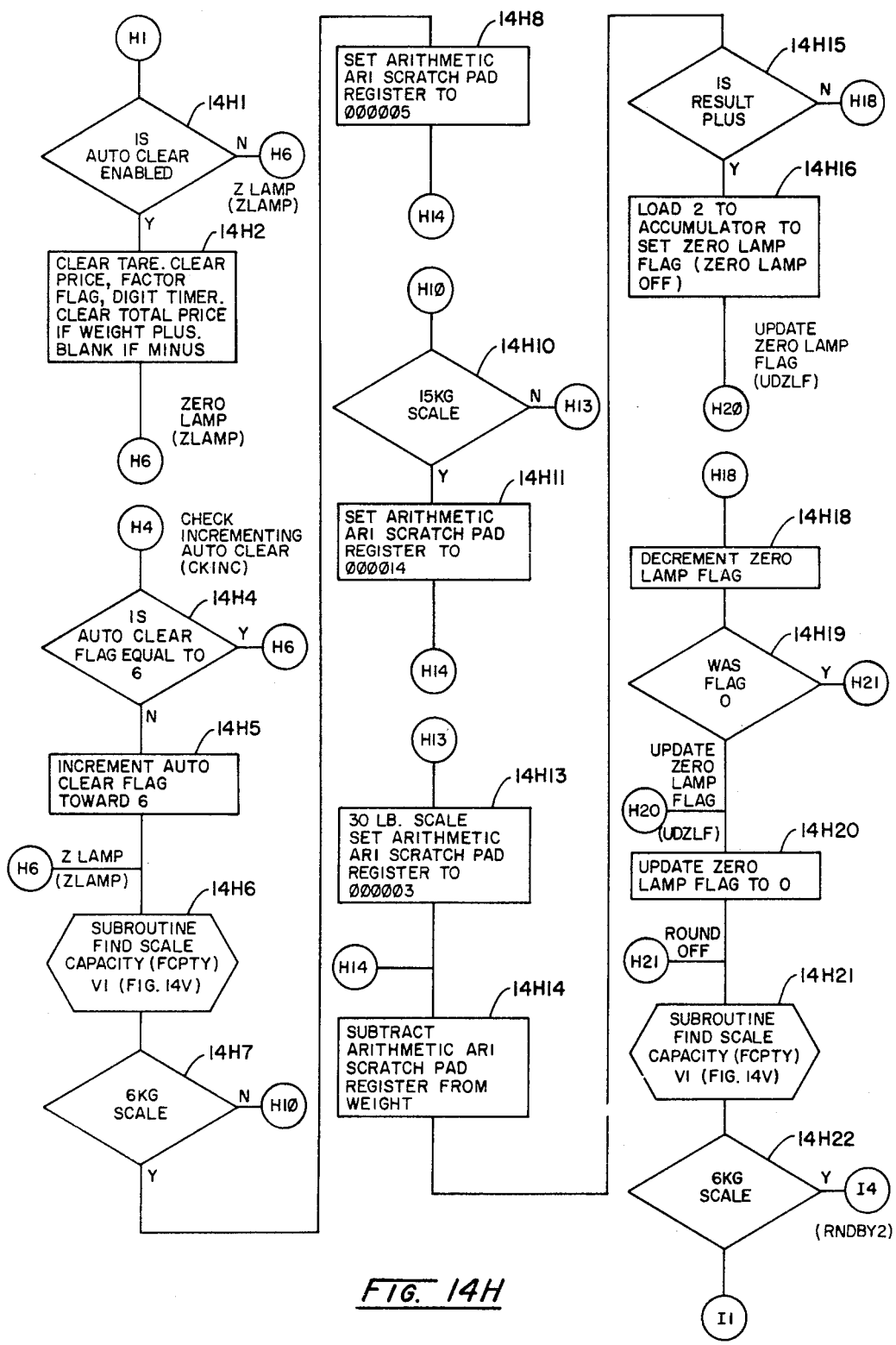
Figure 14I:
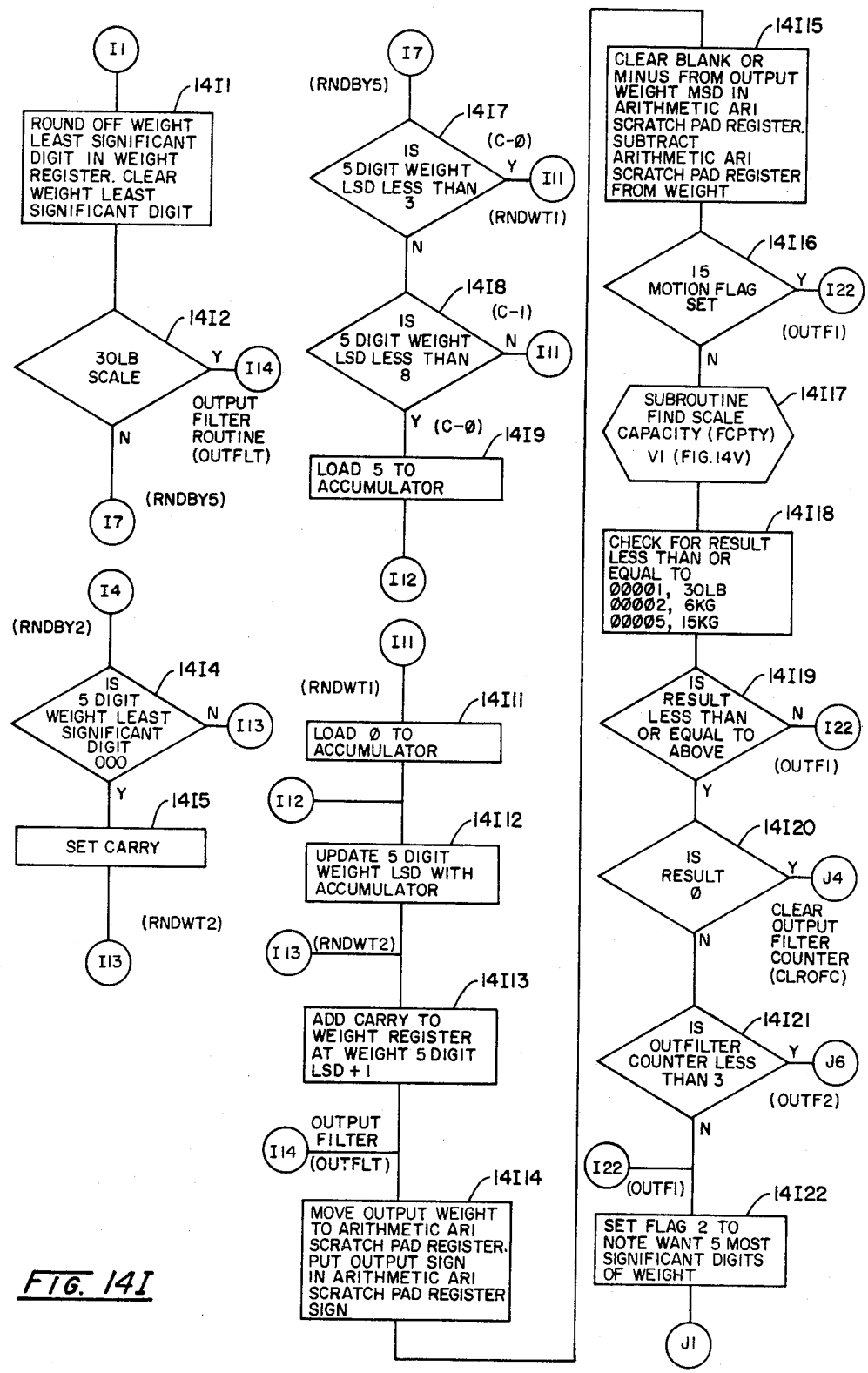
Figure 14J:
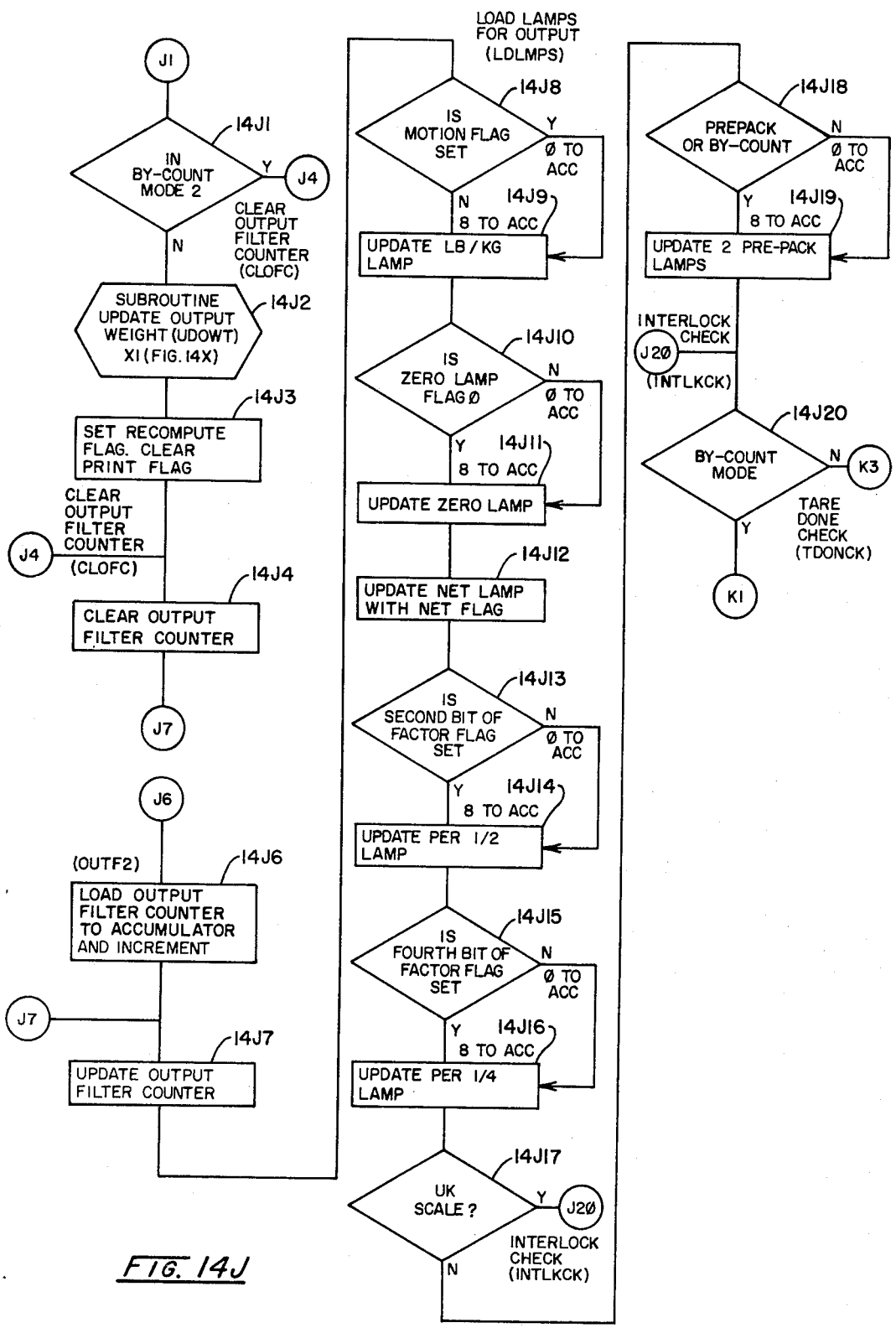
Figure 14K:
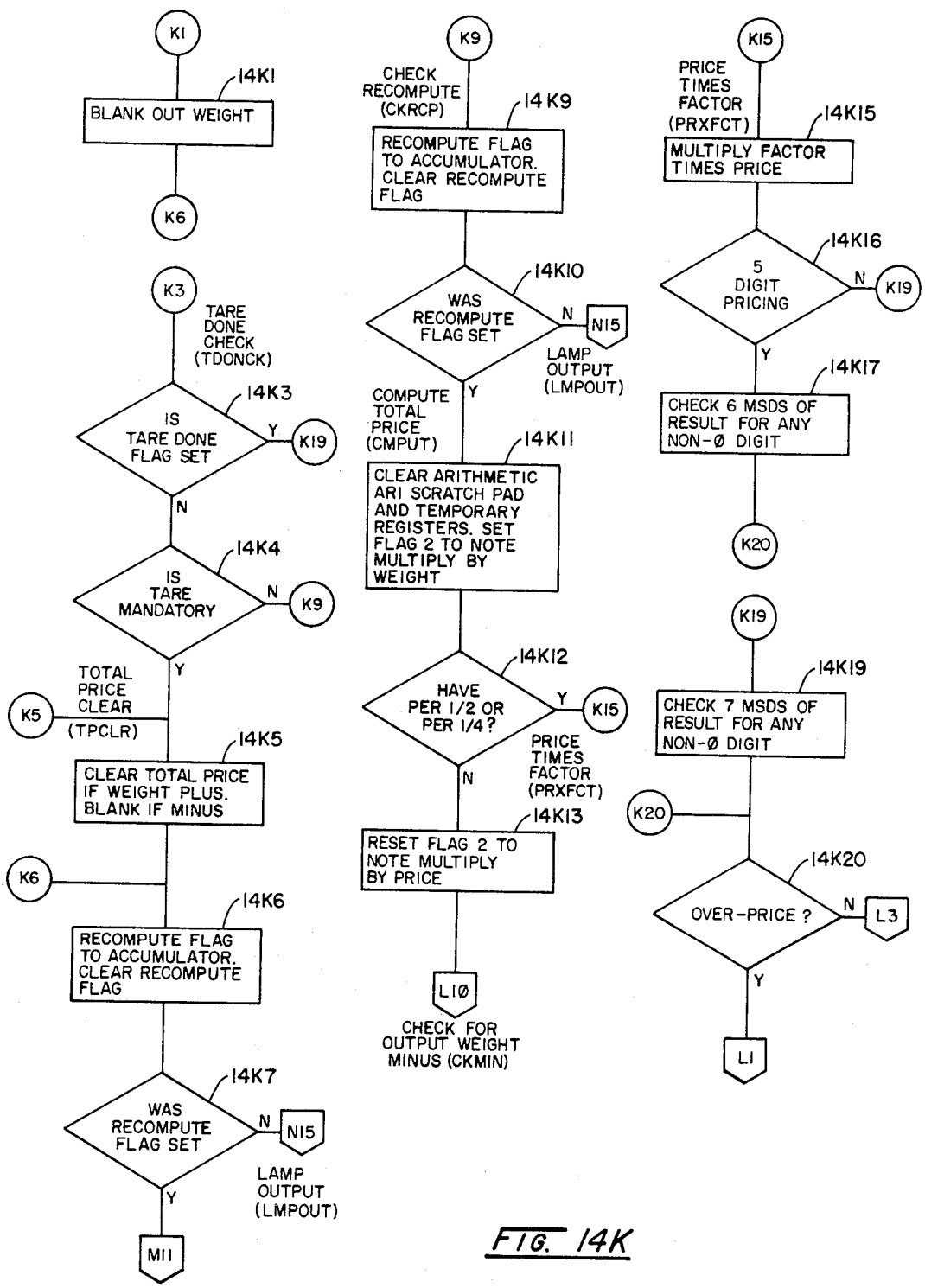
Figure 14L:
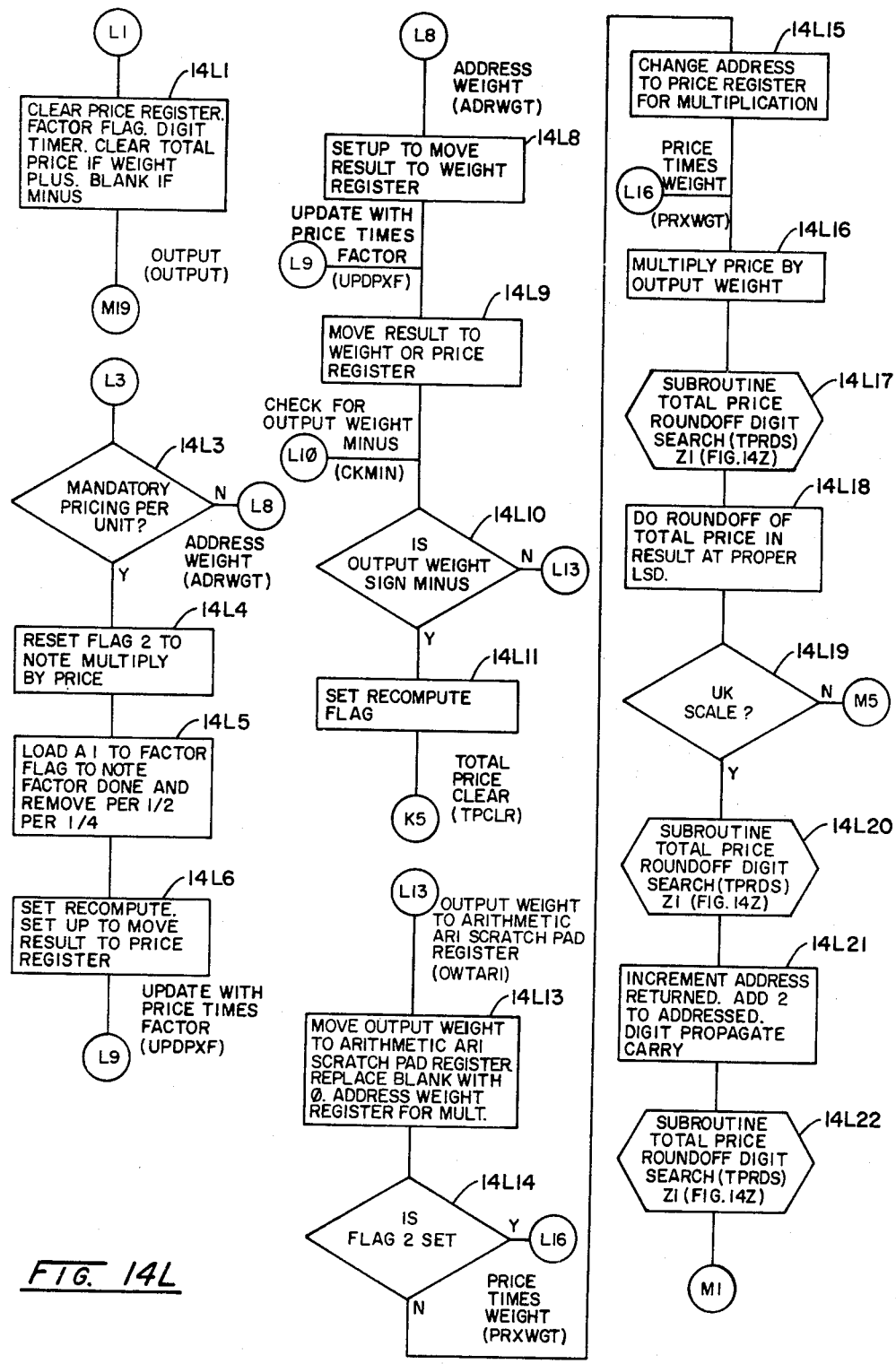
Figure 14M:
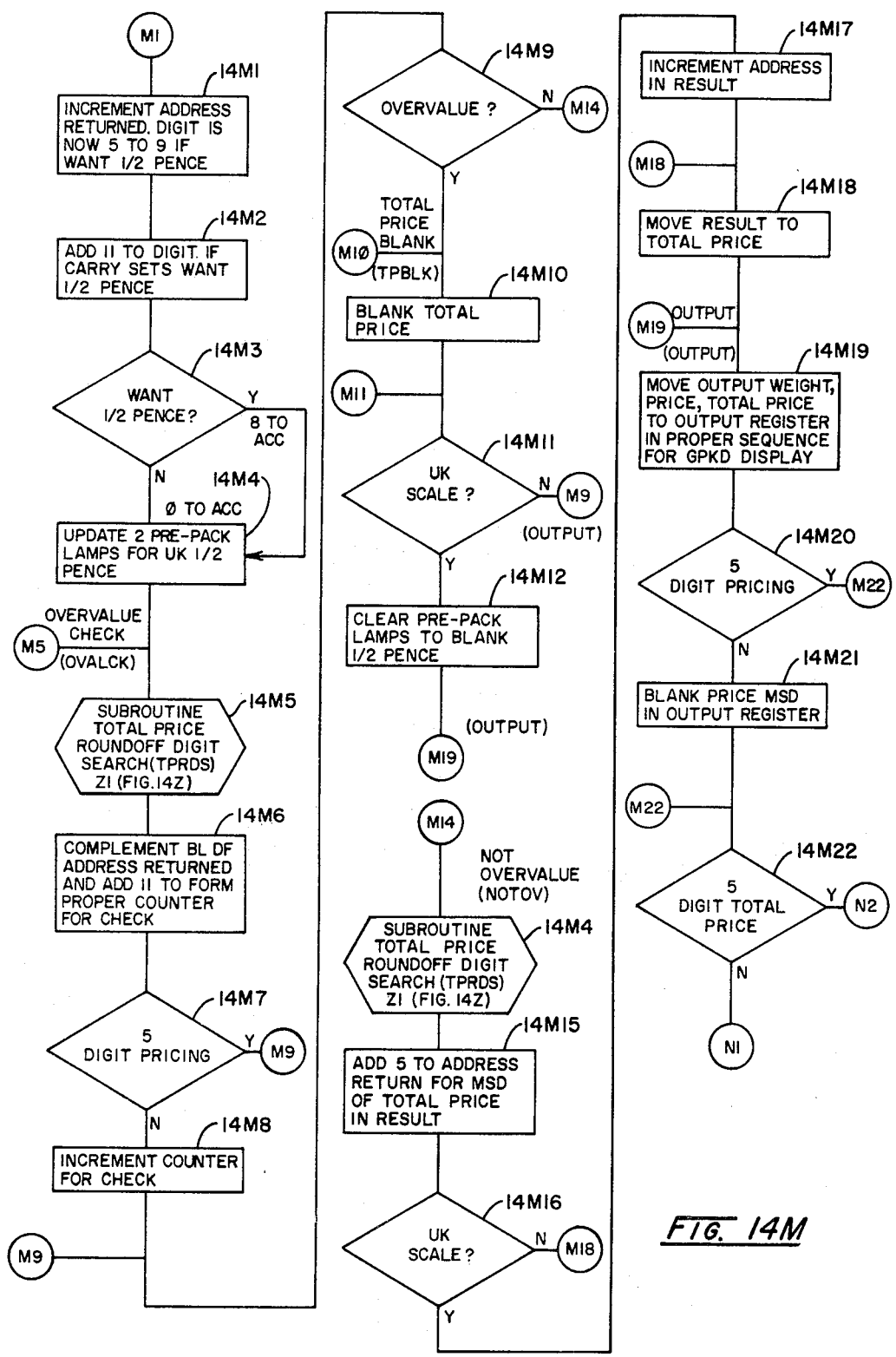
Figure 14N:
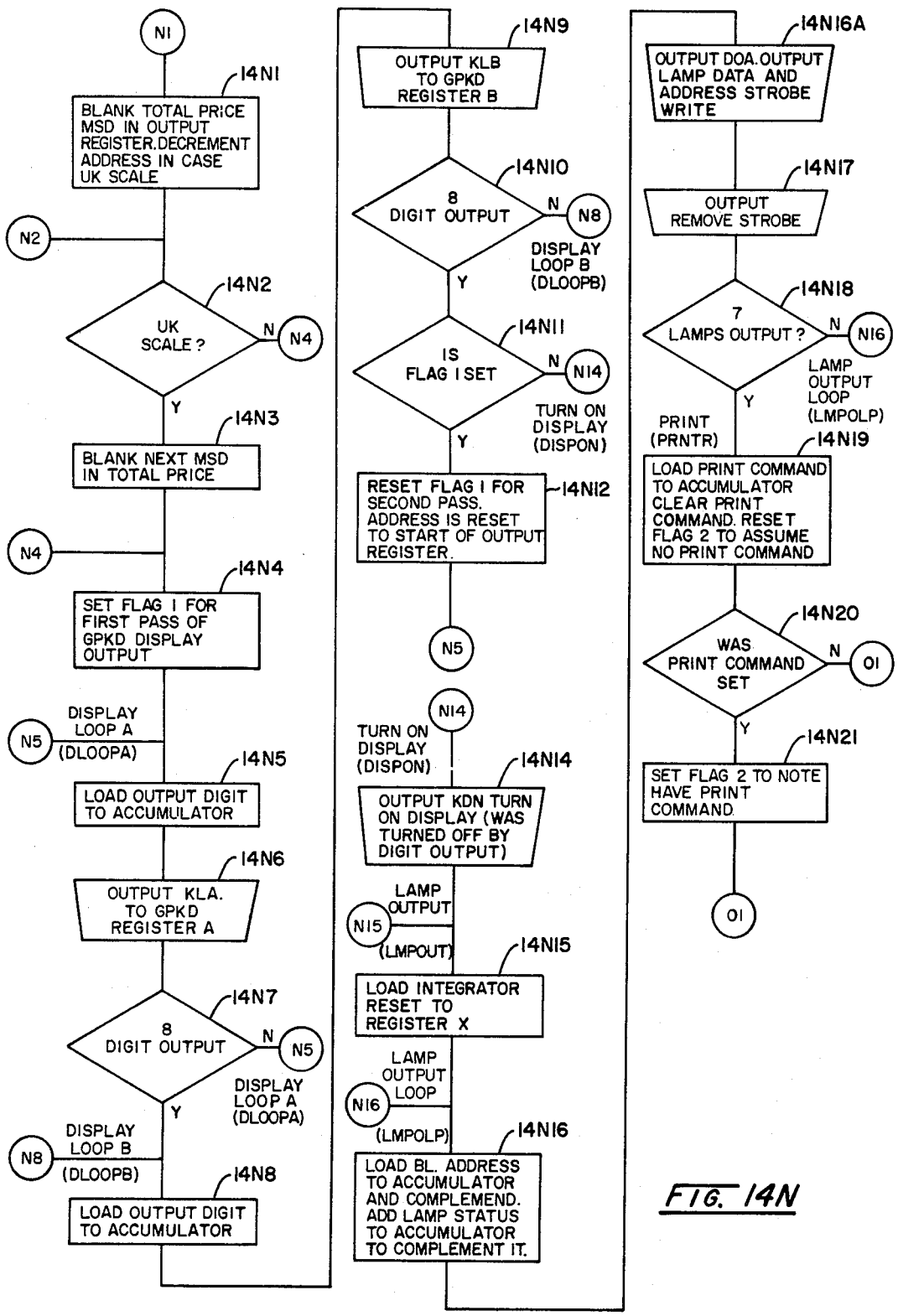
Figure 14O:
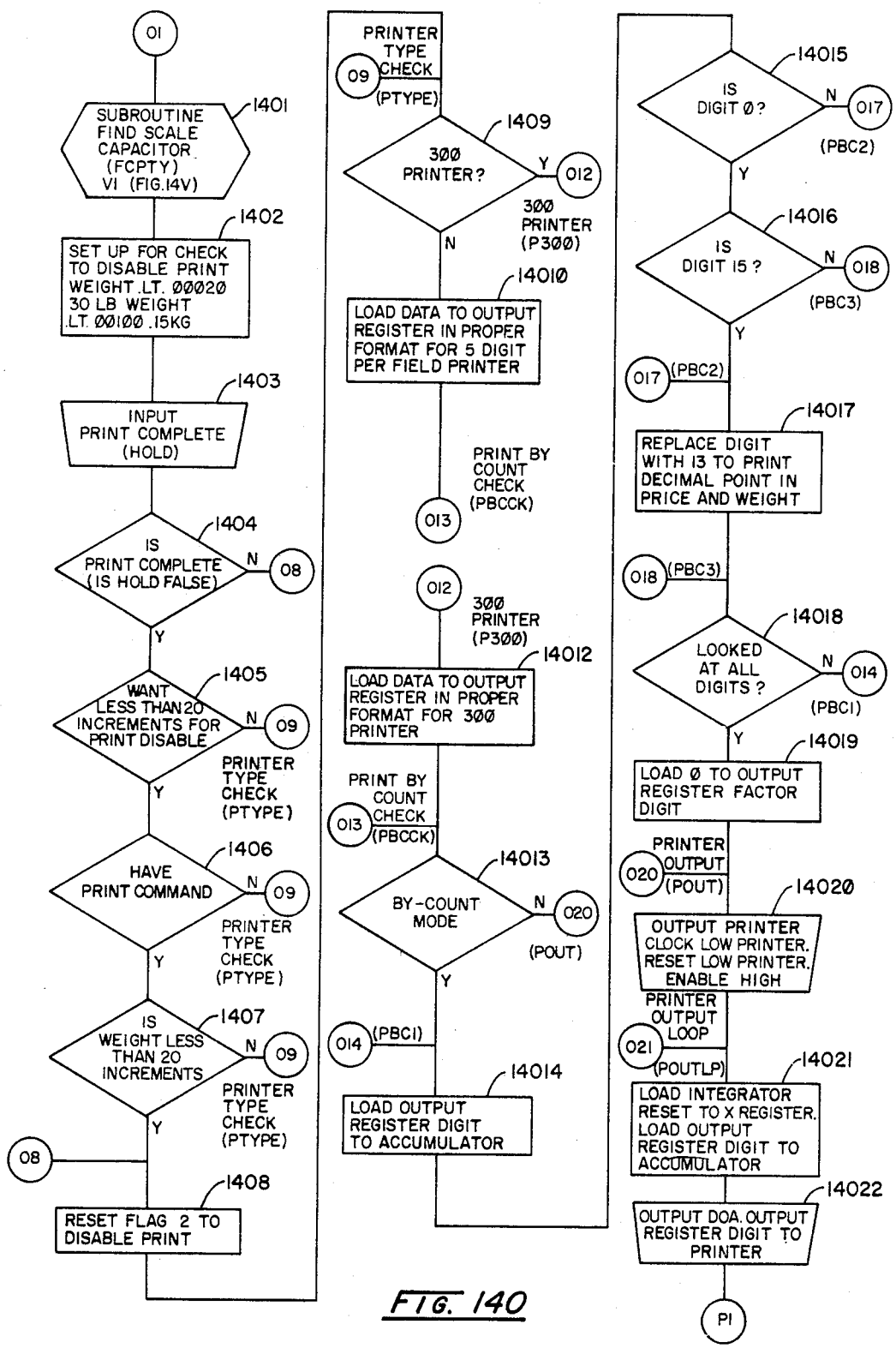
Figure 14P:
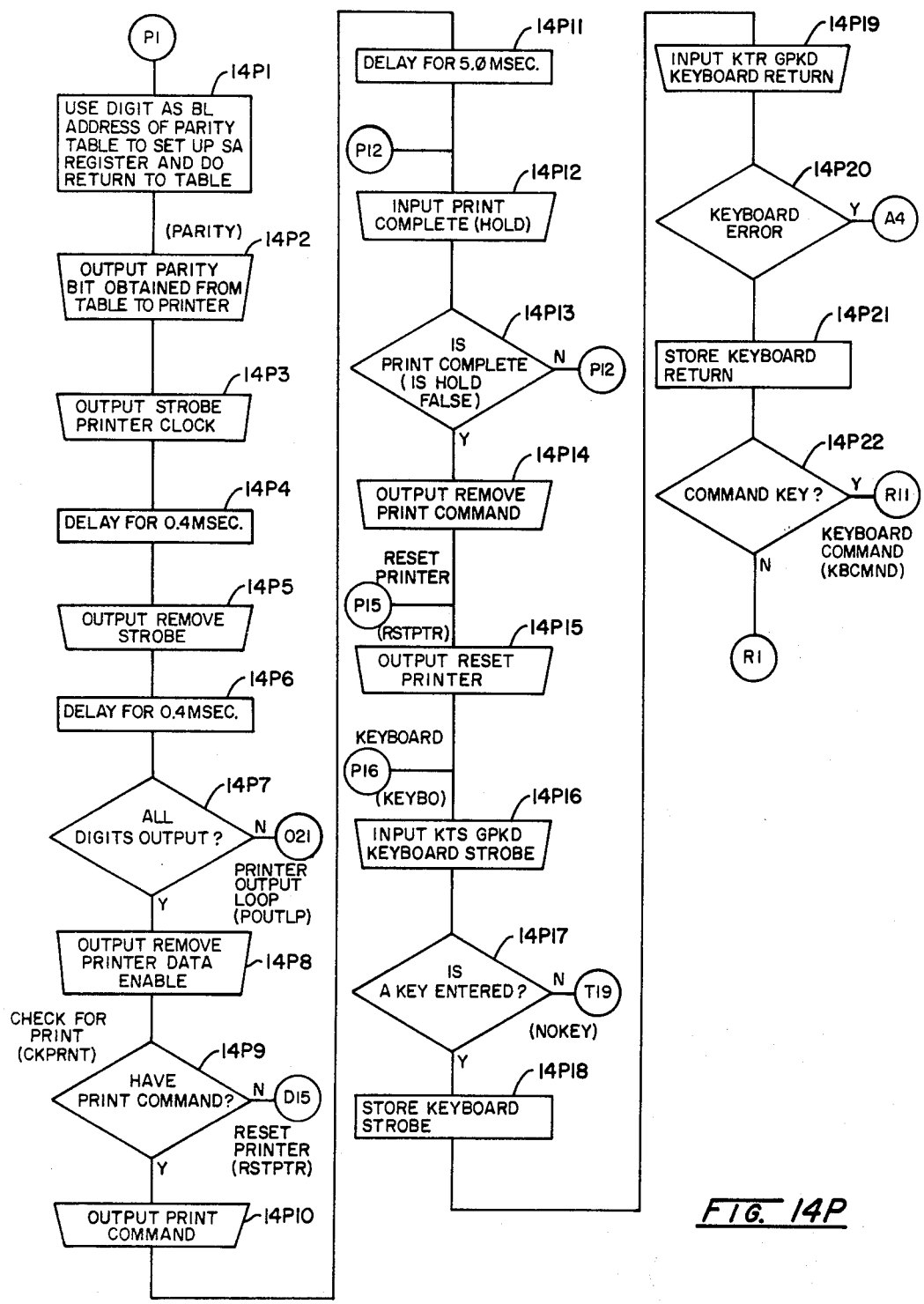
Figure 14R:
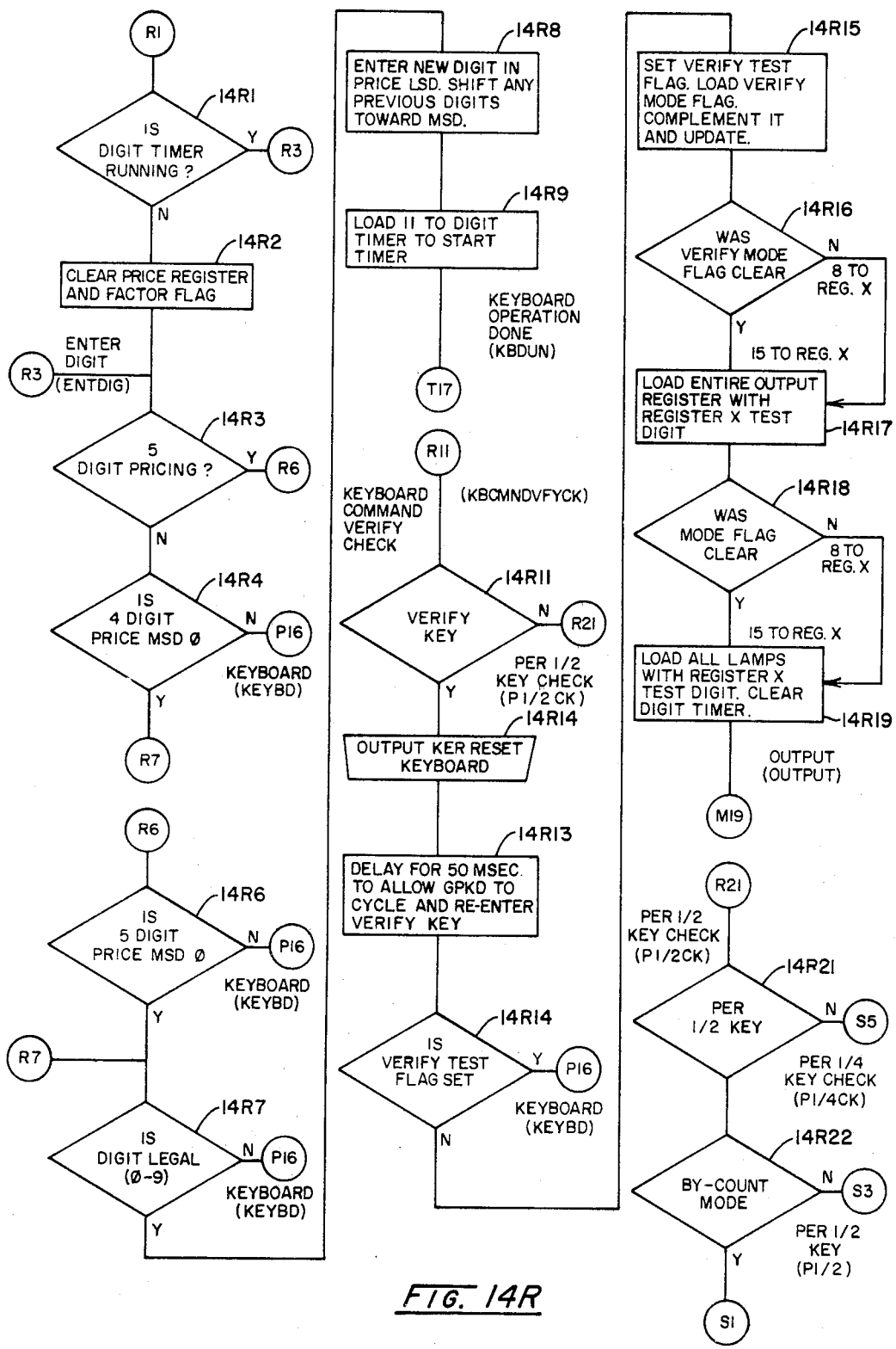
Figure 14S:
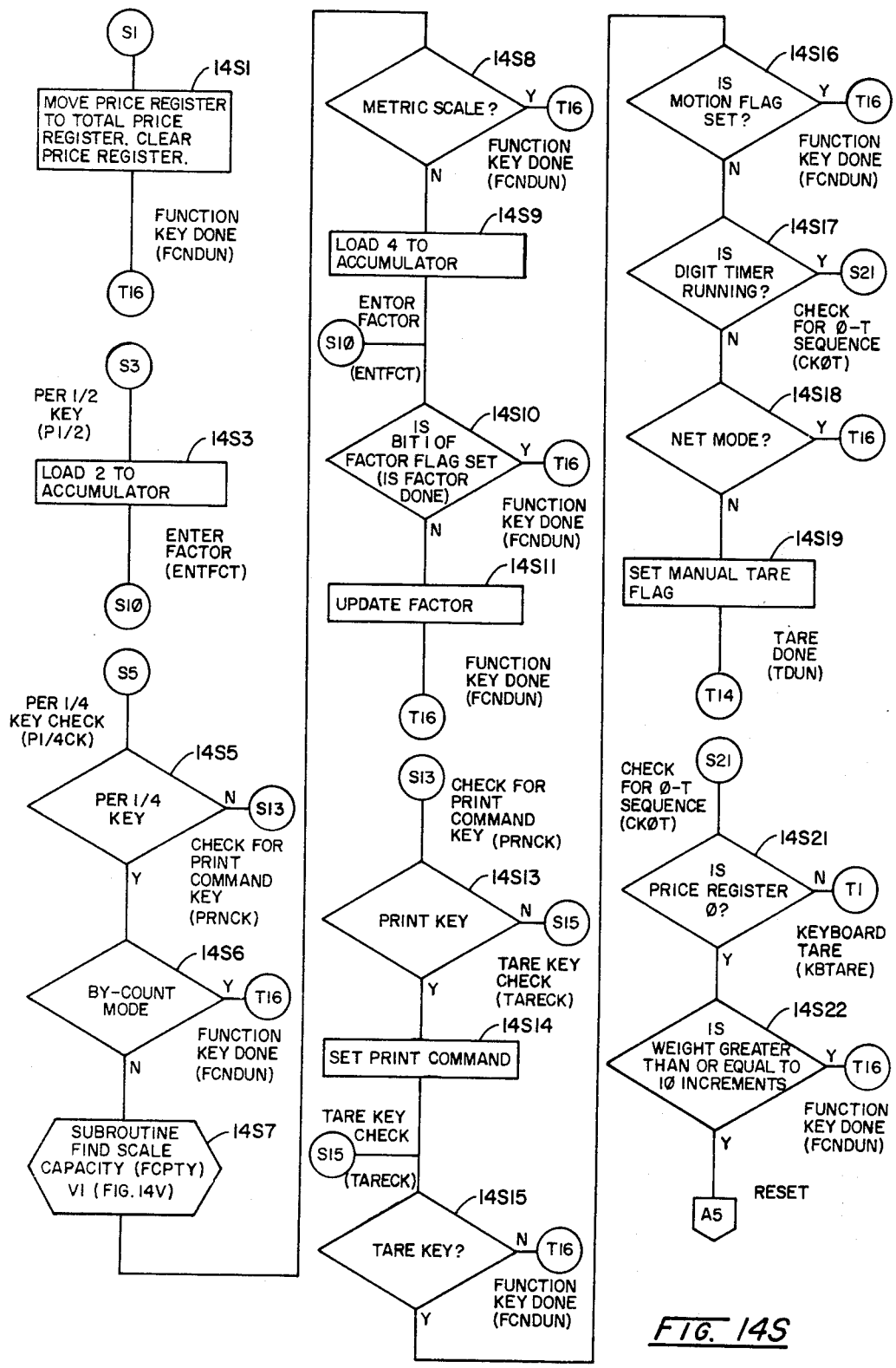
Figure 14T:
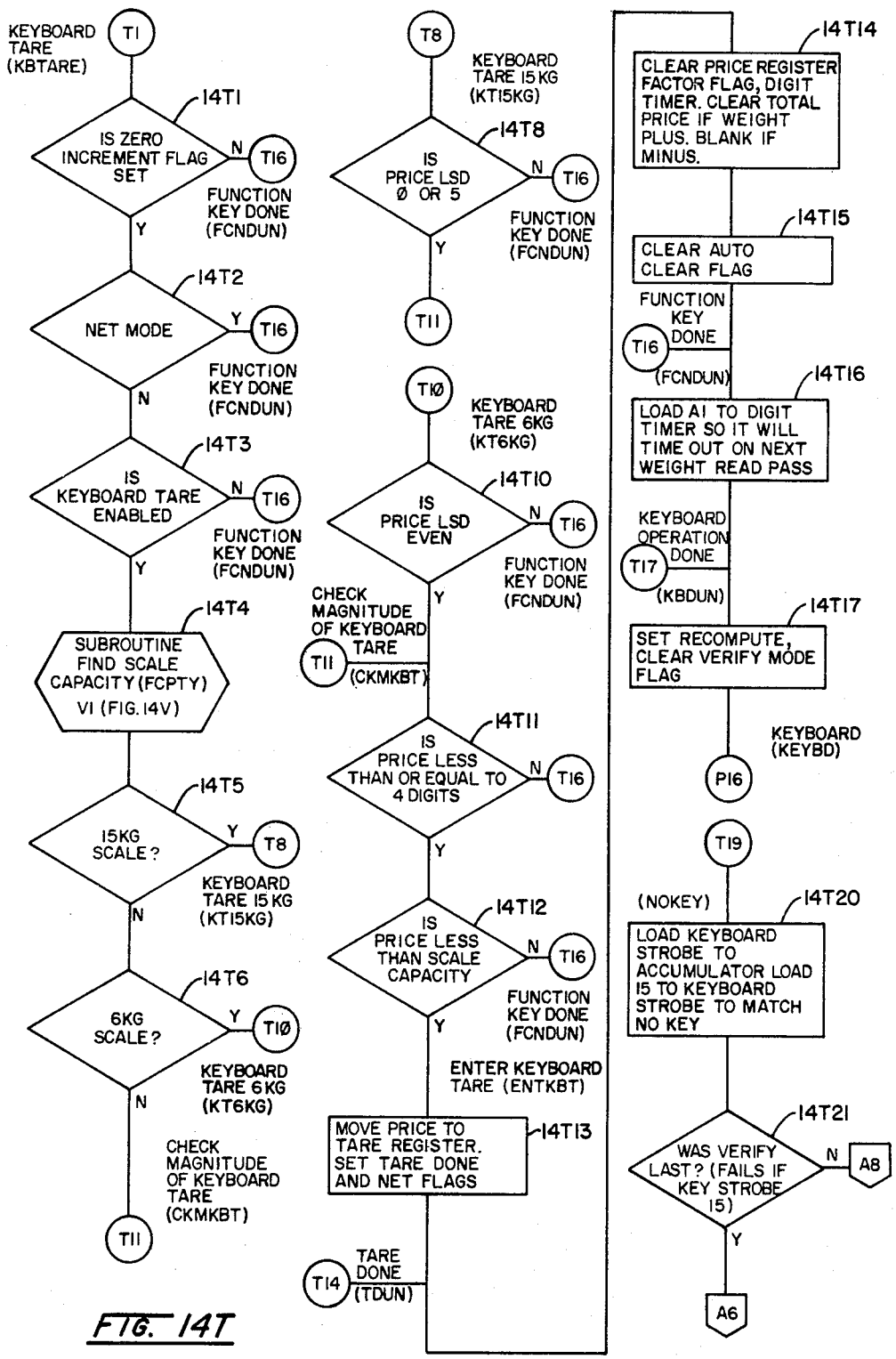
Figure 14V:
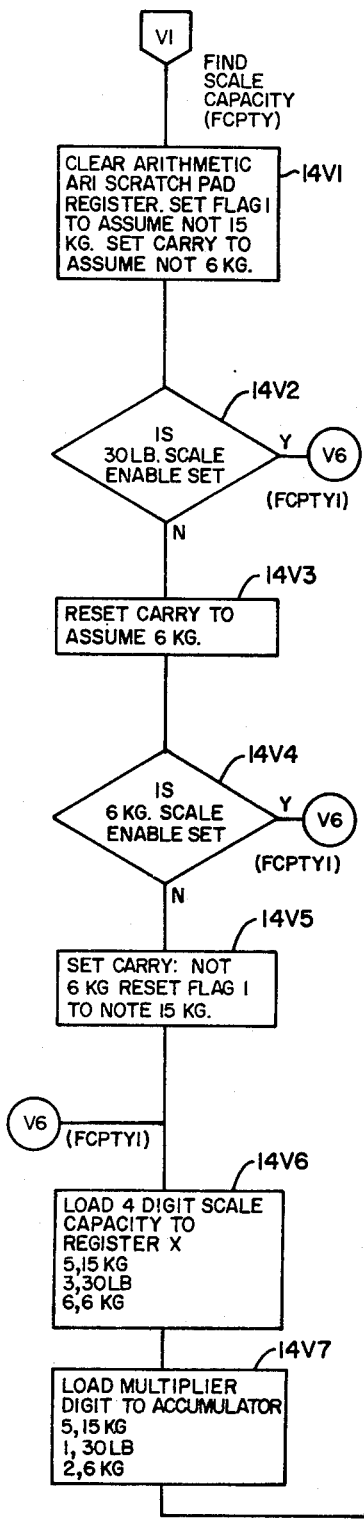
Figure 14W:
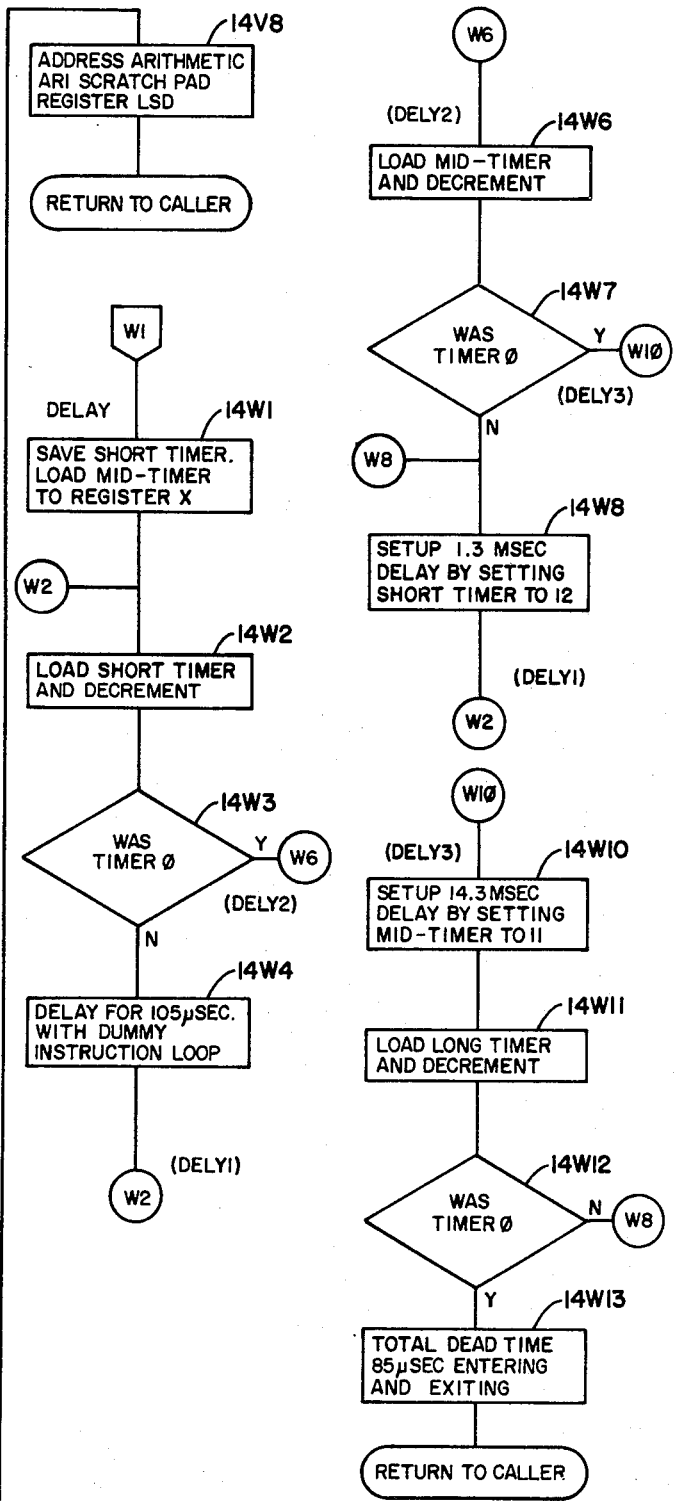
Figure 14X:
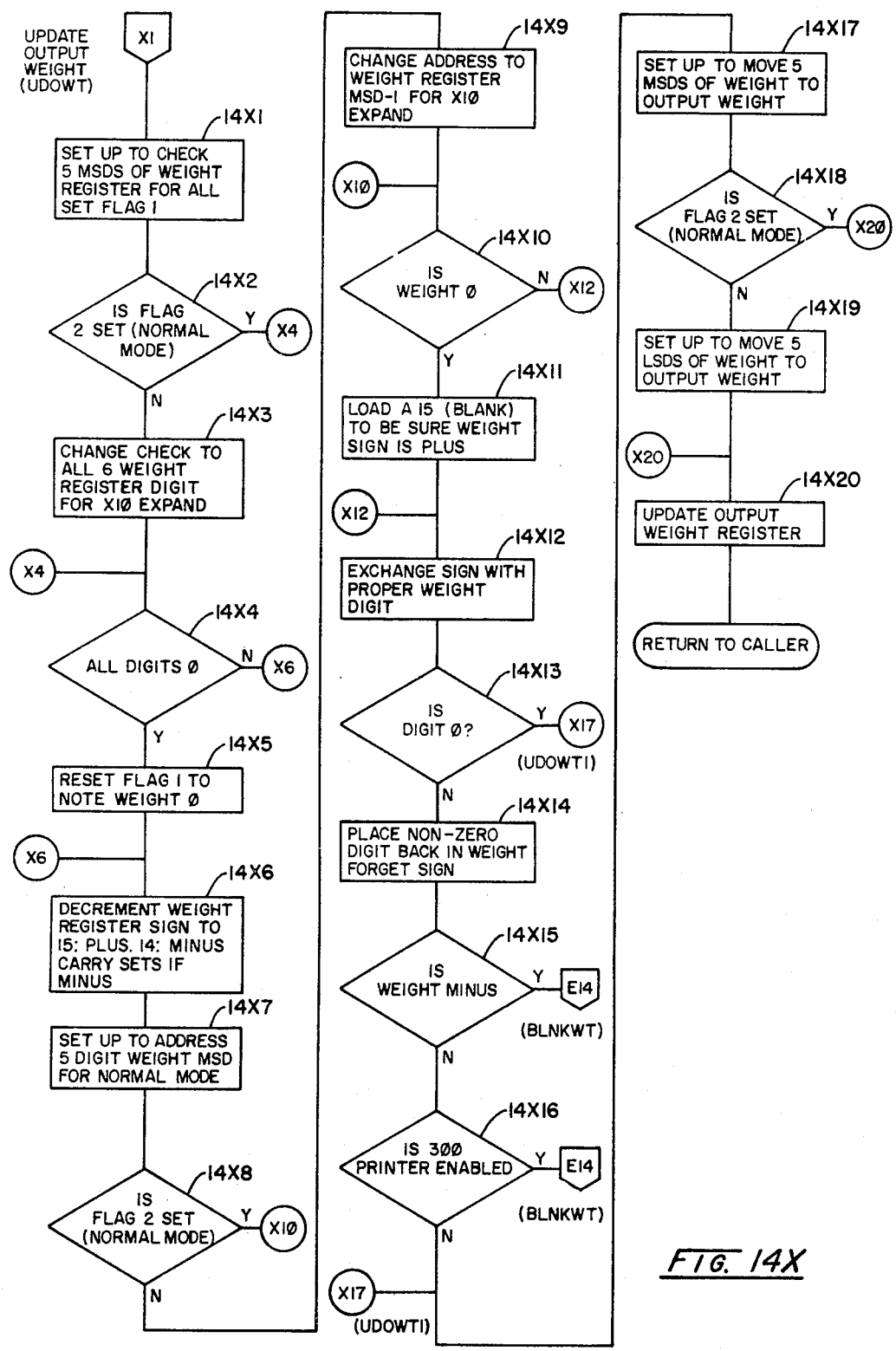
Figures 14Y, 14Z:
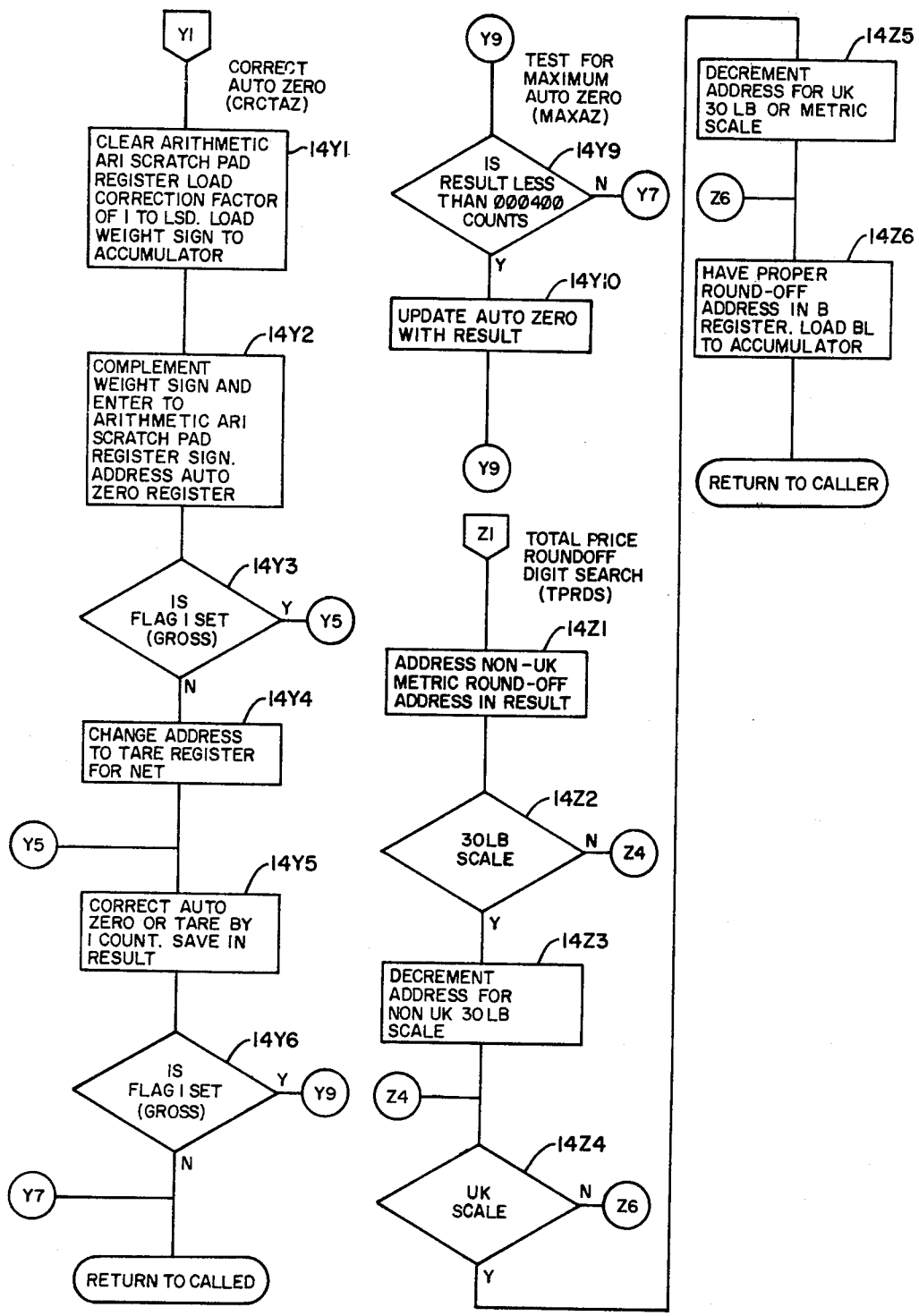

The operation of the system can be most conveniently described in conjunction with FIGS. 14A through 14Z of the drawings (Figure numbers 14Q and 14U are not used for clarity). The flow diagrams of FIGS. 14A through 14Z graphically describe the operation of the scale system utilizing the operating sequence represented by the program listing included herewith as an appendix in combination with the Rockwell PPS-4/2 microcomputer described above. However, it should be appreciated that the operating sequence of the system utilizing this operating sequence may be implemented on other types of commercially available computers in accordance with the principles described herein.

The present invention, as incorporated in the exemplary embodiment described herein is arranged to cooperate with many features and operations which are described and claimed in U.S. Pat. No. 3,984,667 to Loshbough, U.S. Pat. No. 3,869,005 to Williams, Jr., and U.S. Pat. No. 3,861,479 to Pryor, which patents are specifically incorporated by reference herein: and U.S. patent application Ser. No. 729,911 of Donivan L. Hall and Edward G. Pryor entitled "Digital Scale With Antifraud Features", which patent application is also incorporated by reference herein. In order to more clearly set forth the precise invention for which this patent is solicited, in such a manner as to distinguish it from other inventions and from what is old, those operations which are disclosed in the incorporated references will only be generally described, with the primary emphasis being given those operations forming a part of the instant invention.

Many of the operations of the scale system utilizing the operating sequence are performed only partially by single pass through the operating sequence (hereinafter referred to as an operating sequence cycle), so that a plurality of passes or cycles through the operating sequence may be required in order to complete a particular operation. Such operations are clearly disposed in the incorporated references and will be referred to in the instant disclosure only where necessary to clearly set forth the instant invention. The details of the operations are completely disclosed in the accompanying program listing in the appendix and in the flow diagrams FIGS. 14A through 14Z.

The flow diagrams of FIGS. 14A through 14Z disclose in graphical form an exemplary operating sequence of the scale system, including the operations required for implementing the analog-to-digital conversion and the net zero tracking described herein. The flow diagrams consist of a series of geometrical shapes, each of which corresponds to a particular type of operation. Each rectangular block represents the performance of a function which is generally indicated by the notation found within the rectangular block. Each diamond shaped geometrical figure represents a decision making operation where one of two alternatives is determined. The hexagons represent that a subroutine is performed at that particular point in the operating sequence, with the subroutine being performed indicated by the notation within the hexagon. The oval-shaped geometrical figures represent a branch back operation and are used in conjunction with a subroutine to indicate that the operating sequence continues at that point in the main operating sequence where the subroutine was entered. A rhomboid geometrical figure represents either an input or an output operation. The numbers placed in circles to the top and left of the geometrical figures represent input locations to those particular operations. The numbers in the circles to the right and below the blocks in the flow diagrams represent an output connected to a different location in the flow diagrams indicating a transfer in the operating sequence. The mneumonic designations found in parenthesis adjacent to the circles containing numbers, indicate labels which have been given to a particular group of operations. These mneumonics may be utilized in referring back to the detailed operating sequence disclosed in the appendix by referring to the symbol table found at the end of the appendix. The symbol table found in the appendix lists, in alphabetical order, the mneumonic labels and the corresponding location in the detailed program listing of the operating sequence where the particular operations represented by the mneumonic label may be found. Also a table is included showing the operations represented by the mneumonic labels.

In order to accomplish the operations illustrated in FIGS. 14A–14Z, data is assigned to and stored in various registers or memory cells in the random access memory or RAM 911 as illustrated in FIG. 13. Therefore, it is useful to define and explain the various flags, counters, timers and data registers which are used in the exemplary embodiment of the invention and which are referred to in the flow chart diagrams of FIGS. 14A–14Z.

The memory unit 310 which is shown in FIG. 6 and illustrated in more detail in FIG. 10, includes a random access memory or RAM with a capacity of 128 four-bit words and arranged as shown in FIG. 13. Each of the 128 four-bit words may contain any one of sixteen states. These states can represent numerical values of data or a status or condition.

In FIG. 13, the register addresses are referred to by the hexadecimal equivalents of their binary address. The two most significant hexadecimal digits of the address within the RAM define a particular column or grouping of four bit words and the least significant hexadecimal digit defines a row or particular four bit word within the RAM. The hexadecimal address designations are also used as reference numerals below. A tare done flag at address 002 is set to its binary eight state after a tare operation has been completed by the entry of tare weight data into the appropriate storage registers and otherwise is reset or cleared to a "zero" state when such a tare has not been completed.

A digit timer is provided at register 004. The digit timer is set to its binary "eleven" state upon the depression of a digit key on the keyboard. Thereafter it begins a timing cycle by decrementing one count each pass through an operating sequence cycle. The depression of any other digit key before the digit timer counts to zero will again set the digit timer to binary "eleven" state to reinitiate the counting cycle. If the digit timer counts down its "zero" state before all price digits are entered or the tare key is depressed, all previously entered keyboard digits will be cleared upon entry of any new digit. This feature requires that all digits be entered within a few seconds of each other and consequently avoids the retention by the apparatus of accidently entered data or of data entered a considerable time earlier and forgotten by the operator.

A manual tare flag having two states is provided at register 003. Whenever the "T" key is pressed, there is no motion of the platter and the digit timer of register 004 is at its "zero" state (i.e., is not running), the manual tare flag is set to its "eight" state. It is reset or cleared to its "zero" state after its condition has been sensed in subsequent operations.

The addresses of registers 005 through 00F are labelled as a result register and are used as a scratch pad.

A filter counter is provided at address 010 and is used to provide four states, "zero" through "three". Whenever, during the sequence of operations, no difference is found to exist between a most recently generated, fully processed weight and the weight currently being displayed, the filter counter is reset or cleared to its "zero" state. However, each time a difference is found to exist between the most recently generated fully processed weight and the weight being displayed, the filter counter counts up one count. If such a difference is found three times in succession, the filter counter counts one count at a time, to its "three" state to signal that the displayed weight should be updated with the most recently generated fully processed weight. This avoids a display blink from an unnecessary updating of the displayed weight with weight data which is identical to that which is currently being displayed.

A zero lamp flag is provided at address 011 and is used to provide three states "zero" through "two". Whenever a weight is detected which is not within a small range of the previously established scale zero, which range is different for different scale capacities, the zero lamp flag is set to its "two" state for purposes of causing the zero lamp to be turned off to indicate that the scale is not zeroed. However, each time a weight within this range is detected, the zero lamp flag is decremented. Consequently, if the scale is found to be within this range for two such detections in succession, the zero lamp flag gets decremented to its "zero" state so that the zero lamp is turned on to indicate that the scale is zeroed.

A net flag is provided at register 012 and is set to its "eight" state when the weighing scale is in its net mode of operation, that is, when a positive weight is stored in the tare memory register. Otherwise, the net flag is in its clear or reset state of "zero".

A factor flag is provided in register 013 which is reset or cleared to its "zero" state when there is no price factor, set to its "two" state when pricing is per ½ unit of weight and is set to its "four" state when pricing is per ¼ unit of weight.

A verify test flag is provided in register 018. This flag is set to its "eight" state in response to depression of the "clear" key to signify that a verification test is in progress. The vertify test flag is reset or cleared to its "zero" state when the sequence of operations pass through the reset operation III beginning on FIG. 14A.

Registers 01A through 01F provide six, binary coded decimal digits of temporary scratch pad data storage for use in carrying out the sequences of operations of the exemplary embodiment of the invention. The sign of that six digit number is stored as a fifteen or zero in register 019.

Registers 020 through 026 store, as an "eight" or "zero", on the "on" or "off" state of the indicator lamps labelled at those addresses in FIG. 13.

The presence or absence of a print command is stored as an "eight" or "zero" at register 027.

Registers 02A through 02F store the six binary coded decimal digits which represent a detected weight while register 029 stores the sign of that weight.

In order to require that the "Z" be depressed for a sufficient length of time before such depression is accepted and to thereby prevent accidental erroneous or fraudulent zeroing of the weighing scale, a zero key timer is provided at register 030. The zero key timer has even states "zero" through "fourteen". An initial depression of the "Z" key causes the zero key timer to switch to its "two" state. Thereafter, on each pass through the operating sequence cycles, the zero key timer is incremented to its next higher even state so long as the "Z" key remains depressed. If the "Z" key is depressed sufficiently long that the zero key timer counts through all its even states and returns to "zero", the depression of the "Z" key is then accepted, the scale is zeroed and the zero done flag at register 031 is set to its "fifteen" state to indicate that the scale has been zeroed. The zero done flag is reset or cleared to its "zero" state in the initial, main program power-up operation I beginning on FIG. 14A.

An auto clear flag is provided at register 033 to help in the automatic clearing of a previously entered tare weight and price each time a weighing operation is completed. The auto clear flag is a seven state counter which is reset to its "zero" state whenever the detected weight is greater than a weight corresponding to one hundred raw weight increments. Whenever the scale weight exceeds this 100 increment band, the auto clear flag begins counting towards its "six" state. This auto clear flag counter is incremented each pass through the sequence of operations. If the detected weight falls within the 100 increment band before the auto clear flag counter reaches its "six" state, the auto clear counter is reset to its "zero" state and the tare data is not automatically cleared. However, if the scale weight is above the 100 increment band long enough for the auto clear flag to reach its "six" state, it will remain in its six state to enable the auto clear function. After the scale weight returns to within the 100 increment band, the tare weight and price will then be cleared.

Registers 034 and 035 are provided to store the least significant binary coded decimal digits of a first previously detected and a second previously detected weight. These are utilized as described below in the filtering operation of the preferred embodiment of the invention.

Registers 039 through 03F are used for the sign and the six binary coded decimal digits of a partially processed weight which represents a previously detected weight.

Registers 040 through 045, 050, 051, and 053 through 055 are two-state registers which store each mode selector switch status as an "eight" state or a "zero" state. Registers 046 and 047 store data which represent a keyboard key which has been depressed and detected. Register 048 stores in its four bits the status of the switches or keys labelled in those positions in FIG. 13.

Registers 049 through 04F form the auto zero register in which the zero correction factor is stored.

Registers 050 through 055 are used to store data as indicated.

A recompute flag is provided at register 057. It is set to a non-zero value whenever there is a change in a price digit or output weight in order to signify, during the next pass through an operating sequence cycle, that a new total price should be computed. However, if no such change is detected, the recompute flag remains in its "zero" state so that no new total price is computed. The recompute flag is cleared immediately prior to the compute total price operation XX.

A verify mode flag is provided at register 058. This flag has two states and is switched from its "zero" state to its 15 state upon the first depression of the CLEAR key and is returned to its "zero" state upon depression of any other key.

Registers 059 through 05F store the tare weight. Registers 060 through 06E store the total price, price and output weight as indicated. Registers 070 through 07F are as a work area and temporary scratch pad during the display and other routines.

The various means and apparatus for performing the functions and improvements in accordance with the exemplary embodiment of the invention comprise the scale mechanism, keys, switches, flags, registers, counters, timers, and storage spaces together with program sequences or routines and routine loops in combination with the computer, and the output or display apparatus and the control thereof.

Thus the means for controlling the time the integrator means is connected to the scale means comprises gate 94 and the control thereof including program sequences of blocks 14A17, 14A20, or 14A22 and the program loops or sequences of FIG. 14W in combination with the computer.

The means for reading the weight includes the flow diagrams beginning at B8 of FIG. 14B of the drawing.

The structure of the timing and counting arrangements operative during the T2 and T3 intervals comprise counter 1, counter 2, and counter 3 together with the program sequences and loops beginning at B9 of FIG. 14B which sequences and loops comprise the structure of the corresponding sections of the ROM storage. These sequences and loops together with the computer determine the T2 and T3 times.

The program sequences employed to derive the raw weight from the T2 and T3 times are shown in the drawing beginning with block 14B22 of FIG. 14B and extend through block 14C11 of FIG. 14C.

The operation of the exemplary embodiment of the invention is now described with reference to the flow chart diagrams of FIGS. 14A–14Z. The first two digits of the alphanumeric reference numerals for the individual steps of the operation are the Figure numbers on which the particular steps are illustrated. The latter alphanumeric digits refer to the particular step in that Figure. The labels which are shown in parentheses on the drawings are the labels used in the program and therefore provide cross references to be appended program listing.

Main Program Power-up

The power-up sequence is an initialization sequence which is performed when power is first applied to the central processor or ther is an interruption of power to the central processor.

During step 14A2 various registers within the computer are cleared to an initial state to provide a known starting state for the operating sequence.

After the main program power-up sequence the operating sequence then proceeds to the X10 CLEAR sequence beginning at step 14E1 which causes a clearing operation to take place with respect to the tare and auto-zero. The operating sequence then proceeds to the output sequence beginning at 14M19.

The main program then advances through the remaining sequences shown in FIG. 14M and then transfers to the sequences of FIGS. 14N and 14O and through the various sequences of FIG. 14P through 14P15. These output and printer sequences are analogous to the output sequences such as described in the above identified patents and applications. The main program then advances through the various keyboard sequences or routines beginning at 14P16. If no key is operated the program transfers to T19 of FIG. 14T and then to A8 assuming no verifying operation.

Upon transfer to block 14A8 via transfer A8, the various control and mode switches are scanned and the various registers in the RAM 911 conditioned or set in accordance with the condition of the various control and mode switches. These various operations are designated in blocks 14A8 through 14A11. These operations and the operations relating to the scanning and response to the keyboard digit keys are analogous to the corresponding operations described in the above patents and applications incorporated herein.

In the beginning under the assumed conditions, the digit timer was previously or already zero so control transfers from block 14A11 via transfer A15 to block 14A15.

Beginning with block 14A15, the read weight sequence of operations VI is performed in which the analog to digital conversion in accordance with the present invention is accomplished.

At the beginning of the read weight sequence of operations, a find scale capacity subroutine is performed. This subroutine is illustrated on FIG. 14V. It performs the interrogation of RAM registers 043 and 044 to determine what scale capacity is selected and returns to the main program data which is dependent upon which capacity is selected.

Referring to FIG. 14V, at step 14V1, the arithmetic scratch pad register 01A–01F is cleared and flag 1, i.e., flip flop 825 of the CPU 210 is set to make an initial assumption that the 15 kilogram scale is not selected. Similarly, the carry register 812 of the CPU 210 is set for an initial assumption that the 6 kilogram scale is not selected.

Then, in step 14V2, the 30 lb. enable RAM register 043 is examined to determine whether the 30 lb. scale is selected. If it is, operation jumps to step 14V6. However, if it is not, the carry is then reset in step 14V3 to assume that the 6 kilogram scale is selected. Then, in step 14V4 the 6 kilogram enable register RAM 044 is examined to determine whether the 6 kilogram scale is selected. If it is, operation jumps to step V6. However, if it is not, the carry register is set and flag 1 is reset to note that the 15 kilogram scale is selected.

Then, at step 14V6, the flag 1 (FF825) and carry register 812 are used to load into the X register 813 of the CPU 210 a 5 if the 15 kilogram scale was selected, a 3 if the 30 lb. scale is selected and a 6 if the 6 kilogram scale is selected. In step 14V7 there is loaded into the accumulator 810 a 5 if the 15 kilogram scale was selected, a 1 if the 30 lb. scale is selected, and a 2 if the 6 kilogram scale is selected. Then, in step 14V8 the address DD1A of the arithmetic scratch pad register ARI is loaded in the BL section of the address register 814 and operation returns to the next order in the sequence of operations at which the find scale capacity sequence of operations was called.

Referring now again to FIG. 14A, data returned in this manner is then used in steps 14A16 through 14A22 to set up a timing sequence for providing the time interval during which the analog weight signal is integrated as part of the analog to digital conversion.

In the exemplary embodiment of the present invention three, four bit, digital timers are employed; a "Long Timer" in RAM register 00A, a "Mid Timer" in RAM register 009, and a "Short Timer" in the accumulator and initialized to the values shown in steps 14A17, 14A20, or 14A22. These timers are then processed according to the subsequently described timing subroutines in order to provide the desired integrating time interval $T_1$ illustrated in FIG. 12.

Although a single timer register having sufficient bit capacity could be used to provide the desired time interval, it is advantageous to use the short, mid and long timers described above.

As an example, if the scale has been set or conditioned to operate as 6 kilogram scale, the long timer 00A, is set to a 15 state, the mid-timer 009, is set to its 3 state, and the short timer in the accumulator is set to a 9 state.

After loading this initial timing data into the long, mid and short timers, the CPU 210 at step 14B1 switches the transistor 94 (FIG. 4) of the switching circuit 50 to its conduction state in order to apply the analog weight signal to the integrator circuit 51 and begin the integration. The delay subroutine at step 14B2 then uses the previously loaded long, mid and short timers to provide the desired time-delay such as $T_1$. This delay subroutine comprising a counting and timing program loop of instructions is illustrated in detail of FIG. 14W.

Referring now to FIG. 14W, upon entry into the delay subroutine at step 14W1, the four bit contents of the mid-timer is loaded to register X813 of the CPU. The four bit contents of the short timer is then loaded at step 14W2 into the accumulator and decremented. The timer is checked at step 14W3 to determine whether it had previously been 0. If it was not 0, then at step 14W4 at 105 microsecond delay is obtained by causing the CPU 210 to perform some instructions causing the CPU to count cycles for the purpose of gaining the delay. Thereafter, the sequence of operation loops back again to step 14W2. Operation continues to loop through these 14W2 through 14W4 steps until the short timer is decremented to zero. Thus, it will loop through these steps a number of times equal to the number initially loaded into the short timer.

When a 0 is detected in step 14W3, the operation jumps to step 14W6 in which the mid-timer is loaded into the accumulator and decremented. The contents of the mid-timer is then checked at step 14W7 to determine whether it was a 0. If the mid-timer was not 0, a 1.3 millisecond delay is provided by setting the short timer to a 12 state and looping back to step 14W2. This causes the operations to loop through steps 14W2, 14W3, and 14W4 twelve times until the short timer again is decremented to 0.

Thereupon, steps 14W6, 14W7, and 14W8 will again be performed and the entire procedure repeated until the mid-timer was found to be 0 at step 14W7. Upon finding the mid-timer to be 0 at step 14W7, the operation jumps to step 14W10 which sets up a 14.3 millisecond time delay by loading an 11 state into the mid-timer. The previously set long timer is then loaded into the accumulator at step 14W11 and is decremented. Then, at step 14W12, the timer is checked to determine whether it was previously 0. If the long timer was not previously 0, operation loops back to step 14W8 and then to step 14W2 and repeats the previously described loop until operation arrives again at step 14W12 and finds that the long timer was decremented to zero. This will signify that the entire selected time delay such as $T_1$, during which the analog signal was integrated has expired and operation can return to step 14B3 of FIG. 14B.

Returning to FIG. 14B, at step 14B3, the timing loop counters which are going to be used during the time intervals for integrating the reference DC source are cleared. The discrete output of the CPU 210 are disabled and the state of the output 102 of the threshold detector 53 is examined.

If, during the first integrating interval $T_1$ then (See FIG. 12), the output of the integrator 51 becomes opposite in polarity from the initial level $V_0$ along a slope such as $S_D$ to a level such as $V_3$ such output represents a negative raw weight of relatively large magnitude. This might happen if the platter were removed or if an operator lifted up on it. It will immediately cause the output of the threshold detector 53 to switch to its low state. If the comparator is found to be in a low state at step 14B5, then this indicates at step 14B6 that a large negative raw weight was detected and therefore all the discrete outputs of the CPU are enabled and operation jumps to step 14E14 at FIG. 14E and then to step 14M10. This results in skipping of many intermediate operations which check, filter, correct, or otherwise process the raw weight and which would not be meaningful with such negative weight data.

However, if a positive raw weight is found in step 14B5 such as would result from the integration along slope $S_1$ to $V_1$, operation proceeds to step 14B8 which stops the integration of the analog signal by switching transistor 94 to a non-conducting state and begins the first reference source integration, such as time interval $T_2$, by switching the transistor 95 of FIG. 4 to its conducting state.

Steps 14B9 through 14B11 form the interrogation and counting cycle or instruction loop for the integration of the comparator or threshold detector during the $T_2$ integration time of the first reference DC source. During each instruction loop, the output of the threshold detector 53 is periodically interrogated and a counter is incremented each time the output of the comparator has not occurred changed sign. This counting for both the first and second reference DC source integrating intervals $T_2$ and $T_3$ is done in three, four-bit counters, one counter for each of three hexadecimal digits.

While each of these three, four-bit counters could be formed in three, four-bit RAM registers, it is more convenient to form them in the save register 817 forming a part of the CPU 210 illustrated in FIG. 9. The twelve bits of the save register 817 comprise three, four-bit counters referred to as counter 1, counter 2, and counter 3. This is convenient because the Rockwell PPS-4/2 CPU has an instruction, with the mnemonic CYS, which cycles the save register 817 and the accumulator. This convenient instruction provides a four-bit shift of the save register 817 with the four-bits which are shifted off the right end of the save register 817 being transferred to the accumulator and with the contents of the accumulator being transferred into the left end of the save register 817.

As shown in steps 14B9–14B11, the counting begins by setting the carry register 812 of the CPU 210 (FIG. 9) to its 1 state. That carry is added to the contents of counter 1 with the results placed in counter 1. Then any carry generated from counter 1 is added to the contents of counter 2 with the result placed in counter 2. Then any carry produced by counter 2 is added to the contents of counter 3 and the result placed in counter 3.

At step 14B10, the output 102 of the threshold detector is then loaded to the accumulator and examined in step 14B12 to determine if it is yet low, that is whether the $V_o$ level has been crossed. If the comparator is not low, operation then loops back to step 14B9 where it passes again through steps 14B9–14B11. Each pass through this loop requires 65 microseconds using the specific selected CPU instructions. Operation continues to loop through steps 14B9–14B11 until the comparator is found at step 14B11 to have switched to its low state. This indicates that the output of the integrator circuit 51 has crossed its initial voltage level $V_o$.

An additional 65 microsecond delay is then provided at step 14B12 to extend the second integrating time by the interval $T_{2C}$ shown on FIG. 12 and described above. Then, at step 14B13, transistor 95 of FIG. 4 is switched to its non-conducting state to halt the integration of the first reference DC source.

The count contained in the three timing loop counters for the second integrating time interval $T_2$ is then stored in the scratch pad registers 70, 71, and 72 of the RAM memory and the counters (the SA register 817) are cleared for reuse. Then at step 14B15, the third timing interval $T_3$ illustrated in FIG. 12 is begun by switching the transistor 96 of FIG. 3 to its conducting state to apply the second reference DC source to the integrator circuit 51.

Then steps 14B16, 14B17, and 14B18 provide an interrogation and counting cycle or loop of steps 14B9–14B11. While the steps of the $T_3$ counting loop are not identical with the steps of the $T_2$ loops, they require the same overall time of 65 microseconds. During each pass through this $T_3$ cycle, the output 102 of the threshold detector 53 is examined to determine whether it has returned to its high state. So long as it has not, operation continues looping through the $T_3$ interrogating and counting cycle of steps 14B16–14B18. However, whenever in step 14B18 the output 102 has found to have shifted to it high state, then at step 14B19, the transistor 96 (FIG. 4) is turned off to stop the integration of the second reference DC source and the integrator 51 is reset by switching the transistor 97 to its conducting state.

Then, at step 14B20, the contents of counter 1 and counter 2 of the $T_3$ counters is stored in RAM memory register spaces 73 and 74. At step 14B21, the scratch pad memories (i.e., register spaces 01A through 01F) illustrated in FIG. 13 are cleared for subsequent use.

Thus the contents of each four-bit register 70, 71, 72, 73, and 74 now represents a hexadecimal digit of the $T_2$ and $T_3$ count which in turn represent the raw weight of the scale. Next these counts are converted to decimal notation and then finally to raw weight increments. This is begun in step 14B22 by multiplying the contents of register 72 (which has stored in it the most significant hexadecimal of the $T_2$ count) by 256 and moving the result to the weight register 02A through 02F illustrated in FIG. 13. Then, at step 14C1, the weight sign is cleared and the temporary scratch pad register is again cleared. The contents of register 71 (which has stored in it the next most significant hexadecimal of the $T_2$ count) the $T_2$ counter is multiplied in step 14C2 by 16 and the result moved to the arithmetic scratch pad register illustrated in FIG. 13. Then, at step 14C3, the results of these two multiplications are added together with the result being moved to the weight register. Then, at step 14C4 the least significant hexadecimal digit of the $t_2$ count is converted to decimal form and added to the sum in the weight register. At 14C5 the resulting total is placed in the weight register and represents the total count during time interval $T_2$ in decimal digits. The arithmetic scratch pad register is then cleared. While the digits of this decimal number are different from the digits of the hexadecimal number, both numbers represent the same number of counts or cycles obtained during the $T_2$ interval and each count represents 32 raw weight increments.

The decimal conversion of the $T_3$ count then begins at step 14C6 by moving the contents of register 74 (which has stored in it the most significant hexadecimal digit of the $T_3$ count) to the arithmetic register. As stated previously, the reference signal level during time interval $T_3$ is 1/32 the reference signal level which is integrated during time interval $T_2$ and therefore each count during time interval $T_2$ represents 32 times as much analog weight signal (i.e., 32 raw weight increments) as does each $T_3$ count. In order to eliminate the effect of the additional 65 microsecond delay provided at step 14B12 during time interval $T_2$, (one additional $T_2$ count) 32 counts are subtracted from the $T_3$ count in step 14C6.

Conversion of the $T_3$ count to decimal form then proceeds at step 14C7 by multiplying the result of the subtraction in step 14C6 by 16 and moving the result to the temporary scratch pad register (FIG. 13). The arithmetic register is also cleared and in step 14C8 the low digit of the $T_3$ count is moved from register 74 (FIG. 13) to the arithmetic register and converted to decimal form. The result of the multiplication in step 14C7 which is stored in the temporary scratch pad register and the result of the decimal conversion of step 14C8 which is stored in the arithmetic register are then added together in step 14C8 to represent the total counts (raw weight increments) during time interval $T_3$ reduced by 32 counts to compensate for the 65 microsecond delay as described above.

Because each $T_2$ count represents 32 times as much analog weight signal amplitude as each $T_3$ count, at step 14C9 the total of the $T_2$ counts is multiplied by 32 and the result is moved to the weight register. Then, at step 14C10 the $T_3$ count is subtracted from the $T_2$ count in order to provide the net number of raw weight increments. This final number of raw weight increments, which is proportional to the sum of the weight on the scale platter and the analog offset, is then moved in step 14C11 to the weight register and is referred to as the raw weight.

Process Weight

In the process weight operation VII, the presence or absence of platter motion if first detected and noted, the digital weight data resulting from step 14C11 is then filtered or updated, the appropriate initial analog offset is digitally subtracted and finally the "x10 EXPAND" operations are performed if that mode is selected.

The detection of motion begins at step 14C12 with the subtraction of the filtered weight, which represents a previously detected and processed weight which was stored in the filtered weight register during a previous pass through an operation sequence cycle. It is subtracted from the most recently detected raw weight resulting from step 14C11. The sign of the result of this subtraction is moved to the arithmetic sign register 019 in step 14C13.

In step 14C14, a determination is made whether the result of the above subtraction is less than or equal to five raw weight increments. If this result is less than or equal to five raw weight increments, then this is accepted as one detection of a no motion condition and operation goes to step 14C17 wherein a fifteen is loaded into the accumulator and then added to the motion flag to decrement the motion flag. It will be recalled that the motion flag is a three state flag which required two detections of no motion prior to concluding that no platter motion exists. Consequently, at step 14C18 the motion flag is examined to determine whether it had decremented to zero. If the motion flage had already been zero, then no motion existed for the last two passes through the operational sequence cycle and consequently operation proceeds to step 14C22. However, if the flag was not already zero, then operation advances to step 14C19.

If at step 14C14 the result of the subtraction was found to be greater than 5 counts, then a motion condition exists so in step 14C15 a two is loaded into the accumulator for purposes of subsequently setting the motion flag to its two state and operation proceeds to step 14C19.

At step 14C19 the motion flag is updated with either the 2 from step 14C15 or its decremented state from step 14C17. Then, at step 14C20 the output filter counter is set to its three state to indicate that new weight data has been detected. The recompute flage is also set to indicate that new price computations must be made subsequently and operation advances top step 14D5.

However, if at step 14C18 the motion flag was found to have been zero, so that a no motion condition was found to exist, then the initial raw weight filtering operation will occur at step 14C22. The purpose of raw weight filtering is to eliminate the effects of noise and random data shifts. In step 14C22 the least significant digit of the most recently detected raw weight from step 14C11 is written into RAM register 035. The least significant digit of the previously detected weight count is written into RAM register 034. Then, using the most recently detected raw weight and the two previous raw weights, a determination is made at step 14D1 whether the least significant digit of the second previous detected raw weight is equal to the least significant digit of the first previous raw weight. If these are not equal then the filtering operations must be performed beginning in step 14D3. If, however, at step 14D1 these digits are found to be equal, then at step 14D2 a determination is made whether the least significant digit of the first previous raw weight is equal to the least significant digit of the most recently detected raw weight. If these are not equal, then filtering must be performed beginning at step 14D3. However, if the least significant digits are found to be equal in both steps 14D1 and 14D2, filtering may be skipped and operation jumps to step 14D5.

The filtering operation which begins at step 14D3 consists essentially of forming a new filtered weight by adjusting the most recently detected weight toward the previously detected and modified weight which is stored in the filtered weight register (FIG. 13). The most recently detected raw weight is adjusted toward the previously filtered weight by one count more than one half the difference between the previously filtered raw weight and the most recently detected weight. Therefore, in step 14D3 the least significant digit of the difference between the most recently detected weight and the previous filtered weight is interger divided by 2 and then added to 1.

If in step 14D3A this difference divided by 2 is found to be 0 (i.e., if the difference was 0 or 1, then the filtered raw weight is written into the weight register (FIG. 13).

However, if the difference is not 0 or 1 then at step 14D4 the most recently detected raw weight is adjusted toward the previously filtered weight by 1 count more than ½ the least significant digit of the above difference. This is then treated as a new filtered raw weight and is first moved to the weight register. Then, in step 14D5 this weight is moved to the filtered weight register to provide an updated filtered raw weight for subsequent use.

It was previously described that potentiometer 76 is adjusted to provide a fixed analog offset under no weight conditions. Therefore, this initial offset must be removed from the detected raw weight data. This is done in steps 14D6 through 14D14. However, because a different analog signal integrating time interval is used for different scale capacities and the load cell output voltage is interpreted differently for different capacities, a different number must be subtracted from the raw weight for each scale capacity.

Therefore, in step 14D6 the find scale capacity subroutine of FIG. 14V is performed which returns the data described above. The returned data is used to set the arithmetic scratch pad register to 003700 if the 6 Kg scale capacity is selected, to 001600 if the 15 kilogram scale capacity is selected, and to 001700 if the 30 pound scale capacity is selected.

After the arithmetic scratch pad register is set to one of these three numbers, which is the analog offset expressed in raw weight increments for the particular scale capacity selected, then in step 14D14 the chosen number of raw weight increments is subtracted from the raw weight and the result is moved to the weight register.

In step 14D15 a check is made to determine whether the "x10EXPAND" mode has been selected. If it is not, which is the usual situation except when servicing, etc., operation jumps to step 14E3.

However, if the "x10 EXPAND" mode has been selected, a determination is made at step 14D16 whether the raw weight is less than or equal to 2 raw weight increments. If it is, operation proceeds to step 14D17 in which an 8 is loaded into the accumulator for subsequent use in turning on the zero lamp to indicate that the scale is zeroed. If, however, the weight is found to be greater than 2 raw weight increments, then operation proceeds to step 14D19 in which a 0 is loaded into the accumulator for subsequently turning off the zero lamp to indicate that the scale is not zeroed.

After steps 14D17 or 14D19, operation proceeds to step 14D20 in which the 0 or 8 from the accumulator is loaded into the zero lamp register 021 (FIG. 13) for later use in control of the zero lamp. Also flag 2, 825, of the CPU 210 illustrated in FIG. 9 is set to note that the "x10 EXPAND" mode has been selected. This flag is used in step 14D21 which is the subroutine for updating the output weight.

In the Update Output Operation XVII of step 14D21, the five most or five least significant digits of data in the weight register (FIG. 13) are moved to the output weight register (FIG. 13) unless a negative weight is found or the 300 printer enable mode 10 is selected. If either of these two latter conditions exist, operation jumps to the weight blanking sequence of operations beginning at step 14E14.

Referring in detail to the Update Output Weight operation in FIG. 14X, at step 14X1, the computer is set up to check the five most significant digits of the weight register for all zeroes and flag 1 of the CPU 210 is set. Then, in step 14X2 flag 2 of the CPU 210 is checked to determine whether it is set to indicate the normal mode of operation or whether it is reset to note the "x10 EXPAND" mode of operation. If flag 2 is found to be reset, then in step 14X3, the previous step 14X1 set up is changed to set up to check all 6 weight register digits as is appropriate for the "x10 EXPAND" mode. Otherwise, if flag 2 is found to be set in step 14X2, operation proceeds directly to step 14X4.

In step 14X4, the digits are checked to determine if they are all zero. If all digits are found to be zero, then in step 14X5 flag 1 of the CPU 210 is reset to note that the weight is zero. If, however, the digits are not all zero, then operation proceeds directly to step 14X6.

Then, in step 14X6, the weight register sign data is decremented to 15 if it is a plus and to 14 if it is a minus. Additionally, the carry is set if it is a minus. In step 14X7, the registers are set up to address the most significant digit of the 5 digit weight for the normal mode of operation. Then in step 14X8 flag 2 is interrogated to determine whether it is set to indicate a normal mode of operation. If it is set, operation jumps directly to step 14X10. However, if flag 2 is not set, then the "x10 EXPAND" mode is selected and the next lower significant digit is addressed for the "x10 EXPAND" mode.

In step 14X10, the weight is interrogated to determine if it is 0. If the weight is not 0 then a 15 is loaded into the appropriate digit position so that the negative sign is not displayed for a zero weight. If, however, a non-zero weight is detected at step 14X10, then operation proceeds to step 14X12.

In step 14X12 the proper sign is placed in the proper position and in step 14X13 the removed weight digit is examined to determine whether it is zero. If it is zero, the operation jumps to step 14X17. If it was not zero, the digit is returned to the proper position in step 14X14 and the sign is forgotten. Then in step 14X15, the weight sign is examined. If the weight sign was minus, operation loops back to the blank weight step 14E14. If, however, the sign was not minus, then RAM register 040 is interrogated in step 14X16 to determine whether the Toledo Scale 300 printer is enabled. If the 300 printer is enabled, then operation loops back to the blank weight step 14E14 because the 300 printer cannot accommodate the required number of significant digits. if the 300 printer is found in step 14X16 not to be enabled or if the exchanged digit examined in step 14X13 is found to be zero, then operation advances to step 14X17.

In step 14X17, the registers are set up to move the five most significant digits of weight to the output weight register. Then, in step 14X18 flag 2 is checked to see if it is set so that operation is in the normal mode. If flag 2 is set, operation advances to step 14X20 and the output weight register is updated with the 5 most significant digits of the weight register.

If, however, flag 2 is not set, thereby indicating that the "x10 EXPAND" mode has been selected, then operation advances to step 14X19 which sets up the registers to write the 5 least significant digits of weight into the output weight register at step 14X19. Then, in step 14X20 the output weight register has the selected five significant digits of the weight register written into it. After step 14X20 operation returns to the next step after it was called.

Returning therefore to FIG. 14D, after the output weight register is updated, the price and total price registers are blanked in step 14D22 because they are not used in the "x10 EXPAND" mode. Operation then proceeds to step 14E1 in which the tare register and the auto-zero register are cleared. Operation then jumps to the output operation XX1 at step 14M19 because the intermediate steps are not significant in the "x10 EXPAND" mode.

Manual Zero Capture

In the usual situation, where the "x10 EXPAND" mode is found at step 14D15 to not have been selected, operation advances to the manual zero capture operation VIII at step 14E3.

In the manual zero capture operation VIII, a series of checks are first made to determine whether the scale should be zeroed. If the scale should be zeroed, the raw weight in the weight register is written into the auto zero register (FIG. 13). The data in the auto zero register is then subtracted from the detected weight to provide a corrected raw weight and a check for overcapacity is made.

Considering the manual zero capture check operation VIII in greater detail, the RAM memory is checked at step 14E3 to determine whether the "Z" key was pressed. If the "Z" key was not pressed, then the zeroing operation is skipped and operation jumps to step 14E10 because manual zeroing is not desired where not initiated by depression of the "Z" key.

If, however, the "Z" key is found in step 14E3 to have been depressed, then operation proceeds to step 14E4 to check the net flag to determine whether the system is in the net mode. If the system is already in the net mode then gross zeroing is not appropriate and operation jumps to step 14E10. However, if the system is found not to be in the net mode, then at step 14E5 the motion flag is checked to determine whether motion exists. If motion exists, then the weight data detected during such motion should not be used for zeroing purposes and operation similarly jumps to step 14E10. However, if the motion flag has not been set then at step 14E6 a two is added to the zero key timer and it is checked in step 14E7 to determine whether it is zero. If the zero key timer is found not to have advanced to zero, then the "Z" key has not been depressed sufficiently long to permit zeroing of the weighing scale so that operation jumps to step 14E11.

However, if at step 14E7 the zero key timer has gone to zero, then at step 14E8 a check is made whether the weight count is less than 400 raw weight increments. If the weight count is greater than 400 raw weight increments, a significant weight must exist upon the platter and consequently zeroing would be undesirable and operation jumps to step 14E11. However, if the weight is less than 400 raw weight increments, operation proceeds to step 14E9 in which the detected weight data is moved into the auto zero register and the zero done flag is set to indicate that the scale is zeroed. At step 14E10, the zero key timer is cleared.

When operation proceeds to step 14E11, the data in the auto-zero register is subtracted from data in the weight register. The data in the auto-zero register represents the correction factor used to zero the weighing scale. Consequently, when subtracted from weight data the result represents the accurate, zeroed weight upon the weighing scale platter.

Then, at step 14E12 this zeroed weight is subtracted from 030050, which represent a weight which is 50 raw weight increments beyond the scale capacity to determine whether the scale is reading a weight beyond its maximum capacity.

A check is then made in step 14E13 to determine whether the result of this subtraction is positive. If it is negative, this indicates that the scale is not beyond its capacity and consequently operation proceeds to the gross auto zero correction operation IX at step 14E16.

However, if the result of the subtraction is positive, the scale is overcapacity and operation advances to step 14E14 wherein the output weight is blanked. From step 14E14 operation advances to step 14E14 wherein the output weight is blanked. From step 14E14 operation then jumps to step 14M10 for blanking the total price and continuing the operation.

Gross Auto Zero Correction

Although the weighing scale of the present invention may be manually zeroed as provided in operation VIII the zero will still be subject to some drift or wandering. It is therefore desirable to automatically track these changes in order to maintain an accurate correction factor in the auto zero register.

In the gross auto zero correction operation IX, the corrected weight from step 14E11 is examined to determine whether the scale is within an auto zero correction band of ±4 raw weight increments within which the gross zero will be automatically tracked or corrected. If the raw weight is within the auto zero correction band, the zero increment flag is set. If the total auto zero correction factor will less than 400 raw weight increments and the corrected raw weight is not already exactly zero, then the auto zero correction factor is corrected by one raw weight increment.

Examining the gross auto zero correction operation IX in detail, the raw weight from step 14E11 is examined in step 14E16 to determine whether it is less than or equal to 4 raw weight increments. If the raw weight is found to be less than or equal to 4 raw weight increments then the scale is within the auto zero increment and operation proceeds to step 14E19. In step 14E19, a 15 is loaded into the accumulator in order to subsequently set the zero increment flag to note that the scale is within the auto zero increment.

If in step 14E16, the corrected raw weight from step 14E11 is found to be greater than 4 raw weight increments then in step 14E17, a 0 is loaded into the accumulator for subsequent clearing of the zero increment flag to note that the scale is not within the auto zero increment.

Then, in step 14E20, the number previously loaded into the accumulator is written into the zero increment flag and flag 1 of CPU 210 is set to note the gross weighing mode.

At step 14E21, the corrected raw weight is again examined to determine whether it is either outside the auto zero correction band or equal to zero because in either situation correction of the auto zero register will be skipped. Therefore, if at step 14E21 the raw weight is found to be greater than 4 counts or equal to 0, operation jumps to step 14F1. If, however, the raw weight is within the gross auto zero correction band but is not equal to zero, operation proceeds to step 14E22 which is the "Correct Auto Zero" operation XXVIII beginning at step 14Y1 of FIG. 14Y.

Referring now to FIG. 14Y, at steps 14Y1 and 14Y2, the arithmetic scratch pad register is cleared and a factor of one is written into its least significant digit. The weight sign is loaded to the accumulator and complemented and then is written into the arithmetic scratch pad sign register. Then the auto zero register is addressed.

In step 14Y3, flag 1 is interrogated to determine whether it is set to note the gross mode or reset to note the net mode since the Correct Auto Zero Operation XXVIII is used for gross auto zero correction as well as net zero tracking. Therefore, if flag 1 is found in step 14Y3 to be set, operation jumps to step 14Y5 for the gross auto zero correction while, if the flag 1 is found in step 14Y3 to be reset, then operation advances to step 14Y4 in which the address is changed to the tare register which is corrected in net zero tracking.

In step 14Y5 the 1 which was prevously loaded in the arithmetic scratch pad register is algebraically added to either the auto zero register or the tare register depending upon which is addressed as a result of steps 14Y2, 14Y3 and 14Y4. The result of this correction is written into the RAM result registers 005 through 00F.

Then, in step 14Y6 flag 1 is again interrogated to determine whether the scale is in the gross mode. If it is not in the gross mode, operation returns to the calling operation. However, if the scale is in the gross mode operation proceeds to step 14Y9 in which the corrected result is examined to determine whether it is less than 400 raw weight increments If the resulting gross auto zero correction factor is less than 400 raw weight increments, then at step 14Y10 the auto zero register is updated with the corrected auto zero factor from the result register. However, if the result is equal to or greater than 400 raw weight increments then no further auto zero tracking is permitted. This prevents the zero increment from being more than 400 raw weight increments from the factory determined zero. Operation then returns to the step after the calling operation leaving the auto zero register with its previous contents.

Multiply Raw Weight By Proper Factor

Referring to FIG. 14F, up until this point in the sequence of operations, the weight is represented in raw weight increments regardless of the scale capacity which has been selected with 30,000 raw weight increments representing full scale capacity.

In this operation X, the raw weight is multiplied by the proper integral factor to convert the raw weight digits to digits representing the selected and conventional units of weight.

At step 14F1 with the find scale capacity subroutine operation XXV is performed and will return to the accumulator a 5 if the 15 kilogram scale is selected, 1 if the 30 lb. scale is selected and 2 if the 6 kilogram scale is selected. Thus, in step 14F2 the returned multiplier is written into the arithmetic scratch pad register and in step 14F3 it is multiplied by the raw weight with the result being moved to the weight register. Therefore, after step 14F3, the digits in the weight register represent the decimal digits of the detected weight.

In step 14FA, the most significant digit of the price register is examined to determine whether it is greater than or equal to 8. This interrogation of the most significant digit of the price register is necessary because, if the verify key was depressed elsewhere in the sequence of the operation, that will cause all 8's to be loaded into the price digits. Therefore, if an 8 or 9 is found in the most significant price digit, operation will proceed to step 14F5 to clear the price register, factor flag and digit timer and to clear the total price if the weight is positive and to blank the total price if the weight is negative.

However, if the verify key was not depressed and consequently an 8 or 9 is not found in the most significant price digit, operation jumps from step 14F4 to step 14F6. It might be noted that a result of steps 14F4 and 14F5 is that the operator will not be permitted to input an 8 or 9 to the most significant price digit and get meaningful results. However, this presents no problem because such large prices are not encountered in the usual operation of the weighing scale.

Manual Tare

The manual tare operation XI permits the operator to place a tare object on the scale platter and have the tare weight written into memory. In this operation, a series of checks are performed and if conditions are proper, the weight is written into the tare weight register, some flags are conditioned and some registers are then cleared.

At step 14F6, the zero done flag is interrogated to see whether the weighing scale was previously zeroed. If it was not, then the tare operation and the net mode of operation are not permitted so that operation will jump to step 14F22.

However, if the scale was zeroed, the state of the manual tare flag is written into the accumulator and the manual tare flag register is itself cleared in step 14F7. In step 14F8 the manual tare flag is examined to determine whether it is set. If it is not set this indicates that the tare key was not depressed and detected during the read keyboard operation XXIII and therefore operation jumps from step 14F8 to step 14G1, skipping the manual tare operation.

If, however, the manual tare flag is set then in step 14F9 the motion flag is interrogated to determine whether there is motion. If the motion flag is found to be set so that motion exists, then erroneous tare weight data would be on the scale. Therefore, operation jumps from step 14F9 to step 14G1.

However, if no motion is detected, then in step 14F10 the most significant digit of the weight register is examined to see if it contains a zero. If it does not, operation must jump to step 14G1 and the manual tare operation skipped because the most significant weight digit will be used to display a negative sign in the net mode of operation.

If the most significant digit of the weight register is found to be zero, operation proceeds to step F11, in which the zero increment flag is examined to determine whether the scale is within the auto zero correction band. If the scale was within the auto zero correction band, operation proceeds to step 14F13, but if it is not then the weight sign is examined to determine whether it is minus. if the weight sign is not minus, operation continues to step 14F13. However, if the weight sign is found to be minus, operation jumps to step 14G1.

In step 14F13 preparations are made for moving the weight to the tare register. The zero increment flag is then examined in step 14F14 to again determine whether the scale is within the auto zero correction band. If it is not, operation proceeds the step 14F16 at which the weight data in the weight register is moved to the tare register to store it as the tare weight.

If at step 14F14, the scale is found to be within the auto zero correction band, then at step 14F15 the register is cleared so that in step 14F16 all zeroes will be moved into the tare register. Steps 14F14, 14F15, and 14F16 permit the entry of a zero tare weight in order to permit the operator to intentionally override or satisfy the tare mandatory mode if that mode was selected at the factory. It also assures that zeroes will be displayed whenever the weighing scale is within the auto zero correction band even though it is not at absolute zero.

Operation then proceeds to step 14F17 in which the zero increment flag is again examined to determine whether the weighing scale is within the auto zero correction band. If is is not, an 8 is loaded in step 14F18 into the accumulator for subsequent use to set the net flag and thereby indicate that the weighing scale is in the net mode. If, however, the weighing scale is found in step 14F17 to not be in the auto zero correction band, then operation jumps to step 14F20 in which zeroes are loaded into the accumulator for subsequent use to clear the net flag and thereby indicate that the weighing scale is in the gross weighing mode.

Then at step 14F21, the contents of the accumulator from either step 14F18 or 14F19 is written into the net flag, the tare done flag is set to indicate that the tare operation has been completed and the recompute flag is set to indicate that a new price must be computed upon entry into the compute total price operation XX. Then, in step 22 the price register, factor flag and the digit timer are all cleared. The total price is cleared if the weight is plus and is blanked if the weight is minus.

Subtract Tare

Operation then proceeds to step 14G1 at which the tare weight is subtracted from the weight and the resulting net weight is written into the weight register.

Net Auto Zero Correction

As explained above, the exemplary embodiment tracks changes in the net zero by modifying the tare register data to correct for such changes. This is done in steps 14G2 through 14G15.

In step 14G2 the weight in the weight register is examined to determine whether it is zero. If the weight is zero then no net auto zero correction is needed and operation jumps to the auto clear operation XIV at step 14F16. If, however, the weight is not zero, then the net flag is interrogated to determine whether it is set. If it is not set indicating that the weighing scale is in the gross weighing mode, then the net auto zero correction is skipped and operation jumps to step 14G16. If, however, the net flag is set, then operation proceeds to the find scale capacity operation at step 14G4.

Because the weight data in the weight register is no longer in raw weight increments but has been converted to weight units appropriate for the selected scale capacity, the band for the net zero correction will be different for the different scale capacities.

Therefore, in steps 14G5 through 14G11, the data returned by step 14G4 will set the arithmetic scratch pad register to 000009 if the 6Kg scale capacity is selected, to 00025 if the 15Kg scale capacity is selected and to 000005 if the 30 pound scale capacity is selected.

Then, at step 14G12 the number written into the arithmetic scratch pad register is subtracted from the weight and flag 1 of the CPU 210 is reset to note the net mode. Then in step 14G13, the result of the above subtraction is checked to determine whether it is positive. If the result is positive, then the weight is above the net zero correction band and operation proceeds to step 14G16 without any correction. If, however, the result of the subtraction of step 14G12 is found in step 14G13 to be negative, then the tare register is corrected in step 14G14 as previously described by the correct auto zero operation XXVIII, with the result of the correction being written into the tare register in step 14G15.

Auto Clear

In the auto clear operation the tare and price registers are to be automatically cleared after an object has been weighed if that mode is selected. They are cleared if the scale rises above ten scale increments, remains for a sufficient length of time above the ten scale increments and then falls below the ten increments.

The auto clear operation XIV begins at step 14G16 with the find scale capacity operation. The multiplier digit which is returned to the accumulator is then written into the third least significant digit of the arithmetic scratch pad register in step 14G17. The number written into the scratch pad register at step 14G17 represents 100 raw weight increments for the selected scale capacity. That number is then subtracted at step 14G18 from the weight and the result is examined at step 14G19. If this result is plus, this indicates that the scale is still weighing a weight above the 100 raw weight increments and that therefore the price and tare registers should not yet be clear. Therefore, operation will jump to step 14H4.

However, if at step 14G19 the result is found to be negative, then the weight is below 10 scale increments and the auto clear flag is cleared at step 14G20. Then in step 14G21, the state of the auto clear flag prior to clearing in step 14G20 is examined to determine whether it was equal to 6. If the auto clear flag was equal to 6, this indicates that the weight previously had been above 100 raw weight increments for a sufficient length of time that the tare and price registers should now be cleared and operation will advance to step 14G22. If, however, the auto clear flag had not advanced to a 6, then the weight was not above 100 raw weight increments for a sufficient length of time and clearing of these registers should not be done. Therefore, operation will jump to step 14H6.

At step 14G22, a determination is made whether a "prepack" or "by count" mode is selected. If a "prepack" or "by count" mode is selected, then auto clear will be skipped because any price and tare data in the price and tare registers will be used in subsequent weighing operations. However, if in step 14G22 neither the "prepack" or "by count" mode is selected, operation advances to step 14H1 in which memory register 053 is examined to determine whether the auto clear mode was selected. If the auto clear mode was not selected, operation jumps to step 14H6 and automatic clearing is skipped. If however, auto clear is enabled, then operation advances to step 14H2 and the tare register, the price register, the factor flag and the digit timer are cleared. The total price is cleared if the weight is positive and blanked if the weight is negative. After step 14H2, operation advances to step 14H6.

If in step 14G19, the result of the previous subtraction indicated that the weight was still above the 100 raw weight increments, then operation advances to step 14H4 in which the auto clear flag is interrogated.

If the auto clear flag is found to have advanced to its "six" state, this indicates that the weight has been above 100 raw increments sufficiently long to permit automatic clearing whenever the scale weight falls below the 100 raw weight increments. Therefore, nothing is done to the auto clear flag and operation advances to step 14H6. If, however, the auto clear flag has not advanced to its "six" state, then in step 14H5 the auto clear flag is incremented.

Zero Lamp

In the Zero lamp operations of steps 14H6 through 14H20, a check is made to determine whether the weight data is within a small range of zero referred to as the zero increment range. If it is found to be within this range on two successive checks it is considered to be in this range and the zero lamp is turned on.

In operation 14H6, the find scale capacity operation XXV is performed, and in operations 14H7 through 14H13, the data returned by step 14H6 is used to set the arithmetic scratch pad register to a 5 if the 6 kilogram scale is selected, a 14 if the 15 kilogram is selected and a 3 if the 30 lb. scale is selected. Then, in step 14H14 the number set in the arithmetic scratch pad register is subtracted from the weight and the result is examined in step H15 to determine whether it is plus. If the result is plus, the weight is above the zero increment range. Therefore, in step 14H16, a 2 is loaded to the accumulator for subsequent use in setting the zero lamp flag so that the zero lamp will be turned off. Operation then jumps to step 14H20.

If in step 14H15 the result of the subtraction of step 14H14 is found to be negative then the scale is within the zero increment range. However, since it must be within the zero increment range on two successive checks before the zero lamp is to be turned on, operation advances to step 14H18 in which the zero lamp flag (which has three states) is written into the accumulator and decremented. Then in step 14H19 the flag is examined to determine if it was zero. It it was not zero, operation advances to step 14H20 in which either the decremented state of the zero lamp flag from step 14H18 or the set state from step 14H16 is written into the zero lamp flag register. If it was zero, then the zero state in the zero lamp flag register continues so that the zero lamp remains on.

Round Off

All the above operations involving weight data have been done with six significant digits of weight data. In the round off operation XVI, the weight data is rounded off to fewer significant digits.

Consequently, at step 14H21 the find scale capacity operation XXV is performed and its results examined to determine which scale is selected. If the 6 kilogram scale is selected operation jumps to step 14I4. If, however, the 6 kilogram scale is not selected operation advances to step 14I1 in which the 6 digit weight in the weight register is rounded off to 5 significant digits and the 6th digit is cleared.

Then, at step 14I2, the data returned at step 14H21 is examined to determine whether the 30 lb. scale has been selected. If it has been selected, no further round off is required and operation jumps to step 14I14 at the beginning of the output filter operation XVII.

However, if the 30 lb. scale is not selected then the 15 kilogram scale must be selected and operation jumps to step 14I7 for rounding off by 5. At step 14I7 the 5th least significant digit of the weight is examined and if it is less than 3, operation jumps to step 14I11 in which a zero is loaded in the accumulator. If, however, the 5th least significant digit is not less than 3, then it is examined at step 14I8 and if it is not less than 8, operation jumps to step 14I11 in which a zero is loaded into the accumulator. However, if it is less than 8, a 5 is loaded into the accumulator at step 14I9 and operation advances to step 14I12.

If the 6 kilogram scale was found in step 14H22 to have been selected then in step 14I4 the least significant digit of the five digit weight is examined. If it is odd, the carry register of the CPU 210 is set and operation jumps to step 14I13. If, however, in step 14I4 the least significant digit of the 5 digit weight is found to be even, then operation jumps directly to step 14I13.

In step 14I12 whatever is loaded into the accumulator in step 14I9 or 14I11 is written into the 5th least significant weight digit register. Then at step 14I13 the carry register is added to the 4th least significant digit of the weight register with the result being written into the weight register.

Output Filter

In the output filter operation XVII, the most recently detected weight is compared to the weight currently being displayed to determine if it is different enough from the displayed weight to justify an update of the displayed weight. If a sufficient difference occurs 3 times in succession, such an update will be made.

Therefore, in step 14I14 the output weight is moved from the output weight register to the arithmetic scratch pad register along with its sign. This output weight is then subtracted from the weight in the weight register in step 14I15. Then in step 14I16, the motion flag is examined. If the motion flag is set, operation jumps to step 14I22. If the motion flag is not set then at step 14I17 the find scale capacity operation XXV is performed. Then, at step 14I19, a determination is made whether the result of the subtraction in step 14I15 is less than or equal to the number returned by step 14I17 which represents 10 raw weight increments for the selected scale capacity.

If the result of the subtraction is not less than or equal to the returned digit, then operation jumps to step 14I22. However, if the result is less than or equal to the returned digit then in step 14I20 the result is examined to see if it is zero. If it is found to be zero, then there is no difference between the recently detected weight and the output weight and updating is unnecessary and consequently operation jumps to step 14J4. However, if the result is not zero, the filter counter is examined to determine if it is less than 3. If it is not less than 3, then it has not timed out and a difference has not been observed a sufficient number of times to require updating of the output weight. Therefore, if the output filter counter is less than 3, operation jumps to step 14J6 where the output filter counter is loaded into the accumulator and incremented. If, however, the output filter counter is found to not be less than 3, operation advances to step 14I22.

In steps 14I22 flag 2 of the CPU 210 is set to note that the 5 most significant digits of weight data will be subsequently used. Operation then advances to step 14J1. At step 14J1, the memory is checked to determine whether the "by count" mode is selected. If it is, no updating of the output weight display data is appropriate and therefore operation jumps to step 14J4. If, however, it is not in the "by count" mode, then operation advances to step 14J2 which is the update output weight subroutine operation XXVII illustrated in FIG. 14X and described above. After the output weight is updated, then in step 14J3 the recompute flag is set and the print flag is cleared. In step 14J4 the output filter counter is cleared and operation jumps to step 14J7.

In step 14J7, the output filter counter is updated with either the incremented filter counter from step 14J6 or the cleared filter counter from step 14J4.

Load Lamps for Output

In this operation the various lamp status flag registers are checked and their status used to update the lamp status registers 020 through 026 for use in controlling the front and back indicator lamp displays.

In step 14J8, the motion flag is examined. If the motion flag is set then motion exists and a zero is loaded into the accumulator and used in step 14J9 to update the LB/KG lamp register so that the LB/KG lamp subsequently will be turned off during the motion condition. If, however, the motion flag is not set, then an 8 will be loaded to the accumulator for subsequent use in step 14J9 for updating the LB/KG lamp register so that the LB/KG lamp subsequently will be turned on.

In step 14J10, the zero lamp flag is examined. If the zero lamp flag is found to be 0, then an 8 is loaded to the accumulator for use in step 14J11 to update the zero lamp register to subsequently turn on the zero lamp indicating that the weighing scale is zeroed. If, however, the zero lamp is not zero, then a zero is loaded into the accumulator for use in step 14J11 to update the zero lamp register and subsequently turn off the zero lamp.

In step 14J12, the net lamp register is updated with the state of the net flag.

In step 14J13, the second bit of the factor flag is examined. If it is set, then an 8 is loaded into the accumulator for use in step 14J14 to update the per ½ lamp register. However, if it is not set, then a 0 is loaded into the accumulator for use in step 14J14 to update the per ½ lamp register so that the per ½ lamp will be turned off.

In step 14J14, the 4th bit of the factor flag is examined. If it is set, an 8 is loaded into the accumulator for use in step 14J15 in updating the per ¼ lamp register so that the per ¼ lamp will be turned on. However, if the 4th bit of the factor flag is not set, then a 0 is loaded into the accumulator for use in step 14J15 in updating the ¼ lamp register so that the per ¼ lamp will be off.

In step 14J16, RAM register 045 is interrogated to determine whether the UK scale has been selected. If it has been selected, then operation jumps to step 14J20. If the UK scale has not been selected, then a determination is made in step 14J17 whether the "prepack" or "by count" mode has been selected. If the "prepack" or "by count" mode has been selected, an 8 is loaded into the accumulator for use in step 14J18 in updating the prepack lamp registers. If, however, the "prepack" or "by count" mode is not selected, a 0 is loaded into the accumulator for use in updating the prepack lamp registers in step 14J18 so that the legend will not be backlighted.

Interlock Check

In the interlock check operation, various conditions are checked to determine whether operation should proceed to the computation of a total price in operation or should skip that operation and jump to the next.

In step 14J20, the "by count" mode is checked. If the "by count" mode has been selected, then operation advances to step 14K1 in which the output weight is blanked as is appropriate for the "by count" mode and then operation jumps to step 14K6 skipping the check to determine whether tare has been done. If it has not been selected, operation proceeds to step 14K3 to determine whether tare has been done.

At step 14K3, a determination is made whether tare has been done. If tare has been done, operation jumps to step 14K9 to determine whether the recompute flag is set. However, if tare has not been done, then in step 14K4 a determination is made whether tare is mandatory. If tare is not mandatory, then operation advances to step 14K9. However, if tare was not done and tare is mandatory, then a price should not yet be computed so operation advances to step 14K5 which clears any total price if the weight is positive and blanks total price if the weight is negative.

Operation then continues to step 14K6 in which the contents of the recompute flag register is written into the accumulator and the recompute flag register is cleared. Then in step 14K7 the condition of the recompute flag as written into the accumulator is checked. If the recompute flag was set, operation skips to step 14M11 and if the recompute flag was not set then operation skips further to step 14N15.

However, if the tare was done or was not mandatory, then in step 14K9, the recompute flag is similarly written into the accumulator and the recompute flag register is cleared. In step 14K10, the condition of the recompute flag as written into the accumulator is examined. If the recompute flag is set so that a new computation of a total price is called for, operation advances to the compute total price operation beginning FIG. 14K. However, if the recompute flag was not set, then the currently exhibited price, weight and total price data do not need modification. Therefore, both the compute total price operation XX and that portion of the output operation XXI which outputs new weight, price and total price data may be skipped. Operation therefore jumps to step 14N15.

Compute Total Price

In the Compute Total Price Operation XX, the presence of a factor is checked and if one has been input, the price is multiplied by the factor. This product is checked for overprice and if not overpriced a check is made whether pricing per unit is mandatory. Then if the weight is positive it is multiplied by the price and the resulting total value is rounded off, checked for overvalue and if not overvalue is stored in the total price register (FIG. 13).

The computation of the total price begins in step 14K11 with the clearing of the arithmetic and temporary scratch pad registers and the setting of flag 2 to assume that the weight is to be multiplied by a factor. Then, in step 14K12 a determination is made whether the price is to be multiplied by a factor of 2 or 4. If the weight is not to be multiplied by a factor, operation proceeds to step 14K13 in which flag 2 is reset to note that the detected weight is to be multiplied directly by price without first requiring that the price be multiplied by a factor. Operation then jumps to step 14L10. However, if the price must first be multiplied by 4 or 2, operation proceeds to step 14K15 in which the price is multiplied by the appropriate factor.

The result of this multiplication will be 11 digits long. If 5 digit pricing is used, then the 6 most significant digits of the result must all be zeroes and if 4 digit pricing is used, then the 7 most significant digits of the price must be zeroes.

Therefore, in step 14K16, a determination is made whether 5 digit pricing has been selected. If it has, the 6 most significant digits of the result are checked in step 14K17 for any non-zero digit. However, if 5 digit pricing is not selected, then in step 14K19 the 7 most significant digits of the result are checked for any non-zero digit.

Since the presence of a non-zero digit in the check of steps 14K17 or 14K19 will indicate that the price constraints have been exceeded, in step 14K20 the results of these checks are examined to determine whether the multiplication has produced an overprice. If the result is overpriced, operation advances to step 14L1 in which the price register, factor flag and digit timer are cleared. The total price is cleared if the weight is positive and blanked if the weight is negative. Thereafter, operation jumps to step 14M19.

However, if there is not an overprice, operation advances from step 14K20 to step 14L3. In this step, a determination is made whether the mandatory pricing per unit mode is selected. If it is not, operation advances to step 14L8 in which the address registers are set up to move the result of the price times factor multiplication to the weight register. Therefore, with the mandatory pricing per unit not selected, the result of the price times factor multiplication will, in step 14L9, be moved into the weight register.

However, if price by unit is found in step L3 to have been selected, then in step 14L4 flag 2 of the CPU 210 is set to note that the price will be multiplied by the weight to determine the total price. Then, in step 14L5, a 1 is written into the factor flag register 013 to note that factoring is done and the 2 or 4 previously stored therein is removed. Operation now advances to step 14L6 in which the recompute flag is set and the register address is modified to set up to move the result of the price times factor multiplication into the price register.

Operation then advances to step 14L9 from either step 14L6 or step 14L8. The result of the price times factor multiplication is moved to either the weight register or the price register depending upon whether step 14L6 or 14L8 preceeded step 14L9.

In step 14L10, the output weight sign is examined. If it is found to be negative, then an error occurred in the computation and operation advances to step 14L11 which sets the recompute flag and loops the operation back to step 14K5. However, if the output weight sign is positive, then operation advances to step 14L13 in which the contents of the output weight register is moved to the arithmetic scratch pad register, the blank bit therein is replaced with a zero and the weight register is addressed.

Then, in step 14L14 flag 2 is examined. If it was set, operation jumps to step 14L16. If flag 2 is not set, operation proceeds to step 14L15 in which the register address is changed to the address of the price register.

In step 14L16, the data in the register which is addressed in either step 14L13 or 14L15 is multiplied by the data in the output weight register to give a total price.

This total price must now be rounded off to the proper number of digits. In order to determine which digit to round off, step 14L17 is performed which is a subroutine operation for returning the address of the proper digit to be rounded off. This subroutine is described in detail in connection with FIG. 14Z.

Referring to the Total Price Roundoff Digit Search Operation of FIG. 14Z, in step 14Z1, the digit address of the digit which is rounded off under non-UK conditions is first addressed in the result register. Then, in step 14Z2 the 30 lb. enable register is examined and if the 30 lb. scale capacity has been selected, the address of step 14Z1 is decremented shifting the address to the round off position for the 30 lb. scale.

However, if the 30 lb. scale capacity is not selected, operation jumps directly to step 14Z4 in which the UK enable register is examined. If the UK scale has been selected, the address is again decremented in step 14Z5 to the position which is appropriate for rounding off for use in the UK. If UK is not selected the address is correct. This therefore provides, as stated in step 14Z6, the proper round off address. This address is then loaded into the accumulator and operation returns to the step in the main sequence of operations at which the total price round off digit search operation was initiated.

Returning to FIG. 14L, the total price is then rounded off using the address returned from step 14L17 and a determination is made in step 14L19 whether the UK mode is selected. If the UK mode is not selected, operation jumps to step 14M5, no further round off being necessary. However, if the UK mode is selected then a further round off must be performed. Therefore, operation again advances to the total price round off digit search subroutine operation XXIX at step 14L20.

The address returned in step 14L20 is then incremented to the next most significant digit in step 14L21 and a 2 is added to that digit with the carry being propagated. Then at step 14L22 the total price round off digit search subroutine operation is performed at step 14M1 the returned address is incremented.

If the currently addressed digit is in the range 5 to 9 inclusive, this indicates that the ½ legend should be illuminated. Therefore, in step 14M2 an 11 may be added to that digit. If a carry is produced, then the digit was in the stated range and therefore half-pence is desired. Consequently, in step 14M3 the carry may be inspected to determine if half-pence is desired. If it is, an 8 is loaded to the accumulator for being written into the prepack or half-pence registers 025 and 026. However, if half-pence is not desired, a zero is loaded into the accumulator for writing into the same registers in step 14M4.

Operation then proceeds to an over value check. At step 14M5 the total price round off digit search subroutine operation XXIX is again repeated. The lower 4 digits of the returned address are complemented and added to 11 in order to form an address counter for performing the over value check. Then, in step 14M7, a determination is made whether 5 digit pricing is selected. If it is not, then in step 14M8 the check counter formed in step 14M6 is incremented so that the over value check will be done for 4 digit pricing. However, if the 5 digit pricing is selected, operation jumps directly to step 14M9.

At step 14M9 the addressed digit and the more significant digits of the total price are examined to determine whether they are 0. If all are 0, then in step 14M9 the total price is found not to be over value and operation jumps to step 14M14. However, if a non-zero digit is found, the total price is over value and in step 14M10 the total price is blanked.

In step 14M11, a determination is made whether the UK scale is selected. If it is not, operation jumps directly to step 14M19. However, if the UK scale is selected, then in step 14M12 the prepack lamp registers are cleared.

If, in step 14M9, an over value did not exist, operation advances to step 14M14 to prepare and move the computed total price to the total price register. To do this the total price round off digit search subroutine operation XXIX is performed at step 14M14 and then at step 14M15 a 5 is added to the returned address so that the most significant digit of the total price may be addressed. Then, at step 14M16 a determination is made whether the UK scale mode is selected. If it is, in step 14M17 the address is incremented so that in step 14M18 the appropriate number of total price digits are moved from the result register to the total price register.

Output

In the Output Operation XXI, the proper digits are output to the GPKD 410 and displayed and the contents of the lamp status flags are output to the lamp latches for display.

In step 14M19, the output weight, price and total price are moved to RAM registers 070 through 07F in the proper sequence for output to the GPKD. Then, in step 14M20 a determination is made whether 5 digit pricing is selected. If 5 digit pricing is selected, operation advances directly to step 14M22 while if 5 digit pricing is not selected, then 4 digit pricing will be provided and in step 14M21 the most significant digit of the price register is blanked.

Similarly, in step 14M22, a determination is made whether 5 digit total price is selected. If it is, operation jumps directly to step 14N2 while if the 5 digit total price is not selected, then operation goes to step 14N1 in which the most significant digit of the total price is blanked Then, in step 14N2 a determination is again made whether the UK mode is selected. If it is, the next most significant digit in the total price is also blanked while if it is not operation jumps directly to step 14N4.

Step 14N4 through 14N12 operate to output the digits in RAM register 07O through 07F to the GPKD for display. Then, in step 14N14, the CPU sends the KDN instructions to the GPKD to turn on the display and display the digits which were output to the GPKD.

Finally, in steps 14N15 through 14N18, the 7 lamp states are output to the latch, decoder and driver circuitry 56.

Print

In the print operation determinations are made whether a print command was entered, whether a print should be disabled because the weight is below the minimum established for printing and what type of print is desired. The data is then output to the printer and a print is performed if the print command was entered. The printer is then reset.

Looking now at the print operation XXII in more detail, in step 14N19, the contents of the print command register is written into the accumulator and the print command register is cleared. FIG. 2 of the CPU 210 is then reset. Then, in step 14N20 the contents of the accumulator is examined to determine whether the print command was set. If the print command was not set, then operation jumps to step 1401. However, if the print command was set, flag 2 of the CPU 210 is set in step 14N21 to note that a print command exists. Then, in step 1401 the find scale capacity subroutine operation XXV is performed and its returned data is used in step 1402 to make a determination whether the weight is less than 20 raw weight increments. Then, in step 1403, the print complete signal from the printer is input to the CPU 210 and examined in step 1404 to determine whether a character is being printed.

If the printing is not complete, operation jumps to step 1408 in which flag 2 is reset in order to disable an initiation of another print operation while a print operation is being currently carried out. However, if printing is complete, a determination is made in step 1405 whether the print inhibit mode has been selected. If it has not, operation jumps to step 1409. However, if the print disable mode has been selected, a determination is made whether a print command exists. If a print command does not exist, operation jumps to step 1409. However, if a print command does not exist, a determination is made whether the weight is less than 20 raw weight increments. If the weight is not less than 20 raw weight increments, operation jumps to step 1409. However, if the weight is less than 20 increments flag 2 is reset in order to disable a print. Then, in step 1409 a determination is made whether the Toledo Scale 300 printer mode has been selected. If it has not,, the output data is written into RAM registers 07O through 07F in the proper format for a 5 digit printer. However, if the 300 printer is found in step 1409 to have been selected, operation advances to step 14O12 in which the data is loaded into the same registers in proper format for the 300 printer.

After the data is loaded in the proper format, then in step 14O13 a determination is made whether the "by count" mode is selected. If the "by count" mode is not selected, operation jumps to step 14O13 to begin the output of the data to the printer.

However, if the "by count" mode is selected, it is desirable to replace all the digits in which a 0 appears with a decimal point so that merely a series of dots are printed. To do this, a loop formed by steps 14O14 through 14O18 looks at each digit and if the digit is a 0 it is replaced with a 13 so that it will cause a decimal point to be printed. After all digits are examined, then in step 14O19 a 0 is loaded to the output register factor digit and the printer output is begun.

To do this, step 14O20 switches the printer clock and printer reset lines illustrated in FIG. 6 to a low state and the printer enable line to its high state.

Then, an output loop is formed in steps 14O21 through 14P7 in which each digit to be output and its appropriate parity bit is output in sequence. In step 14O21 the integrator reset signal is written into the X register of the CPU to maintain the analog to digital integrator circuit in its reset condition. Then, in step 14O21 the first digit from the output RAM registers 14O70 through 14O7F is loaded into the accumulator and in step 14O22 the output instruction, with mnemonic DOA, is output to the GPKD and the digit is thereby sent to the printer.

In step 14P1, the output digit is used to address the parity table and select the correct parity bit so that in step 14P2 the parity bit is output to the printer. Then at step 14P3 the printer clock line is strobed and held in the stobe state for 0.4 milliseconds in step 14P4. The strobe is removed in step 14P5. Then, after another 0.4 millisecond delay in step 14P6 a determination is made in step 14P7 whether all of the digits have been output. If they have not, operation loops back to state 021 to again pass through steps 14O21 through 14P7 until all digits have finally been output in this manner to the printer.

After all digits have been output, the printer enable line of FIG. 6 is switched to its low state in step 14P8 to disable the printer and operation proceeds to step P9. At step 14P9 a determination is made whether a print command exists. If it does not, operation jumps to step 14P15 in which the printer is reset through the print reset line illustrated in FIG. 6.

However, if a print command is found to exist at step 14P9, the print command is output at step 14P10 on the print command line illustrated in FIG. 6. After a delay of 5 milliseconds in step 14P11, the print complete line is input to the CPU in step 14P12 and examined in step 14P13 to determine whether the print is complete. If the print is incomplete, operation loops back to step 14P12 and continues looping through steps 14P12 and 14P13 until the print is found in step 14P13 to be complete. In step 14P14, the print command is removed from the print command line and in step 14P15 the printer is reset through its print reset line.

Keyboard

In the keyboard operation XXIII, a determination is made whether a key is entered and if so the entered key is identified and stored in memory if conditions are appropriate. For some of the operations called for by key depression, the operation also is performed.

Referring to the diagram of the GPKD in FIG. 11, each time a key is depressed, the code representing that key is stored in the key buffer registers 1032. Then, whenever the CPU outputs the proper instruction to the GPKD, the key codes are input to the CPU.

The key codes comprise two parts as described in the Rockwell literature. The first is a four bit word entitled the strobe. The second is a four bit word entitled the return.

Returning to FIG. 14P, in step 14P16 the CPU 210 outputs the mneumonic KTS instruction which causes the GPKD to transfer the strobe code to the CPU. Then, in step 14P17, the transferred strobe code can be examined to determine whether a key was entered. If a key was not entered, operation jumps to step 14T19 at the end of the keyboard operation. In steps 14T19 and 14T20, a determination is made whether the verify key was the last key to have been depressed. If the verify key was not the last key, operation loops back to step 14A8. However, if the verify key was the last key to have been depressed, operation proceeds to step 14P18 in which the keyboard strobe word is entered into register 047. Then, in step 14P19 a mneumonic KTR instruction is output from the CPU to the GPKD to cause the GPKD to return its keyboard return data to the CPU.

As explained in the Rockwell literature, if the number of depressed keys exceeds the storage capacity of the GPKD, then the most significant bit of the keyboard return word will be switched from a 0 to a 1. Consequently, in step 14P20, the keyboard return 4 bit word can be examined to determine if such a keyboard error is present because all depressed keys were not stored in the GPKD. If such a keyboard error is found, operation loops back to step 14A4 in which the CPU 210 outputs a KER instruction to the GPKD 410 which causes it to be reset. If not keyboard error is present then the keyboard return word is written into RAM memory 046.

Then in step 14P22, the keyboard strobe and return data are examined. If a command key is found, operation jumps to step 14R11. However, if a command key is not found, the key must have been a digit key and therefore operation proceeds to step 14R1.

In step 14R1 the digit timer is examined. If the digit timer is still running, this means that the key was depressed within the required time for accepting the depression of a digit key. Therefore, operation may jump to step 14R3 in which the digit is written into RAM memory. However, if the digit timer is not running, then the entered digit must be the first in a new series of digits so the price register and the factor register are cleared in step 14R2. Then, in step 14R3, a determination is made whether 5 digit pricing is selected. If 5 digit pricing is selected, operation jumps to step 14R6. If 5 digit pricing is not selected, then 4 digit pricing must have been selected. Therefore, in step 14R4, a determination is made whether the most significant digit of the 4 digit price is a zero. If the most significant digit is found in step 14R4 to be a non-zero digit, then all the allowable digits have been entered and the digit just input from the GPKD should be ignored. Therefore, operation loops back to the beginning of the keyboard operation XXIII at step 14P16. However, if the most significant digit of the 4 digit price is zero then operation jumps to step 14R7. Similarly, if 5 digit pricing was found to have been selected at step 14R3, then in step 14R6 the most significant digit of the 5 digit price is examined to determine whether it is zero. If this most significant digit is not zero, then the most recently entered digit must be ignored and therefore operation loops back to step 14P16.

If, however, operation advances to step 14R7, the most recently entered digit is examined to determine whether it is 0 to 9 inclusive. If it is not, one of these allowed digits, it must be ignored and therefore operation loops back to step 14P16. However, if it is an allowed digit, the new digit is entered into the least significant digit of the price register in step 14R8 and any other digits already entered in the price register are shifted one position toward the most significant digit. Then, in step 14R9 the digit timer is set to its 11 state to set up a new time delay for acceptance of another digit. Operation then jumps to step 14T17.

If in step 14P22 a command key rather than a digit key was found to have been depressed, then in step 14R11 the stored key data is examined. If the verify key was not depressed operation jumps to step 14R21 to determine whether it was the per half key which was depressed. If, however, the verify key was depressed, then a KER instruction is output from the CPU in step 14R12 in order to reset the GPKD. Then, after a 50 millisecond time delay in step 14R12, the verify test flag is examined. If the verify test flag is set, then this detection of the verify key should be ignored and operation loops back to step 14P16. However, if the verify flag was not set, then in step 14R15 it is set and the contents of the verify mode flag is complemented. Then, in step 14R16 the verify mode flag is examined to determine whether it was clear.

If the verify mode flag was clear then a 15 is written into the X register of the CPU 210 and the contents of X register is unloaded into each 4 bit register at RAM addresses 070 through 07F. This done so that upon the first depression of the verify key all digits of the diplays will be blanked. However, if the verify mode flag was found not clear in step 14R16, and 8 is loaded into register X so that in step 14R17 all 8's will be loaded into the contents of RAM registers 070 through 07F. These 8's will then subsequently cause all segments of the display registers to be illuminated.

In step 14R19, all the lamps are loaded with the register X test digit and the digit timer is cleared. Then operation loops back to step 14M19 so that the loaded digits can be output for the verify test.

If, however, the verify key was found in step 14R11 not to have been depressed, then in step 14R21 determination is made whether the per ½ key is depressed. If it is not, operation jumps to step 14S5. However, if the per ½ key is depressed, then in step 14R22 a determination is made whether the "by count" mode has been selected. If it has not been selected, operation jumps to step 14S3 in which a 2 is loaded into the accumulator and operation jumps to step 14S10.

If the "by count" mode was found selected in step 14R22, then in step 14S1 the contents of the price register is moved to the total price register and the price register is cleared. Thereafter operation jumps to step 14T16.

If operation jumped to step 14S5 because the per ½ key was found in step 14R21 not to have been depressed, a determination is made whether the per ¼ key was depressed. If it was not, operation jumps to step 14S13. However, if the per ¼ key was depressed, then in step 14S6 a determination is made whether the "by count" mode was selected. If it was, operation jumps to step 14T16. However, if the "by count" mode was not selected, then in step 14S7 the find scale capacity operation XXV is performed.

In step 14S8 the returned data is examined to determine whether a metric scale capacity has been selected. If it has, operation jumps to step 14T16. However, if a metric scale has not been selected, a 4 is loaded into the accumulator in step 14S9.

In step 14S10 the first bit of the factor flag is examined to determine whether it is a 1 indicating that the factor multiplication has already been done. If factoring is found to have been done, operation jumps to step 14T16. However, if factoring has not been done, the factor register is updated with the 4 loaded in the accumulator in step 14S9 and the setting of the first bit of the factor flag.

In step 14S13, a determination is made whether the print key was depressed. If the print key was depressed, then in step 14S14 the print command RAM register 027 is set and operation continues to step 14S15. However, if the print key was not selected, operation jumps directly to step 14S15 in which a determination is made whether the tare key was depressed. If the tare key was not depressed, there are no more keys to check and therefore operation jumps to step 14T16. However, if the tare key was depressed, then in step 14S16 a determination is made whether the motion flag is set.

If the motion flag is found to be set, indicating that platter motion exists, then a manual tare weight would be erroneous and consequently should not be accepted. Therefore, operation will jump to step 14T16. However, if the motion flag is not set, the digit timer is checked to determine if it was still running. If the digit timer is still running this indicates that the tare key was depressed in sufficient time that it may be accepted as a keyboard tare. Therefore, operation jumps to step 14S21 in which the price register is examined to determine whether its digits are all zeros. If a non-zero digit is found in the price register then a keyboard tare must be intended and operation jumps to step 14T1. However, if the price register contains all zeroes, a determination is made in step 14S22 whether the weight is greater than or equal to 10 increments. If the weight is greater than or equal to 10 scale increments, operation jumps to step 14T16. However, if it is not greater than 10 increments a tare entry is erroneous and operation loops back to step 14A5.

Referring back to step 14S17, if the digit timer was not still running, an examination is made at step 14S18 of the net flag to determine if the weighing scale is in the net mode. If it is already in the net mode, the tare key depression should be ignored and operation jumps to step 14T16. However, if it is not in the net mode then the manual tare flag is set at step 14S19 and operation jumps to step 14T14.

Step 14T1 is entered from step 14S21 because it appears that a keyboard tare was intended. The zero increment flag is examined in step 14T1 to determine whether the scale is within the auto zero increment. If it is not, operation jumps to step 14T16. However, if it is an examination is made to determine whether the weighing scale is in the net mode at step 14T2. If it is already in the net mode no further tare weight should be entered and operation jumps to step 14T16. However, if it is not in the net mode, a determination is made in step 14T2 whether a keyboard tare is permitted.

If a keyboard tare is not permitted then operation jumps to step 14T16. However, if keyboard tare is permitted then operation advances to step 14T4 in which the find scale capacity operation XXV is performed. The returned data is then used to check the keyboard tare weight which is entered, initially in the price register, to determine if it is in a format acceptable as a tare weight. Therefore, if a 15 kilogram scale is selected, then in step 14T8 the least significant digit of the price must be a 0 or a 5. If it is not a 0 or a 5, the digits are merely left in the price register and operation jumps to step 14T16. If, however, the least significant digit is a 0 or a 5 and therefore is acceptable operation advances to step 14T11.

If the 30 lb. scale is selected then operation advances directly from step 14T6 to step 14T11 in which the price register is examined to determine whether there are 4 or fewer digits. If there are more than 4 digits then there are too many and the data in the price register cannot be accepted as tare weight data and therefore operation jumps to step 14T16. However, if there are 4 of fewer digits, then in step 14T12, the data in the price register is examined to determine whether it is less than the scale weight capacity. If it is not, it cannot be accepted as a tare weight and therefore operation jumps to step 14T16. However, if it is less than the scale capacity, operation advances to step 14T13 in which the data in the price register is moved to the tare register and the tare done and net flags are set. Operation then advances to step 14T14 in which the price register, factor flag and digit timer are cleared. Additionally, in step 14T14 the total price is cleared if the weight is plus and blanked if weight is minus. Then, in step 14T15 the auto clear flag is cleared.

In step 14T16, a 1 is loaded into the digit timer, in step 14T17 the recompute flag is set and the verify mode flag is cleared. Operation then loops back to step 14P16 to check for another key.

APPENDIX

| | LABEL | OPERATION |
|---|---|---|
| 224 | ADD | Add |
| 510 | ADDC | Add Carry to Field |
| 373 | ADDC> | Link to ADDC |
| 1378 | ADRWGT | Address Weight |
| 302 | ARICL | ARI Clear |
| 338 | BLANK | Blank |
| 490 | BLKWT> | Blank Out Weight |
| 1005 | BLNKWT | Blank Out Weight |
| 1104 | CKACL> | Link to CKACLR |
| 1130 | CKACLR | Check Auto Clear |
| 1008 | CKGAZC | Check Gross Auto Zero Correction |
| 1157 | CKINC | Check Incrementing Auto Clear Flag |
| 1383 | CKMIN | Check for Our Weight Minus |
| 1929 | CKMKBT | Check Magnitude of Keyboard Tare |
| 1096 | CKNAZC | Check Net Auto Zero Correction |
| 1701 | CKPRNT | Check for Print |
| 1329 | CKRCP | Check Recompute |
| 620 | CKRST | Check for Scale Reset |
| 330 | CKWSGN | Check for Weight Sign |
| 1889 | CKOT | Check for O-T Sequence |
| 304 | CLEAR | Clear Subroutine |
| 1262 | CLROFC | Clear Out Filter Counter |
| 349 | CLRPF | Clear Print Flag |
| 324 | CLRPR | Clear Price Subroutine |
| 293 | CLRT | Clear Tare Subroutine |
| 162 | CMDIG | Compare Test Digit with Memory |
| 1335 | CMPUT | Compute Total Price |
| 1040 | CRCTAZ | Correct Auto Zero |
| 374 | CRTAZ> | Link to CRCTAZ |
| 984 | CZTIM | Clear Zero Key Timer |
| 529 | DELAY | Delay Subroutine |
| 376 | DELAY> | Link to DELAY |
| 533 | DELY1 | Label in DELAY |
| 540 | DELY2 | Label in DELAY |
| 546 | DELY3 | Label in DELAY |
| 1526 | DISPON | Turn on Display |
| 493 | DL.4MS | 0.4 MS DELAY |
| 1511 | DLOOPA | Display Loop Label |
| 1518 | DLOOPB | Display Loop Label |
| 377 | DLY.4> | Link to DL.4MS |
| 1767 | ENTDIG | Enter Digit |
| 1963 | ENTFCT | Enter Factor |
| 1940 | ENTKBT | Enter Keyboard Tare |
| 1953 | FCNDUN | Function Key Done |
| 405 | FCPTY | Find Scale Capacity Subroutine |
| 371 | FCPTY> | Link to FCPTY |
| 419 | FCPTY1 | Label in FCPTY |
| 424 | FCPTY2 | Label in FCPTY |
| 431 | FCPTY3 | Label in FCPTY |
| 1852 | FDUN> | Link to FCNDUN |
| 1900 | FDUN>> | Link to FCNDUN |
| 887 | FLTWGT | Filter Raw Weight |
| 899 | FLTWT1 | Label in FLTWGT |
| 869 | INIFLT | Initial Filter |
| 1309 | ITLKCK | Interlock Check |
| 18 | KAF | Turn Off A |
| 1788 | KBCMND | Keyboard Command |
| 1956 | KBDUN | Keyboard Operation Done |
| 1748 | KBD1 | Label in KEYBD |
| 568 | KBERR | Keyboard Error |
| 19 | KBF | Turn Off B |
| 1902 | KBTARE | Keyboard Tare |
| 1758 | KCMND> | Link to KBCMND |
| 20 | KDN | Turn on Display |
| 21 | KER | Keyboard Error |
| 1757 | KERR> | Link to KBERR |
| 1723 | KEYBD | Keyboard Routine |
| 1810 | KEYBD> | Link to KEYBD |
| 22 | KLA | Load Display Register A |
| 23 | KLB | Load Display Register B |
| 24 | KTR | Transfer Keyboard Return |
| 25 | KTS | Transfer Keyboard Strobe |
| 1920 | KT15KG | Keyboard Tare 15 KG |
| 1925 | KT6KG | Keyboard Tare 6 KG |

-continued
APPENDIX

| LABEL | | OPERATION |
|---|---|---|
| 1268 | LDLMPS | LD Lamps for Output |
| 933 | LDPPUK | LD Pre-pack or UK Total Price ½ Lamps |
| 1334 | LMOUT> | Link to LMP Out |
| 1591 | LMPLP> | Link to LMPOLP |
| 1530 | LMPOLP | Lamp Output Loop |
| 1527 | LMPOUT | Lamp Output Routine |
| 891 | LSD/2 | Raw Weight LSD Divided by 2 |
| 266 | MADDL | Multiply Add Loop |
| 151 | MAGCK | Magnitude Check Routine |
| 155 | MAGLP | Label in MAGCK |
| 438 | MAXAZ | Test for Maximum Auto Zero Subroutine |
| 253 | MDIG | Multiplier Digit |
| 1024 | MCFTR | Multiply Raw Weight by Proper Factor |
| 311 | MODECK | Check for By-Count Mode Subroutine |
| 96 | MOVPR | Link to MOVPRX |
| 447 | MOVPRX | Move Price Subroutine |
| 75 | MOVX | Move Register to Register Subroutine |
| 378 | MOXV> | Link to MOVX |
| 107 | MOV5 | Move 5 Digits Subroutine |
| 105 | MOV5X | Specialized Move 5 Digits Subroutine |
| 243 | MULT | Multiply Subroutine |
| 276 | NDIG | Next Digit of Multiplier |
| 83 | NOKEY | No Key Depression |
| 1756 | NOKEY> | Link to NOKEY |
| 1448 | NOTOV | Not Overvalue |
| 1219 | OUTFLT | Output Filter Routine |
| 1254 | OUTF1 | Label in OUTFLT |
| 1265 | OUTF2 | Label in OUTFLT |
| 174 | OUTPT> | Link to OUTPUT |
| 1462 | OUTPUT | Output Routine |
| 1425 | OVALCK | Overvalue Check |
| 1390 | OW>ARI | Output Weight to the ARI Register |
| 1681 | PARITY | Parity Formulation Return |
| 1968 | PBCCK | Price By-Count Check |
| 1978 | PBC1 | Label in PBCCK |
| 1984 | PBC2 | Label in PBCCK |
| 1986 | PBC3 | Label in PBCCK |
| 1658 | POUT | Printer Output |
| 1992 | POUT> | Link to POUT |
| 1668 | POUTLP | Printer Output Loop |
| 1865 | PRNCK | Check for Print Command Key |
| 1551 | PRNTR | Printer Routine |
| 847 | PROCWT | Process Weight |
| 1346 | PRXFCT | Price Times Factor |
| 1404 | PRXWGT | Price Times Weight |
| 1578 | PTYPE | Printer Type Check |
| 1863 | P½ | Per ½ Key |
| 1841 | P½CK | Per ½ Key Check |
| 1853 | P¼CK | Per ¼ Key Check |
| 1618 | P300 | 300 Printer Routine |
| 1592 | P300> | Link to P300 |
| 586 | RDSWA | Label in RDSWS |
| 577 | RDSWS | Read Switches Routine |
| 92 | RDSWS> | Link to RDSWS |
| 642 | RDWGT | Read Weight |
| 686 | RDWGT1 | Label in RDWGT |
| 569 | RESET | Scale Reset |
| 1203 | RNDBY2 | Round Weight by 2's |
| 1209 | RNDBY5 | Round Weight by 5's |
| 372 | RNDOF> | Link to RNDOFF |
| 505 | RNDOFF | Round Off Subroutine |
| 1215 | RNDWT1 | Label in Weight Roundoff |
| 1218 | RNDWT2 | Label in Weight Roundoff |
| 590 | RSLOOP | Read Switch Loop |
| 1704 | RSTPR> | Link to RSTPTR |
| 1720 | RSTPTR | Reset Printer |
| 235 | SDUN | Subtract Subroutine Done |
| 26 | SES | PPS4 Select Enable Status |
| 379 | SETRC> | Link to SETRCP |
| 608 | SETRCP | Set Recompute Subroutine |
| 27 | SOS | PPS4 Select Output Status |
| 1092 | STARE | Subtract Tare |
| 987 | SUBAZ | Subtract Auto-Zero |
| 195 | SUBL | Subtract Loop |
| 209 | SUBM | Subtract Result Minus (Borrow) |
| 216 | SUBML | Subtract Result Minus Loop |
| 183 | SUBT | Subtract Subroutine |
| 1870 | TARECK | Tare Key Check |
| 1949 | TDUN | Tare Done |
| 1315 | TDUNCK | Tare Done Check |
| 1440 | TPBLK | Total Price Blank |
| 1332 | TPCLR | Total Price Clear |
| 358 | TPRDS | Total Price Round Off Digit Research |
| 748 | T2CNVT | T2 Count Convert |
| 690 | T2LOOP | T2 Counting Loop |
| 804 | T3CNVT | T3 Count Convert |
| 719 | T3LOOP | T3 Counting Loop |
| 911 | UDFWT | Update Filtered Weight |
| 458 | UDOWT | Update Output Weight Subroutine |
| 375 | UDOWT> | Link to UDOWT |
| 483 | UDOWT1 | Label in UDOWT |
| 1381 | UDTPXF | Update with Price Times Factor |
| 1192 | UDZLF | Update Zero Lamp Flag |
| 1796 | VFYCK | Verify Key Check |
| 957 | X10CLR | Times 10 Routine Clear |
| 945 | X10EXP | Times 10 Expand |
| 961 | ZCAPT | Zero Capture Check |
| 1163 | ZLAMP | Zero Lamp Routine |
| 1814 | ¼CK> | Link to P¼CK |

```
ADDR  CODE    ARG   STNU            STMT

1    ** 8203 DCS CALCULATOR OPTION SWITCH ASSIGNMENTS
                     2    *     NAME DEFINES ON CONDITION
                     3    *     SP1-1: .LT.20 INCREMENT PRINT INHIBIT
                     4    *         -2: NOT USED
                     5    *         -3: 5 DIGIT TOTAL PRICE ENABLE
                     6    *         -4: KEYBOARD TARE ENABLE
                     7    *         -5: 10 INCREMENT AUTO CLR ENABLE
                     8    *         -6: 5 DIGIT UNIT PRICE ENABLE
                     9    *         -7: NOT USED
                    10    *     SP2-1: TARE MANDATORY ENABLE
                    11    *         -2: 6 KG CAPACITY ENABLE
                    12    *         -3: 300 PRINTER ENABLE
                    13    *         -4: MANDATORY PRICE/UNIT ENABLE
                    14    *         -5: UNITED KINGDOM ENABLE
                    15    *         -6: 30 LB CAPACITY ENABLE
                    16    *         -7: TIMES 10 EXPAND ENABLE
                    17    *****                                              *****
        00FB        18    KAF   EJX             FB
        00F7        19    KBF   EJX             F7
        00F3        20    KDN   EJX             F3
```

| ADDR | CODE | ARG | STNO | | STMT | | |
|------|------|------|------|------|------|------|------|
|  |  | 00F6 | 21 | KER | EQX | F6 |  |
|  |  | 00FE | 22 | KLA | EQX | FE |  |
|  |  | 00FD | 23 | KLB | EQX | FD |  |
|  |  | 00FC | 24 | KTR | EQX | FC |  |
|  |  | 00FA | 25 | KTS | EQX | FA |  |
|  |  | 0040 | 26 | SES | EQX | 40 |  |
|  |  | 0041 | 27 | SOS | EQX | 41 |  |
|  |  |  | 28 |  | ORG | 0C0 |  |
| 00C0 | FF | 0000 | 29 | >00 | PTR | #00 | MOTION FLAG |
| 00C1 | FE | 0001 | 30 | >01 | PTR | #01 | Z GRAD FLAG |
| 00C2 | FD | 0002 | 31 | >02 | PTR | #02 | TARE DONE FLAG |
| 00C3 | FB | 0004 | 32 | >04 | PTR | #04 | DIGIT TIMER |
| 00C4 | F6 | 0009 | 33 | >09 | PTR | #09 | RESULT PTR FOR MOVX |
| 00C5 | ED | 0012 | 34 | >12 | PTR | #12 | NET FLAG |
| 00C6 | EC | 0013 | 35 | >13 | PTR | #13 | PER 1/2 FLAG |
| 00C7 | E5 | 001A | 36 | >1A | PTR | #1A | ARI LSD |
| 00C8 | DE | 0021 | 37 | >21 | PTR | #21 | ZERO LAMP, WGT=ARI |
| 00C9 | D6 | 0029 | 38 | >29 | PTR | #29 | WGT SIGN |
| 00CA | CC | 0033 | 39 | >33 | PTR | #33 | AUTO CLR FLAG |
| 00CB | B7 | 0048 | 40 | >48 | PTR | #48 | PREPAK,Z KEY,AZ INH,X10 |
| 00CC | A8 | 0057 | 41 | >57 | PTR | #57 | RECOMPUTE FLAG |
| 00CD | 96 | 0069 | 42 | >69 | PTR | #69 | PRICE MSD |
| 00CE | 91 | 006E | 43 | >6E | PTR | #6E | OUT WGT SIGN |
| 00CF | 85 | 007A | 44 | >7A | PTR | #7A | TEMP LSD |
|  |  |  | 45 |  |  |  |  |
|  |  |  | 46 |  | ORG | 0D0 |  |
| 00D0 | FC | 01FC | 47 | >MOVX | PTR | MOVX> |  |
| 00D1 | 02 | 0102 | 48 | >MOV5X | PTR | MOV5X |  |
| 00D2 | 04 | 0104 | 49 | >MOV5 | PTR | MOV5 |  |
| 00D3 | 40 | 0140 | 50 | >SUBT | PTR | SUBT |  |
| 00D4 | 79 | 0179 | 51 | >MULT | PTR | MULT |  |
| 00D5 | 26 | 0126 | 52 | >MAGCK | PTR | MAGCK |  |
| 00D6 | B3 | 01B3 | 53 | >ARICL | PTR | ARICL |  |
| 00D7 | B5 | 01B5 | 54 | >CLEAR | PTR | CLEAR |  |
| 00D8 | A9 | 01A9 | 55 | >CLRT | PTR | CLRT |  |
| 00D9 | C0 | 01C0 | 56 | >CLRPR | PTR | CLRPR |  |
| 00DA | CE | 01CE | 57 | >BLANK | PTR | BLANK |  |
| 00DB | DE | 01DE | 58 | >TPRDS | PTR | TPRDS |  |
| 00DC | EE | 01EE | 59 | >FCPTY | PTR | FCPTY> |  |
| 00DD | F0 | 01F0 | 60 | >RNDOF | PTR | RNDOF> |  |
| 00DE | F2 | 01F2 | 61 | >ADDC | PTR | ADDC> |  |
| 00DF | F6 | 01F6 | 62 | >UDOWT | PTR | UDOWT> |  |
| 00E0 | F8 | 01F8 | 63 | >DELAY | PTR | DELAY> |  |
| 00E1 | 4C | 014C | 64 | >SUBL | PTR | SUBL |  |
| 00E2 | FA | 01FA | 65 | >DLY,4 | PTR | DLY,4> |  |
| 00E3 | 00 | 0100 | 66 | >MOVPR | PTR | MOVPR |  |
| 00E4 | BA | 01BA | 67 | >MODE | PTR | MODECK |  |
| 00E5 | FE | 01FE | 68 | >SETRC | PTR | SETRC> |  |
| 00E6 | F4 | 01F4 | 69 | >CRTAZ | PTR | CRTAZ> |  |
| 00E7 | 30 | 0130 | 70 | >OUTP> | PTR | OUTPT> |  |
|  |  |  | 71 | * MOVX SUBROUTINE - MOVES DIGS FROM ADDR UP TO END | | | |
|  |  |  | 72 | * | TO CALL: | BM=SOURCE BM | |
|  |  |  | 73 | * |  | BL=SOURCE AND DEST BL (LSD) | |
|  |  |  | 74 | * |  | A=DESTINATION BM | |
| 00E8 | 1B |  | 75 | MOVX | LXA |  | DEST BM>X |
| 00E9 | 37 | 0 | 76 |  | LD |  | LD DATA WRD |
| 00EA | 1B |  | 77 |  | XBMX |  | DEST BM>BM,SOURCE BM>X |
| 00EB | 3F | 0 | 78 |  | EX |  | WRITE DATA WRD |
| 00EC | 1B |  | 79 |  | XBMX |  | SOURCE BM>BM,DEST BM>X |
| 00ED | 17 |  | 80 |  | INCB |  | INC BL, SKIP IF 0 |
| 00EE | A9 | 00E9 | 81 |  | T | MOVX+1 | BL NOT 0 |
| 00EF | 05 |  | 82 |  | RTN |  | RETURN |
| 00F0 | 70 | 000F | 83 | VOKEY | LDI | 15 |  |
| 00F1 | 2F | 0 | 84 |  | EXD |  | KEY STB>A,15>KEY STB |
| 00F2 | 1E |  | 85 |  | SKZ |  | SKIP IF STROBE 0 |
| 00F3 | BA | 00FA | 86 |  | T | RDSWS> |  |
| 00F4 | 7B | 0004 | 87 |  | LDI | 4 | 4>A |
| 00F5 | 0C |  | 88 |  | EOR |  | EX-OR WITH KEY RTN |
| 00F6 | 1E |  | 89 |  | SKZ |  | SKIP IF VERIFY LAST |

| ADDR | CODE | ARG | STNO | | STMT | |
|------|------|------|------|------|------|------|
| 00F7 | BA | 00FA | 90 | | T | RDSWS> |
| 00F8 | 5017 | 0017 | 91 | | TL | RDSWS-2 CLR PRICE IF VERIFY LAST |
| 00FA | 5019 | 0019 | 92 | RDSWS> | TL | RDSWS |
| | | | 93 | | | |
| | | | 94 | | ORG | 100 |
| | | | 95 | * MOVPR SUBROUTINE - MOVES UNIT PRICE TO REG 7A-7E | | |
| 0100 | 5239 | 0239 | 96 | MOVPR | TL | MOVPRX |
| | | | 97 | * MOV5 SUBROUTINE - MOVES 5 DIGS INDEPENDENT OF ADDR | | |
| | | | 98 | * | TO CALL: | BM=SOURCE BM |
| | | | 99 | * | | BL=SOURCE BL (MSD) |
| | | | 100 | * | | X=DESTINATION BM |
| | | | 101 | * | | A=DESTINATION BL (MSD) |
| | | | 102 | * | ON RETURN 6TH DIG IS IN A AND B OK FOR "EX" | |
| | | | 103 | **** | MAY BE CALLED FROM MAIN PROGRAM ONLY **** | |
| | | | 104 | * MOV5X DIFFERS ONLY IN DEFAULT DEST BL=15 | | |
| 0102 | 1B | | 105 | MOV5X | LXA | A>X,DEST BM IN A |
| 0103 | 70 | 000F | 106 | | LDI | 15   DEST BL=15 |
| 0104 | 26 | | 107 | MOV5 | RF1 | RESET FLG 1 |
| 0105 | 06 | | 108 | | XS | EXCH SA AND SB |
| 0106 | 6F | | 109 | | CYS | SA*DEST BL/?/?,A*? |
| 0107 | 37 | 0 | 110 | | LD | LD DATA WRD N |
| 0108 | 1F | | 111 | | DECB | DEC BL |
| 0109 | 8A | 010A | 112 | | T | *+1 |
| 010A | 6F | | 113 | | CYS | SA*DATN/DEST BL/?,A*? |
| 010B | 37 | 0 | 114 | | LD | LD DATA WRD N-1 |
| 010C | 1F | | 115 | | DECB | DEC BL |
| 010D | 8E | 010E | 116 | | T | *+1 |
| 010E | 6F | | 117 | | CYS | SA*DATN-1-DATN-DEST BL,A*? |
| 010F | 37 | 0 | 118 | | LD | LD DATA WRD N-2 |
| 0110 | 1F | | 119 | | DECB | DEC BL |
| 0111 | 92 | 0112 | 120 | | T | *+1 |
| 0112 | 6F | | 121 | | CYS | |
| | | | 122 | * | SA*DATN-2/DATN-1/DATN,A*DEST BL | |
| 0113 | 19 | | 123 | | XABL | DEST BL>BL,SOURCE BL>A |
| 0114 | 1B | | 124 | | XBMX | DEST BM>BM,SOURCE BM>X |
| 0115 | 6F | | 125 | | CYS | |
| | | | 126 | * | SA*SRCE BL/DATN-2/DATN-1,A*DATN | |
| 0116 | 2F | 0 | 127 | | EXD | WRITE DATA WRD N,DEC BL |
| 0117 | 98 | 0118 | 128 | | T | *+1 |
| 0118 | 6F | | 129 | | CYS | SA*?/SRCE BL/DATN-2,A*DATN-1 |
| 0119 | 2F | 0 | 130 | | EXD | WRITE DATA WRD N-1,DEC BL |
| 011A | 9B | 011B | 131 | | T | *+1 |
| 011B | 6F | | 132 | | CYS | SA*?/?/SRCE BL,A*DATN-2 |
| 011C | 16 | | 133 | | SKF1 | SKIP ON FLG 1, PASS 2 |
| 011D | A0 | 0120 | 134 | | T | *+5   PASS 1 |
| 011E | 06 | | 135 | | XS | RESTORE SA FOR RETURN |
| 011F | 05 | | 136 | | RTN | RETURN |
| 0120 | 2F | 0 | 137 | | EXD | WRITE DATA WRD N-2,DEC BL |
| 0121 | 6F | | 138 | | CYS | SA*?/?/?,A*SRCE BL |
| 0122 | 19 | | 139 | | XABL | SOURCE BL>BL,DEST BL>A |
| 0123 | 1B | | 140 | | XBMX | SOURCE BM>BM,DEST BM>X |
| 0124 | 22 | | 141 | | SF1 | SET FLG 1,PASS 2 |
| 0125 | 86 | 0106 | 142 | | T | MOV5+2 |
| | | | 143 | * MAGCK SUBROUTINE - CHECKS FIELD FOR .LE. TEST DIG | | |
| | | | 144 | * | TO CALL: | BM=FIELD BM |
| | | | 145 | * | | BL=COUNTER DOWN TO TEST POINT |
| | | | 146 | * | | A=TEST DIGIT |
| | | | 147 | * | ON RETURN: | |
| | | | 148 | * | IF ALL 0S FOUND:C=0,A=15,NO SKIP | |
| | | | 149 | * | IF MEM.LE.TEST: C=0,A=DIFFERENCE,NO SKIP | |
| | | | 150 | * | IF MEM.GT.TEST: C=1,SKIPS NEXT INSTR ON RTN | |
| 0126 | 1B | | 151 | MAGCK | LXA | TEST DIG>X |
| 0127 | 70 | 000F | 152 | | LDI | 15   FIELD BL |
| 0128 | 19 | | 153 | | XABL | COUNTER>A,15>BL |
| 0129 | 24 | | 154 | | RC | |
| 012A | 60 | 000F | 155 | MAGLP | ADI | 15   DEC COUNTER,SKIP ON C |
| 012B | 05 | | 156 | | RTN | NO C,C=0,A=15,RETURN |
| 012C | 3F | 0 | 157 | | EX | MEM DIG>A,CNTR>MEM |
| 012D | 1E | | 158 | | SKZ | SKIP IF DIG 0 |

| ADDR | CODE | ARG | STNO | | STMT | | |
|------|------|-----|------|------|------|------|------|
| 012E | B1 | 0131 | 159 | | T | CMDIG | NOT 0,COMPARE DIGS |
| 012F | 2F | 0 | 160 | | EXD | | CNTR>A,MEM DIG>MEM,DEC BL |
| 0130 | AA | 012A | 161 | | T | MAGLP | LOOP |
| 0131 | 3F | 0 | 162 | CMDIG | EX | | CNTR>A,MEM DIG>MEM |
| 0132 | 60 | 000F | 163 | | ADI | 15 | DEC CNTR,SKIP ON C |
| 0133 | B6 | 0136 | 164 | | T | *+3 | CNTR 0,DO COMPARISON |
| 0134 | 20 | | 165 | | SC | | SET C FOR RTN |
| 0135 | 07 | | 166 | | RTNSK | | TOO EARLY,C=1,A=? |
| 0136 | 12 | | 167 | | LAX | | TEST DIG>A |
| 0137 | 0E | | 168 | | COMP | | COM TEST DIG |
| 0138 | 0B | | 169 | | AD | | ADD MEM DIG |
| 0139 | 0E | | 170 | | COMP | | COM RES TO FORM POS DIFF |
| 013A | 15 | | 171 | | SKC | | SKIP ON C,MEM DIG.GT.TEST |
| 013B | 05 | | 172 | | RTN | | RETURN,MEM DIG.LE.TEST DIG |
| 013C | 07 | | 173 | | RTNSK | | RETURN,MEM DIG.GT.TEST DIG |
| 013D | 55AE | 05AE | 174 | OUTPT> | TL | OUTPUT | OUTPUT ROUTINE LINK |
| | | | 175 | | | | |
| | | | 176 | | ORG | 140 | |
| | | | 177 | * SUBT SUBROUTINE - SUBTRACTS 2 FIELDS WITH SIGNS | | | |
| | | | 178 | * IN BL ADDR 9, DATA IN BL ADDR 10-15(A-F) | | | |
| | | | 179 | * TO CALL: | | BM=MINUEND BM | |
| | | | 180 | * | | BL=SUBTRAHEND BM | |
| | | | 181 | * ON RETURN RESULT SIGN IS IN A, B ADDRESSES | | | |
| | | | 182 | * RESULT SIGN, RESULT IN RAM 09 THRU 0F | | | |
| 0140 | 76 | 0009 | 183 | SUBT | LDI | 9 | MINUEND SIGN ADDR>A |
| 0141 | 19 | | 184 | | XABL | | MND SGN ADDR>BL,SBTRND BM>A |
| 0142 | 1B | | 185 | | LXA | | SBTRND BM>X |
| 0143 | 37 | 0 | 186 | | LD | | LD MND SGN |
| 0144 | 13 | | 187 | | SAG | | ADDR RESULT |
| 0145 | 3F | 0 | 188 | | EX | | WRITE TO RESULT SGN |
| 0146 | 37 | 0 | 189 | | LD | | LD MND SGN |
| 0147 | 1B | | 190 | | XBMX | | SBTRND BM>BM,MND BM>X |
| 0148 | 0C | | 191 | | EOR | | EX-OR SIGNS |
| 0149 | 17 | | 192 | | INCB | | INC BL |
| 014A | 1E | | 193 | | SKZ | | SKIP IF SIGNS SAME |
| 014B | AA | 016A | 194 | | T | ADD | SIGNS DIFFERENT |
| 014C | 20 | | 195 | SUBL | SC | | SET C TO START |
| 014D | 37 | 0 | 196 | | LD | | LD SBTRND DIG |
| 014E | 0E | | 197 | | COMP | | COM IT |
| 014F | 1B | | 198 | | XBMX | | MND BM>BM,SBTRND BM>X |
| 0150 | 08 | | 199 | | ADCSK | | ADD MND DIG+C,SKIP ON C |
| 0151 | 65 | | 200 | | DC | | NO C,DECIMAL CORRECT |
| 0152 | 13 | | 201 | | SAG | | ADDR RESULT |
| 0153 | 3F | 0 | 202 | | EX | | WRITE TO RESULT |
| 0154 | 1B | | 203 | | XBMX | | SBTRND BM>BM,MND BM>X |
| 0155 | 17 | | 204 | | INCB | | INC BL,SKIP IF 0 |
| 0156 | BD | 014D | 205 | | T | SUBL+1 | NOT 0,LOOP |
| 0157 | 15 | | 206 | | SKC | | SKIP IF NO BORROW |
| 0158 | 9A | 015A | 207 | | T | SUBM | BORROW |
| 0159 | B5 | 0175 | 208 | | T | SDUN | DONE |
| 015A | 00F6 | 0009 | 209 | SUBM | LBL | #09 | ADDR RESULT SIGN |
| 015C | 37 | 0 | 210 | | LD | | LD RESULT SIGN |
| 015D | 0E | | 211 | | COMP | | COM IT |
| 015E | 3F | 0 | 212 | | EX | | UPDATE IT |
| 015F | 17 | | 213 | | INCB | | INC BL |
| 0160 | 20 | | 214 | | SC | | 10S COM LSD |
| 0161 | 7F | 0000 | 215 | | LDI | 0 | 0>A |
| 0162 | 3F | 0 | 216 | SUBML | EX | | RESULT DIG>A,0>RESULT |
| 0163 | 0E | | 217 | | COMP | | COM DIG |
| 0164 | 08 | | 218 | | ADCSK | | ADD DIG COM+0+C,SKIP ON C |
| 0165 | 65 | | 219 | | DC | | NO C,DECIMAL CORRECT |
| 0166 | 3F | 0 | 220 | | EX | | RESULT DIG>RESULT,0>A |
| 0167 | 17 | | 221 | | INCB | | INC BL,SKIP IF 0 |
| 0168 | A2 | 0162 | 222 | | T | SUBML | NOT 0,LOOP |
| 0169 | B5 | 0175 | 223 | | T | SDUN | DONE |
| 016A | 24 | | 224 | ADD | RC | | RESET C TO START |
| 016B | 37 | 0 | 225 | | LD | | LD ADDEND DIG |
| 016C | 69 | 0006 | 226 | | ADI | 6 | EXCESS 6 |
| 016D | 1B | | 227 | | XBMX | | MND BM>BM,ADND BM>X |

| ADDR | CODE | ARG | STNO | | STMT | | |
|---|---|---|---|---|---|---|---|
| 016E | 08 | | 228 | | ADCSK | | ADD MND+C,SKIP ON C |
| 016F | 65 | | 229 | | DC | | NO C,DECIMAL CORRECT |
| 0170 | 13 | | 230 | | SAG | | ADDR RESULT |
| 0171 | 3F | 0 | 231 | | EX | | WRITE TO RESULT |
| 0172 | 1B | | 232 | | XBMX | | ADND BM>BM,MND BM>X |
| 0173 | 17 | | 233 | | INCB | | INC BL,SKIP IF 0 |
| 0174 | A5 | 016B | 234 | | T | ADD+1 | NOT 0,LOOP |
| 0175 | 00F6 | 0009 | 235 | SDUN | LBL | #09 | ADDR RESULT SGN |
| 0177 | 37 | 0 | 236 | | LD | | LD RESULT SGN |
| 0178 | 05 | | 237 | | RTN | | RETURN |
| | | | 238 | * MULT SUBROUTINE - MULTIPLIES MULTIPLICAND BY ARI | | | |
| | | | 239 | * WITH BL ADDR OF 10-15(A-F) | | | |
| | | | 240 | * TO CALL: | | BM=MULTIPLICAND BM | |
| | | | 241 | * | | BL=5 | |
| | | | 242 | * ON RETURN B ADDRESSES RESULT LSD (05) | | | |
| 0179 | 7F | 0000 | 243 | MULT | LDI | 0 | 0>A |
| 017A | 13 | | 244 | | SAG | | ADDR RESULT |
| 017B | 3F | 0 | 245 | | EX | | CLR RESULT |
| 017C | 17 | | 246 | | INCB | | INC BL,SKIP IF 0 |
| 017D | B9 | 0179 | 247 | | T | MULT | NOT 0,LOOP |
| 017E | 5180 | 0180 | 248 | | TL | #180 | |
| | | | 249 | | | | |
| | | | 250 | | ORG | 180 | |
| 0180 | 75 | 000A | 251 | | LDI | 10 | ARI BL |
| 0181 | 1B | | 252 | | LXA | | INIT X WITH ARI BL=10 |
| 0182 | 7E | 0001 | 253 | MDIG | LDI | 1 | ARI BM |
| 0183 | 1A | | 254 | | XAX | | ARI BL>A,ARI BM>X |
| 0184 | 1B | | 255 | | XBMX | | ARI BM>BM,MPCND BM>X |
| 0185 | 19 | | 256 | | XABL | | ARI BL>BL |
| 0186 | 37 | 0 | 257 | | LD | | LD MULTIPLIER DIG |
| 0187 | 60 | 000F | 258 | | ADI | 15 | DEC BY 1,SKIP ON C |
| 0188 | 99 | 0199 | 259 | | T | NDIG | DIG WAS 0,ADV TO NXT MPR DIG |
| 0189 | 3F | 0 | 260 | | EX | | UPDATE MULTIPLIER DIG |
| 018A | 1B | | 261 | | XBMX | | MPCND BM>BM |
| 018B | 75 | 000A | 262 | | LDI | 10 | MPCND BL |
| 018C | 19 | | 263 | | XABL | | ARI BL>A,MPCND BL>BL |
| 018D | 1B | | 264 | | LXA | | ARI BL>X |
| 018E | 24 | | 265 | | RC | | RESET C TO START ADD LOOP |
| 018F | 37 | 0 | 266 | MADDL | LD | | LD MPCND DIG |
| 0190 | 69 | 0006 | 267 | | ADI | 6 | EXCESS 6 |
| 0191 | 13 | | 268 | | SAG | | ADDR RESULT |
| 0192 | 08 | | 269 | | ADCSK | | ADD PARTIAL RES+C,SKIP ON C |
| 0193 | 65 | | 270 | | DC | | NO C,DECIMAL CORRECT |
| 0194 | 13 | | 271 | | SAG | | ADDR RESULT |
| 0195 | 3F | 0 | 272 | | EX | | UPDATE PARTIAL RESULT |
| 0196 | 17 | | 273 | | INCB | | INC MPCND BL,SKIP IF 0 |
| 0197 | 8F | 018F | 274 | | T | MADDL | NOT 0,LOOP |
| 0198 | 82 | 0182 | 275 | | T | MDIG | BL 0,GET MULTIPLIER DIG |
| 0199 | 17 | | 276 | NDIG | INCB | | INC ARI BL,SKIP IF 0 |
| 019A | 9E | 019E | 277 | | T | *+4 | NOT 0 SHIFT RESULT |
| 019B | 00F5 | 000A | 278 | | LBL | #0A | ADDR RESULT 6 DIG MSD |
| 019D | 05 | | 279 | | RTN | | RETURN |
| 019E | 70 | 000F | 280 | | LDI | 15 | RESULT MSD |
| 019F | 19 | | 281 | | XABL | | ARI BL>A,RES MSD>BL |
| 01A0 | 1B | | 282 | | XBMX | | MPCND BM>BM |
| 01A1 | 1B | | 283 | | LXA | | ARI BL>X |
| 01A2 | 7F | 0000 | 284 | | LDI | 0 | 0>A TO CLEAR RESULT MSD |
| 01A3 | 13 | | 285 | | SAG | | ADDR RESULT |
| 01A4 | 3F | 0 | 286 | | EX | | DIG N>RES,DIG N-1>A |
| 01A5 | 1F | | 287 | | DECB | | DEC BL |
| 01A6 | 44 | 0004 | 288 | | SKBI | 4 | SKIP IF BL=4 |
| 01A7 | A3 | 01A3 | 289 | | T | *-4 | BL NOT 4,LOOP |
| 01A8 | 82 | 0182 | 290 | | T | MDIG | SHIFT DONE,GET NEXT MPR DIG |
| | | | 291 | * CLRT SUBROUTINE - CLEARS TARE REG,TARE DONE FLAG, | | | |
| | | | 292 | * NET FLAG,MANUAL TARE FLAG | | | |
| 01A9 | 00FC | 0003 | 293 | CLRT | LBL | #03 | |
| 01AB | 7F | 0000 | 294 | | LDI | 0 | |
| 01AC | 2E | 1 | 295 | | EXD | 1 | CLR MANUAL TARE FLAG |
| 01AD | 7F | 0000 | 296 | | LDI | 0 | |
| 01AE | 3E | 1 | 297 | | EX | 1 | CLR NET FLAG |

| ADDR | CODE | ARG | STNO | | STMT | | |
|---|---|---|---|---|---|---|---|
| 01AF | 7F | 0000 | 298 | | LDI | 0 | |
| 01B0 | 3F | 0 | 299 | | EX | | CLR TARE DONE FLAG |
| 01B1 | 00A6 | 0059 | 300 | | LBL | #59 | ADDR TARE |
| | | | 301 | \* ARICL SUBROUTINE - CLEARS ARI REG FROM 19 THRU 1F | | | |
| 01B3 | 00E6 | 0019 | 302 | ARICL | LBL | #19 | ADDR ARI |
| | | | 303 | \* CLEAR SUBROUTINE - CLEARS REG FROM ADDR UP TO END | | | |
| 01B5 | 7F | 0000 | 304 | CLEAR | LDI | 0 | |
| 01B6 | 3F | 0 | 305 | | EX | | 0>MEM DIG |
| 01B7 | 17 | | 306 | | INCB | | INC BL,SKIP IF 0 |
| 01B8 | B5 | 01B5 | 307 | | T | CLEAR | NOT 0,LOOP |
| 01B9 | 05 | | 308 | | RTN | | RETURN |
| | | | 309 | \* MODECK SUBROUTINE - CHECKS FOR BY COUNT | | | |
| | | | 310 | \* MODE IN KEYBD PER 1/2 AND 1/4 KEY SECTION | | | |
| 01BA | CB | 00CB | 311 | MODECK | LB | >4B | |
| 01BB | 7D | 0002 | 312 | | LDI | 2 | 2>A |
| 01BC | 0D | | 313 | | AND | | ,AND,WITH BY COUNT |
| 01BD | 1E | | 314 | | SKZ | | SKIP IF BY COUNT |
| 01BE | 05 | | 315 | | RTN | | NORMAL OR PRE-PAK |
| 01BF | 07 | | 316 | | RTNSK | | BY COUNT |
| | | | 317 | | | | |
| | | | 318 | | ORG | 1C0 | |
| | | | 319 | \* CLRPR SUBROUTINE - CLEARS PRICE REG,PER 1/2,1/4, | | | |
| | | | 320 | \* FCTR DONE FLAGS,DIGIT TIMER, CLEARS TOTAL PRICE | | | |
| | | | 321 | \* IF OUT WGT PLUS,BLANKS TOTAL PRICE IF MINUS. | | | |
| | | | 322 | \* CLEARS VERIFY TEST IN PROCESS FLAG | | | |
| | | | 323 | \*\*\*\* ALSO CLEARS ARI REG \*\*\*\* | | | |
| 01C0 | C3 | 00C3 | 324 | CLRPR | LB | >04 | |
| 01C1 | 7F | 0000 | 325 | | LDI | 0 | |
| 01C2 | 2E | 1 | 326 | | EXD | 1 | CLR DIGIT TIMER |
| 01C3 | D7 | 00D7 | 327 | | TM | >CLEAR | CLR FCTR,VFY FLAGS,ARI |
| 01C4 | CD | 00CD | 328 | | LB | >69 | |
| 01C5 | 01CD | 01CD | 329 | | TML | BLANK-1 | CLR PRICE |
| 01C7 | CE | 00CE | 330 | CKWSGN | LB | >6E | |
| 01C8 | 7D | 000E | 331 | | LDI | 14 | 14>A |
| 01C9 | 0C | | 332 | | EOR | | EX-OR WITH OUT WGT SIGN |
| 01CA | 009B | 0064 | 333 | | LBL | #64 | ADDR TOTAL PRICE MSD |
| 01CC | 1E | | 334 | | SKZ | | SKIP IF OUT WGT SIGN MINUS |
| 01CD | 7F | 0000 | 335 | | LDI | 0 | PLUS,LD 0 TO CLR TOTAL PRICE |
| | | | 336 | \* BLANK SUBROUTINE - BLANKS REG FROM ADDR DOWN TO | | | |
| | | | 337 | \* BOTTOM OR DOWN TO BL ADDR OF 5 | | | |
| 01CE | 7D | 000F | 338 | BLANK | LDI | 15 | |
| 01CF | 1B | | 339 | | LXA | | 0 OR 15>X |
| 01D0 | 2F | 0 | 340 | | EXD | | 15>MEM DIG,DEC BL,SKIP IF 15 |
| 01D1 | 93 | 01D3 | 341 | | T | \*+2 | NOT 15 |
| 01D2 | 99 | 01D9 | 342 | | T | CLRPF | |
| 01D3 | 12 | | 343 | | LAX | | 0 OR 15>A |
| 01D4 | 49 | 0009 | 344 | | SKBI | 9 | SKIP IF BL=9 |
| 01D5 | 97 | 01D7 | 345 | | T | \*+2 | |
| 01D6 | 99 | 01D9 | 346 | | T | CLRPF | |
| 01D7 | 44 | 0004 | 347 | | SKBI | 4 | SKIP IF BL=4 |
| 01D8 | 90 | 01D0 | 348 | | T | BLANK+2 | NOT 4,LOOP |
| 01D9 | 00D8 | 0027 | 349 | CLRPF | LBL | #27 | |
| 01DB | 7F | 0000 | 350 | | LDI | 0 | |
| 01DC | 3F | 0 | 351 | | EX | | CLR PRINT COMMAND |
| 01DD | 05 | | 352 | | RTN | | RETURN |
| | | | 353 | \* TPRDS SUBROUTINE - SETS B ADDR TO CORRECT DIGIT | | | |
| | | | 354 | \* FOR TOTAL PRICE INITIAL ROUND OFF IN RESULT | | | |
| | | | 355 | \* TPRDS - TOTAL PRICE ROUND OFF DIGIT SEARCH | | | |
| | | | 356 | \* ON RETURN: ROUND OFF DIGIT BL IS IN A | | | |
| | | | 357 | \* B ADDR IS LOADED FOR RNDOFF | | | |
| 01DE | 00BA | 0045 | 358 | TPRDS | LBL | #45 | |
| 01E0 | 37 | 0 | 359 | | LD | | UK SCALE ENB>A |
| 01E1 | 1B | | 360 | | LXA | | A>X |
| 01E2 | 00BC | 0043 | 361 | | LBL | #43 | |
| 01E4 | 37 | 0 | 362 | | LD | | LD 50LB SCALE ENB |
| 01E5 | 00FB | 0007 | 363 | | LBL | #07 | ADDR NON-UK METRIC ROUND OFF |
| 01E7 | 1E | | 364 | | SKZ | | SKIP IF NOT 50LB SCALE |
| 01E8 | 1F | | 365 | | DECB | | ADDR NON-UK LB ROUND OFF |
| 01E9 | 12 | | 366 | | LAX | | RE-LD UK SCALE ENB |

| ADDR | CODE | ARG | STNO | | STMT | | |
|------|------|-----|------|---|------|---|---|
| 01EA | 1E | | 367 | | SKZ | | SKIP IF NOT UK SCALE |
| 01EB | 1F | | 368 | | DECB | | ADDR UK METRIC OR LB RND OFF |
| 01EC | 11 | | 369 | | LABL | | FINAL BL>A |
| 01ED | 05 | | 370 | | RTN | | RETURN |
| 01EE | 5211 | 0211 | 371 | FCPTY> | TL | FCPTY | FCPTY SUBROUTINE LINK |
| 01F0 | 5274 | 0274 | 372 | RNDJF> | TL | RNDJFF | RNDOFF SUBROUTINE LINK |
| 01F2 | 5278 | 0278 | 373 | ADDC> | TL | ADDC | ADDC SUBROUTINE LINK |
| 01F4 | 53EF | 03EF | 374 | CRTAZ> | TL | CRCTAZ | CRCTAZ SUBROUTINE LINK |
| 01F6 | 5240 | 0240 | 375 | UDDWT> | TL | UDDWT | UDDWT SUBROUTINE LINK |
| 01F8 | 5280 | 0280 | 376 | DELAY> | TL | DELAY | DELAY SUBROUTINE LINK |
| 01FA | 5267 | 0267 | 377 | DLY.4> | TL | DL.4MS | DL.4MS SUBROUTINE LINK |
| 01FC | 50E8 | 00E8 | 378 | MOVX> | TL | MOVX | MOVX SUBROUTINE LINK |
| 01FE | 503C | 003C | 379 | SETRC> | TL | SETRCP | SETRCP SUBROUTINE LINK |
| | | | 380 | | | | |
| | | | 381 | | ORG | 200 | |
| 0200 | 77 | 0008 | 382 | | LDI | 8 | DIG 0 PARITY |
| 0201 | 7F | 0000 | 383 | | LDI | 0 | DIG 1 |
| 0202 | 7F | 0000 | 384 | | LDI | 0 | DIG 2 |
| 0203 | 77 | 0008 | 385 | | LDI | 8 | DIG 3 |
| 0204 | 7F | 0000 | 386 | | LDI | 0 | DIG 4 |
| 0205 | 77 | 0008 | 387 | | LDI | 8 | DIG 5 |
| 0206 | 77 | 0008 | 388 | | LDI | 8 | DIG 6 |
| 0207 | 7F | 0000 | 389 | | LDI | 0 | DIG 7 |
| 0208 | 7F | 0000 | 390 | | LDI | 0 | DIG 8 |
| 0209 | 77 | 0008 | 391 | | LDI | 8 | DIG 9 |
| 020A | 77 | 0008 | 392 | | LDI | 8 | DIG 10 |
| 020B | 7F | 0000 | 393 | | LDI | 0 | DIG 11 |
| 020C | 77 | 0008 | 394 | | LDI | 8 | DIG 12 |
| 020D | 7F | 0000 | 395 | | LDI | 0 | DIG 13 |
| 020E | 7F | 0000 | 396 | | LDI | 0 | DIG 14 |
| 020F | 56A1 | 06A1 | 397 | | TL | PARITY | |
| | | | 398 | * FCPTY SUBROUTINE - SETS FLG1,C,A,X ACCORDING | | | |
| | | | 399 | * TO SCALE CAPACITY. THE ARI REG IS CLEARED. | | | |
| | | | 400 | * | FLG1 | - RESET IF 15KG SCALE | |
| | | | 401 | * | C | - RESET IF 6KG SCALE | |
| | | | 402 | * | A | - 10 GRADUATION DIGIT | |
| | | | 403 | * | X | - CAPACITY DIGIT | |
| | | | 404 | * | B | - ADDRESSES ARI LSD(1A) | |
| 0211 | 06 | 0006 | 405 | FCPTY | TM | >ARICL | |
| 0212 | 22 | | 406 | | SF1 | | ASSUME NOT 15KG |
| 0213 | 20 | | 407 | | SC | | ASSUME NOT 6KG |
| 0214 | 00BC | 0043 | 408 | | LBL | #43 | |
| 0216 | 37 | 0 | 409 | | LD | | LD 30LB SCALE ENB |
| 0217 | 1E | | 410 | | SKZ | | SKIP IF NOT 30LB SCALE |
| 0218 | A0 | 0220 | 411 | | T | FCPTY1 | 30LB SCALE |
| 0219 | 24 | | 412 | | RC | | NOT 30LB,ASSUME 6KG |
| 021A | 17 | | 413 | | INCB | | |
| 021B | 37 | 0 | 414 | | LD | | LD 6KG SCALE ENB |
| 021C | 1E | | 415 | | SKZ | | SKIP IF NOT 6KG SCALE |
| 021D | A0 | 0220 | 416 | | T | FCPTY1 | 6KG SCALE |
| 021E | 20 | | 417 | | SC | | NOT 6KG |
| 021F | 26 | | 418 | | RF1 | | 15KG |
| 0220 | 15 | | 419 | FCPTY1 | SKC | | SKIP IF NOT 6KG |
| 0221 | A5 | 0225 | 420 | | T | FCPTY2 | 6KG |
| 0222 | 16 | | 421 | | SKF1 | | SKIP IF NOT 15KG |
| 0223 | 7A | 0005 | 422 | | LDI | 5 | 15KG |
| 0224 | 7C | 0003 | 423 | | LDI | 3 | 30LB |
| 0225 | 79 | 0006 | 424 | FCPTY2 | LDI | 6 | 6KG |
| 0226 | 1B | | 425 | | LXA | | CAPACITY DIGIT>X |
| 0227 | 15 | | 426 | | SKC | | SKIP IF NOT 6KG |
| 0228 | AC | 022C | 427 | | T | FCPTY3 | 6KG |
| 0229 | 16 | | 428 | | SKF1 | | SKIP NOT 15KG |
| 022A | 7A | 0005 | 429 | | LDI | 5 | 15KG |
| 022B | 7E | 0001 | 430 | | LDI | 1 | 30LB |
| 022C | 7D | 0002 | 431 | FCPTY3 | LDI | 2 | 6KG |
| 022D | 00E5 | 001A | 432 | | LBL | #1A | |
| 022F | 05 | | 433 | | RTN | | RETURN |
| | | | 434 | * MAXAZ SUBROUTINE - CHECKS THAT WGT OR AUTO ZERO | | | |
| | | | 435 | * CORRECTION RESULT IS LESS THAN 000400 CNTS. ON | | | |

| ADDR | CODE | ARG | STNO | | STMT | | |
|------|------|-----|------|------|------|------|------|
| | | | 436 | * | ENTRY B IS SET TO 24(WGT) OR 04(RESULT), IF | | |
| | | | 437 | * | AUTO ZERO IS UPDATED A RETURN AND SKIP OCCURS. | | |
| 0230 | 7C | 0003 | 438 | MAXAZ | LDI | 3 | |
| 0231 | 05 | 0005 | 439 | | TM | >MAGCK | CK FOR .LE.3XX,WGT OR RES FLD |
| 0232 | 84 | 0234 | 440 | | T | *+2 | .LE.3XX RTN |
| 0233 | 05 | | 441 | | RTN | | .GT.3XX RTN,OVER,RETURN |
| 0234 | 76 | 0009 | 442 | | LDI | 9 | |
| 0235 | 19 | | 443 | | XABL | | ADDR WGT OR RESULT SIGN |
| 0236 | 76 | 0004 | 444 | | LDI | 4 | |
| 0237 | D0 | 00D0 | 445 | | TM | >MOVX | MOVE WGT OR RES TO AUTO ZERO |
| 0238 | 07 | | 446 | | RTNSK | | UPDATE DONE,RETURN AND SKIP |
| 0239 | CD | 00CD | 447 | MOVPRX | LB | >69 | |
| 023A | 76 | 0007 | 448 | | LDI | 7 | |
| 023B | 1B | | 449 | | LXA | | |
| 023C | 71 | 000E | 450 | | LDI | 14 | |
| 023D | 5104 | 0104 | 451 | | TL | MOV5 | |
| | | | 452 | | | | |
| | | | 453 | | ORG | 240 | |
| | | | 454 | * OUOWT SUBROUTINE - MOVES WGT 5 MSDS AND WGT SIGN | | | |
| | | | 455 | * TO OUT WGT, BLANKS OUT WGT IF SIGN MINUS AND | | | |
| | | | 456 | * HAVE NON-0 DIGIT IN MSD, ENSURES THAT SIGN PLUS | | | |
| | | | 457 | * IF OUT WGT IS 0. | | | |
| 0240 | 00DA | 0025 | 458 | ODOWT | LBL | #25 | |
| 0242 | 14 | | 459 | | SKF2 | | SKIP NOT X10 EXP |
| 0243 | 17 | | 460 | | INCB | | |
| 0244 | 7F | 0000 | 461 | | LDI | 0 | |
| 0245 | 22 | | 462 | | SF1 | | |
| 0246 | 05 | 0005 | 463 | | TM | >MAGCK | CK FOR ALL 0S IN FINAL WGT |
| 0247 | 26 | | 464 | | RF1 | | ALL 0S RETURN,RESET FLG1 |
| 0248 | C9 | 00C9 | 465 | | LB | >29 | |
| 0249 | 70 | 000F | 466 | | LDI | 15 | 15>A TO DEC WGT SIGN |
| 024A | 0B | | 467 | | AD | | WGT SIGN>15:PLUS,14:MINUS |
| 024B | 00D0 | 002F | 468 | | LBL | #2F | |
| 024D | 14 | | 469 | | SKF2 | | SKIP NOT X10 EXP |
| 024E | 1F | | 470 | | DECB | | |
| 024F | 16 | | 471 | | SKF1 | | SKIP IF OUT WGT NOT 0 |
| 0250 | 70 | 000F | 472 | | LDI | 15 | BE SURE SIGN PLUS IF 0 |
| 0251 | 3F | 0 | 473 | | EX | | OUT WGT SIGN>MSD WGT,MSD>A |
| 0252 | 1E | | 474 | | SKZ | | SKIP IF WGT MSD 0 |
| 0253 | 95 | 0255 | 475 | | T | *+2 | NOT 0 |
| 0254 | 9C | 025C | 476 | | T | ODOWT1 | MSD 0 |
| 0255 | 3F | 0 | 477 | | EX | | NOT 0,MSD>MEM |
| 0256 | 00BF | 0040 | 478 | | LBL | #40 | |
| 0258 | 37 | 0 | 479 | | LD | | LD 300 PRINTER FWD |
| 0259 | 15 | | 480 | | SKC | | SKIP IF WGT MINUS |
| 025A | 1E | | 481 | | SKZ | | NOT MINUS,SKIP NOT 300 PRNTR |
| 025B | A5 | 0265 | 482 | | T | BLKWT> | MINOR.300 PNTR,AND,MSD NOT 0 |
| 025C | 00D0 | 002F | 483 | ODOWT1 | LBL | #2F | |
| 025E | 14 | | 484 | | SKF2 | | SKIP NOT X10 EXPAND |
| 025F | 1F | | 485 | | DECB | | |
| 0260 | 79 | 0006 | 486 | | LDI | 6 | |
| 0261 | 1B | | 487 | | LXA | | |
| 0262 | 71 | 000E | 488 | | LDI | 14 | |
| 0263 | 5104 | 0104 | 489 | | TL | MOV5 | MOVE WGT 5 MSDS TO OUT WGT |
| 0265 | 53C9 | 03C9 | 490 | BLKWT> | TL | BLNKWT | BLANK OUT WGT |
| | | | 491 | * DL.4MS SUBROUTINE - SETS UP AND PERFORMS .4MS DLY | | | |
| | | | 492 | * AND RETURNS WITH B SET TO ADDR 00 | | | |
| 0267 | 1C41 | 0041 | 493 | DL.4MS | IOL | SJS | STROBE OR REMOVE CLOCK |
| 0269 | C4 | 00C4 | 494 | | LB | >04 | |
| 026A | 7F | 0000 | 495 | | LDI | 0 | |
| 026B | 3F | 0 | 496 | | EX | | |
| 026C | 17 | | 497 | | INCB | | |
| 026D | 7F | 0000 | 498 | | LDI | 0 | |
| 026E | 3F | 0 | 499 | | EX | | |
| 026F | 7C | 0003 | 500 | | LDI | 3 | |
| 0270 | E0 | 00E0 | 501 | | TM | >DELAY | .4 MS DELAY |
| 0271 | 00F2 | 000D | 502 | | LBL | #0D | |
| 0273 | 05 | | 503 | | RTN | | |
| | | | 504 | * RNDOFF SUBROUTINE - DOES 5 ROUND OFF,PROPAGATES C | | | |

| ADDR | CODE | ARG | STNO | | STMT | | |
|------|------|------|------|------|------|------|------|
| 0274 | 74 | 000B | 505 | RNDOFF | LDI | 11 | 11>A |
| 0275 | 08 | | 506 | | AD | | ADD RND OFF DIG,C>1 IF.GE.5 |
| 0276 | 7F | 0000 | 507 | | LDI | 0 | |
| 0277 | 8B | 027B | 508 | | T | ADDC+3 | REPLACE LSD WITH 0 |
| | | | 509 | * ADDC SUBROUTINE - ADDS C TO FIELD,PROPAGATES C | | | |
| 0278 | 79 | 0006 | 510 | ADDC | LDI | 6 | EXCESS 6 |
| 0279 | 08 | | 511 | | ADCSK | | ADD MEM DIG+C,SKIP ON C |
| 027A | 65 | | 512 | | DC | | DECIMAL CORRECT |
| 027B | 3F | 0 | 513 | | EX | | UPDATE MEM DIG |
| 027C | 17 | | 514 | | INCB | | INC BL,SKIP IF 0 |
| 027D | 88 | 0278 | 515 | | T | ADDC | NOT 0,LOOP |
| 027E | 05 | | 516 | | RTN | | RETURN |
| | | | 517 | | | | |
| | | | 518 | | ORG | 280 | |
| | | | 519 | | | | |
| | | | 520 | * DELAY SUBROUTINE - ALLOWS TIME DELAYS FROM 190 | | | |
| | | | 521 | * MIC-SEC TO 255.76 MILLI-SEC, INCREMENT .105 MS | | | |
| | | | 522 | * TO CALL: | | | LONG TIMER IN ADDR 0A |
| | | | 523 | * | | | MID TIMER IN ADDR 09 |
| | | | 524 | * | | | SHORT TIMER IN A |
| | | | 525 | * DELAY VALUES: | | | LONG TIMER 15.64 MS/COUNT |
| | | | 526 | * | | | MID TIMER 1.3 MS/COUNT |
| | | | 527 | * | | | SHORT TIMER 0.105 MS/COUNT |
| | | | 528 | * | | | DEAD TIME 0.085 MS |
| 0280 | 00F6 | 0009 | 529 | DELAY | LBL | #09 | |
| 0282 | 3F | 0 | 530 | | EX | | MID TIMER>A,SHORT TIMER>MEM |
| 0283 | 1B | | 531 | | LXA | | SAVE MID TIMER IN X |
| 0284 | 3F | 0 | 532 | | EX | | SHORT TIMER>A,MID TIMER>MEM |
| 0285 | 60 | 000F | 533 | DELY1 | ADI | 15 | DEC SHORT TIM,SKIP WAS NOT 0 |
| 0286 | 8E | 028E | 534 | | T | DELY2 | WAS 0 |
| 0287 | 00F3 | 000C | 535 | | LBL | #0C | LD B WITH 4 COUNTER |
| 0289 | 528B | 028B | 536 | | TL | *+2 | 10 MIC-SEC |
| 028B | 17 | | 537 | | INCB | | 5 MIC-SEC,INC BL,SKIP IF 0 |
| 028C | 89 | 0289 | 538 | | T | *-3 | 5 MIC-SEC,X4 FOR 80 MIC-SEC |
| 028D | 85 | 0285 | 539 | | T | DELY1 | SHORT DELY=TIMERX105 MIC-SEC |
| 028E | 12 | | 540 | DELY2 | LAX | | LD MID COUNTER |
| 028F | 60 | 000F | 541 | | ADI | 15 | DEC,SKIP WAS NOT 0 |
| 0290 | 94 | 0294 | 542 | | T | DELY3 | WAS 0 |
| 0291 | 1B | | 543 | | LXA | | DECREMENTED TIMER>X |
| 0292 | 7J | 000C | 544 | | LDI | 12 | SET UP SHORT DELAY=1.26 MS |
| 0293 | 85 | 0285 | 545 | | T | DELY1 | MID DELAY=TIMERX1.3 MS |
| 0294 | 74 | 000B | 546 | DELY3 | LDI | 11 | |
| 0295 | 1B | | 547 | | LXA | | SET UP MID DELAY=14.3 MS |
| 0296 | 00F5 | 000A | 548 | | LBL | #0A | |
| 0298 | 37 | 0 | 549 | | LD | | LD LONG TIMER |
| 0299 | 60 | 000F | 550 | | ADI | 15 | DEC,SKIP WAS NOT 0 |
| 029A | 05 | | 551 | | RTN | | WAS 0,DONE,85 MIC-SEC ADDED |
| 029B | 3F | 0 | 552 | | EX | | UPDATE LONG TIMER |
| 029C | 92 | 0292 | 553 | | T | DELY3-2 | SET UP SHORT DELAY |
| | | | 554 | | | | |
| | | | 555 | *MAIN PROGRAM POWER-UP START* | | | |
| | | | 556 | | ORG | 0 | |
| 0000 | 81 | 0001 | 557 | | T | *+1 | POWER UP ENTRY |
| 0001 | 00CE | 0031 | 558 | | LBL | #31 | |
| 0003 | 7F | 0000 | 559 | | LDI | 0 | |
| 0004 | 2C | 3 | 560 | | EXD | 3 | BE SURE Z DONE FLAG CLR |
| 0005 | 77 | 0008 | 561 | | LDI | 8 | |
| 0006 | 1C41 | 0041 | 562 | | IOL | SDS | DISCRETE I/O>LOW |
| 0008 | 17 | | 563 | | INCB | | |
| 0009 | 85 | 0005 | 564 | | T | *-4 | LOOP TO INIT ALL 15 I/O |
| 000A | 77 | 0008 | 565 | | LDI | 8 | |
| 000B | 1C40 | 0040 | 566 | | IOL | SES | ENABLE ALL DISCRETE OUTPUTS |
| 000D | 5392 | 0392 | 567 | | TL | X10CLR | |
| 000F | 1CF6 | 00F6 | 568 | KBERR | IOL | KER | RESET KEYBOARD |
| 0011 | C5 | 00C5 | 569 | RESET | LB | >12 | |
| 0012 | D7 | 0007 | 570 | | TM | >CLEAR | CLR NET,FCTR,VFY TEST FLGS |
| 0013 | CA | 00CA | 571 | | LB | >33 | |
| 0014 | 7F | 0000 | 572 | | LDI | 0 | |
| 0015 | 3F | 0 | 573 | | EX | | CLR AUTO CLR FLAG |

| ADDR | CODE | ARG | STNO | | STMT | | |
|---|---|---|---|---|---|---|---|
| 0016 | D8 | 00DB | 574 | | TM | >CLRT | CLR TARE |
| 0017 | E5 | 00E5 | 575 | | TM | >SETRC | SET RECOMPUTE |
| 0018 | D9 | 00D9 | 576 | | TM | >CLRPR | CLR PRICE,TOTAL PRICE |
| 0019 | 0090 | 006F | 577 | RDSWS | LBL | #6F | |
| 001B | 7F | 0000 | 578 | | LDI | 0 | |
| 001C | 3F | 0 | 579 | | EX | | BE SURE RAM REG 6F CLR |
| 001D | CB | 00CB | 580 | | LB | >4B | |
| 001E | 27 | | 581 | | DIA | | RD X10,Z KEY,BY CNT,PRE-PAK |
| 001F | 3F | 0 | 582 | | EX | | |
| 0020 | 00F9 | 0006 | 583 | | LBL | #06 | |
| 0022 | 22 | | 584 | | SF1 | | SET FLG1 FOR 1ST SWITCH BANK |
| 0023 | 7B | 0004 | 585 | | LDI | 4 | WANT RAM REG 4 FOR 1ST BANK |
| 0024 | 1B | | 586 | RDSWA | LXA | | RAM REG>X |
| 0025 | 7F | 0000 | 587 | | LDI | 0 | |
| 0026 | 1C41 | 0041 | 588 | | IOL | SOS | ENB BANK,SET I/O 6:1ST,7:2ND |
| 0028 | C0 | 00C0 | 589 | | LB | >00 | |
| 0029 | 77 | 0008 | 590 | RSLOOP | LDI | 8 | |
| 002A | 1C41 | 0041 | 591 | | IOL | SOS | RD SWITCH,0>A:ON,8>A:OFF |
| 002C | 1B | | 592 | | XBMX | | RAM REG>BM,0>X |
| 002D | 1E | | 593 | | SKZ | | SKIP IF SW ON |
| 002E | 7F | 0000 | 594 | | LDI | 0 | SW OFF |
| 002F | 77 | 0008 | 595 | | LDI | 8 | SW ON |
| 0030 | 3F | 0 | 596 | | EX | | 8>MEM:ON,0>MEM:OFF |
| 0031 | 17 | | 597 | | INCB | | INC BL |
| 0032 | 1B | | 598 | | XBMX | | 0>BM,RAM REG>X |
| 0033 | 46 | 0006 | 599 | | SKBI | 6 | SKIP IF BL=6 |
| 0034 | A9 | 0029 | 600 | | T | RSLOOP | LOOP |
| 0035 | 16 | | 601 | | SKF1 | | SKIP ON FLG1,1ST BANK READ |
| 0036 | 17 | | 602 | | INCB | | 2ND BANK READ,WANT I/O 7 |
| 0037 | 77 | 0008 | 603 | | LDI | 8 | |
| 0038 | 1C41 | 0041 | 604 | | IOL | SOS | DIS BANK,CLR I/O 6:1ST,7:2ND |
| 003A | 5040 | 0040 | 605 | | TL | #040 | |
| | | | 606 | * SETRCP SUBROUTINE - SETS RECOMPUTE FLAG | | | |
| | | | 607 | * ON RETURN PRINT FLAG IS ADDRESSED | | | |
| 003C | CC | 00CC | 608 | SETRCP | LB | >57 | |
| 003D | 70 | 000F | 609 | | LDI | 15 | |
| 003E | 38 | 7 | 610 | | EX | 7 | SET RECOMPUTE FLAG |
| 003F | 05 | | 611 | | RTN | | |
| | | | 612 | | | | |
| | | | 613 | | ORG | 040 | |
| 0040 | 16 | | 614 | | SKF1 | | SKIP IF 1ST BANK READ |
| 0041 | 87 | 0047 | 615 | | T | CKRST | 2ND BANK READ,DONE |
| 0042 | 17 | | 616 | | INCB | | START 2ND BANK,WANT I/O 7 |
| 0043 | 26 | | 617 | | RF1 | | CLR FLG1 FOR 2ND SWITCH BANK |
| 0044 | 7A | 0005 | 618 | | LDI | 5 | WANT RAM REG 5 FOR 2ND BANK |
| 0045 | 5024 | 0024 | 619 | | TL | RDSWA | LOOP |
| 0047 | C3 | 00C3 | 620 | CKRST | LB | >04 | |
| 0048 | 37 | 0 | 621 | | LD | | LD DIG TIMER |
| 0049 | 60 | 000F | 622 | | ADI | 15 | DEC IT,SKIP ON C |
| 004A | 9D | 005D | 623 | | T | RDWGT | NO C,TIMER WAS 0,SKIP CHECK |
| 004B | 3F | 0 | 624 | | EX | | UPDATE DIGIT TIMER |
| 004C | 00B0 | 0042 | 625 | | LBL | #42 | |
| 004E | 77 | 0008 | 626 | | LDI | 8 | 8>A TO SELECTIVELY COM 8 BIT |
| 004F | 0C | | 627 | | EOR | | EX-OR WITH TARE MAND ENB |
| 0050 | C2 | 00C2 | 628 | | LB | >02 | |
| 0051 | 0F | | 629 | | OR | | ,OR,WITH T DONE,A=0:NOT DONE |
| 0052 | 17 | | 630 | | INCB | | |
| 0053 | 0F | | 631 | | OR | | NO RESET IF MAN T FLAG SET |
| 0054 | 17 | | 632 | | INCB | | |
| 0055 | 0F | | 633 | | OR | | ,OR,WITH DIG TIM,A=0:JUST 0 |
| 0056 | 1E | | 634 | | SKZ | | SKIP IF ALL TRUE TO RESET |
| | | | 635 | * SKIP IF (TARE MANDATORY),AND,(NO TARE DONE),AND, | | | |
| | | | 636 | * (NO MANUAL TARE FLAG),AND,(TIMER JUST 0) | | | |
| 0057 | 9D | 005D | 637 | | T | RDWGT | A,NE,0,NO RESET |
| 0058 | E4 | 00E4 | 638 | | TM | >MODE | CK FOR BY COUNT MODE |
| 0059 | 9B | 005B | 639 | | T | *+2 | NOT BY COUNT,RESET OK |
| 005A | 9D | 005D | 640 | | T | RDWGT | BY COUNT,SKIP RESET |
| 005B | 5011 | 0011 | 641 | | TL | RESET | A,EQ,0,RESET SCALE |
| 005D | DC | 00DC | 642 | RDWGT | TM | >FCPTY | DETERMINE SCALE CAPACITY |

| ADDR | CODE | ARG | STNO | | STMT | | |
|------|------|------|------|------|------|------|------|
| 005E | C4 | 00C4 | 643 | | LB | >09 | |
| 005F | 15 | | 644 | | SKC | | SKIP NOT 6KG |
| 0060 | A4 | 0064 | 645 | | T | *+4 | 6KG |
| 0061 | 16 | | 646 | | SKF1 | | SKIP NOT 15KG |
| 0062 | 7E | 0001 | 647 | | LDI | 1 | 15KG |
| 0063 | 77 | 0008 | 648 | | LDI | 8 | 30LB |
| 0064 | 7C | 0003 | 649 | | LDI | 3 | 6KG |
| 0065 | 3F | 0 | 650 | | EX | | ENTER T1 DELAY MID TIMER |
| 0066 | 17 | | 651 | | INCB | | |
| 0067 | 15 | | 652 | | SKC | | SKIP NOT 6KG |
| 0068 | 70 | 000F | 653 | | LDI | 15 | 6KG |
| 0069 | 79 | 0006 | 654 | | LDI | 6 | 15KG OR 30LB |
| 006A | 3F | 0 | 655 | | EX | | ENTER T1 DELAY LONG TIMER |
| 006B | 77 | 0008 | 656 | | LDI | 8 | |
| 006C | 1B | | 657 | | LXA | | T1 CONTROL BIT>X |
| 006D | 7F | 0000 | 658 | | LDI | 0 | |
| 006E | 1D | | 659 | | DOA | | START T1 INTEGRATION |
| 006F | 15 | | 660 | | SKC | | SKIP NOT 6KG |
| 0070 | 84 | 0074 | 661 | | T | *+4 | 6KG |
| 0071 | 16 | | 662 | | SKF1 | | SKIP NOT 15KG |
| 0072 | 7B | 0004 | 663 | | LDI | 4 | 15KG,TOTAL DELAY 95.765 MS |
| 0073 | 74 | 000B | 664 | | LDI | 11 | 30LB,TOTAL DELAY 105.600 MS |
| 0074 | 76 | 0009 | 665 | | LDI | 9 | 6KG,TOTAL DELAY 239.655 MS |
| 0075 | E0 | 00E0 | 666 | | TM | >DELAY | PERFORM T1 DELAY |
| 0076 | 7F | 0000 | 667 | | LDI | 0 | |
| 0077 | 6F | | 668 | | CYS | | |
| 0078 | 7F | 0000 | 669 | | LDI | 0 | |
| 0079 | 6F | | 670 | | CYS | | |
| 007A | 7F | 0000 | 671 | | LDI | 0 | |
| 007B | 6F | | 672 | | CYS | | |
| 007C | 00F7 | 0008 | 673 | | LBL | #08 | |
| 007E | 5080 | 0080 | 674 | | TL | #080 | |
| | | | 675 | | | | |
| | | | 676 | | ORG | 080 | |
| 0080 | 7F | 0000 | 677 | | LDI | 0 | |
| 0081 | 3F | 0 | 678 | | EX | | FORM DUMMY MEM 0 FOR ADDS |
| 0082 | 7F | 0000 | 679 | | LDI | 0 | |
| 0083 | 1C40 | 0040 | 680 | | IOL | SES | DISABLE DISCRETE OUTPUTS |
| 0085 | 67 | 0008 | 681 | | ADI | 8 | SKIP IF WGT TOO MINUS |
| 0086 | 8C | 008C | 682 | | T | RDWGT1 | NO COIN,NOT TOO MINUS |
| 0087 | 77 | 0008 | 683 | | LDI | 8 | |
| 0088 | 1C40 | 0040 | 684 | | IOL | SES | ENABLE DISCRETE OUTPUTS |
| 008A | 53C9 | 03C9 | 685 | | TL | BLNKWT | TOO MINUS |
| 008C | 7B | 0004 | 686 | RDWGT1 | LDI | 4 | |
| 008D | 1B | | 687 | | LXA | | T2 CONTROL BIT>X |
| 008E | 7F | 0000 | 688 | | LDI | 0 | |
| 008F | 1D | | 689 | | DOA | | STOP T1,START T2 INTEGRATION |
| 0090 | 20 | | 690 | T2LOOP | SC | | START 65 MIC-SEC T2 LOOP |
| 0091 | 6F | | 691 | | CYS | | LD LOW DIGIT COUNTER |
| 0092 | 0A | | 692 | | ADC | | CNTR+0+C>A,C |
| 0093 | 6F | | 693 | | CYS | | STORE LOW,LD MID DIG COUNTER |
| 0094 | 0A | | 694 | | ADC | | CNTR+0+C>A,C |
| 0095 | 6F | | 695 | | CYS | | STORE MID,LD HI DIG COUNTER |
| 0096 | 0A | | 696 | | ADC | | CNTR+0+C>A,C |
| 0097 | 6F | | 697 | | CYS | | STORE HIGH DIGIT COUNTER,0>A |
| 0098 | 1C41 | 0041 | 698 | | IOL | SOS | INPUT A/D CMPRTR,8>A IF LOW |
| 009A | 1E | | 699 | | SKZ | | SKIP IF COMPARATOR HIGH |
| 009B | 9D | 009D | 700 | | T | *+2 | COIN,COMPARATOR LOW |
| 009C | 90 | 0090 | 701 | | T | T2LOOP | NO COIN,CONTINUE COUNTING |
| 009D | 0083 | 007C | 702 | | LBL | #7C | |
| 009F | 17 | | 703 | | INCB | | INC BL,SKIP IF 0,WANT EXTRA |
| 00A0 | 9F | 009F | 704 | | T | *-1 | 65 MIC-SEC DELAY TO DOA INST |
| 00A1 | 7F | 0000 | 705 | | LDI | 0 | |
| 00A2 | 1B | | 706 | | LXA | | T2 OFF>X |
| 00A3 | 1D | | 707 | | DOA | | STOP T2 INTEGRATION |
| 00A4 | 7F | 0000 | 708 | | LDI | 0 | |
| 00A5 | 6F | | 709 | | CYS | | T2 DIGIT CNTRS>A,0>CNTRS |
| 00A6 | 3F | 0 | 710 | | EX | | LOW>ADDR 70,MID>71,HIGH >72 |
| 00A7 | 17 | | 711 | | INCB | | INC BL |

| ADDR | CODE | ARG | STNO | | STMT | | |
|------|------|-----|------|--------|------|------|------|
| 00A8 | 43 | 0003 | 712 | | SKBI | 3 | SKIP IF BL=3 |
| 00A9 | A4 | 00A4 | 713 | | T | *-5 | LOOP |
| 00AA | 00F7 | 0008 | 714 | | LBL | #08 | |
| 00AC | 7D | 0002 | 715 | | LDI | 2 | |
| 00AD | 1B | | 716 | | LXA | | T3 CONTROL BIT>X |
| 00AE | 7F | 0000 | 717 | | LDI | 0 | |
| 00AF | 1D | | 718 | | DOA | | START T3 INTEGRATION |
| 00B0 | 77 | 0008 | 719 | T3LOOP | LDI | 8 | START 65 MIC-SEC T3 LOOP |
| 00B1 | 20 | | 720 | | SC | | |
| 00B2 | 6F | | 721 | | CYS | | LD LOW DIGIT COUNTER |
| 00B3 | 0A | | 722 | | ADC | | CNTR+0+C>A,C |
| 00B4 | 6F | | 723 | | CYS | | STORE LOW,LD MID DIG COUNTER |
| 00B5 | 0A | | 724 | | ADC | | CNTR+0+C>A,C |
| 00B6 | 6F | | 725 | | CYS | | STORE MID,LD HI DIG COUNTER |
| 00B7 | 0A | | 726 | | ADC | | CNTR+0+C>A,C (ALWAYS 0) |
| 00B8 | 6F | | 727 | | CYS | | STORE HIGH DIGIT COUNTER,0>A |
| 00B9 | 1C41 | 0041 | 728 | | IOL | SOS | INPUT A/D CMPRTR,8>A IF LOW |
| 00BB | 1E | | 729 | | SKZ | | SKIP IF COMPARATOR HIGH |
| 00BC | B0 | 00B0 | 730 | | T | T3LOOP | NO COIN,CONTINUE COUNTING |
| 00BD | 7E | 0001 | 731 | | LDI | 1 | |
| 00BE | 529D | 029D | 732 | | TL | #29D | |
| | | | 733 | | | | |
| | | | 734 | | ORG | 29D | |
| 029D | 1B | | 735 | | LXA | | A/D RESET CONTROL BIT>X |
| 029E | 70 | 000F | 736 | | LDI | 15 | |
| 029F | 1D | | 737 | | DOA | | RESET A/D INTEGRATOR |
| 02A0 | 1C40 | 0040 | 738 | | IOL | SES | ENABLE DISCRETE OUTPUTS |
| 02A2 | 008C | 0073 | 739 | | LBL | #73 | |
| 02A4 | 6F | | 740 | | CYS | | LD LOW DIGIT T3 COUNTER |
| 02A5 | 3F | 0 | 741 | | EX | | LOW DIG CNTR>ADDR 73 |
| 02A6 | 17 | | 742 | | INCB | | |
| 02A7 | 6F | | 743 | | CYS | | LD MID DIGIT T3 COUNTER |
| 02A8 | 3F | 0 | 744 | | EX | | MID DIG CNTR>ADDR 74 |
| 02A9 | 0086 | 0079 | 745 | | LBL | #79 | |
| 02AB | D7 | 00D7 | 746 | | TM | >CLEAR | CLR TEMP |
| 02AC | D6 | 00D6 | 747 | | TM | >ARICL | CLR ARI |
| 02AD | 0080 | 0072 | 748 | T2CVVT | LBL | #72 | |
| 02AF | 37 | 0 | 749 | | LD | | LD HIGH DIGIT T2 COUNTER |
| 02B0 | C7 | 00C7 | 750 | | LB | >1A | |
| 02B1 | 3F | 0 | 751 | | EX | | HI DIG T2 CNTR>ARI FOR MULT |
| 02B2 | 0083 | 007C | 752 | | LBL | #7C | LD TEMP WITH 256 |
| 02B4 | 7D | 0002 | 753 | | LDI | 2 | |
| 02B5 | 2F | 0 | 754 | | EXD | | |
| 02B6 | 7A | 0005 | 755 | | LDI | 5 | |
| 02B7 | 2F | 0 | 756 | | EXD | | |
| 02B8 | 79 | 0006 | 757 | | LDI | 6 | |
| 02B9 | 3F | 0 | 758 | | EX | | |
| 02BA | 008A | 0075 | 759 | | LBL | #75 | |
| 02BC | D4 | 00D4 | 760 | | TM | >MULT | MULT HI DIG T2 CNTR BY 256 |
| 02BD | 7D | 0002 | 761 | | LDI | 2 | |
| 02BE | 52C0 | 02C0 | 762 | | TL | #2C0 | |
| | | | 763 | | | | |
| | | | 764 | | ORG | 2C0 | |
| 02C0 | D1 | 00D1 | 765 | | TM | >MOV5X | MOVE RESULT TO WGT |
| 02C1 | 2F | 0 | 766 | | EXD | | MOVE RES 6TH DIG(LSD) TO WGT |
| 02C2 | 7F | 0000 | 767 | | LDI | 0 | |
| 02C3 | 3F | 0 | 768 | | EX | | CLR WGT SIGN |
| 02C4 | CF | 00CF | 769 | | LB | >7A | |
| 02C5 | D7 | 00D7 | 770 | | TM | >CLEAR | CLR TEMP |
| 02C6 | 008E | 0071 | 771 | | LBL | #71 | |
| 02C8 | 37 | 0 | 772 | | LD | | LD MID DIGIT T2 COUNTER |
| 02C9 | C7 | 00C7 | 773 | | LB | >1A | |
| 02CA | 39 | 6 | 774 | | EX | 6 | MID DIG T2 CNTR>ARI FOR MULT |
| 02CB | 79 | 0006 | 775 | | LDI | 6 | LD TEMP WITH 16 |
| 02CC | 3F | 0 | 776 | | EX | | |
| 02CD | 17 | | 777 | | INCB | | |
| 02CE | 7E | 0001 | 778 | | LDI | 1 | |
| 02CF | 3F | 0 | 779 | | EX | | |
| 02D0 | 008A | 0075 | 780 | | LBL | #75 | |

| ADDR | CODE | ARG | STNO | | STMT | | |
|------|------|------|------|------|------|------|------|
| 02D2 | D4 | 00D4 | 781 | | TM | >MULT | MULT MID DIG T2 CNTR BY 16 |
| 02D3 | 7E | 0001 | 782 | | LDI | 1 | |
| 02D4 | D1 | 00D1 | 783 | | TM | >MOV5X | MOVE RESULT TO ARI |
| 02D5 | 2F | 0 | 784 | | EXD | | MOVE 6TH DIG(LSD) TO ARI |
| 02D6 | 70 | 000F | 785 | | LDI | 15 | |
| 02D7 | 3F | 0 | 786 | | EX | | MAKE MINUS SO SUBT WILL ADD |
| 02D8 | C8 | 00C8 | 787 | | LB | >21 | |
| 02D9 | D3 | 00D3 | 788 | | TM | >SUBT | 16XMID CNTR + 256XHIGH CNTR |
| 02DA | 70 | 0002 | 789 | | LDI | 2 | |
| 02DB | D0 | 00D0 | 790 | | TM | >MOVX | MOVE RESULT TO WGT |
| 02DC | C7 | 00C7 | 791 | | LB | >1A | |
| 02DD | D7 | 00D7 | 792 | | TM | >CLEAR | CLR ARI EXCEPT SIGN |
| 02DE | 00BF | 0070 | 793 | | LBL | #70 | |
| 02E0 | 37 | 0 | 794 | | LD | | LD LOW DIGIT T2 COUNTER |
| 02E1 | C7 | 00C7 | 795 | | LB | >1A | |
| 02E2 | 3F | 0 | 796 | | EX | | LOW DIGIT CNTR>ARI |
| 02E3 | 24 | | 797 | | RC | | |
| 02E4 | DE | 00DE | 798 | | TM | >ADDC | TRANSFORM HEX TO DECIMAL |
| 02E5 | C8 | 00C8 | 799 | | LB | >21 | |
| 02E6 | D3 | 00D3 | 800 | | TM | >SUBT | LOW + 16XMID + 256XHIGH |
| 02E7 | 70 | 0002 | 801 | | LDI | 2 | |
| 02E8 | D0 | 00D0 | 802 | | TM | >MOVX | MOVE RESULT TO WGT |
| 02E9 | D6 | 00D6 | 803 | | TM | >ARICL | CLR ARI |
| 02EA | 00BB | 0074 | 804 | T3CNVT | LBL | #74 | |
| 02EC | 37 | 0 | 805 | | LD | | LD MID DIGIT T3 COUNTER |
| 02ED | C7 | 00C7 | 806 | | LB | >1A | |
| 02EE | 61 | 000E | 807 | | ADI | 14 | |
| 02EF | B0 | 02F0 | 808 | | T | *+1 | |
| 02F0 | 3F | 0 | 809 | | EX | | MID DIG T3 CNTR>ARI |
| 02F1 | 00BA | 0075 | 810 | | LBL | #75 | |
| 02F3 | D4 | 00D4 | 811 | | TM | >MULT | MULT MID DIG T3 CNTR BY 16 |
| 02F4 | 7B | 0007 | 812 | | LDI | 7 | |
| 02F5 | D1 | 00D1 | 813 | | TM | >MOV5X | SAVE RESULT IN TEMP |
| 02F6 | 3F | 0 | 814 | | EX | | MOVE 6TH DIG(LSD) TO TEMP |
| 02F7 | D6 | 00D6 | 815 | | TM | >ARICL | CLR ARI |
| 02F8 | 008C | 0073 | 816 | | LBL | #73 | |
| 02FA | 37 | 0 | 817 | | LD | | LD LOW DIGIT T3 COUNTER |
| 02FB | C7 | 00C7 | 818 | | LB | >1A | |
| 02FC | 3F | 0 | 819 | | EX | | LOW DIG T3 CNTR>ARI |
| 02FD | 24 | | 820 | | RC | | |
| 02FE | 5300 | 0300 | 821 | | TL | #300 | |
| | | | 822 | | | | |
| | | | 823 | | ORG | 300 | |
| 0300 | DE | 00DE | 824 | | TM | >ADDC | TRANSFORM HEX TO DECIMAL |
| 0301 | 0086 | 0079 | 825 | | LBL | #79 | ADDR TEMP SIGN |
| 0303 | 70 | 000F | 826 | | LDI | 15 | |
| 0304 | 29 | 6 | 827 | | EXD | 6 | MAKE MINUS SO SUBT WILL ADD |
| 0305 | 1F | | 828 | | DECB | | |
| 0306 | D3 | 00D3 | 829 | | TM | >SUBT | 16XMID T3 CNTR + LOW T3 CNTR |
| 0307 | 7B | 0007 | 830 | | LDI | 7 | |
| 0308 | D0 | 00D0 | 831 | | TM | >MOVX | SAVE IN TEMP |
| 0309 | C7 | 00C7 | 832 | | LB | >1A | LD ARI WITH 32 |
| 030A | 70 | 0002 | 833 | | LDI | 2 | |
| 030B | 3F | 0 | 834 | | EX | | |
| 030C | 17 | | 835 | | INCB | | |
| 030D | 7C | 0003 | 836 | | LDI | 3 | |
| 030E | 3F | 0 | 837 | | EX | | |
| 030F | 00DA | 0025 | 838 | | LBL | #25 | |
| 0311 | D4 | 00D4 | 839 | | TM | >MULT | MULT T2 COUNTS IN WGT BY 32 |
| 0312 | 70 | 0002 | 840 | | LDI | 2 | |
| 0313 | D1 | 00D1 | 841 | | TM | >MOV5X | MOVE RESULT TO WGT |
| 0314 | 3F | 0 | 842 | | EX | | MOVE 6TH DIG(LSD) TO WGT |
| 0315 | 00D8 | 0027 | 843 | | LBL | #27 | |
| 0317 | D3 | 00D3 | 844 | | TM | >SUBT | T2 CNTS(WGT) - T3 CNTS(TEMP) |
| 0318 | 70 | 0002 | 845 | | LDI | 2 | |
| 0319 | D0 | 00D0 | 846 | | TM | >MOVX | MOVE FINAL RAW COUNTS TO WGT |
| 031A | D6 | 00D6 | 847 | PROCWT | TM | >ARICL | CLR ARI |
| 031B | 00DC | 0023 | 848 | | LBL | #25 | |
| 031D | D3 | 00D3 | 849 | | TM | >SUBT | SUB FILTERED WGT FROM WGT |

| ADDR | CODE | ARG | STNO | | STMT | | |
|------|------|------|------|--------|------|--------|---|
| 031E | 00E6 | 0019 | 850 | | LBL | #19 | |
| 0320 | 3F | 0 | 851 | | EX | | RESULT SIGN>ARI SIGN |
| 0321 | 00F9 | 0006 | 852 | | LBL | #06 | |
| 0323 | 7A | 0005 | 853 | | LDI | 5 | |
| 0324 | D5 | 00D5 | 854 | | TM | >MAGCK | CK FOR RESULT,LE,5 |
| 0325 | 70 | 000F | 855 | | LDI | 15 | .LE.5 RTN,15>A:DEC MOTN FLG |
| 0326 | 70 | 0002 | 856 | | LDI | 2 | .GT.5 RTN,2>A:SET MOTN FLG |
| 0327 | C0 | 00C0 | 857 | | LB | >00 | |
| 0328 | 15 | | 858 | | SKC | | SKIP,GT,5, MOTION |
| 0329 | AB | 032B | 859 | | T | *+2 | NO MOTION |
| 032A | AD | 032D | 860 | | T | *+5 | MOTION |
| 032B | 09 | | 861 | | ADSK | | DEC MOTN FLG,SKIP ON C |
| 032C | B5 | 0335 | 862 | | T | INIFLT | FLG WAS 0,EXEC INITIAL FLTR |
| 032D | 3F | 0 | 863 | | EX | | UPDATE OR SET MOTN FLG |
| 032E | 00EF | 0010 | 864 | | LBL | #10 | |
| 0330 | 7C | 0003 | 865 | | LDI | 3 | |
| 0331 | 3F | 0 | 866 | | EX | | 3>OUT FLTR CNTR:UPDT OUT WGT |
| 0332 | E5 | 00E5 | 867 | | TM | >SETRC | SET RECOMPUTE |
| 0333 | 5362 | 0362 | 868 | | TL | UDFWT | SKIP INITIAL FILTER |
| 0335 | 00D5 | 002A | 869 | INIFLT | LBL | #2A | |
| 0337 | 37 | 0 | 870 | | LD | | LD WGT LSD |
| 0338 | 00CA | 0055 | 871 | | LBL | #35 | |
| 033A | 1B | | 872 | | LXA | | WGT LSD>X |
| 033B | 2F | 0 | 873 | | EXD | | WGT LSD>1 PREV LSD,1 PREV>A |
| 033C | 3F | 0 | 874 | | EX | | 1 PREV>2 PREV LSD,2 PREV>A |
| 033D | 0C | | 875 | | EOR | | EX-OR 2 PREV WITH 1 PREV LSD |
| 033E | 5340 | 0340 | 876 | | TL | #340 | |
| | | | 877 | | | | |
| | | | 878 | | ORG | 340 | |
| 0340 | 1E | | 879 | | SKZ | | SKIP IF EQUAL |
| 0341 | 88 | 0348 | 880 | | T | FLTWGT | NOT EQ,FILTER WGT |
| 0342 | 37 | 0 | 881 | | LD | | LD 1 PREV LSD |
| 0343 | 17 | | 882 | | INCB | | |
| 0344 | 0C | | 883 | | EOR | | EX-OR 1 PREV WITH CURRENT |
| 0345 | 1E | | 884 | | SKZ | | SKIP IF EQUAL |
| 0346 | 88 | 0348 | 885 | | T | FLTWGT | NOT EQ,FILTER WGT |
| 0347 | A2 | 0362 | 886 | | T | UDFWT | ALL EQ,MOVE WGT TO FLTRD WGT |
| 0348 | 7F | 0000 | 887 | FLTWGT | LDI | 0 | |
| 0349 | 1B | | 888 | | LXA | | 0>X |
| 034A | 00F5 | 000A | 889 | | LBL | #0A | |
| 034C | 36 | 1 | 890 | | LD | 1 | LD WGT-FLTRD WGT LSD |
| 034D | 3F | 0 | 891 | LSD/2 | EX | | ARI LSD=2>ARI LSD |
| 034E | 71 | 000E | 892 | | LDI | 14 | |
| 034F | 09 | | 893 | | ADSK | | SUB 2 FROM ARI LSD,SKIP ON C |
| 0350 | 95 | 0355 | 894 | | T | FLTWT1 | ARI LSD WAS 0 OR 1,DONE |
| 0351 | 1A | | 895 | | XAX | | PARTIAL LSD/2>A,LSD-2>X |
| 0352 | 6E | 0001 | 896 | | ADI | 1 | INC PARTIAL LSD/2 |
| 0353 | 1A | | 897 | | XAX | | LSD-2>A,PARTIAL LSD/2>X |
| 0354 | 8D | 034D | 898 | | T | LSD/2 | REPEAT UNTIL LSD/2 FORMED |
| 0355 | 12 | | 899 | FLTWT1 | LAX | | LD LSD/2 |
| 0356 | 1E | | 900 | | SKZ | | SKIP IF 0 |
| 0357 | 9C | 035C | 901 | | T | *+5 | |
| 0358 | 00C5 | 003A | 902 | | LBL | #3A | |
| 035A | 7D | 0002 | 903 | | LDI | 2 | |
| 035B | A5 | 0365 | 904 | | T | UDFWT+3 | |
| 035C | 6E | 0001 | 905 | | ADI | 1 | FORM LSD/2+1 |
| 035D | 3F | 0 | 906 | | EX | | LSD/2+1>ARI LSD |
| 035E | C8 | 00C8 | 907 | | LB | >21 | |
| 035F | D3 | 00D3 | 908 | | TM | >SUBT | MODIFY WGT BY LSD/2+1 |
| 0360 | 7D | 0002 | 909 | | LDI | 2 | |
| 0361 | D0 | 00D0 | 910 | | TM | >MOVX | UPDATE WGT |
| 0362 | 00D6 | 0029 | 911 | UDFWT | LBL | #29 | |
| 0364 | 7C | 0003 | 912 | | LDI | 3 | |
| 0365 | D0 | 00D0 | 913 | | TM | >MOVX | MOVE WGT TO FILTERED WGT |
| 0366 | DC | 00DC | 914 | | TM | >FCPTY | DETERMINE CAPACITY |
| 0367 | 00E3 | 001C | 915 | | LBL | #1C | FORM DIGITAL INITIAL IN ARI |
| 0369 | 16 | | 916 | | SKF1 | | SKIP NOT 15KG |
| 036A | 79 | 0006 | 917 | | LDI | 6 | 15KG |
| 036B | 78 | 0007 | 918 | | LDI | 7 | 30LB OR 6KG |

| ADDR | CODE | ARG | STNO | | STMT | | |
|------|------|-----|------|------|------|------|------|
| 036C | 3F | 0 | 919 | | EX | | 6 OR 7>ARI LSD+2 |
| 036D | 17 | | 920 | | INCB | | |
| 036E | 15 | | 921 | | SKC | | SKIP NOT 6KG |
| 036F | 7C | 0003 | 922 | | LDI | 3 | 6KG,ARI=3700 |
| 0370 | 7E | 0001 | 923 | | LDI | 1 | 15KG;ARI=1500,30LB;ARI=1600 |
| 0371 | 3F | 0 | 924 | | EX | | 1 OR 3>ARI LSD+3 |
| 0372 | C8 | 00C8 | 925 | | LB | >21 | |
| 0373 | D3 | 00D3 | 926 | | TM | >SUBT | SUB DIG INIT FROM WGT |
| 0374 | 7D | 0002 | 927 | | LDI | 2 | |
| 0375 | D0 | 00D0 | 928 | | TM | >MOVX | UPDATE WGT |
| 0376 | CB | 00CB | 929 | | LB | >4B | |
| 0377 | 5380 | 0380 | 930 | | TL | #380 | |
| | | | 931 | * LDPPUK SUBROUTINE - LOADS ENTRY ACCUMULATOR | | | |
| | | | 932 | *   TO 2 PRE-PAK,UK 1/2 TOTAL PRICE REGISTERS | | | |
| 0379 | 00DA | 0025 | 933 | LDPPUK | LBL | #25 | |
| 037B | 3F | 0 | 934 | | EX | | A>1ST REGISTER |
| 037C | 37 | 0 | 935 | | LD | | RE-LD A |
| 037D | 17 | | 936 | | INCB | | |
| 037E | 3F | 0 | 937 | | EX | | A>2ND REGISTER |
| 037F | 05 | | 938 | | RTN | | |
| | | | 939 | | | | |
| | | | 940 | | ORG | 380 | |
| 0380 | 77 | 0008 | 941 | | LDI | 8 | |
| 0381 | 0D | | 942 | | AND | | CK FOR X10 EXPD MODE |
| 0382 | 67 | 0008 | 943 | | ADI | 8 | SKIP IF X10 EXPAND |
| 0383 | 97 | 0397 | 944 | | T | ZCAPT | |
| 0384 | 00D9 | 0026 | 945 | X10EXP | LBL | #26 | |
| 0386 | 7D | 0002 | 946 | | LDI | 2 | |
| 0387 | D5 | 00D5 | 947 | | TM | >MAGCK | CK FOR WGT,LE,2 CNTS |
| 0388 | 77 | 0008 | 948 | | LDI | 8 | .LE,2 RTN,Z LAMP ON |
| 0389 | 7F | 0000 | 949 | | LDI | 0 | .GT,2 RTN,Z LAMP OFF |
| 038A | C8 | 00C8 | 950 | | LB | >21 | |
| 038B | 3F | 0 | 951 | | EX | | UPDATE Z LAMP |
| 038C | 25 | | 952 | | RF2 | | NOTE X10 EXP |
| 038D | DF | 00DF | 953 | | TM | >UDOWT | |
| 038E | DA | 00DA | 954 | | TM | >BLANK | BLANK PRICE |
| 038F | 009B | 0064 | 955 | | LBL | #64 | |
| 0391 | DA | 00DA | 956 | | TM | >BLANK | BLANK TOTAL PRICE |
| 0392 | D8 | 00D8 | 957 | X10CLR | TM | >CLRT | CLR TARE |
| 0393 | 00B6 | 0049 | 958 | | LBL | #49 | |
| 0395 | D7 | 00D7 | 959 | | TM | >CLEAR | CLR AUTO ZERO |
| 0396 | E7 | 00E7 | 960 | | TM | >OUTP> | GO TO OUTPUT |
| 0397 | 7B | 0004 | 961 | ZCAPT | LDI | 4 | |
| 0398 | 0D | | 962 | | AND | | CK FOR Z KEY |
| 0399 | 1E | | 963 | | SKZ | | SKIP IF TRUE |
| 039A | B1 | 03B1 | 964 | | T | CZTIM | FALSE,CLR Z KEY TIMER |
| 039B | C5 | 00C5 | 965 | | LB | >12 | |
| 039C | 37 | 0 | 966 | | LD | | LD NET FLAG |
| 039D | 1E | | 967 | | SKZ | | SKIP NOT NET |
| 039E | B1 | 03B1 | 968 | | T | CZTIM | NET,NO Z KEY ALLOWED |
| 039F | C0 | 00C0 | 969 | | LB | >00 | |
| 03A0 | 34 | 3 | 970 | | LD | 3 | LD MOTION FLAG |
| 03A1 | 1E | | 971 | | SKZ | | SKIP IF NO MOTION |
| 03A2 | B1 | 03B1 | 972 | | T | CZTIM | MOTION |
| 03A3 | 7D | 0002 | 973 | | LDI | 2 | |
| 03A4 | 0B | | 974 | | AD | | INC Z KEY TIMER |
| 03A5 | 3F | 0 | 975 | | EX | | UPDATE |
| 03A6 | 15 | | 976 | | SKC | | SKIP IF TIMER DONE |
| 03A7 | B5 | 03B5 | 977 | | T | SUBAZ | STILL COUNTING |
| 03A8 | 00DB | 0024 | 978 | | LBL | #24 | TIMER DONE |
| 03AA | 0230 | 0230 | 979 | | TML | MAXAZ | CK FOR WGT,LT,400 CNTS |
| 03AC | B5 | 03B5 | 980 | | T | SUBAZ | .GE,400 CNT RTN |
| 03AD | 00CE | 0031 | 981 | | LBL | #31 | .LT,400 CNT RTN |
| 03AF | 70 | 000F | 982 | | LDI | 15 | |
| 03B0 | 3F | 0 | 983 | | EX | | SET Z DONE FLAG |
| 03B1 | 00CF | 0030 | 984 | CZTIM | LBL | #30 | |
| 03B3 | 7F | 0000 | 985 | | LDI | 0 | |
| 03B4 | 3F | 0 | 986 | | EX | | CLR Z KEY TIMER |
| 03B5 | 00DB | 0024 | 987 | SUBAZ | LBL | #24 | |

| ADDR | CODE | ARG | STNO | | STMT | | |
|------|------|-----|------|------|------|------|------|
| 03B7 | D3 | 00D3 | 988 | | TM | >SUBT | SUB AUTO-ZERO FROM WGT |
| 03B8 | 7D | 0002 | 989 | | LDI | 2 | |
| 03B9 | D0 | 00D0 | 990 | | TM | >MOVX | UPDATE WGT |
| 03BA | D6 | 00D6 | 991 | | TM | >ARICL | |
| 03BB | 00E4 | 001B | 992 | | LBL | #1B | SET ARI=30050 |
| 03BD | 7A | 0005 | 993 | | LDI | 5 | |
| 03BE | 53C0 | 03C0 | 994 | | TL | #3C0 | |
| | | | 995 | | | | |
| | | | 996 | | ORG | 3C0 | |
| 03C0 | 3F | 0 | 997 | | EX | | |
| 03C1 | 00E1 | 001E | 998 | | LBL | #1E | |
| 03C3 | 7C | 0003 | 999 | | LDI | 3 | |
| 03C4 | 3F | 0 | 1000 | | EX | | |
| 03C5 | C8 | 00C8 | 1001 | | LB | >21 | |
| 03C6 | D3 | 00D3 | 1002 | | TM | >SUBT | CK FOR OVERCAP |
| 03C7 | 1E | | 1003 | | SKZ | | SKIP IF OVERCAP |
| 03C8 | 8D | 03CD | 1004 | | T | CKGAZC | NOT OVERCAP |
| 03C9 | CE | 00CE | 1005 | BLNKWT | LB | >6E | |
| 03CA | DA | 00DA | 1006 | | TM | >BLANK | BLANK OUT WGT |
| 03CB | 559A | 059A | 1007 | | TL | TPBLK | BLANK TOTAL PRICE |
| 03CD | 00D9 | 0026 | 1008 | CKGAZC | LBL | #26 | CK GROSS AUTO-ZERO CRCN |
| 03CF | 7B | 0004 | 1009 | | LDI | 4 | |
| 03D0 | D5 | 00D5 | 1010 | | TM | >MAGCK | CK FOR WGT,LE,4 CNTS |
| 03D1 | 0E | | 1011 | | COMP | | .LE.4 RTN,A>0 IF WGT 0 |
| 03D2 | C1 | 00C1 | 1012 | | LB | >01 | .GT.4 RTN,ADDR Z GRAD FLAG |
| 03D3 | 3F | 0 | 1013 | | EX | | SAVE A IN Z GRAD FLAG,FLAG>A |
| 03D4 | 15 | | 1014 | | SKC | | SKIP IF WGT,GT,4 CNTS |
| 03D5 | 70 | 000F | 1015 | | LDI | 15 | 15>A TO SET Z GRAD FLAG |
| 03D6 | 7F | 0000 | 1016 | | LDI | 0 | 0>A TO CLR Z GRAD FLAG |
| 03D7 | 3F | 0 | 1017 | | EX | | UPDT Z GRAD FLAG,MAGCK RTN>A |
| 03D8 | 60 | 000F | 1018 | | ADI | 15 | SKIP IF WGT NOT 0 |
| 03D9 | 9E | 03DE | 1019 | | T | MFCTR | WGT 0,SKIP CORRECTION |
| 03DA | 22 | | 1020 | | SF1 | | NOTE GROSS CORRECTION |
| 03DB | 15 | | 1021 | | SKC | | SKIP IF WGT,GT,4 CNTS |
| 03DC | E6 | 00E6 | 1022 | | TM | >CRTAZ | .LE.4 CNTS,DO GROSS A-Z CRCN |
| 03DD | 9E | 03DE | 1023 | | T | *+1 | |
| 03DE | DC | 00DC | 1024 | MFCTR | TM | >FCPTY | A=1:30LB,2:6KG,5:15KG |
| 03DF | 3F | 0 | 1025 | | EX | | WRITE MULTIPLE TO ARI LSD |
| 03E0 | 00DA | 0025 | 1026 | | LBL | #25 | |
| 03E2 | D4 | 00D4 | 1027 | | TM | >MULT | MULT WGT BY MULTIPLE |
| 03E3 | 7D | 0002 | 1028 | | LDI | 2 | |
| 03E4 | D1 | 00D1 | 1029 | | TM | >MOVSX | UPDATE WGT 5 MSDS |
| 03E5 | 2B | 4 | 1030 | | EXD | 4 | UPDATE WGT 6TH DIG(LSD) |
| 03E6 | 77 | 0008 | 1031 | | LDI | 8 | 8>A |
| 03E7 | 0D | | 1032 | | AND | | .AND.WITH PRICE MSD |
| 03E8 | 1E | | 1033 | | SKZ | | SKIP IF PRICE MSD,LT,8 |
| 03E9 | D9 | 00D9 | 1034 | | TM | >CLRPR | .GE.8,INVALID PRICE |
| 03EA | 00CE | 0031 | 1035 | | LBL | #31 | |
| 03EC | 37 | 0 | 1036 | | LD | | LD Z DONE FLAG |
| 03ED | 5400 | 0400 | 1037 | | TL | #400 | |
| | | | 1038 | * CRCTAZ SUBROUTINE - CORRECTS AUTO ZERO REGISTER | | | |
| | | | 1039 | * BY ONE COUNT TO BRING WGT TOWARD 0 | | | |
| 03EF | D6 | 00D6 | 1040 | CRCTAZ | TM | >ARICL | CLR ARI |
| 03F0 | C7 | 00C7 | 1041 | | LB | >1A | |
| 03F1 | 7E | 0001 | 1042 | | LDI | 1 | 1>A |
| 03F2 | 2C | 3 | 1043 | | EXD | 3 | CORRECTION OF 1>ARI LSD |
| 03F3 | 34 | 3 | 1044 | | LD | 3 | LD WGT SIGN |
| 03F4 | 0E | | 1045 | | COMP | | COM FOR AUTO ZERO CORRECTION |
| 03F5 | 3F | 0 | 1046 | | EX | | .COM.WGT SIGN>ARI SIGN |
| 03F6 | 00BE | 0041 | 1047 | | LBL | #41 | |
| 03F8 | 16 | | 1048 | | SKF1 | | SKIP IF GROSS CORRECTION |
| 03F9 | 36 | 1 | 1049 | | LD | 1 | NET,ADDR TARE REG |
| 03FA | D3 | 00D3 | 1050 | | TM | >SUBT | CORRECT AUTO-ZERO BY 1 |
| 03FB | 16 | | 1051 | | SKF1 | | SKIP IF GROSS CORRECTION |
| 03FC | 05 | | 1052 | | RTN | | NET,RETURN |
| 03FD | C3 | 00C3 | 1053 | | LB | >04 | |
| 03FE | 5230 | 0230 | 1054 | | TL | MAXAZ | CK FOR,LT,400 CNTS |
| | | | 1055 | | | | |
| | | | 1056 | | ORG | 400 | |

| ADDR | CODE | ARG | STNO | | STMT | | |
|------|------|------|------|-------|------|------|------|
| 0400 | 6E | 0001 | 1057 | | ADI | 1 | SKIP IF Z DONE SINCE PWR UP |
| 0401 | A4 | 0424 | 1058 | | T | STARE-1 | NO Z DONE |
| 0402 | 00FC | 0003 | 1059 | | LBL | #03 | |
| 0404 | 3F | 0 | 1060 | | EX | | MAN TARE FLAG>A,0>MAN T FLAG |
| 0405 | 67 | 0008 | 1061 | | ADI | 8 | SKIP IF FLAG SET |
| 0406 | A5 | 0425 | 1062 | | T | STARE | FLAG CLR |
| 0407 | C0 | 00C0 | 1063 | | LB | >00 | |
| 0408 | 37 | 0 | 1064 | | LD | | LD MOTION FLAG |
| 0409 | 00D0 | 002F | 1065 | | LBL | #2F | |
| 040B | 0F | | 1066 | | OR | | ,OR,WITH WGT MSD |
| 040C | 1E | | 1067 | | SKZ | | SKIP IF MSD 0,AND,NO MOTION |
| 040D | A5 | 0425 | 1068 | | T | STARE | MSD NOT 0,OR,MOTION |
| 040E | C1 | 00C1 | 1069 | | LB | >01 | |
| 040F | 7E | 0001 | 1070 | | LDI | 1 | |
| 0410 | 0B | | 1071 | | AD | | A>0,C>1 IF IN ZERO GRAD |
| 0411 | C9 | 00C9 | 1072 | | LB | >29 | |
| 0412 | 0D | | 1073 | | AND | | ,AND,WGT SIGN WITH 0 OR 1 |
| 0413 | 1E | | 1074 | | SKZ | | SKIP WGT PLUS,OR,ZERO GRAD |
| 0414 | A5 | 0425 | 1075 | | T | STARE | WGT MINUS,AND,NOT ZERO GRAD |
| 0415 | 17 | | 1076 | | INCB | | ADDR WGT |
| 0416 | 15 | | 1077 | | SKC | | SKIP IF IN ZERO GRAD |
| 0417 | 9A | 041A | 1078 | | T | *+3 | NOT ZERO GRAD |
| 0418 | D6 | 00D6 | 1079 | | TM | >ARICL | CLR ARI TO GET 0 FIELD |
| 0419 | C7 | 00C7 | 1080 | | LB | >1A | CHANGE ADDR TO ARI |
| 041A | 7A | 0005 | 1081 | | LDI | 5 | |
| 041B | D0 | 00D0 | 1082 | | TM | >MOVX | MOVE WGT OR 0S TO TARE |
| 041C | C5 | 00C5 | 1083 | | LB | >12 | |
| 041D | 15 | | 1084 | | SKC | | SKIP SETTING NET IF Z GRAD |
| 041E | 77 | 0008 | 1085 | | LDI | 8 | SET NET |
| 041F | 7F | 0000 | 1086 | | LDI | 0 | CLR NET |
| 0420 | 3E | 1 | 1087 | | EX | 1 | UPDATE NET FLAG |
| 0421 | 70 | 000F | 1088 | | LDI | 15 | |
| 0422 | 3F | 0 | 1089 | | EX | | SET TARE DONE FLAG |
| 0423 | E5 | 00E5 | 1090 | | TM | >SETRC | SET RECOMPUTE |
| 0424 | D9 | 00D9 | 1091 | | TM | >CLRPR | CLR PRICE,TOTAL PRICE |
| 0425 | 00DA | 0025 | 1092 | STARE | LBL | #25 | |
| 0427 | D3 | 00D3 | 1093 | | TM | >SUBT | SUBT TARE FROM WGT |
| 0428 | 70 | 0002 | 1094 | | LDI | 2 | |
| 0429 | D0 | 00D0 | 1095 | | TM | >MOVX | UPDATE WGT |
| 042A | 00D9 | 0026 | 1096 | CKNAZC | LBL | #26 | |
| 042C | 7F | 0000 | 1097 | | LDI | 0 | |
| 042D | D5 | 00D5 | 1098 | | TM | >MAGCK | CK FOR WGT 0 |
| 042E | 83 | 0433 | 1099 | | T | CKACL> | WGT 0 RTN,SKIP CRRCTN |
| 042F | C5 | 00C5 | 1100 | | LB | >12 | |
| 0430 | 37 | 0 | 1101 | | LD | | LD NET FLAG |
| 0431 | 1E | | 1102 | | SKZ | | SKIP NOT NET |
| 0432 | 85 | 0435 | 1103 | | T | *+3 | NET,CK A-Z CORRECTION |
| 0433 | 544E | 044E | 1104 | CKACL> | TL | CKACLR | NOT NET,SKIP A-Z CRRCTN |
| 0435 | DC | 00DC | 1105 | | TM | >FCPTY | CK NET AUTO ZERO CRRCTN |
| 0436 | 15 | | 1106 | | SKC | | SKIP NOT 6KG |
| 0437 | 76 | 0009 | 1107 | | LDI | 9 | |
| 0438 | 7A | 0005 | 1108 | | LDI | 5 | |
| 0439 | 3F | 0 | 1109 | | EX | | ARI LSD=9:6KG,5:15KG,30LB |
| 043A | 17 | | 1110 | | INCB | | |
| 043B | 16 | | 1111 | | SKF1 | | SKIP NOT 15KG |
| 043C | 70 | 0002 | 1112 | | LDI | 2 | |
| 043D | 5440 | 0440 | 1113 | | TL | #440 | |
| | | | 1114 | | | | |
| | | | 1115 | | ORG | 440 | |
| 0440 | 3F | 0 | 1116 | | EX | | ARI=25:15KG,0>A |
| 0441 | C4 | 00C4 | 1117 | | LB | >09 | |
| 0442 | 3F | 0 | 1118 | | EX | | CLR RESULT SIGN |
| 0443 | C7 | 00C7 | 1119 | | LB | >1A | |
| 0444 | 70 | 0002 | 1120 | | LDI | 2 | |
| 0445 | 1B | | 1121 | | LXA | | |
| 0446 | E1 | 00E1 | 1122 | | TM | >SUBL | CK FOR WGT,LE,4 CNTS,A>0,GT, |
| 0447 | 26 | | 1123 | | RF1 | | NOTE NET CORRECTION |
| 0448 | 6E | 0001 | 1124 | | ADI | 1 | SKIP IF WGT,LE,4 CNTS |
| 0449 | 8E | 044E | 1125 | | T | CKACLR | ,GT,4 CNTS,SKIP CRRCTN |

| ADDR | CODE | ARG | STNO | | STMT | | |
|------|------|------|------|------|------|------|------|
| 044A | E6 | 00E6 | 1126 | | TM | >CRTAZ | ,LE,4,DO NET A-Z CRRCTN |
| 044B | C4 | 00C4 | 1127 | | LB | >09 | |
| 044C | 7A | 0005 | 1128 | | LDI | 5 | |
| 044D | D0 | 00D0 | 1129 | | TM | >MOVX | MOVE RESULT TO TARE |
| 044E | DC | 00DC | 1130 | CKACLR | TM | >FCPTY | A=1:30LB,2:6KG,5:15KG |
| 044F | 00E3 | 001C | 1131 | | LBL | #1C | |
| 0451 | 3F | 0 | 1132 | | EX | | A>ARI LSD+2 |
| 0452 | C8 | 00C8 | 1133 | | LB | >21 | |
| 0453 | D3 | 00D3 | 1134 | | TM | >SUBT | CK FOR 10 INC AUTO CLR WGT |
| 0454 | 1B | | 1135 | | LXA | | RESULT SIGN >X,0 IF,GE,10 G |
| 0455 | CA | 00CA | 1136 | | LB | >53 | |
| 0456 | 75 | 000A | 1137 | | LDI | 10 | 10>A |
| 0457 | 0B | | 1138 | | AD | | ADD AUTO CLR FLG,C>1 IF 6 |
| 0458 | 12 | | 1139 | | LAX | | RE-LD RESULT SIGN |
| 0459 | 6E | 0001 | 1140 | | ADI | 1 | SKIP IF WGT,LT,AUTO CLR WGT |
| 045A | AB | 046B | 1141 | | T | CKINC | ,GE,AUTO CLR WGT |
| 045B | 3F | 0 | 1142 | | EX | | CLR AUTO CLR FLAG |
| 045C | 15 | | 1143 | | SKC | | SKIP IF AUTO CLR FLAG,EQ,6 |
| 045D | B1 | 0471 | 1144 | | T | ZLAMP | ,LT,6 |
| 045E | CB | 00CB | 1145 | | LB | >4B | |
| 045F | 7C | 0003 | 1146 | | LDI | 3 | |
| 0460 | 0D | | 1147 | | AND | | CK FOR PRE-PAK OR BY CNT |
| 0461 | 62 | 000D | 1148 | | ADI | 13 | SKIP NOT PRE-PAK OR BY CNT |
| 0462 | B1 | 0471 | 1149 | | T | ZLAMP | PRE-PAK:BY CNT,SKIP AUTO CLR |
| 0463 | 00AC | 0053 | 1150 | | LBL | #53 | |
| 0465 | 37 | 0 | 1151 | | LD | | LD AUTO CLR PR AND TARE ENB |
| 0466 | 67 | 0008 | 1152 | | ADI | 8 | SKIP IF ENABLED |
| 0467 | B1 | 0471 | 1153 | | T | ZLAMP | NOT ENABLED |
| 0468 | D8 | 00D8 | 1154 | | TM | >CLRT | CLR TARE |
| 0469 | D9 | 00D9 | 1155 | | TM | >CLRPR | CLR PRICE,TOTAL PRICE |
| 046A | B1 | 0471 | 1156 | | T | ZLAMP | |
| 046B | 15 | | 1157 | CKINC | SKC | | SKIP IF AUTO CLR FLAG,EQ,6 |
| 046C | AE | 046E | 1158 | | T | *+2 | ,LT,6 |
| 046D | B1 | 0471 | 1159 | | T | ZLAMP | ,EQ,6,SKIP INCREMENTING |
| 046E | 7E | 0001 | 1160 | | LDI | 1 | |
| 046F | 0B | | 1161 | | AD | | INC AUTO CLR FLAG |
| 0470 | 3F | 0 | 1162 | | EX | | UPDATE AUTO CLR FLAG |
| 0471 | DC | 00DC | 1163 | ZLAMP | TM | >FCPTY | A=1:30LB,2:6KG,5:15KG |
| 0472 | 3F | 0 | 1164 | | EX | | A>ARI LSD |
| 0473 | 37 | 0 | 1165 | | LD | | RE-LD A |
| 0474 | 16 | | 1166 | | SKF1 | | SKIP ON FLG1,6KG,OR 30LB |
| 0475 | 71 | 000E | 1167 | | LDI | 14 | 15KG,LD 14 INSTEAD |
| 0476 | 6E | 0001 | 1168 | | ADI | 1 | INC |
| 0477 | 0B | | 1169 | | AD | | FORM 2A+1 OR 4 (15KG) |
| 0478 | 3F | 0 | 1170 | | EX | | 3,5 OR 4>ARI LSD;1,2,OR 5>A |
| 0479 | 63 | 000C | 1171 | | ADI | 12 | ADD 12,SKIP ON C,A>1 IF 15KG |
| 047A | BD | 047D | 1172 | | T | *+3 | NOT 15KG |
| 047B | 17 | | 1173 | | INCB | | |
| 047C | 3F | 0 | 1174 | | EX | | 15KG,1>ARI LSD+1 |
| 047D | C4 | 00C4 | 1175 | | LB | >09 | |
| 047E | 5480 | 0480 | 1176 | | TL | #480 | |
| | | | 1177 | | | | |
| | | | 1178 | | ORG | 480 | |
| 0480 | 7F | 0000 | 1179 | | LDI | 0 | |
| 0481 | 3F | 0 | 1180 | | EX | | 0>RESULT SIGN |
| 0482 | C7 | 00C7 | 1181 | | LB | >1A | |
| 0483 | 7D | 0002 | 1182 | | LDI | 2 | |
| 0484 | 1B | | 1183 | | LXA | | |
| 0485 | E1 | 00E1 | 1184 | | TM | >SUBL | CK FOR WGT,LE,2 CNTS,A>0,GT, |
| 0486 | 00EE | 0011 | 1185 | | LBL | #11 | ADDR ZERO LAMP FLAG |
| 0488 | 1E | | 1186 | | SKZ | | SKIP IF RES PLUS,Z LAMP OFF |
| 0489 | 8C | 048C | 1187 | | T | *+3 | RE NEG, DEC ZERO LAMP FLAG |
| 048A | 7D | 0002 | 1188 | | LDI | 2 | |
| 048B | 8E | 048E | 1189 | | T | UDZLF | TURN OFF ZERO LAMP |
| 048C | 09 | | 1190 | | ADSK | | DEC Z LMP FLG,SKIP WAS NOT 0 |
| 048D | 8F | 048F | 1191 | | T | *+2 | WAS 0,SKIP UPDATE |
| 048E | 3F | 0 | 1192 | UDZLF | EX | | UPDATE ZERO LAMP FLAG |
| 048F | DC | 00DC | 1193 | | TM | >FCPTY | C=0:6KG;C=1:30LB,15KG |
| 0490 | 36 | 1 | 1194 | | LD | 1 | 0>A |

| ADDR | CODE | ARG | STNO | | STMT | | |
|------|------|------|------|------|------|------|------|
| 0491 | 3D | 2 | 1195 | | EX | 2 | CLR SUBT RESULT LSD |
| 0492 | 15 | | 1196 | | SKC | | SKIP IF 30LB OR 15KG |
| 0493 | 9A | 049A | 1197 | | T | RNDBY2 | 6KG |
| 0494 | DD | 00DD | 1198 | | TM | >RNDOF | ROUND OFF 6 DIG WGT LSD |
| 0495 | 00D4 | 002B | 1199 | | LBL | #2B | |
| 0497 | 16 | | 1200 | | SKF1 | | SKIP IF 30LB SCALE |
| 0498 | A0 | 04A0 | 1201 | | T | RNDBY5 | 15KG |
| 0499 | AA | 04AA | 1202 | | T | OUTFLT | 30LB |
| 049A | 17 | | 1203 | RNDBY2 | INCB | | |
| 049B | 7E | 0001 | 1204 | | LDI | 1 | 6KG |
| 049C | 0D | | 1205 | | AND | | A>0 IF 5 DIG LSD EVEN |
| 049D | 1E | | 1206 | | SKZ | | SKIP IF EVEN,C=0 FROM RNDOFF |
| 049E | 20 | | 1207 | | SC | | ODD,SET C |
| 049F | A9 | 04A9 | 1208 | | T | RNDWT2 | |
| 04A0 | 72 | 000D | 1209 | RNDBY5 | LDI | 13 | 13>A |
| 04A1 | 09 | | 1210 | | ADSK | | ADD 5 DIG LSD, SKIP ON C |
| 04A2 | A6 | 04A6 | 1211 | | T | RNDWT1 | 5 DIG LSD,LT,3 |
| 04A3 | 77 | 0008 | 1212 | | LDI | 8 | 5 DIG LSD,GE,3,8>A |
| 04A4 | 09 | | 1213 | | ADSK | | ADD 5 DIG LSD,SKIP ON C |
| 04A5 | 7A | 0005 | 1214 | | LDI | 5 | 5 DIG LSD,GE,3 AND ,LT,8,5>A |
| 04A6 | 7F | 0000 | 1215 | RNDWT1 | LDI | 0 | 5 DIG LSD,LT,3 OR ,GE,8,0>A |
| 04A7 | 3F | 0 | 1216 | | EX | | UPDATE 5 DIG LSD WITH 0 OR 5 |
| 04A8 | 17 | | 1217 | | INCB | | |
| 04A9 | DE | 00DE | 1218 | RNDWT2 | TM | >ADDC | INC WGT FIELD IF C SET |
| 04AA | CE | 00CE | 1219 | OUTFLT | LB | >6E | |
| 04AB | 7E | 0001 | 1220 | | LDI | 1 | |
| 04AC | D1 | 00D1 | 1221 | | TM | >MOVSX | MOVE OUT WGT TO ARI |
| 04AD | 00E0 | 001F | 1222 | | LBL | #1F | |
| 04AF | 71 | 000E | 1223 | | LDI | 14 | 14>A |
| 04B0 | 0C | | 1224 | | EOR | | EX-OR WITH OUT WGT MSD |
| 04B1 | 6D | 0002 | 1225 | | ADI | 2 | SKIP IF WAS 1,A>1 |
| 04B2 | 7F | 0000 | 1226 | | LDI | 0 | WAS MINUS OR BLANK |
| 04B3 | 3F | 0 | 1227 | | EX | | UPDATE OUT WGT MSD |
| 04B4 | 00F5 | 000A | 1228 | | LBL | #0A | |
| 04B6 | 7F | 0000 | 1229 | | LDI | 0 | |
| 04B7 | 3E | 1 | 1230 | | EX | 1 | CLR SUBT RESULT LSD |
| 04B8 | 17 | | 1231 | | INCB | | |
| 04B9 | 7D | 0002 | 1232 | | LDI | 2 | |
| 04BA | 1B | | 1233 | | LXA | | |
| 04BB | E1 | 00E1 | 1234 | | TM | >SUBL | SUB OUT WGT FROM 5 MSDS WGT |
| 04BC | C0 | 00C0 | 1235 | | LB | >00 | |
| 04BD | 37 | 0 | 1236 | | LD | | LD MOTN FLAG |
| 04BE | 54C0 | 04C0 | 1237 | | TL | #4C0 | |
| | | | 1238 | | | | |
| | | | 1239 | | ORG | 4C0 | |
| 04C0 | 1E | | 1240 | | SKZ | | SKIP IF NO MOTION |
| 04C1 | 90 | 04D0 | 1241 | | T | OUTF1 | MOTION |
| 04C2 | DC | 00DC | 1242 | | TM | >FCPTY | A=1:30LB,2:6KG,5:15KG |
| 04C3 | 00FA | 0005 | 1243 | | LBL | #05 | |
| 04C5 | D5 | 00D5 | 1244 | | TM | >MAGCK | CK FOR RESULT,LE,A |
| 04C6 | 88 | 04C8 | 1245 | | T | *+2 | ,LE, |
| 04C7 | 90 | 04D0 | 1246 | | T | OUTF1 | ,GT, |
| 04C8 | 00EF | 0010 | 1247 | | LBL | #10 | |
| 04CA | 6E | 0001 | 1248 | | ADI | 1 | A>0,C>1 IF ALL 0S IN RESULT |
| 04CB | 8D | 04CD | 1249 | | T | *+2 | RESULT NOT 0 |
| 04CC | 9E | 04DE | 1250 | | T | OUTF2+2 | RESULT 0,CLR OUT FLTR CNTR |
| 04CD | 72 | 000D | 1251 | | LDI | 13 | 13>A |
| 04CE | 09 | | 1252 | | ADSK | | ADD OUT FLTR CNTR,SKIP ON C |
| 04CF | 9C | 04DC | 1253 | | T | OUTF2 | OUT FLTR CNTR,LT,3 |
| 04D0 | 21 | | 1254 | OUTF1 | SF2 | | NOTE WANT 5 MSDS |
| 04D1 | E4 | 00E4 | 1255 | | TM | >MODE | CK FOR BY COUNT MODE |
| 04D2 | 94 | 04D4 | 1256 | | T | *+2 | NOT BY COUNT |
| 04D3 | 98 | 04D8 | 1257 | | T | CLROFC | BY COUNT,IGNORE OUT FLT CNTR |
| 04D4 | DF | 00DF | 1258 | | TM | >UDOWT | OUT FLTR CNTR 3,UPDT OUT WGT |
| 04D5 | E5 | 00E5 | 1259 | | TM | >SETRC | SET RECOMPUTE |
| 04D6 | 7F | 0000 | 1260 | | LDI | 0 | |
| 04D7 | 3F | 0 | 1261 | | EX | | CLR PRINT FLAG |
| 04D8 | 00EF | 0010 | 1262 | CLROFC | LBL | #10 | |
| 04DA | 7F | 0000 | 1263 | | LDI | 0 | 0>A TO CLR OUT FLTR CNTR |
| 04DB | 9E | 04DE | 1264 | | T | OUTF2+2 | |
| 04DC | 7E | 0001 | 1265 | OUTF2 | LDI | 1 | |

| ADDR | CODE | ARG | STNO | | STMT | | |
|------|------|-----|------|------|------|------|------|
| 04DD | 0B | | 1266 | | AD | | INC OUT FLTR CNTR |
| 04DE | 3E | 1 | 1267 | | EX | 1 | UPDATE OUT FLTR CNTR |
| 04DF | 35 | 2 | 1268 | LDLMPS | LD | 2 | LD MOTION FLAG |
| 04E0 | 1E | | 1269 | | SKZ | | SKIP NO MOTION |
| 04E1 | 7F | 0000 | 1270 | | LDI | 0 | MOTION |
| 04E2 | 77 | 0008 | 1271 | | LDI | 8 | NO MOTION |
| 04E3 | 3C | 3 | 1272 | | EX | 3 | UPDATE LB/KG LAMP |
| 04E4 | 17 | | 1273 | | INCB | | |
| 04E5 | 34 | 3 | 1274 | | LD | 3 | LD Z LAMP FLAG |
| 04E6 | 1E | | 1275 | | SKZ | | SKIP IF 0,LAMP ON |
| 04E7 | 7F | 0000 | 1276 | | LDI | 0 | FLAG NOT 0 |
| 04E8 | 77 | 0008 | 1277 | | LDI | 8 | FLAG 0 |
| 04E9 | 3C | 3 | 1278 | | EX | 3 | UPDATE ZERO LAMP |
| 04EA | 17 | | 1279 | | INCB | | |
| 04EB | 34 | 3 | 1280 | | LD | 3 | LD NET FLAG |
| 04EC | 3C | 3 | 1281 | | EX | 3 | UPDATE NET LAMP |
| 04ED | 17 | | 1282 | | INCB | | |
| 04EE | 7D | 0002 | 1283 | | LDI | 2 | |
| 04EF | 0D | | 1284 | | AND | | CK FOR PER 1/2 |
| 04F0 | 1E | | 1285 | | SKZ | | SKIP NO PER 1/2 |
| 04F1 | 77 | 0008 | 1286 | | LDI | 8 | PER 1/2 |
| 04F2 | 00DC | 0023 | 1287 | | LBL | #23 | |
| 04F4 | 3C | 3 | 1288 | | EX | 3 | UPDATE PER 1/2 LAMP |
| 04F5 | 7B | 0004 | 1289 | | LDI | 4 | |
| 04F6 | 0D | | 1290 | | AND | | CK FOR PER 1/4 |
| 04F7 | 1E | | 1291 | | SKZ | | SKIP NO PER 1/4 |
| 04F8 | 77 | 0008 | 1292 | | LDI | 8 | PER 1/4 |
| 04F9 | 00DB | 0024 | 1293 | | LBL | #24 | |
| 04FB | 39 | 6 | 1294 | | EX | 6 | UPDATE PER 1/4 LAMP |
| 04FC | 17 | | 1295 | | INCB | | |
| 04FD | 37 | 0 | 1296 | | LD | | LD UK ENB |
| 04FE | 5500 | 0500 | 1297 | | TL | #500 | |
| | | | 1298 | | | | |
| | | | 1299 | | ORG | 500 | |
| 0500 | 1E | | 1300 | | SKZ | | SKIP NOT UK SCALE |
| 0501 | 8A | 050A | 1301 | | T | ITLKCK | SKIP PRE-PAK LAMPS |
| 0502 | CB | 00CB | 1302 | | LB | >48 | |
| 0503 | 7C | 0003 | 1303 | | LDI | 3 | |
| 0504 | 0D | | 1304 | | AND | | CK FOR PRE-PAK OR BY CNT |
| 0505 | 62 | 000D | 1305 | | ADI | 15 | SKIP NOT PRE-PAK OR BY CNT |
| 0506 | 77 | 0008 | 1306 | | LDI | 8 | PRE-PAK OR BY CNT |
| 0507 | 7F | 0000 | 1307 | | LDI | 0 | NOT PRE-PAK OR BY CNT |
| 0508 | 0379 | 0379 | 1308 | | TML | LDPPUK | UPDATE 2 PRE-PAK LAMPS |
| 050A | E4 | 00E4 | 1309 | ITLKCK | TM | >MODE | CK FOR BY COUNT MODE |
| 050B | 90 | 0510 | 1310 | | T | TDUNCK | NOT BY COUNT |
| 050C | CE | 00CE | 1311 | | LB | >6E | |
| 050D | DA | 00DA | 1312 | | TM | >BLANK | BLANK OUT WGT |
| 050E | 3F | 0 | 1313 | | EX | | RESTORE PRINT FLAG |
| 050F | 99 | 0519 | 1314 | | T | TPCLR+2 | |
| 0510 | C2 | 00C2 | 1315 | TDUNCK | LB | >02 | |
| 0511 | 33 | 4 | 1316 | | LD | 4 | LD TARE DONE FLAG |
| 0512 | 1E | | 1317 | | SKZ | | SKIP IF TARE NOT DONE |
| 0513 | A0 | 0520 | 1318 | | T | CKRCP | |
| 0514 | 37 | 0 | 1319 | | LD | | LD TARE MANDATORY ENB |
| 0515 | 67 | 0008 | 1320 | | ADI | 8 | SKIP IF MANDATORY |
| 0516 | A0 | 0520 | 1321 | | T | CKRCP | NOT MANDATORY |
| 0517 | 01C7 | 01C7 | 1322 | TPCLR | TML | CKWSGN | WGT +:0S,WGT -:15S>TOT PRICE |
| 0519 | CC | 00CC | 1323 | | LB | >57 | |
| 051A | 7F | 0000 | 1324 | | LDI | 0 | |
| 051B | 3F | 0 | 1325 | | EX | | RECOMP>A,0>RECOMP |
| 051C | 60 | 000F | 1326 | | ADI | 15 | SKIP IF RECOMPUTE SET |
| 051D | A5 | 0525 | 1327 | | T | LMOUT> | GO TO OUT LMPS AND KEYBD |
| 051E | 559D | 059D | 1328 | | TL | TPBLK+3 | CLR TP 1/2 IF UK,OUTPUT |
| 0520 | CC | 00CC | 1329 | CKRCP | LB | >57 | |
| 0521 | 7F | 0000 | 1330 | | LDI | 0 | |
| 0522 | 3F | 0 | 1331 | | EX | | RECOMPUTE>A,0>RECOMPUTE |
| 0523 | 1E | | 1332 | | SKZ | | SKIP IF RECOMPUTE CLR |
| 0524 | A7 | 0527 | 1333 | | T | CMPUT | DO RECOMPUTE |
| 0525 | 55F4 | 05F4 | 1334 | LMOUT> | TL | LMPOUT | SKIP DISPLAY OUTPUT |
| 0527 | D6 | 00D6 | 1335 | CMPUT | TM | >ARICL | |

| ADDR | CODE | ARG | STNO | | STMT | | |
|------|------|-----|------|--------|------|------|------|
| 0528 | CF | 00CF | 1336 | | LB | >7A | |
| 0529 | D7 | 00D7 | 1337 | | TM | >CLEAR | CLR RAM REG 7 |
| 052A | 21 | | 1338 | | SF2 | | SET FLG2:TOT PR MULT BY WGT |
| 052B | C6 | 00C6 | 1339 | | LB | >13 | |
| 052C | 79 | 0006 | 1340 | | LDI | 6 | 6>A |
| 052D | 0D | | 1341 | | AND | | .AND.WITH FACTOR FLAG |
| 052E | 1E | | 1342 | | SKZ | | SKIP NO PER 1/2 OR PER 1/4 |
| 052F | B3 | 0533 | 1343 | | T | PRXFCT | HAVE PER 1/2 OR PER 1/4 |
| 0530 | 25 | | 1344 | | RF2 | | RESET FLG2:TOT PR MULT BY PR |
| 0531 | 555B | 055B | 1345 | | TL | CKMIN | |
| 0533 | C7 | 00C7 | 1346 | PRXFCT | LB | >1A | |
| 0534 | 3F | 0 | 1347 | | EX | | FACTOR>ARI LSD |
| 0535 | C9 | 00C9 | 1348 | | LB | >29 | |
| 0536 | D7 | 00D7 | 1349 | | TM | >CLEAR | CLR WGT |
| 0537 | E3 | 00E3 | 1350 | | TM | >MOVPR | |
| 0538 | 008A | 0075 | 1351 | | LBL | #75 | |
| 053A | D4 | 00D4 | 1352 | | TM | >MULT | MULTIPLY FACTOR TIMES PRICE |
| 053B | 00AE | 0051 | 1353 | | LBL | #51 | |
| 053D | 37 | 0 | 1354 | | LD | | LD 5 DIG PRICE ENB |
| 053E | 5540 | 0540 | 1355 | | TL | #540 | |
| | | | 1356 | | | | |
| | | | 1357 | | ORG | 540 | |
| 0540 | 00F8 | 0007 | 1358 | | LBL | #07 | |
| 0542 | 1E | | 1359 | | SKZ | | SKIP IF 4 DIG PRICING |
| 0543 | 1F | | 1360 | | DECB | | 5 DIG,DEC COUNTER |
| 0544 | 7F | 0000 | 1361 | | LDI | 0 | |
| 0545 | D5 | 00D5 | 1362 | | TM | >MAGCK | CK FOR OVERPRICE |
| 0546 | 89 | 0549 | 1363 | | T | *+3 | LEGAL PRICE RTN |
| 0547 | D9 | 00D9 | 1364 | | TM | >CLRPR | CLR PRICE,TOTAL PRICE |
| 0548 | E7 | 00E7 | 1365 | | TM | >OUTP> | GO TO OUTPUT |
| 0549 | 00BE | 0041 | 1366 | | LBL | #41 | |
| 054B | 37 | 0 | 1367 | | LD | | LD MANDATORY PRICE/UNIT ENB |
| 054C | 66 | 0009 | 1368 | | ADI | 9 | A>1 AND SKIP IF ENABLED |
| 054D | 96 | 0556 | 1369 | | T | ADRWGT | NOT ENABLED |
| 054E | 25 | | 1370 | | RF2 | | RESET FLG2:TOT PR MULT BY PR |
| 054F | C6 | 00C6 | 1371 | | LB | >13 | |
| 0550 | 3F | 0 | 1372 | | EX | | 1>FACTOR FLAG:FACTOR DONE |
| 0551 | E5 | 00E5 | 1373 | | TM | >SETRC | SET RECOMPUTE |
| 0552 | 79 | 0006 | 1374 | | LDI | 6 | DEST BM IS PRICE |
| 0553 | 1B | | 1375 | | LXA | | |
| 0554 | 76 | 0009 | 1376 | | LDI | 9 | |
| 0555 | 99 | 0559 | 1377 | | T | UDTPXF | |
| 0556 | 7D | 0002 | 1378 | ADRWGT | LDI | 2 | DEST BM IS WGT |
| 0557 | 1B | | 1379 | | LXA | | |
| 0558 | 71 | 000E | 1380 | | LDI | 14 | |
| 0559 | C4 | 00C4 | 1381 | UDTPXF | LB | >09 | |
| 055A | D2 | 00D2 | 1382 | | TM | >MOV5 | MOVE RESULT TO PRICE OR WGT |
| 055B | CE | 00CE | 1383 | CKMIN | LB | >6E | |
| 055C | 71 | 000E | 1384 | | LDI | 14 | 14>A |
| 055D | 0C | | 1385 | | EOR | | EX-OR WITH OUT WGT SIGN |
| 055E | 1E | | 1386 | | SKZ | | SKIP IF MINUS |
| 055F | A3 | 0563 | 1387 | | T | OW>ARI | OUT WGT PLUS |
| 0560 | E5 | 00E5 | 1388 | | TM | >SETRC | SET RECOMPUTE |
| 0561 | 5517 | 0517 | 1389 | | TL | TPCLR | OUT WGT MINUS |
| 0563 | E3 | 00E3 | 1390 | OW>ARI | TM | >MOVPR | |
| 0564 | CE | 00CE | 1391 | | LB | >6E | |
| 0565 | 7E | 0001 | 1392 | | LDI | 1 | |
| 0566 | 1B | | 1393 | | LXA | | |
| 0567 | 71 | 000E | 1394 | | LDI | 14 | |
| 0568 | D2 | 00D2 | 1395 | | TM | >MOV5 | MOVE OUT WGT TO ARI |
| 0569 | 00E1 | 001E | 1396 | | LBL | #1E | |
| 056B | 37 | 0 | 1397 | | LD | | LD OUT WGT MSD |
| 056C | 6E | 0001 | 1398 | | ADI | 1 | INC,A>0 AND SKIP IF MSD BLNK |
| 056D | AF | 056F | 1399 | | T | *+2 | NO BLANK IN OUT WGT MSD |
| 056E | 3F | 0 | 1400 | | EX | | REPLACE BLANK WITH 0 |
| 056F | 00DA | 0025 | 1401 | | LBL | #25 | |
| 0571 | 14 | | 1402 | | SKF2 | | SKIP IF TOT PR MULT BY WGT |
| 0572 | 32 | 5 | 1403 | | LD | 5 | CHANGE BM FOR MULT BY PRICE |
| 0573 | D4 | 00D4 | 1404 | PRXWGT | TM | >MULT | MULTIPLY PRICE TIMES OUT WGT |

| ADDR | CODE | ARG | STNO | | STMT | | |
|------|------|-----|------|---|------|---|---|
| 0574 | DB | 00DB | 1405 | | TM | >TPRDS | PROPER ROUND OFF ADDR>A,BL |
| 0575 | DD | 00DD | 1406 | | TM | >RNDOF | DO ROUND OFF OF TOT PR LSD |
| 0576 | 12 | | 1407 | | LAX | | LD UK ENB SAVED IN TPRDS |
| 0577 | 1E | | 1408 | | SKZ | | SKIP NOT UK SCALE |
| 0578 | BB | 057B | 1409 | | T | *+3 | UK SCALE |
| 0579 | 558A | 058A | 1410 | | TL | OVALCK | NOT UK SCALE |
| 057B | DB | 00DB | 1411 | | TM | >TPRDS | PROPER ROUND OFF ADDR>A,BL |
| 057C | 17 | | 1412 | | INCB | | INC BL TO NEXT DIGIT |
| 057D | 77 | 0008 | 1413 | | LDI | 8 | 2 IN EXCESS 6 CODE>A |
| 057E | 5580 | 0580 | 1414 | | TL | #580 | |
| | | | 1415 | | | | |
| | | | 1416 | | ORG | 580 | |
| 0580 | 0279 | 0279 | 1417 | | TML | ADDC+1 | ADD A TO TOTAL PRICE FIELD |
| 0582 | DB | 00DB | 1418 | | TM | >TPRDS | ADDR SAME DIGIT |
| 0583 | 17 | | 1419 | | INCB | | HAVE 5 TO 9 IN DIG FOR 1/2 |
| 0584 | 74 | 000B | 1420 | | LDI | 11 | 11>A |
| 0585 | 09 | | 1421 | | ADSK | | ADD DIG TO A, IF C>1 WANT 1/2 |
| 0586 | 7F | 0000 | 1422 | | LDI | 0 | 0>A,PRINT,DSPLY BLANK |
| 0587 | 77 | 0008 | 1423 | | LDI | 8 | 8>A,PRINT,DSPLY 1/2 |
| 0588 | 0379 | 0379 | 1424 | | TML | LDPPUK | UK 1/2>PRE-PAK |
| 058A | DB | 00DB | 1425 | OVALCK | TM | >TPRDS | PROPER ROUND OFF ADDR>A,BL |
| 058B | 1B | | 1426 | | LXA | | RNDOFF BL>X |
| 058C | 00AF | 0050 | 1427 | | LBL | #50 | |
| 058E | 32 | 5 | 1428 | | LD | 5 | LD 5 DIG TP ENB |
| 058F | 1A | | 1429 | | XAX | | RNDOFF BL>A,ENB>X |
| 0590 | 0E | | 1430 | | COMP | | COM RNDOFF BL |
| 0591 | 64 | 000B | 1431 | | ADI | 11 | ADD TO 11 TO FORM MAGCK CNTR |
| 0592 | 93 | 0593 | 1432 | | T | *+1 | |
| 0593 | 19 | | 1433 | | XABL | | CNTR>BL |
| 0594 | 12 | | 1434 | | LAX | | RE-LD 5 DIG TP ENB |
| 0595 | 67 | 0008 | 1435 | | ADI | 8 | SKIP IF 5 DIG TP |
| 0596 | 17 | | 1436 | | INCB | | 4 DIG TP, INC COUNTER |
| 0597 | 7F | 0000 | 1437 | | LDI | 0 | |
| 0598 | D5 | 00D5 | 1438 | | TM | >MAGCK | CK FOR OVERVALUE |
| 0599 | A5 | 05A5 | 1439 | | T | NOTOV | ALL 0 RTN |
| 059A | 009B | 0064 | 1440 | TPBLK | LBL | #64 | |
| 059C | DA | 00DA | 1441 | | TM | >BLANK | BLANK TOTAL PRICE |
| 059D | 00BA | 0045 | 1442 | | LBL | #45 | |
| 059F | 37 | 0 | 1443 | | LD | | LD UK SCALE ENABLE |
| 05A0 | 67 | 0008 | 1444 | | ADI | 8 | A>0 AND SKIP IF UK |
| 05A1 | AE | 05AE | 1445 | | T | OUTPUT | NOT UK SCALE |
| 05A2 | 0379 | 0379 | 1446 | | TML | LDPPUK | BLANK UK 1/2 |
| 05A4 | AE | 05AE | 1447 | | T | OUTPUT | |
| 05A5 | DB | 00DB | 1448 | NOTOV | TM | >TPRDS | PROPER ROUND OFF ADDR>A,BL |
| 05A6 | 6A | 0005 | 1449 | | ADI | 5 | ADD 5 TO GET MSD |
| 05A7 | 19 | | 1450 | | XABL | | ADDR TOTAL PRICE MSD IN RES |
| 05A8 | 79 | 0006 | 1451 | | LDI | 6 | |
| 05A9 | 1A | | 1452 | | XAX | | UK ENB>A,DEST BM>X |
| 05AA | 1E | | 1453 | | SKZ | | SKIP NOT UK SCALE |
| 05AB | 17 | | 1454 | | INCB | | INC SOURCE BL |
| 05AC | 7B | 0004 | 1455 | | LDI | 4 | |
| 05AD | D2 | 00D2 | 1456 | | TM | >MOV5 | MOVE RESULT TO TOTAL PRICE |
| | | | 1457 | * THE FOLLOWING SEQUENCE OF MOV5 CALLS SET DISPLAY | | | |
| | | | 1458 | * OUT REG AS FOLLOWS FOR OUTPUT TO GPKD: | | | |
| | | | 1459 | * 70      75      ADDRESS     /A      7F | | | |
| | | | 1460 | * V0-V1-P2-P3-P4-W0-W1-15-V2-V3-V4-P0-P1-W2-W3-W4 | | | |
| | | | 1461 | *     P=PRICE, W=WEIGHT, V=TOTAL PRICE (VALUE) | | | |
| 05AE | 0091 | 006E | 1462 | OUTPUT | LBL | #6E | |
| 05B0 | 78 | 0007 | 1463 | | LDI | 7 | |
| 05B1 | D1 | 00D1 | 1464 | | TM | >MOV5X | |
| 05B2 | 0099 | 0066 | 1465 | | LBL | #66 | |
| 05B4 | 78 | 0007 | 1466 | | LDI | 7 | |
| 05B5 | 1B | | 1467 | | LXA | | |
| 05B6 | 73 | 000C | 1468 | | LDI | 12 | |
| 05B7 | D2 | 00D2 | 1469 | | TM | >MOV5 | |
| 05B8 | 70 | 000F | 1470 | | LDI | 15 | |
| 05B9 | 3F | 0 | 1471 | | EX | | |
| 05BA | 0094 | 006B | 1472 | | LBL | #6B | |
| 05BC | 78 | 0007 | 1473 | | LDI | 7 | |

| ADDR | CODE | ARG | STNO | STMT | | |
|------|------|------|------|------|------|------|
| 05BD | 1B | | 1474 | LXA | | |
| 05BE | 55C0 | 05C0 | 1475 | TL | #5C0 | |
| | | | 1476 | | | |
| | | | 1477 | ORG | 5C0 | |
| 05C0 | 79 | 0006 | 1478 | LDI | 6 | |
| 05C1 | D2 | 00D2 | 1479 | TM | >MOV5 | |
| 05C2 | 1B | | 1480 | XBMX | | |
| 05C3 | 36 | 1 | 1481 | LD | 1 | |
| 05C4 | 2E | 1 | 1482 | EXD | 1 | |
| 05C5 | 36 | 1 | 1483 | LD | 1 | |
| 05C6 | 3D | 2 | 1484 | EX | 2 | |
| 05C7 | 17 | | 1485 | INCB | | |
| 05C8 | 37 | 0 | 1486 | LD | | LD 5 DIG UNIT PRICE ENB |
| 05C9 | 008B | 0074 | 1487 | LBL | #74 | |
| 05CB | 1E | | 1488 | SKZ | | SKIP IF 4 DIG PRICING |
| 05CC | 8F | 05CF | 1489 | T | *+3 | |
| 05CD | 70 | 000F | 1490 | LDI | 15 | |
| 05CE | 3F | 0 | 1491 | EX | | BLANK PRICE MSD (P4) |
| 05CF | 00BA | 0045 | 1492 | LBL | #45 | |
| 05D1 | 37 | 0 | 1493 | LD | | LD UK ENB |
| 05D2 | 1B | | 1494 | LXA | | SAVE IN X |
| 05D3 | 00AF | 0050 | 1495 | LBL | #50 | |
| 05D5 | 37 | 0 | 1496 | LD | | LD 5 DIGIT TOTAL PRICE ENB |
| 05D6 | CF | 00CF | 1497 | LB | >7A | |
| 05D7 | 1E | | 1498 | SKZ | | SKIP IF 4 DIGIT TOTAL PRICE |
| 05D8 | 9B | 05DB | 1499 | T | *+3 | 5 DIGIT,NO MSD BLANK |
| 05D9 | 70 | 000F | 1500 | LDI | 15 | |
| 05DA | 2F | 0 | 1501 | EXD | | BLANK TOTAL PRICE MSD (V4) |
| 05DB | 12 | | 1502 | LAX | | RE-LD UK ENABLE |
| 05DC | 67 | 0008 | 1503 | ADI | 8 | SKIP IF UK SCALE |
| 05DD | A0 | 05E0 | 1504 | T | *+3 | NOT UK SCALE |
| 05DE | 70 | 000F | 1505 | LDI | 15 | |
| 05DF | 3F | 0 | 1506 | EX | | UK,BLANK NEXT MSD TOT PR |
| 05E0 | 008F | 0070 | 1507 | LBL | #70 | |
| 05E2 | 22 | | 1508 | SF1 | | SET FLG1 FOR 1ST PASS |
| | | | 1509 | * GPKD REG A IS SET AS FOLLOWS FROM LSD: | | |
| | | | 1510 | * V0-V1-P2-P3-P4-W0-W1-15-V0-V1-P2-P3-P4-W0-W1-15 | | |
| 05E3 | 37 | 0 | 1511 | DLOOPA LD | | LD OUT DIGIT |
| 05E4 | 1CFE | 00FE | 1512 | IDL | KLA | DIG>GPKD REG A |
| 05E6 | 17 | | 1513 | INCB | | |
| 05E7 | 48 | 0008 | 1514 | SKBI | 8 | |
| 05E8 | A3 | 05E3 | 1515 | T | DLOOPA | LOOP 8 TIMES |
| | | | 1516 | * GPKD REG B IS SET AS FOLLOWS FROM LSD: | | |
| | | | 1517 | * V2-V3-V4-P0-P1-W2-W3-W4-V2-V3-V4-P0-P1-W2-W3-W4 | | |
| 05E9 | 37 | 0 | 1518 | DLOOPB LD | | LD OUT DIGIT |
| 05EA | 1CFD | 00FD | 1519 | IDL | KLB | DIG>GPKD REG B |
| 05EC | 17 | | 1520 | INCB | | |
| 05ED | A9 | 05E9 | 1521 | T | DLOOPB | LOOP TO END |
| 05EE | 16 | | 1522 | SKF1 | | SKIP IF 1ST PASS |
| 05EF | 82 | 05F2 | 1523 | T | DISPON | 2ND PASS,DONE |
| 05F0 | 26 | | 1524 | RF1 | | RESET FLG1 FOR 2ND PASS |
| 05F1 | A3 | 05E3 | 1525 | T | DLOOPA | |
| 05F2 | 1CF3 | 00F3 | 1526 | DISPON IDL | KDN | TURN ON DISPLAY |
| 05F4 | 00DF | 0020 | 1527 | LMPOUT LBL | #20 | |
| 05F6 | 7E | 0001 | 1528 | LDI | 1 | |
| 05F7 | 1B | | 1529 | LXA | | 1>X,INTEGRATOR RESET |
| 05F8 | 11 | | 1530 | LMPLP LABL | | LAMP ADDR>A |
| 05F9 | 0E | | 1531 | COMP | | .COM.ADDR |
| 05FA | 0B | | 1532 | AD | | ADD LAMP STAT,.COM.LAMP |
| 05FB | 1D | | 1533 | DOA | | OUTPUT LAMP DATA AND ADDR |
| 05FC | 11 | | 1534 | LABL | | |
| 05FD | 1B | | 1535 | LXA | | SAVE ADDR IN X |
| 05FE | 5600 | 0600 | 1536 | TL | #600 | |
| | | | 1537 | | | |
| | | | 1538 | ORG | 600 | |
| 0600 | C4 | 00C4 | 1539 | LB | >09 | |
| 0601 | 7F | 0000 | 1540 | LDI | 0 | |

| ADDR | CODE | ARG | STNO | | STMT | | |
|------|------|-----|------|---|------|---|---|
| 0602 | 1C41 | 0041 | 1541 | | IOL | SOS | STROBE WRITE |
| 0604 | 77 | 0008 | 1542 | | LDI | 8 | |
| 0605 | 1C41 | 0041 | 1543 | | IOL | SOS | REMOVE STROBE |
| 0607 | C8 | 00C8 | 1544 | | LB | >21 | |
| 0608 | 7E | 0001 | 1545 | | LDI | 1 | |
| 0609 | 1A | | 1546 | | XAX | | ADDR>A, INTEGRATOR RESET>X |
| 060A | 19 | | 1547 | | XABL | | ADDR>BL |
| 060B | 17 | | 1548 | | INCB | | |
| 060C | 47 | 0007 | 1549 | | SKBI | 7 | |
| 060D | BC | 063C | 1550 | | T | LMPLP> | LOOP FOR 7 LAMPS |
| 060E | 7F | 0000 | 1551 | PRNTR | LDI | 0 | |
| 060F | 3F | 0 | 1552 | | EX | | PRINT CMND>A, 0>PRINT CMND |
| 0610 | 25 | | 1553 | | RF2 | | ASSUME NO PRINT COMMAND |
| 0611 | 1E | | 1554 | | SKZ | | SKIP IF NO PRINT COMMAND |
| 0612 | 21 | | 1555 | | SF2 | | NOTE TO OUTPUT PRINT CMND |
| 0613 | DC | 00DC | 1556 | | TM | >FCPTY | |
| 0614 | 16 | | 1557 | | SKF1 | | SKIP NOT 15KG |
| 0615 | 99 | 0619 | 1558 | | T | *+4 | 15KG |
| 0616 | 15 | | 1559 | | SKC | | SKIP NOT 6KG |
| 0617 | 7C | 0003 | 1560 | | LDI | 3 | 6KG, DISABLE.LT.00040 |
| 0618 | 7E | 0001 | 1561 | | LDI | 1 | 30LB, DISABLE.LT.00020 |
| 0619 | 76 | 0009 | 1562 | | LDI | 9 | 15KG, DISABLE.LT.00100 |
| 061A | 1B | | 1563 | | LXA | | TEST DIGIT>X |
| 061B | 36 | 1 | 1564 | | LD | 1 | DUMMY INST TO ADDR 0A |
| 061C | 77 | 0008 | 1565 | | LDI | 8 | |
| 061D | 1C41 | 0041 | 1566 | | IOL | SOS | INPUT PRINT COMPLETE |
| 061F | 1E | | 1567 | | SKZ | | SKIP IF PRINT COMPLETE |
| 0620 | AC | 062C | 1568 | | T | PTYPE-1 | DISABLE PRINT |
| 0621 | 00AB | 0054 | 1569 | | LBL | #54 | |
| 0623 | 37 | 0 | 1570 | | LD | | LD LT 20 INC PRINT DISABLE |
| 0624 | 1E | | 1571 | | SKZ | | SKIP IF NO PRINT DISABLE |
| 0625 | 14 | | 1572 | | SKF2 | | SKIP IF HAVE PRINT COMMAND |
| 0626 | AD | 062D | 1573 | | T | PTYPE | NO DISABLE, OR, NO PRINT CMND |
| 0627 | 0092 | 006D | 1574 | | LBL | #6D | PRINT DISABLE, AND, PRINT CMND |
| 0629 | 7C | 0003 | 1575 | | LDI | 3 | |
| 062A | 0129 | 0129 | 1576 | | TML | MAGLP-1 | CK FOR PRINT DISABLE WGT |
| 062C | 25 | | 1577 | | RF2 | | .LE. TEST DIG RTN, NO PRINT |
| 062D | 00BF | 0040 | 1578 | PTYPE | LBL | #40 | |
| 062F | 37 | 0 | 1579 | | LD | | LD 300 PRINTER ENABLE |
| 0630 | CE | 00CE | 1580 | | LB | >6E | |
| 0631 | 1E | | 1581 | | SKZ | | SKIP NOT 300 PRINTER |
| 0632 | BE | 063E | 1582 | | T | P300> | 300 PRINTER |
| 0633 | 78 | 0007 | 1583 | | LDI | 7 | 301 OR SMART PRINTER |
| 0634 | D1 | 00D1 | 1584 | | TM | >MOV5X | ENTER OUT WGT TO PRINT REG |
| 0635 | 18 | | 1585 | | XBMX | | |
| 0636 | C6 | 00C6 | 1586 | | LB | >13 | |
| 0637 | 71 | 000E | 1587 | | LDI | 14 | |
| 0638 | 0D | | 1588 | | AND | | REMOVE FCTR DONE FROM FACTOR |
| 0639 | CF | 00CF | 1589 | | LB | >7A | |
| 063A | 5640 | 0640 | 1590 | | TL | #640 | |
| 063C | 55F8 | 05F8 | 1591 | LMPLP> | TL | LMPULP | |
| 063E | 565A | 065A | 1592 | P300> | TL | P300 | |
| | | | 1593 | | | | |
| | | | 1594 | | ORG | 640 | |
| 0640 | 3F | 0 | 1595 | | EX | | ENTER FACTOR |
| 0641 | 00BA | 0045 | 1596 | | LBL | #45 | |
| 0643 | 35 | 2 | 1597 | | LD | 2 | LD UK ENB |
| 0644 | 1F | | 1598 | | DECB | | |
| 0645 | 1E | | 1599 | | SKZ | | SKIP NOT UK SCALE |
| 0646 | 1F | | 1600 | | DECB | | DEC TOT PR SOURCE POINTER |
| 0647 | 76 | 0009 | 1601 | | LDI | 9 | |
| 0648 | D2 | 00D2 | 1602 | | TM | >MOV5 | ENTER TOTAL PRICE |
| 0649 | 18 | | 1603 | | XBMX | | |
| 064A | 00BA | 0045 | 1604 | | LBL | #45 | |
| 064C | 31 | 6 | 1605 | | LD | 6 | LD UK ENB |
| 064D | 67 | 0008 | 1606 | | ADI | 8 | SKIP IF UK SCALE |
| 064E | 93 | 0653 | 1607 | | T | *+5 | NOT UK |
| 064F | 32 | 5 | 1608 | | LD | 5 | LD UK 1/2 FROM PRE-PAK |
| 0650 | 1E | | 1609 | | SKZ | | SKIP IF 1/2 LAMP OFF |

| ADDR | CODE | ARG | STNO | | STMT | | |
|---|---|---|---|---|---|---|---|
| 0651 | 75 | 000A | 1610 | | LDI | 10 | PRINT 1/2 |
| 0652 | 3F | 0 | 1611 | | EX | | UPDATE TOT PR LSD (V0) |
| 0653 | CD | 00CD | 1612 | | LB | >69 | |
| 0654 | 7B | 0004 | 1613 | | LDI | 4 | |
| 0655 | D2 | 00D2 | 1614 | | TM | >MOV5 | ENTER UNIT PRICE |
| 0656 | 7F | 0000 | 1615 | | LDI | 0 | |
| 0657 | 3F | 0 | 1616 | | EX | | 0>PRINT REG WGT MSD |
| 0658 | 57E6 | 07E6 | 1617 | | TL | PBCCK | CK FOR BY COUNT MODE |
| 065A | 1F | | 1618 | P300 | DECB | | 300 PRINTER |
| 065B | 78 | 0007 | 1619 | | LDI | 7 | |
| 065C | 1B | | 1620 | | LXA | | |
| 065D | 75 | 000C | 1621 | | LDI | 12 | |
| 065E | D2 | 00D2 | 1622 | | TM | >MOV5 | ENTER OUT WGT TO PRINT REG |
| 065F | 18 | | 1623 | | XBMX | | |
| 0660 | C6 | 00C6 | 1624 | | LB | >13 | |
| 0661 | 71 | 000E | 1625 | | LDI | 14 | |
| 0662 | 0D | | 1626 | | AND | | REMOVE FCTR DONE FROM FACTOR |
| 0663 | 0087 | 0078 | 1627 | | LBL | #78 | |
| 0665 | 3F | 0 | 1628 | | EX | | ENTER FACTOR |
| 0666 | 009B | 0064 | 1629 | | LBL | #64 | |
| 0668 | 35 | 2 | 1630 | | LD | 2 | LD TOTAL PRICE 5 DIG MSD |
| 0669 | 1E | | 1631 | | SKZ | | SKIP IF 0 |
| 066A | 25 | | 1632 | | RF2 | | NOT 0, DISABLE PRINT |
| 066B | 17 | | 1633 | | INCB | | |
| 066C | 37 | 0 | 1634 | | LD | | LD UK SCALE ENB |
| 066D | 009C | 0063 | 1635 | | LBL | #63 | |
| 066F | 1E | | 1636 | | SKZ | | SKIP NOT UK SCALE |
| 0670 | 1F | | 1637 | | DECB | | DEC TOT PR SOURCE POINTER |
| 0671 | 78 | 0007 | 1638 | | LDI | 7 | |
| 0672 | D2 | 00D2 | 1639 | | TM | >MOV5 | ENTER TOTAL PRICE |
| 0673 | 18 | | 1640 | | XBMX | | |
| 0674 | 00BA | 0045 | 1641 | | LBL | #45 | |
| 0676 | 31 | 6 | 1642 | | LD | 6 | LD UK ENB |
| 0677 | 67 | 0008 | 1643 | | ADI | 8 | SKIP IF UK SCALE |
| 0678 | BE | 067E | 1644 | | T | *+6 | NOT UK |
| 0679 | 32 | 5 | 1645 | | LD | 5 | LD UK 1/2 FROM PRE-PAK |
| 067A | 1F | | 1646 | | DECB | | |
| 067B | 1E | | 1647 | | SKZ | | SKIP IF 1/2 LAMP OFF |
| 067C | 75 | 000A | 1648 | | LDI | 10 | PRINT 1/2 |
| 067D | 3F | 0 | 1649 | | EX | | UPDATE TOT PR LSD (V0) |
| 067E | 5680 | 0680 | 1650 | | TL | #680 | |
| | | | 1651 | | | | |
| | | | 1652 | | ORG | 680 | |
| 0680 | 0097 | 0068 | 1653 | | LBL | #68 | |
| 0682 | 7C | 0003 | 1654 | | LDI | 3 | |
| 0683 | D2 | 00D2 | 1655 | | TM | >MOV5 | ENTER UNIT PRICE |
| 0684 | 7A | 0005 | 1656 | | LDI | 5 | 11 CNTR>A, 300 PRINTER |
| 0685 | 57E7 | 07E7 | 1657 | | TL | PBCCK+1 | CK FOR BY COUNT MODE |
| 0687 | 00F2 | 000D | 1658 | POUT | LBL | #0D | |
| 0689 | 7F | 0000 | 1659 | | LDI | 0 | |
| 068A | 1C41 | 0041 | 1660 | | IOL | SOS | OUTPUT>HIGH |
| 068C | 17 | | 1661 | | INCB | | |
| 068D | 89 | 0689 | 1662 | | T | POUT+2 | LOOP, PRNTR CLK, RST LO, ENB HI |
| 068E | 00BF | 0040 | 1663 | | LBL | #40 | |
| 0690 | 34 | 3 | 1664 | | LD | 3 | LD 300 PRINTER ENB |
| 0691 | 1E | | 1665 | | SKZ | | SKIP NOT 300 PRINTER |
| 0692 | 73 | 000C | 1666 | | LDI | 12 | 300 PRINTER |
| 0693 | 70 | 000F | 1667 | | LDI | 15 | 301 OR SMART PRINTER |
| 0694 | 19 | | 1668 | POUTLP | XABL | | A>BL |
| 0695 | 7E | 0001 | 1669 | | LDI | 1 | |
| 0696 | 1B | | 1670 | | LXA | | 1>X, INTEGRATOR RESET |
| 0697 | 37 | 0 | 1671 | | LD | | LD DIGIT |
| 0698 | 1D | | 1672 | | DOA | | OUTPUT |
| 0699 | 0E | | 1673 | | CJMP | | SET UP PARITY |
| 069A | 6F | | 1674 | | CYS | | |
| 069B | 70 | 000F | 1675 | | LDI | 15 | |
| 069C | 6F | | 1676 | | CYS | | |
| 069D | 72 | 000D | 1677 | | LDI | 13 | |
| 069E | 6F | | 1678 | | CYS | | |
| 069F | 77 | 0008 | 1679 | | LDI | 8 | 8>A FOR 15 PARITY |

| ADDR | CODE | ARG | STNO | | STMT | | |
|------|------|-----|------|---|------|---|---|
| 06A0 | 05 | | 1680 | | RTN | | |
| 06A1 | 1B | | 1681 | PARITY | LXA | | PARITY>X |
| 06A2 | 11 | | 1682 | | LABL | | BL>A |
| 06A3 | 1A | | 1683 | | XAX | | PARITY>A,BL>X |
| 06A4 | 00F3 | 000C | 1684 | | LBL | #0C | |
| 06A6 | 1C41 | 0041 | 1685 | | IOL | SOS | OUTPUT PARITY |
| 06A8 | 17 | | 1686 | | INCB | | |
| 06A9 | 12 | | 1687 | | LAX | | DIGIT BL>A |
| 06AA | 3F | 0 | 1688 | | EX | | DIGIT BL>RAM ADDR 0D |
| 06AB | 77 | 0008 | 1689 | | LDI | 8 | |
| 06AC | E2 | 00E2 | 1690 | | TM | >DLY,4 | STROBE CLOCK,.4 MS DELAY |
| 06AD | 7F | 0000 | 1691 | | LDI | 0 | |
| 06AE | E2 | 00E2 | 1692 | | TM | >DLY,4 | REMOVE CLOCK,.4 MS DELAY |
| 06AF | 30 | 7 | 1693 | | LD | 7 | DIGIT BL>A |
| 06B0 | 60 | 000F | 1694 | | ADI | 15 | DEC BL,SKIP NOT 15 |
| 06B1 | B3 | 06B3 | 1695 | | T | *+2 | DONE |
| 06B2 | 94 | 0694 | 1696 | | T | POUTLP | LOOP |
| 06B3 | 00F1 | 000E | 1697 | | LBL | #0E | |
| 06B5 | 77 | 0008 | 1698 | | LDI | 8 | |
| 06B6 | 1C41 | 0041 | 1699 | | IOL | SOS | REMOVE PRINTER DATA ENB |
| 06B8 | 00F4 | 000B | 1700 | | LBL | #0B | |
| 06BA | 14 | | 1701 | CKPRNT | SKF2 | | SKIP IF HAVE PRINT COMMAND |
| 06BB | BE | 06BE | 1702 | | T | RSTPR> | NO PRINT |
| 06BC | 56C0 | 06C0 | 1703 | | TL | #6C0 | |
| 06BE | 56D0 | 06D0 | 1704 | RSTPR> | TL | RSTPTR | |
| | | | 1705 | | | | |
| | | | 1706 | | ORG | 6C0 | |
| 06C0 | 7F | 0000 | 1707 | | LDI | 0 | PRINT |
| 06C1 | 1C41 | 0041 | 1708 | | IOL | SOS | OUTPUT PRINT COMMAND |
| 06C3 | C4 | 00C4 | 1709 | | LB | >09 | |
| 06C4 | 7B | 0004 | 1710 | | LDI | 4 | |
| 06C5 | 3F | 0 | 1711 | | EX | | MID TIMER=4 |
| 06C6 | E0 | 00E0 | 1712 | | TM | >DELAY | 5.0 MS DELAY |
| 06C7 | 77 | 0008 | 1713 | | LDI | 8 | |
| 06C8 | 1C41 | 0041 | 1714 | | IOL | SOS | INPUT PRINT COMPLETE |
| 06CA | 1E | | 1715 | | SKZ | | SKIP IF PRINT COMPLETE |
| 06CB | 87 | 06C7 | 1716 | | T | *-4 | HOLD HERE UNTIL COMPLETE |
| 06CC | 17 | | 1717 | | INCB | | |
| 06CD | 77 | 0008 | 1718 | | LDI | 8 | |
| 06CE | 1C41 | 0041 | 1719 | | IOL | SOS | REMOVE PRINT COMMAND |
| 06D0 | 00F0 | 000F | 1720 | RSTPTR | LBL | #0F | |
| 06D2 | 77 | 0008 | 1721 | | LDI | 8 | |
| 06D3 | 1C41 | 0041 | 1722 | | IOL | SOS | RESET PRINTER |
| 06D5 | 1CFA | 00FA | 1723 | KEYBD | IOL | KTS | RD KEYBOARD STROBE |
| 06D7 | 0E | | 1724 | | COMP | | |
| 06D8 | 00B8 | 0047 | 1725 | | LBL | #47 | |
| 06DA | 67 | 0008 | 1726 | | ADI | 8 | ADD 8,SKIP IF KEY ENTERED |
| 06DB | BA | 06FA | 1727 | | T | NOKEY> | NO KEY ENTERED |
| 06DC | 2F | 0 | 1728 | | EXD | | STORE KEYBOARD STROBE |
| 06DD | 1CFC | 00FC | 1729 | | IOL | KTR | RD KEYBOARD RETURN |
| 06DF | 0E | | 1730 | | COMP | | |
| 06E0 | 67 | 0008 | 1731 | | ADI | 8 | ADD 8,SKIP IF ERROR |
| 06E1 | 67 | 0008 | 1732 | | ADI | 8 | RESTORE,WILL SKIP |
| 06E2 | BC | 06FC | 1733 | | T | KERR> | KEYBOARD ERROR |
| 06E3 | 3F | 0 | 1734 | | EX | | STORE KEYBOARD RETURN |
| 06E4 | 7B | 0004 | 1735 | | LDI | 4 | 4>A |
| 06E5 | 0D | | 1736 | | AND | | .AND.WITH RETURN,A>0 IF DIG |
| 06E6 | 1E | | 1737 | | SKZ | | SKIP IF DIGIT KEY |
| 06E7 | BE | 06FE | 1738 | | T | KCMND> | COMMAND KEY |
| 06E8 | 7D | 0002 | 1739 | | LDI | 2 | 2>A |
| 06E9 | 0D | | 1740 | | AND | | .AND.WITH RETURN,A>2:8,9 |
| 06EA | 1E | | 1741 | | SKZ | | SKIP NOT 8 OR 9 KEY |
| 06EB | B1 | 06F1 | 1742 | | T | KBD1 | 8 OR 9 KEY |
| 06EC | 7E | 0001 | 1743 | | LDI | 1 | 1>A |
| 06ED | 0D | | 1744 | | AND | | .AND.WITH RETURN,A>1:4,5,6,7 |
| 06EE | 1E | | 1745 | | SKZ | | SKIP NOT 4,5,6,7 KEY |
| 06EF | 7B | 0004 | 1746 | | LDI | 4 | 4,5,6,7 KEY |
| 06F0 | 7F | 0000 | 1747 | | LDI | 0 | 0,1,2,3 KEY |
| 06F1 | 77 | 0008 | 1748 | KBD1 | LDI | 8 | 8,9 KEY |
| 06F2 | 17 | | 1749 | | INCB | | |
| 06F3 | 0B | | 1750 | | AD | | ADD STROBE,HAVE DIGIT IN A |

| ADDR | CODE | ARG | STNO | | STMT | | |
|------|------|-----|------|------|------|------|------|
| 06F4 | C4 | 00C4 | 1751 | | LB | >09 | |
| 06F5 | 3F | 0 | 1752 | | EX | | NEW DIGIT>RAM ADDR 09 |
| 06F6 | C3 | 00C3 | 1753 | | LB | >04 | |
| 06F7 | 37 | 0 | 1754 | | LD | | LD DIGIT TIMER |
| 06F8 | 5700 | 0700 | 1755 | | TL | #700 | |
| 06FA | 50F0 | 00F0 | 1756 | NOKEY> | TL | NOKEY | |
| 06FC | 500F | 000F | 1757 | KERR> | TL | KBERR | |
| 06FE | 5720 | 0720 | 1758 | KCMND> | TL | KBCMND | |
| | | | 1759 | | | | |
| | | | 1760 | | ORG | 700 | |
| 0700 | 1E | | 1761 | | SKZ | | SKIP IF TIMER NOT RUNNING |
| 0701 | 87 | 0707 | 1762 | | T | ENTDIG | TIMER RUNNING |
| 0702 | CD | 00CD | 1763 | | LB | >69 | |
| 0703 | 01CD | 01CD | 1764 | | TML | BLANK-1 | CLR PRICE ONLY |
| 0705 | C6 | 00C6 | 1765 | | LB | >15 | |
| 0706 | D7 | 00D7 | 1766 | | TM | >CLEAR | CLR FACTOR,AR1 |
| 0707 | 00AE | 0051 | 1767 | ENTDIG | LBL | #51 | |
| 0709 | 37 | 0 | 1768 | | LD | | LD 5 DIGIT PRICE ENB |
| 070A | 0097 | 0068 | 1769 | | LBL | #68 | |
| 070C | 1E | | 1770 | | SKZ | | SKIP IF 4 DIGIT PRICING |
| 070D | 17 | | 1771 | | INCB | | 5 DIG PRICING |
| 070E | 37 | 0 | 1772 | | LD | | LD MSD PRICE DIGIT |
| 070F | 1E | | 1773 | | SKZ | | SKIP IF 0 |
| 0710 | 88 | 0738 | 1774 | | T | KEYBD> | NOT 0,REFUSE NEW DIGIT |
| 0711 | C4 | 00C4 | 1775 | | LB | >09 | |
| 0712 | 79 | 0006 | 1776 | | LDI | 6 | 6>A |
| 0713 | 09 | | 1777 | | ADSK | | ADD NEW DIGIT |
| 0714 | 96 | 0716 | 1778 | | T | *+2 | -VALID (0-9) |
| 0715 | B8 | 0738 | 1779 | | T | KEYBD> | INVALID (10-15) |
| 0716 | 37 | 0 | 1780 | | LD | | RE-LD NEW DIGIT |
| 0717 | 009A | 0065 | 1781 | | LBL | #65 | |
| 0719 | 3F | 0 | 1782 | | EX | | LESS SIG DIG>MEM,MORE SIG>A |
| 071A | 17 | | 1783 | | INCB | | |
| 071B | 4A | 000A | 1784 | | SKBI | 10 | SKIP AT END OF PRICE REG |
| 071C | 99 | 0719 | 1785 | | T | *-3 | LOOP TO END OF PRICE REG |
| 071D | 75 | 000A | 1786 | | LDI | 10 | |
| 071E | 57D6 | 07D6 | 1787 | | TL | KBDUN-2 | START DIGIT TIMER |
| 0720 | 7E | 0001 | 1788 | KBCMND | LDI | 1 | 1>A |
| 0721 | 0D | | 1789 | | AND | | .AND.WITH RETURN |
| 0722 | 1E | | 1790 | | SKZ | | SKIP IF 0 |
| 0723 | 7B | 0004 | 1791 | | LDI | 4 | |
| 0724 | 7F | 0000 | 1792 | | LDI | 0 | |
| 0725 | 17 | | 1793 | | INCB | | |
| 0726 | 0B | | 1794 | | AD | | ADD STROBE |
| 0727 | 0E | | 1795 | | COMP | | V>15,1/2>14,1/4>13,P>12,T>11 |
| 0728 | 6E | 0001 | 1796 | VFYCK | ADI | 1 | SKIP IF VERIFY |
| 0729 | BE | 073E | 1797 | | T | 1/2CK> | |
| 072A | 1CF6 | 00F6 | 1798 | | TJL | KER | RESET KEYBOARD |
| 072C | C4 | 00C4 | 1799 | | LB | >09 | |
| 072D | 7D | 0002 | 1800 | | LDI | 2 | |
| 072E | 3F | 0 | 1801 | | EX | | |
| 072F | 17 | | 1802 | | INCB | | |
| 0730 | 7C | 0003 | 1803 | | LDI | 3 | |
| 0731 | 3F | 0 | 1804 | | EX | | |
| 0732 | E0 | 00E0 | 1805 | | TM | >DELAY | DELAY 50MS FOR GPKD CYCLE |
| 0733 | 00E7 | 0018 | 1806 | | LBL | #18 | |
| 0735 | 37 | 0 | 1807 | | LD | | LD VERIFY TEST FLAG |
| 0736 | 67 | 0008 | 1808 | | ADI | 8 | SKIP IF VERIFY IN PROCESS |
| 0737 | 8A | 073A | 1809 | | T | *+3 | 1ST PASS OF VERIFY |
| 0738 | 56D5 | 06D5 | 1810 | KEYBD> | TL | KEYBD | TIGHT LOOP DURING V HOLD |
| 073A | 3B | 4 | 1811 | | EX | 4 | SET VERIFY TEST FLAG |
| 073B | 37 | 0 | 1812 | | LD | | LD VERIFY MODE FLAG |
| 073C | 5740 | 0740 | 1813 | | TL | #740 | |
| 073E | 575A | 075A | 1814 | 1/2CK> | TL | P1/2CK | |
| | | | 1815 | | | | |
| | | | 1816 | | ORG | 740 | |
| 0740 | 0E | | 1817 | | COMP | | COM IT |
| 0741 | 3F | 0 | 1818 | | EX | | UPDATE FLAG |
| 0742 | 37 | 0 | 1819 | | LD | | RE-LD |

| ADDR | CODE | ARG | STNO | | STMT | | |
|---|---|---|---|---|---|---|---|
| 0743 | 1E | | 1820 | | SKZ | | SKIP IF WAS SET |
| 0744 | 70 | 000F | 1821 | | LDI | 15 | WAS CLR,TEST BLANKS |
| 0745 | 77 | 0008 | 1822 | | LDI | 8 | WAS SET,TEST 8S |
| 0746 | 1B | | 1823 | | LXA | | TEST>X |
| 0747 | 0091 | 006E | 1824 | | LBL | #6E | |
| 0749 | 12 | | 1825 | | LAX | | TEST>A |
| 074A | 2F | 0 | 1826 | | EXD | | LD DISPLAY REG WITH TEST |
| 074B | 89 | 0749 | 1827 | | T | *-2 | LOOP TO BOTTOM |
| 074C | 00D9 | 0026 | 1828 | | LBL | #26 | |
| 074E | 12 | | 1829 | | LAX | | TEST>A |
| 074F | 0E | | 1830 | | COMP | | 15>0,8>7 |
| 0750 | 1E | | 1831 | | SKZ | | SKIP IF BLANKS |
| 0751 | 0E | | 1832 | | COMP | | RESTORE 8 |
| 0752 | 1B | | 1833 | | LXA | | LAMP TEST>X |
| 0753 | 12 | | 1834 | | LAX | | TEST>A |
| 0754 | 2F | 0 | 1835 | | EXD | | LD LAMP WITH TEST |
| 0755 | 93 | 0753 | 1836 | | T | *-2 | LOOP TO LAMP REG END |
| 0756 | C3 | 00C3 | 1837 | | LB | >04 | |
| 0757 | 7F | 0000 | 1838 | | LDI | 0 | |
| 0758 | 3F | 0 | 1839 | | EX | | CLR DIGIT TIMER |
| 0759 | E7 | 00E7 | 1840 | | TM | >OUTP> | GO TO OUTPUT |
| 075A | 6E | 0001 | 1841 | P1/2CK | ADI | 1 | SKIP IF PER 1/2 |
| 075B | A8 | 0768 | 1842 | | T | P1/4CK | |
| 075C | E4 | 00E4 | 1843 | | TM | >MODE | CK FOR BY COUNT |
| 075D | B2 | 0772 | 1844 | | T | P1/2 | NORMAL PER 1/2 |
| 075E | CD | 00CD | 1845 | | LB | >69 | BY COUNT MODE |
| 075F | 79 | 0006 | 1846 | | LDI | 6 | |
| 0760 | 1B | | 1847 | | LXA | | |
| 0761 | 7B | 0004 | 1848 | | LDI | 4 | |
| 0762 | D2 | 00D2 | 1849 | | TM | >MOV5 | MOVE PRICE TO TOTAL PRICE |
| 0763 | CD | 00CD | 1850 | | LB | >69 | |
| 0764 | 01CD | 01CD | 1851 | | TML | BLANK-1 | CLR PRICE ONLY |
| 0766 | 57D5 | 07D5 | 1852 | FOUN> | TL | FCNDUN | |
| 0768 | 6E | 0001 | 1853 | P1/4CK | ADI | 1 | SKIP IF PER 1/4 |
| 0769 | 85 | 0775 | 1854 | | T | PRNCK | |
| 076A | E4 | 00E4 | 1855 | | TM | >MODE | CK FOR PRE-PAK,BY COUNT |
| 076B | AD | 076D | 1856 | | T | *+2 | NORMAL OR PRE-PAK |
| 076C | A6 | 0766 | 1857 | | T | FOUN> | BY COUNT MODE |
| 076D | DC | 00DC | 1858 | | TM | >FCPTY | A=1:30LB,2:6KG,5:15KG |
| 076E | 61 | 000E | 1859 | | ADI | 14 | SKIP IF 6KG OR 15KG |
| 076F | B1 | 0771 | 1860 | | T | *+2 | 30LB,PER 1/4 LEGAL |
| 0770 | A6 | 0766 | 1861 | | T | FOUN> | METRIC,PER 1/4 ILLEGAL |
| 0771 | 7B | 0004 | 1862 | | LDI | 4 | |
| 0772 | 7D | 0002 | 1863 | P1/2 | LDI | 2 | |
| 0773 | 57E0 | 07E0 | 1864 | | TL | ENTFCT | GO ENTER FACTOR |
| 0775 | 6E | 0001 | 1865 | PRNCK | ADI | 1 | SKIP IF PRINT KEY |
| 0776 | BA | 077A | 1866 | | T | TARECK | |
| 0777 | 31 | 6 | 1867 | | LD | 6 | DUMMY TO ADDR 27 |
| 0778 | 77 | 0008 | 1868 | | LDI | 8 | |
| 0779 | 3F | 0 | 1869 | | EX | | SET PRINT FLAG |
| 077A | 6E | 0001 | 1870 | TARECK | ADI | 1 | SKIP IF TARE KEY |
| 077B | A6 | 0766 | 1871 | | T | FOUN> | |
| 077C | 5780 | 0780 | 1872 | | TL | #780 | |
| | | | 1873 | | | | |
| | | | 1874 | | ORG | 780 | |
| 0780 | C0 | 00C0 | 1875 | | LB | >00 | |
| 0781 | 37 | 0 | 1876 | | LD | | LD MOTION FLAG |
| 0782 | 1E | | 1877 | | SKZ | | SKIP NO MOTION |
| 0783 | 9B | 079B | 1878 | | T | FOUN>> | NO T ALLOWED IN MOTN |
| 0784 | C3 | 00C3 | 1879 | | LB | >04 | |
| 0785 | 37 | 0 | 1880 | | LD | | LD DIGIT TIMER |
| 0786 | 1E | | 1881 | | SKZ | | SKIP NOT RUNNING |
| 0787 | 8F | 078F | 1882 | | T | CKOT | RUNNING,CK FOR 0-T SEQ |
| 0788 | C5 | 00C5 | 1883 | | LB | >12 | |
| 0789 | 36 | 1 | 1884 | | LD | 1 | LD NET FLAG |
| 078A | 1E | | 1885 | | SKZ | | SKIP NOT NET |
| 078B | 9B | 079B | 1886 | | T | FOUN>> | NO T ALLOWED IN NET |
| 078C | 17 | | 1887 | | INCB | | |
| 078D | 57CF | 07CF | 1888 | | TL | TDUN-2 | SET MANUAL TARE FLAG |

| ADDR | CODE | ARG | STNO | | STMT | | |
|------|------|------|------|------|------|------|------|
| 078F | CD | 00CD | 1889 | CKOT | LB | >69 | |
| 0790 | 7F | 0000 | 1890 | | LDI | 0 | |
| 0791 | 1B | | 1891 | | LXA | | |
| 0792 | 7A | 0005 | 1892 | | LDI | 5 | |
| 0793 | 0129 | 0129 | 1893 | | TML | MAGLP-1 | CK FOR PRICE OF 0 |
| 0795 | 6E | 0001 | 1894 | | ADI | 1 | ALL 0 RTN |
| 0796 | 9F | 079F | 1895 | | T | KBTARE | PRICE NOT 0,KEYBOARD TARE |
| 0797 | CA | 00CA | 1896 | | LB | >33 | |
| 0798 | 37 | 0 | 1897 | | LD | | LD AUTO CLR FLAG |
| 0799 | 60 | 000F | 1898 | | ADI | 15 | ADD 15,SKIP IF.GE.10 INC NET |
| 079A | 9D | 079D | 1899 | | T | *+3 | .LT. 10 INC NET,0-T LEGAL |
| 079B | 57D5 | 07D5 | 1900 | FDUN>> | TL | FCNDUN | |
| 079D | 5011 | 0011 | 1901 | | TL | RESET | LEGAL 0-T,RESET |
| 079F | C1 | 00C1 | 1902 | KBTARE | LB | >01 | |
| 07A0 | 37 | 0 | 1903 | | LD | | LD ZERO GRAD FLAG |
| 07A1 | 67 | 0008 | 1904 | | ADI | 8 | ADD 8,SKIP IF IN ZERO GRAD |
| 07A2 | 9B | 079B | 1905 | | T | FDUN>> | NO KB TARE ALLOWED OFF 0 |
| 07A3 | C5 | 00C5 | 1906 | | LB | >12 | |
| 07A4 | 37 | 0 | 1907 | | LD | | LD NET FLAG |
| 07A5 | 1E | | 1908 | | SKZ | | SKIP NOT NET |
| 07A6 | 9B | 079B | 1909 | | T | FDUN>> | NO T ALLOWED IN NET |
| 07A7 | DC | 00DC | 1910 | | TM | >FCPTY | |
| 07A8 | 00AA | 0055 | 1911 | | LBL | #55 | |
| 07AA | 34 | 3 | 1912 | | LD | 3 | LD KEYBOARD TARE ENB |
| 07AB | 67 | 0008 | 1913 | | ADI | 8 | ADD 8,SKIP IF ENABLED |
| 07AC | 9B | 079B | 1914 | | T | FDUN>> | NOT ENABLED |
| 07AD | 16 | | 1915 | | SKF1 | | SKIP NOT 15KG |
| 07AE | B2 | 07B2 | 1916 | | T | KT15KG | 15KG |
| 07AF | 15 | | 1917 | | SKC | | SKIP NOT 6KG |
| 07B0 | B7 | 07B7 | 1918 | | T | KT6KG | 6KG |
| 07B1 | BB | 07BB | 1919 | | T | CKMKBT | 30LB,CK MAGNITUDE |
| 07B2 | 37 | 0 | 1920 | KT15KG | LD | | LD PRICE LSD |
| 07B3 | 1E | | 1921 | | SKZ | | OK IF 0 |
| 07B4 | 64 | 000B | 1922 | | ADI | 11 | |
| 07B5 | B6 | 07B6 | 1923 | | T | *+1 | |
| 07B6 | B9 | 07B9 | 1924 | | T | KT6KG+2 | OK IF 0 OR 5 |
| 07B7 | 7E | 0001 | 1925 | KT6KG | LDI | 1 | |
| 07B8 | 0D | | 1926 | | AND | | CK FOR EVEN DIGIT |
| 07B9 | 1E | | 1927 | | SKZ | | OK:EVEN(6KG)=0,5(15KG) |
| 07BA | 9B | 079B | 1928 | | T | FDUN>> | |
| 07BB | 75 | 000A | 1929 | CKMKBT | LDI | 10 | |
| 07BC | 57C0 | 07C0 | 1930 | | TL | #7C0 | |
| | | | 1931 | | | | |
| | | | 1932 | | ORG | 7C0 | |
| 07C0 | 16 | | 1933 | | SKF1 | | SKIP NOT 15KG |
| 07C1 | 1B | | 1934 | | LXA | | X=3:30LB,6:6KG,10:15KG |
| 07C2 | CD | 00CD | 1935 | | LB | >69 | |
| 07C3 | 7D | 0002 | 1936 | | LDI | 2 | |
| 07C4 | 0129 | 0129 | 1937 | | TML | MAGLP-1 | CK KBT MAGNITUDE,LE,0X--- |
| 07C6 | 60 | 000F | 1938 | | ADI | 15 | .LE,RTN,DEC DIFF,SKIP NOT 0 |
| 07C7 | 95 | 07D5 | 1939 | | T | FCNDUN | .GT.RTN,IGNORE.GT.OR DIFF 0 |
| 07C8 | D8 | 00D8 | 1940 | ENTKBT | TM | >CLRT | CLR TARE |
| 07C9 | CD | 00CD | 1941 | | LB | >69 | |
| 07CA | 7A | 0005 | 1942 | | LDI | 5 | |
| 07CB | D1 | 00D1 | 1943 | | TM | >MOV5X | ENTER KEYBOARD TARE |
| 07CC | C2 | 00C2 | 1944 | | LB | >02 | |
| 07CD | 70 | 000F | 1945 | | LDI | 15 | |
| 07CE | 3E | 1 | 1946 | | EX | 1 | SET TARE DONE |
| 07CF | 77 | 0008 | 1947 | | LDI | 8 | |
| 07D0 | 3F | 0 | 1948 | | EX | | SET NET FLAG |
| 07D1 | D9 | 00D9 | 1949 | TDUN | TM | >CLRPR | CLR PRICE |
| 07D2 | CA | 00CA | 1950 | | LB | >33 | |
| 07D3 | 7F | 0000 | 1951 | | LDI | 0 | |
| 07D4 | 3F | 0 | 1952 | | EX | | CLR AUTO CLR FLAG |
| 07D5 | 7E | 0001 | 1953 | FCNDUN | LDI | 1 | SET DIG TIMER TO TIME OUT |
| 07D6 | C3 | 00C3 | 1954 | | LB | >04 | ON NEXT WGT READ PASS |
| 07D7 | 3F | 0 | 1955 | | EX | | BY LOADING IT WITH 1 |
| 07D8 | CC | 00CC | 1956 | KBDUN | LB | >57 | |
| 07D9 | 70 | 000F | 1957 | | LDI | 15 | |

| ADDR | CODE | ARG | STNO | | STMT | | |
|------|------|-----|------|------|------|------|------|
| 07DA | 3F | 0 | 1958 | | EX | | SET RECOMPUTE |
| 07DB | 17 | | 1959 | | INCB | | |
| 07DC | 7F | 0000 | 1960 | | LDI | 0 | |
| 07DD | 3F | 0 | 1961 | | EX | | CLR VERIFY MODE FLAG |
| 07DE | 56D5 | 06D5 | 1962 | | TL | KEYBD | |
| 07E0 | 00EC | 0013 | 1963 | ENTFCT | LBL | #13 | |
| 07E2 | 3F | 0 | 1964 | | EX | | FACTOR>FACTOR FLAG,FLAG>A |
| 07E3 | 1E | | 1965 | | SKZ | | SKIP NOT DONE BEFORE |
| 07E4 | 3F | 0 | 1966 | | EX | | REPLACE FACTOR DONE |
| 07E5 | 95 | 07D5 | 1967 | | T | FCNDUN | |
| 07E6 | 79 | 0006 | 1968 | PBCCK | LDI | 6 | 10 CNTR (501 OR SMART PRNTR) |
| 07E7 | 1B | | 1969 | | LXA | | CNTR>X |
| 07E8 | E4 | 00E4 | 1970 | | TM | >MODE | CK FOR BY COUNT MODE |
| 07E9 | BE | 07FE | 1971 | | T | POUT> | NOT BY COUNT |
| 07EA | CF | 00CF | 1972 | | LB | >7A | |
| 07EB | 12 | | 1973 | | LAX | | CNTR>A |
| 07EC | 19 | | 1974 | | XABL | | CNTR>BL |
| 07ED | 1F | | 1975 | | DECB | | |
| 07EE | 1F | | 1976 | | DECB | | START ADDR=CNTR-2 |
| 07EF | 12 | | 1977 | | LAX | | CNTR>A |
| 07F0 | 1B | | 1978 | PBC1 | LXA | | UPDATED CNTR>X |
| 07F1 | 37 | 0 | 1979 | | LD | | LD PRINT REG DIGIT |
| 07F2 | 60 | 000F | 1980 | | ADI | 15 | SKIP DIGIT NOT 0 |
| 07F3 | B6 | 07F6 | 1981 | | T | PBC2 | DIGIT 0,ENTER 13 |
| 07F4 | 6D | 0002 | 1982 | | ADI | 2 | SKIP IF DIGIT 15 |
| 07F5 | B8 | 07F8 | 1983 | | T | PBC3 | NOT 0 OR 15,IGNORE |
| 07F6 | 72 | 000D | 1984 | PBC2 | LDI | 13 | |
| 07F7 | 3F | 0 | 1985 | | EX | | 13>PRINT REG DIGIT |
| 07F8 | 1F | | 1986 | PBC3 | DECB | | |
| 07F9 | BA | 07FA | 1987 | | T | *+1 | |
| 07FA | 12 | | 1988 | | LAX | | CNTR>A |
| 07FB | 6E | 0001 | 1989 | | ADI | 1 | INC CNTR TOWARD 0 |
| 07FC | B0 | 07F0 | 1990 | | T | PBC1 | NOT 0,LOOP |
| 07FD | 3F | 0 | 1991 | | EX | | MAKE SURE FACTOR 0 |
| 07FE | 5687 | 0687 | 1992 | POUT> | TL | POUT | |
| | | | 1993 | | END | | |

0 ERRORS DETECTED

| DEF | SYMBOL | REFERENCES | | | | | | | |
|-----|--------|------------|------|------|------|------|------|------|------|
| 61 | >ADDC | 798 | 824 | 1218 | | | | | |
| 53 | >ARICL | 405 | 747 | 805 | 815 | 847 | 991 | 1040 | 1079 | 1335 |
| 57 | >BLANK | 954 | 956 | 1006 | 1312 | 1441 | | | |
| 54 | >CLEAR | 327 | 570 | 746 | 770 | 792 | 959 | 1337 | 1349 | 1766 |
| 56 | >CLRPR | 576 | 1034 | 1091 | 1155 | 1364 | 1949 | | |
| 55 | >CLRT | 574 | 957 | 1154 | 1940 | | | | |
| 69 | >CRTAZ | 1022 | 1126 | | | | | | |
| 63 | >DELAY | 501 | 666 | 1712 | 1805 | | | | |
| 65 | >DLY.4 | 1690 | 1692 | | | | | | |
| 59 | >FCPTY | 642 | 914 | 1024 | 1105 | 1130 | 1163 | 1193 | 1242 | 1556 | 1858 |
| | | 1910 | | | | | | | |
| 52 | >MAGCK | 439 | 465 | 854 | 947 | 1010 | 1098 | 1244 | 1362 | 1438 |
| 67 | >MODE | 638 | 1255 | 1309 | 1843 | 1855 | 1970 | | |
| 66 | >MOVPR | 1350 | 1390 | | | | | | |
| 47 | >MOVX | 445 | 790 | 802 | 831 | 846 | 910 | 913 | 928 | 990 | 1082 |
| | | 1095 | 1129 | | | | | | |
| 49 | >MOV5 | 1382 | 1395 | 1456 | 1469 | 1479 | 1602 | 1614 | 1622 | 1639 | 1655 |
| | | 1849 | | | | | | | |
| 48 | >MOV5X | 765 | 783 | 815 | 841 | 1029 | 1221 | 1464 | 1584 | 1945 |
| 51 | >MULT | 760 | 781 | 811 | 839 | 1027 | 1352 | 1404 | | |
| 70 | >OUTP> | 960 | 1365 | 1840 | | | | | |
| 60 | >RNDOF | 1198 | 1406 | | | | | | |
| 68 | >SETRC | 575 | 867 | 1090 | 1259 | 1373 | 1388 | | |
| 64 | >SUBL | 1122 | 1184 | 1234 | | | | | |
| 50 | >SUBT | 788 | 800 | 829 | 844 | 849 | 908 | 926 | 988 | 1002 | 1050 |
| | | 1093 | 1134 | | | | | | |

| DEF | SYMBOL | REFERENCES | | | | | | | | |
|---|---|---|---|---|---|---|---|---|---|---|
| 58 | >TPRDS | 1405 | 1411 | 1418 | 1425 | 1448 | | | | |
| 62 | >UDDWT | 953 | 1258 | | | | | | | |
| 29 | >00 | 589 | 857 | 969 | 1063 | 1235 | 1875 | | | |
| 30 | >01 | 1012 | 1069 | 1902 | | | | | | |
| 31 | >02 | 628 | 1315 | 1944 | | | | | | |
| 32 | >04 | 324 | 620 | 1053 | 1753 | 1837 | 1879 | 1954 | | |
| 33 | >09 | 494 | 643 | 1117 | 1127 | 1175 | 1381 | 1539 | 1709 | 1751 | 1775 |
| | | 1799 | | | | | | | | |
| 36 | >1A | 750 | 773 | 791 | 795 | 806 | 818 | 832 | 1041 | 1080 | 1119 |
| | | 1181 | 1346 | | | | | | | |
| 34 | >12 | 569 | 965 | 1083 | 1100 | 1883 | 1906 | | | |
| 35 | >13 | 1339 | 1371 | 1586 | 1624 | 1765 | | | | |
| 37 | >21 | 787 | 799 | 907 | 925 | 950 | 1001 | 1133 | 1544 | |
| 38 | >29 | 465 | 1072 | 1348 | | | | | | |
| 39 | >33 | 571 | 1136 | 1896 | 1950 | | | | | |
| 40 | >48 | 511 | 580 | 929 | 1145 | 1302 | | | | |
| 41 | >57 | 608 | 1523 | 1529 | 1956 | | | | | |
| 43 | >6E | 330 | 1005 | 1219 | 1311 | 1383 | 1391 | 1580 | | |
| 42 | >69 | 328 | 447 | 1612 | 1763 | 1845 | 1850 | 1889 | 1935 | 1941 |
| 44 | >7A | 769 | 1336 | 1497 | 1589 | 1972 | | | | |
| 224 | ADD | 194 | 234 | | | | | | | |
| 510 | ADDC | 373 | 508 | 515 | 1417 | | | | | |
| 373 | ADDC> | 61 | | | | | | | | |
| 1378 | ADRWGT | 1569 | | | | | | | | |
| 302 | ARICL | 53 | | | | | | | | |
| 338 | BLANK | 57 | 329 | 348 | 1764 | 1851 | | | | |
| 490 | BLKWT> | 482 | | | | | | | | |
| 1005 | BLNKWT | 490 | 685 | | | | | | | |
| 1104 | CKACL> | 1099 | | | | | | | | |
| 1130 | CKACLR | 1104 | 1125 | | | | | | | |
| 1008 | CKGAZC | 1004 | | | | | | | | |
| 1157 | CKINC | 1141 | | | | | | | | |
| 1383 | CKMIN | 1345 | | | | | | | | |
| 1929 | CKMKBT | 1919 | | | | | | | | |
| 1096 | CKNAZC | | | | | | | | | |
| 1701 | CKPRNT | | | | | | | | | |
| 1329 | CKRCP | 1318 | 1321 | | | | | | | |
| 620 | CKRST | 615 | | | | | | | | |
| 350 | CKWSGN | 1322 | | | | | | | | |
| 1889 | CK0T | 1882 | | | | | | | | |
| 304 | CLEAR | 54 | 307 | | | | | | | |
| 1262 | CLRDFC | 1257 | | | | | | | | |
| 349 | CLRPF | 342 | 346 | | | | | | | |
| 324 | CLRPR | 56 | | | | | | | | |
| 293 | CLRT | 55 | | | | | | | | |
| 162 | CMDIG | 159 | | | | | | | | |
| 1335 | CMPUT | 1333 | | | | | | | | |
| 1040 | CRCTAZ | 374 | | | | | | | | |
| 374 | CRTAZ> | 69 | | | | | | | | |
| 984 | CZTIM | 964 | 968 | 972 | | | | | | |
| 529 | DELAY | 576 | | | | | | | | |
| 376 | DELAY> | 63 | | | | | | | | |
| 533 | DELY1 | 539 | 545 | | | | | | | |
| 540 | DELY2 | 534 | | | | | | | | |
| 546 | DELY3 | 542 | 553 | | | | | | | |
| 1526 | DISPON | 1523 | | | | | | | | |
| 493 | DL.4MS | 377 | | | | | | | | |
| 1511 | DLUOPA | 1515 | 1525 | | | | | | | |
| 1518 | DLUOPB | 1521 | | | | | | | | |
| 377 | DLY.4> | 65 | | | | | | | | |
| 1767 | EVTDIG | 1762 | | | | | | | | |
| 1963 | EVTFCT | 1864 | | | | | | | | |
| 1940 | EVTKBT | | | | | | | | | |
| 1953 | FCNDUN | 1852 | 1900 | 1939 | 1967 | | | | | |
| 405 | FCPTY | 371 | | | | | | | | |
| 371 | FCPTY> | 59 | | | | | | | | |
| 419 | FCPTY1 | 411 | 416 | | | | | | | |
| 424 | FCPTY2 | 420 | | | | | | | | |
| 431 | FCPTY3 | 427 | | | | | | | | |

| DEF | SYMBOL | REFERENCES | | | | | |
|---|---|---|---|---|---|---|---|
| 1852 | FDUN> | 1857 | 1861 | 1871 | | | |
| 1900 | FDUN>> | 1878 | 1886 | 1905 | 1909 | 1914 | 1928 |
| 887 | FLTWGT | 880 | 885 | | | | |
| 899 | FLTWT1 | 894 | | | | | |
| 869 | INIFLT | 862 | | | | | |
| 1309 | ITLKCK | 1301 | | | | | |
| 18 | KAF | | | | | | |
| 1788 | KBCMND | 1758 | | | | | |
| 1956 | KBDUN | 1787 | | | | | |
| 1748 | KBD1 | 1742 | | | | | |
| 568 | KBERR | 1757 | | | | | |
| 19 | KBF | | | | | | |
| 1902 | KBTARE | 1895 | | | | | |
| 1758 | KCMND> | 1738 | | | | | |
| 20 | KDN | 1526 | | | | | |
| 21 | KER | 568 | 1798 | | | | |
| 1757 | KERR> | 1735 | | | | | |
| 1723 | KEYBD | 1810 | 1962 | | | | |
| 1810 | KEYBD> | 1774 | 1779 | | | | |
| 22 | KLA | 1512 | | | | | |
| 23 | KLB | 1519 | | | | | |
| 24 | KTR | 1729 | | | | | |
| 25 | KTS | 1723 | | | | | |
| 1920 | KT15KG | 1916 | | | | | |
| 1925 | KT6KG | 1918 | 1924 | | | | |
| 1268 | LDLMPS | | | | | | |
| 933 | LDPPUK | 1308 | 1424 | 1446 | | | |
| 1334 | LMOUT> | 1327 | | | | | |
| 1591 | LMPLP> | 1550 | | | | | |
| 1550 | LMPOLP | 1591 | | | | | |
| 1327 | LMPOUT | 1334 | | | | | |
| 891 | LSD/2 | 898 | | | | | |
| 266 | MADDL | 274 | | | | | |
| 151 | MAGCK | 52 | | | | | |
| 155 | MAGLP | 161 | 1576 | 1893 | 1937 | | |
| 438 | MAXAZ | 979 | 1054 | | | | |
| 253 | MDIG | 275 | 290 | | | | |
| 1024 | MFCTR | 1019 | | | | | |
| 311 | MJDECK | 67 | | | | | |
| 96 | MJVPR | 66 | | | | | |
| 447 | MJVPRX | 96 | | | | | |
| 75 | MJVX | 81 | 378 | | | | |
| 378 | MJVX> | 47 | | | | | |
| 107 | MJV5 | 49 | 142 | 451 | 489 | | |
| 105 | MJV5X | 48 | | | | | |
| 243 | MJLT | 51 | 247 | | | | |
| 276 | NDIG | 259 | | | | | |
| 83 | NJKEY | 1756 | | | | | |
| 1756 | NJKEY> | 1727 | | | | | |
| 1448 | NJTOV | 1439 | | | | | |
| 1219 | OUTFLT | 1202 | | | | | |
| 1254 | OUTF1 | 1241 | 1246 | | | | |
| 1265 | OUTF2 | 1250 | 1253 | 1264 | | | |
| 174 | OUTPT> | 70 | | | | | |
| 1462 | OUTPUT | 174 | 1445 | 1447 | | | |
| 1425 | OVALCK | 1410 | | | | | |
| 1390 | OW>ARI | 1387 | | | | | |
| 1681 | PARITY | 397 | | | | | |
| 1968 | PBCCK | 1617 | 1657 | | | | |
| 1978 | PBC1 | 1990 | | | | | |
| 1984 | PBC2 | 1981 | | | | | |
| 1986 | PBC3 | 1983 | | | | | |
| 1658 | PJUT | 1662 | 1992 | | | | |
| 1992 | PJUT> | 1971 | | | | | |
| 1668 | PJUTLP | 1696 | | | | | |
| 1865 | PRNCK | 1854 | | | | | |
| 1551 | PRNTR | | | | | | |
| 847 | PROCWT | | | | | | |
| 1346 | PRXFCT | 1343 | | | | | |
| 1404 | PRXWGT | | | | | | |

| DEF | SYMBOL | REFERENCES | | | | | | | | |
|---|---|---|---|---|---|---|---|---|---|---|
| 1578 | PTYPE | 1568 | 1573 | | | | | | | |
| 1863 | P1/2 | 1844 | | | | | | | | |
| 1841 | P1/2CK | 1814 | | | | | | | | |
| 1853 | P1/4CK | 1842 | | | | | | | | |
| 1618 | P300 | 1592 | | | | | | | | |
| 1592 | P300> | 1582 | | | | | | | | |
| 586 | RDSWA | 619 | | | | | | | | |
| 577 | RDSWS | 91 | 92 | | | | | | | |
| 92 | RDSWS> | 86 | 90 | | | | | | | |
| 642 | RDWGT | 623 | 637 | 640 | | | | | | |
| 686 | RDWGT1 | 682 | | | | | | | | |
| 569 | RESET | 641 | 1901 | | | | | | | |
| 1203 | RNDBY2 | 1197 | | | | | | | | |
| 1209 | RNDBY5 | 1201 | | | | | | | | |
| 372 | RNDOF> | 60 | | | | | | | | |
| 505 | RNDOFF | 372 | | | | | | | | |
| 1215 | RNDWT1 | 1211 | | | | | | | | |
| 1218 | RNDWT2 | 1208 | | | | | | | | |
| 590 | RSLOOP | 600 | | | | | | | | |
| 1704 | RSTPR> | 1702 | | | | | | | | |
| 1720 | RSTPTR | 1704 | | | | | | | | |
| 235 | SDUN | 208 | 223 | | | | | | | |
| 26 | SES | 566 | 680 | 684 | 738 | | | | | |
| 379 | SETRC> | 68 | | | | | | | | |
| 608 | SETRCP | 379 | | | | | | | | |
| 27 | SJS | 495 | 562 | 588 | 591 | 604 | 698 | 728 | 1541 | 1543 | 1566 |
| | | 1660 | 1685 | 1699 | 1708 | 1714 | 1719 | 1722 | | |
| 1092 | STARE | 1058 | 1062 | 1068 | 1075 | | | | | |
| 987 | SJBAZ | 977 | 980 | | | | | | | |
| 195 | SJBL | 64 | 205 | | | | | | | |
| 209 | SJBM | 207 | | | | | | | | |
| 216 | SJBML | 222 | | | | | | | | |
| 183 | SJBT | 50 | | | | | | | | |
| 1870 | TARECK | 1866 | | | | | | | | |
| 1949 | TDUN | 1888 | | | | | | | | |
| 1315 | TDUNCK | 1310 | | | | | | | | |
| 1440 | TPBLK | 1007 | 1328 | | | | | | | |
| 1322 | TPCLR | 1314 | 1389 | | | | | | | |
| 358 | TPRDS | 58 | | | | | | | | |
| 748 | T2CNVT | | | | | | | | | |
| 690 | T2LOOP | 701 | | | | | | | | |
| 804 | T3CNVT | | | | | | | | | |
| 719 | T3LOOP | 730 | | | | | | | | |
| 911 | UDFWT | 868 | 886 | 904 | | | | | | |
| 458 | UDUWT | 375 | | | | | | | | |
| 375 | UDUWT> | 62 | | | | | | | | |
| 483 | UDGWT1 | 476 | | | | | | | | |
| 1381 | UDTPXF | 1377 | | | | | | | | |
| 1192 | UDZLF | 1189 | | | | | | | | |
| 1796 | VFYCK | | | | | | | | | |
| 957 | X10CLR | 567 | | | | | | | | |
| 945 | X10EXP | | | | | | | | | |
| 961 | ZCAPT | 944 | | | | | | | | |
| 1163 | ZLAMP | 1144 | 1149 | 1153 | 1156 | 1159 | | | | |
| 1814 | 1/2CK> | 1797 | | | | | | | | |

What is claimed is:

1. In a weight measuring system computing means of the type having circuit means for generating digital gross weight data, a tare memory means for storing data representing a tare weight, and means for periodically generating a net weight signal from the difference between the generated gross weight data and the tare weight data stored in said tare memory means, the improvement comprising means for modifying the tare weight data stored in said tare memory means by a predetermined amount to decrease the absolute value of the net weight in response to the generation of net weight data within a preselected range.

2. A weight measuring system according to claim 1 wherein said tare memory comprises a register having a preselected number of significant digits and wherein said tare weight data is modified by one increment of the least significant digit in response to the generation of net weight data within a preselected range.

3. A weight measuring system according to claim 2 wherein said weight measuring system has a plurality of alternatively selectable weight capacities and further comprises: a plurality of memory means each storing a net zero tracking range associated with a different one of said weight capacities; and means for comparing the net weight with the net zero tracking range for the selected weight capacity for determining whether the net weight is within the preselected range.

4. An apparatus according to claim 3 further comprising in combination means for generating and storing a factor for correcting said generated gross weight data, means for correcting said gross weight data by said correction factor and means for modifying the correction factor by a predetermined amount to decrease the absolute value of the corrected gross weight data in response to the generation of a corrected gross weight within a preselected range.

5. A method for tracking and correcting the net zero indication of a weighing scale, said scale having means for generating a weight signal, means for storing a tare weight and means for subtracting the tare weight from the generated weight, said method comprising:
  (a) subtracting tare weight data from a generated gross weight data to generate net weight data;
  (b) comparing the net weight data with a preselected weight range to determine whether the net weight data is within said range; and
  (c) modifying the tare weight data by a predetermined amount to decrease the absolute value of the net weight data in response to said net weight data being within said range.

6. A method according to claim 5 wherein said tare weight data is modified by effectively algebraically adding to the least significant digit of the tare weight data a one having a sign which is identical to the sign of the net weight data.

7. A machine implemented method of operating a digital scale comprising the steps of:
  (1) storing a tare weight,
  (2) making a weight measurement,
  (3) subtracting the tare weight from the weight measurement to obtain a net weight,
  (4) storing a predetermined weight range near zero,
  (5) comprising the net weight with the stored predetermined weight range to determine whether the net weight is within the predetermined weight range, and
  (6) automatically changing the stored tare weight by a predetermined amount to decrease the absolute value of the net weight in response to said net weight being within the stored weight range.

8. A net weight digital scale system comprising in combination a scale mechanism, program controlled means for controlling the generation of digital gross weight data representing the weight on the scale means, storage means for storing digital tare weight data, means for generating digital net weight data from the difference between the generated digital gross weight data and the stored digital tare weight data, means responsive to a digital net weight within a predetermined range to change the stored digital tare weight data a small increment to change the net weight data toward zero.

* * * * *